United States Patent [19]

Gassaway et al.

[11] 4,397,005

[45] Aug. 2, 1983

[54] EXPLORATION SYSTEM FOR ENHANCING THE LIKELIHOOD OF THE DISCOVERY OF DEPOSITS OF ORE, MARKER ROCK AND/OR ECONOMIC MINERALS

[75] Inventors: Gary S. Gassaway; Henry J. Richgels, both of San Rafael; James I. Foster, Novato, all of Calif.

[73] Assignee: Chevron Research Company, San Francisco, Calif.

[21] Appl. No.: 238,347

[22] Filed: Feb. 26, 1981

Related U.S. Application Data

[63] Continuation of Ser. No. 952,888, Oct. 18, 1978, abandoned, which is a continuation-in-part of Ser. No. 909,586, May 25, 1978.

[51] Int. Cl.³ ............... G01V 1/20; G01V 1/32; G01V 1/34
[52] U.S. Cl. ................... 367/36; 367/58; 367/75; 364/421
[58] Field of Search ................ 367/36, 58, 75; 364/421

[56] References Cited

U.S. PATENT DOCUMENTS 3,302,164  1/1967  Waters et al. .................. 367/75

Primary Examiner—Nelson Moskowitz
Attorney, Agent, or Firm—H. D. Messner; Edward J. Keeling

[57] ABSTRACT

The present invention provides for the accurate mapping of shallow crustal earth formations by means for refractive seismic waves to identify structure as well as elastic parameters of the strata undergoing survey to indicate deposits or ore, marker rock, economic minerals and the like. In one aspect of the present invention, a "roll-along" technique is used in the field, such technique being both practical and economical. In accordance with another aspect of the invention, there is a provision for (i) accurate separation and determination of seismic shear and compressional responses using two-dimensional hodographs; (ii) stacking displays that allow for accurate identification of shape of the surveyed strata; and (iii) final depth displays of the refracting bed segments associated with seismic shear and compressional wave velocities as well as Poisson's ratio to indicate presence of ore, marker rocks, economic minerals and the like.

8 Claims, 26 Drawing Figures

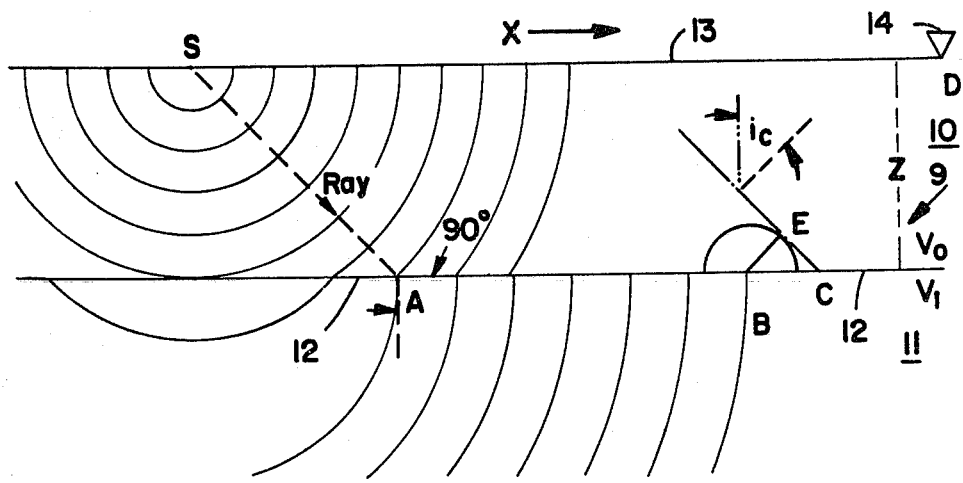
FIG_1
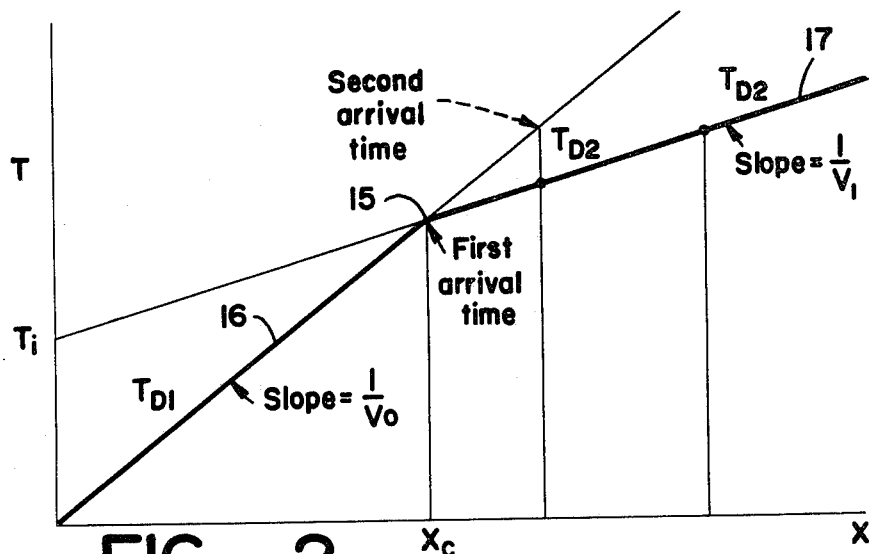
FIG_2
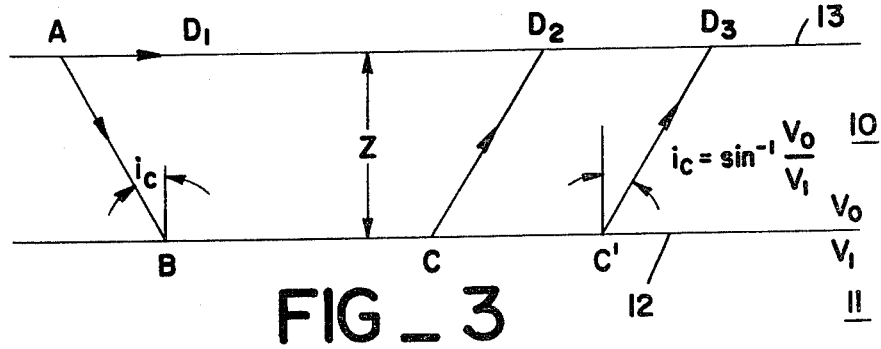
FIG_3

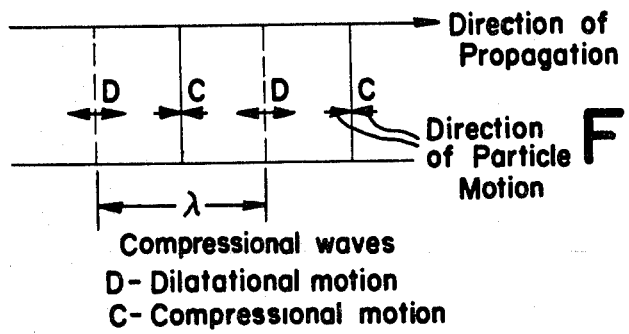
FIG_4a
Compressional waves
D- Dilatational motion
C- Compressional motion
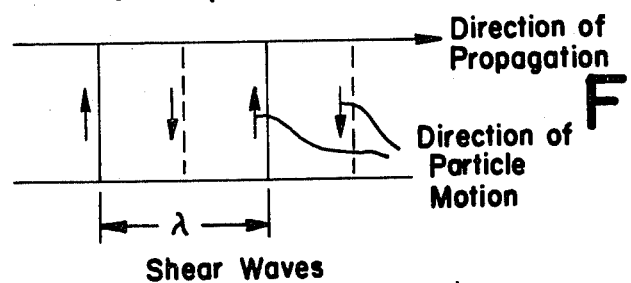
FIG_4b
Shear Waves
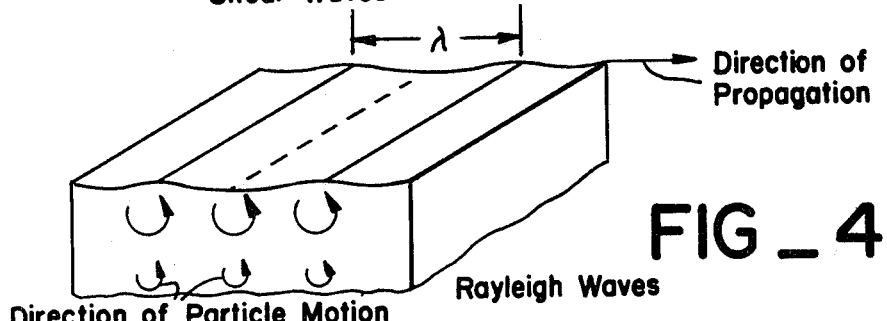
FIG_4c
Rayleigh Waves
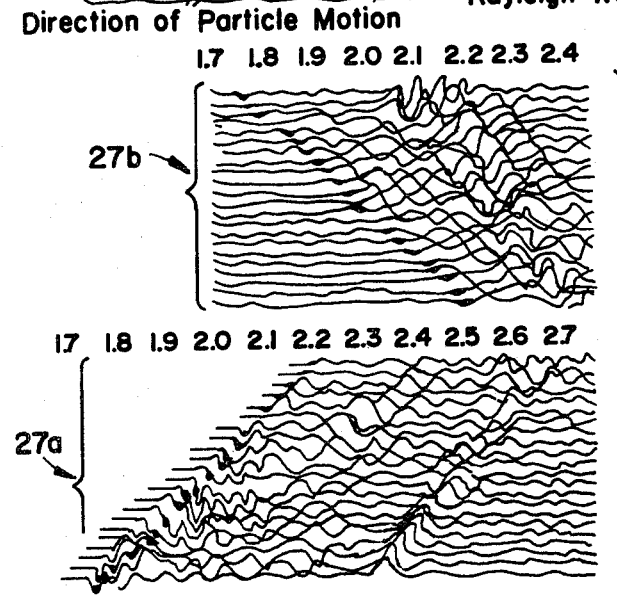
FIG_7

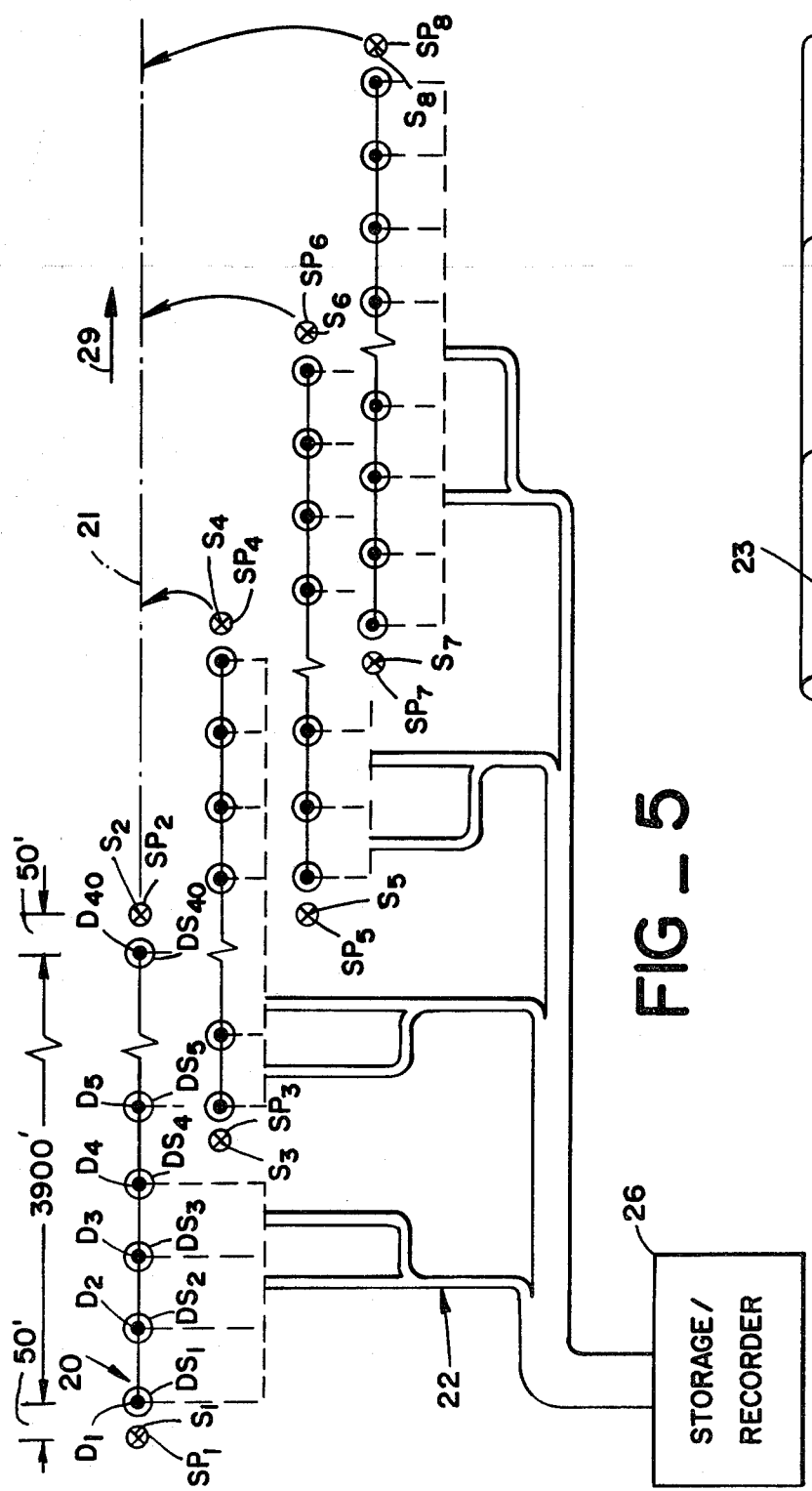
FIG._5
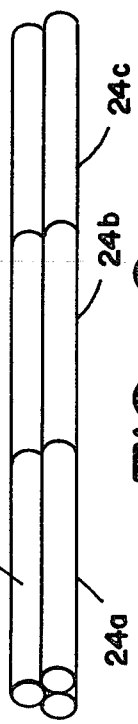
FIG._6

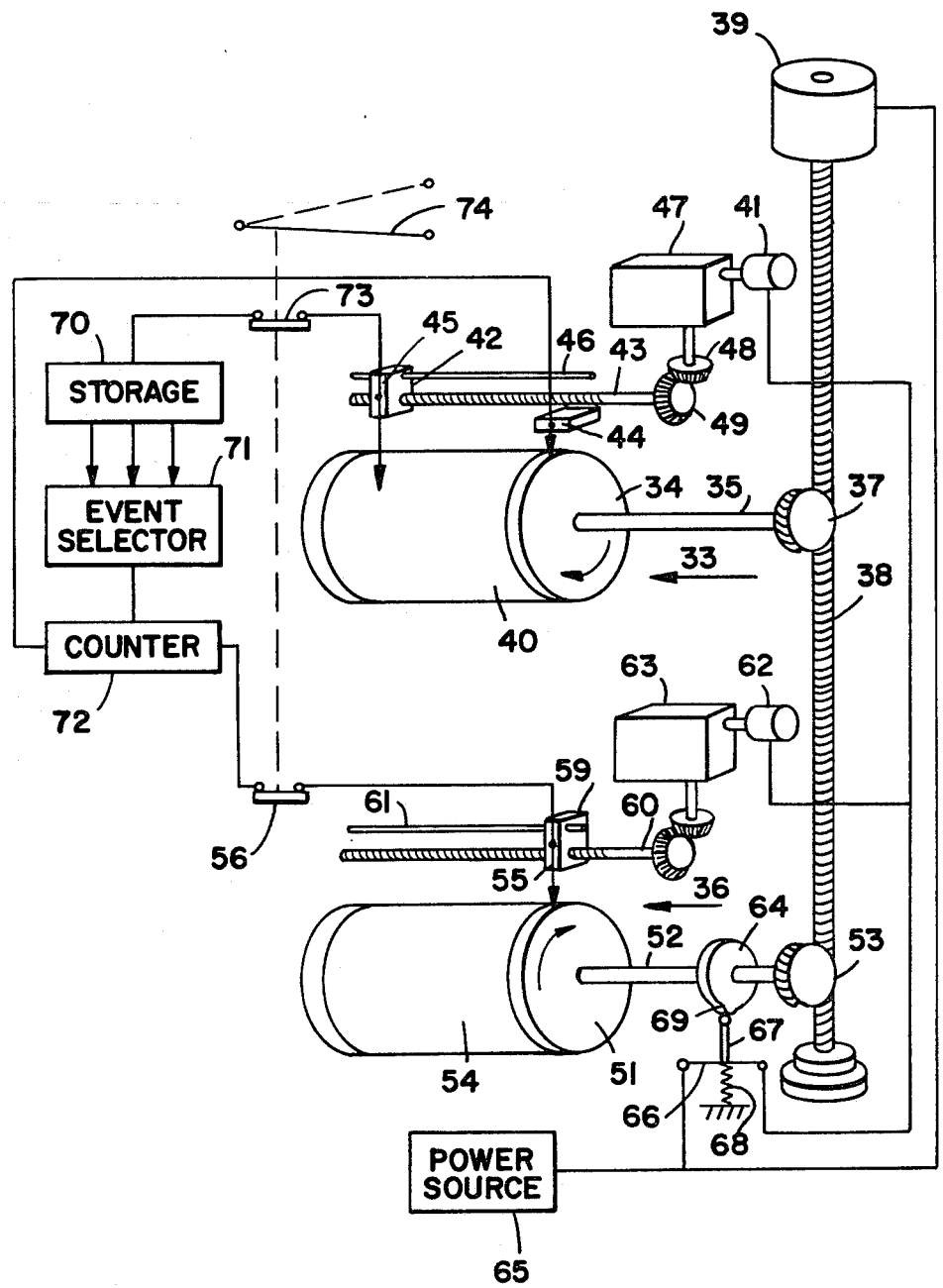
FIG_8

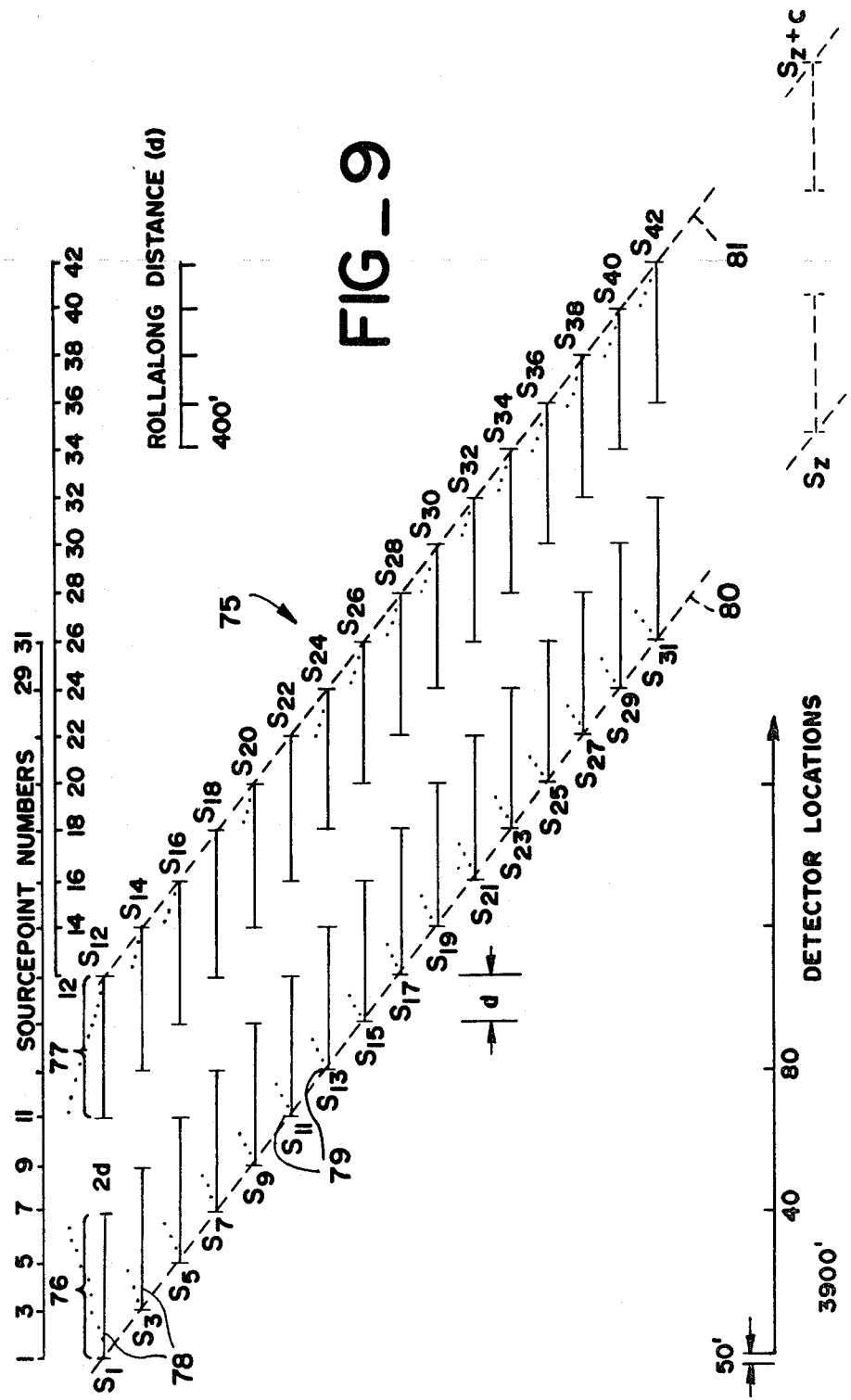

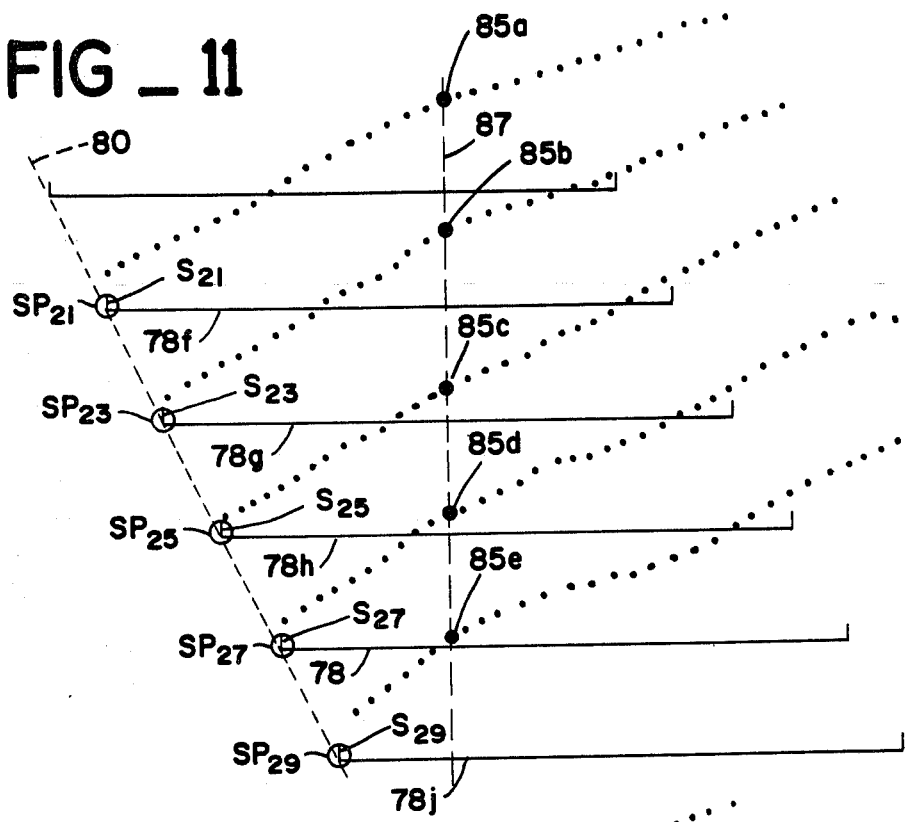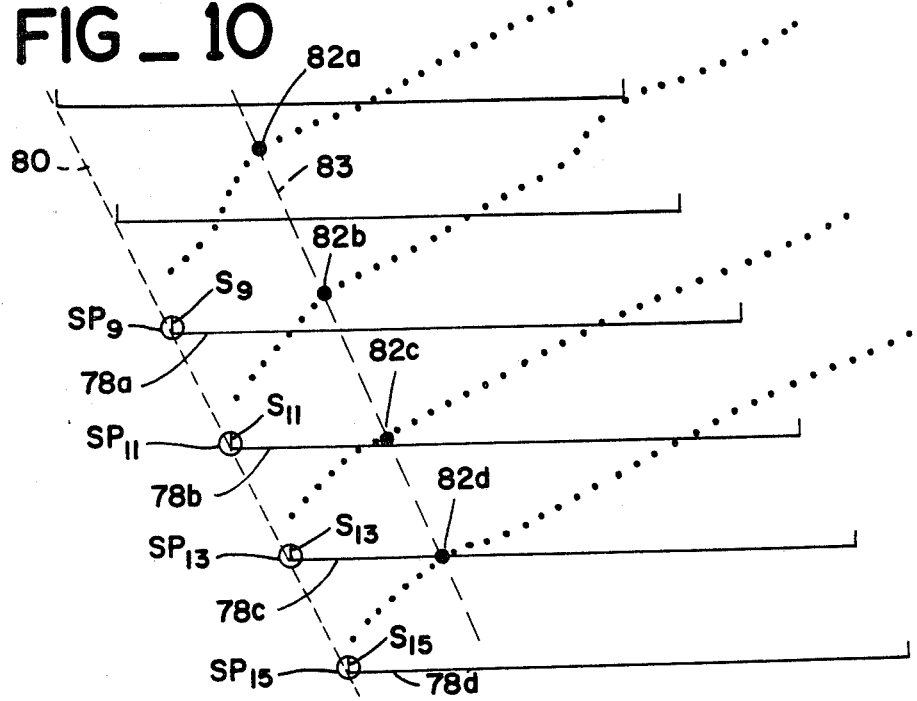

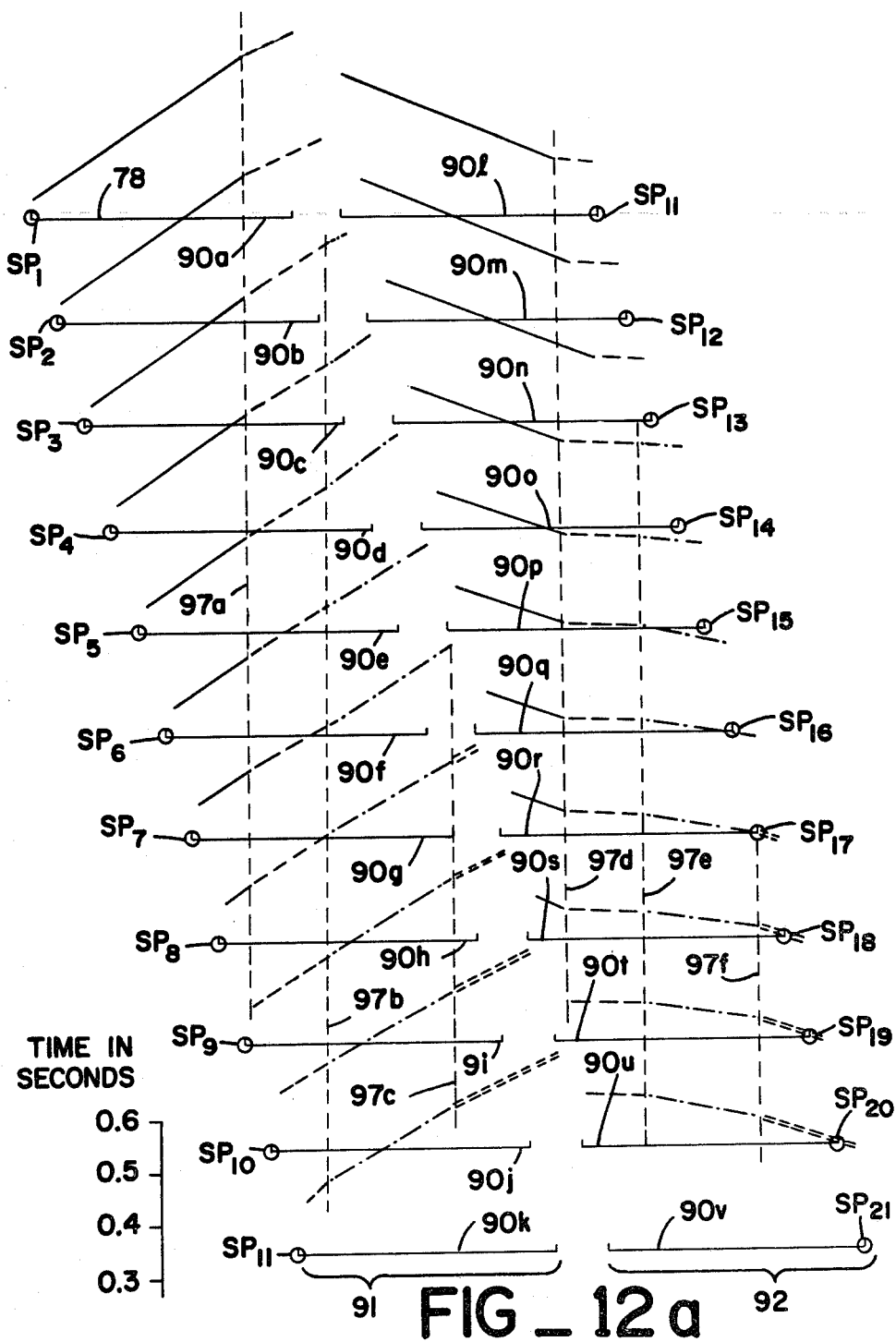
FIG_12a

LEGEND RELATED TO DEPICTED VELOCITIES

APPARENT COMPRESSION VELOCITY (FT/SEC)

"FORWARD" H-BARS 90a - 90k

| SOLID LINE | (———) | = 11,881 |
| BROKEN LINE | (— — —) | = 14,285 |
| DASHED LINE | (—·—) | = 12,121 |
| DOUBLE DASHED LINE | (===) | = 17,647 |

"REVERSE" H-BARS 90l - 90v

| SOLID LINE | (———) | = 20,339 |
| BROKEN LINE | (— — —) | = 130,000 |
| DASHED LINE | (—·—) | = 60,000 |
| DOUBLE DASHED LINE | (===) | = 23,076 |

FIG_12b

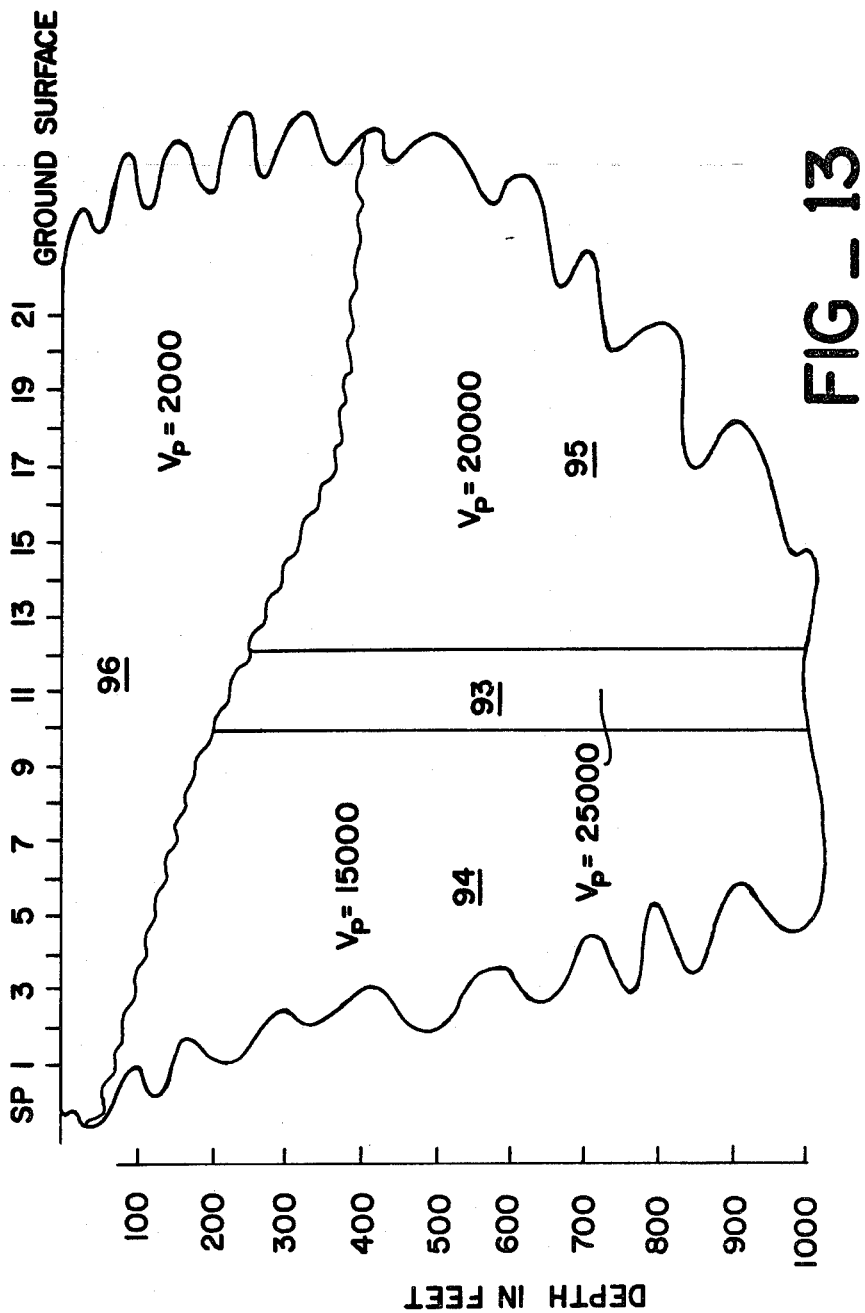

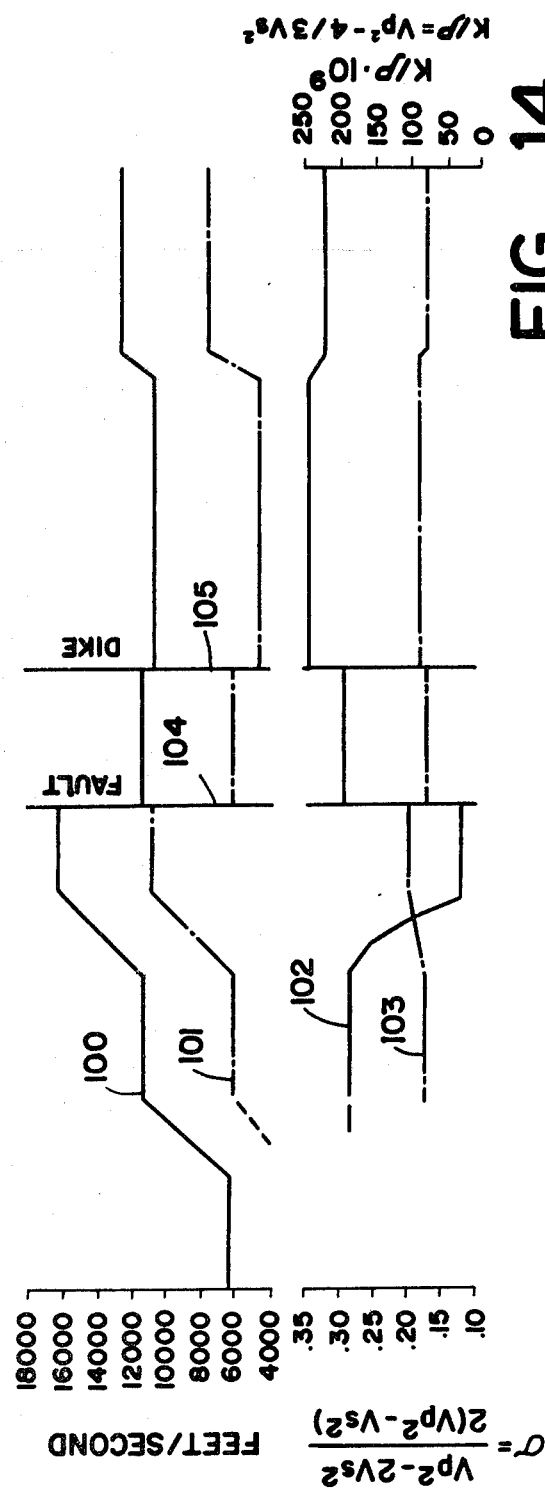
FIG_14
FIG_15

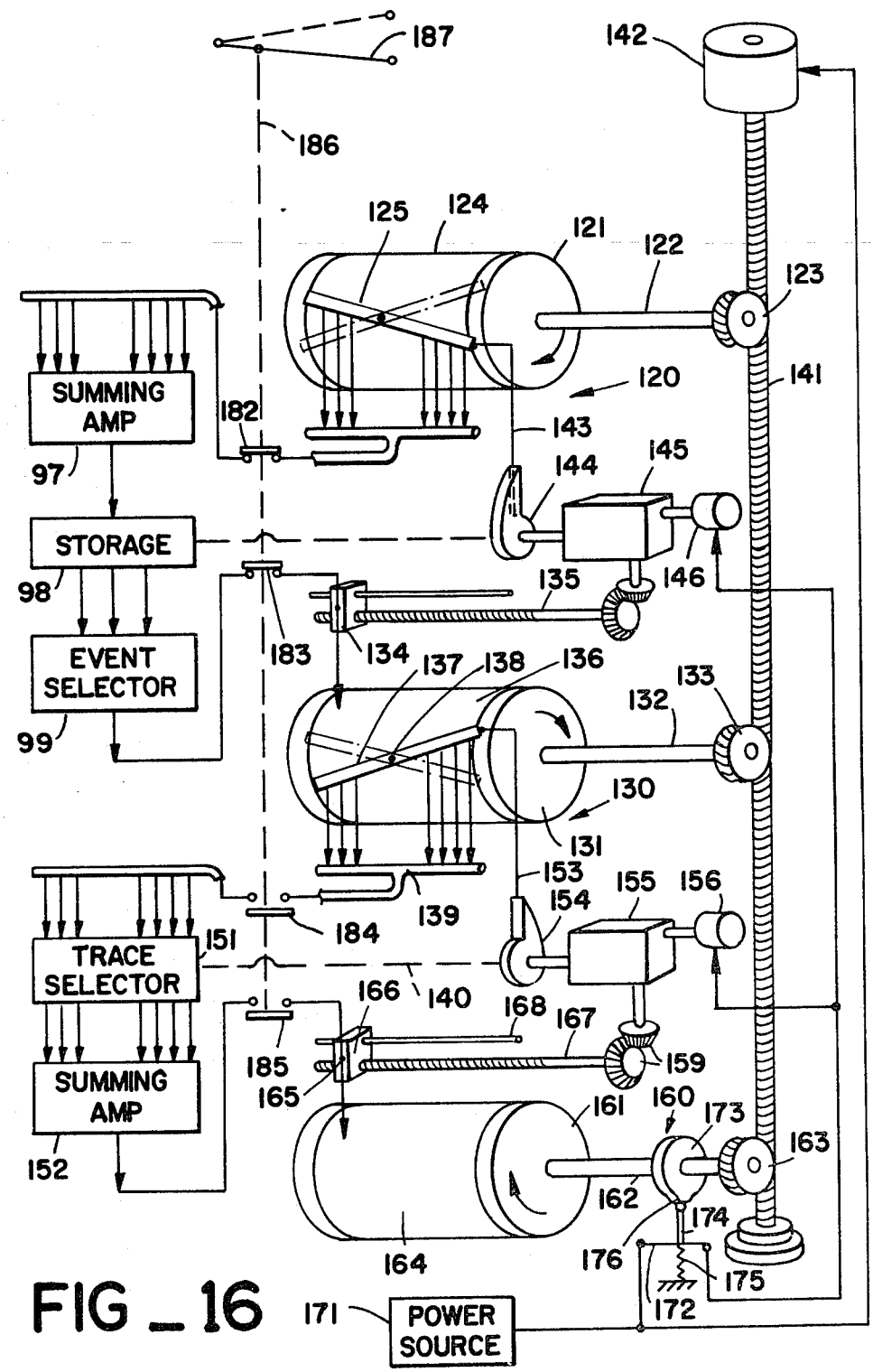
FIG_16

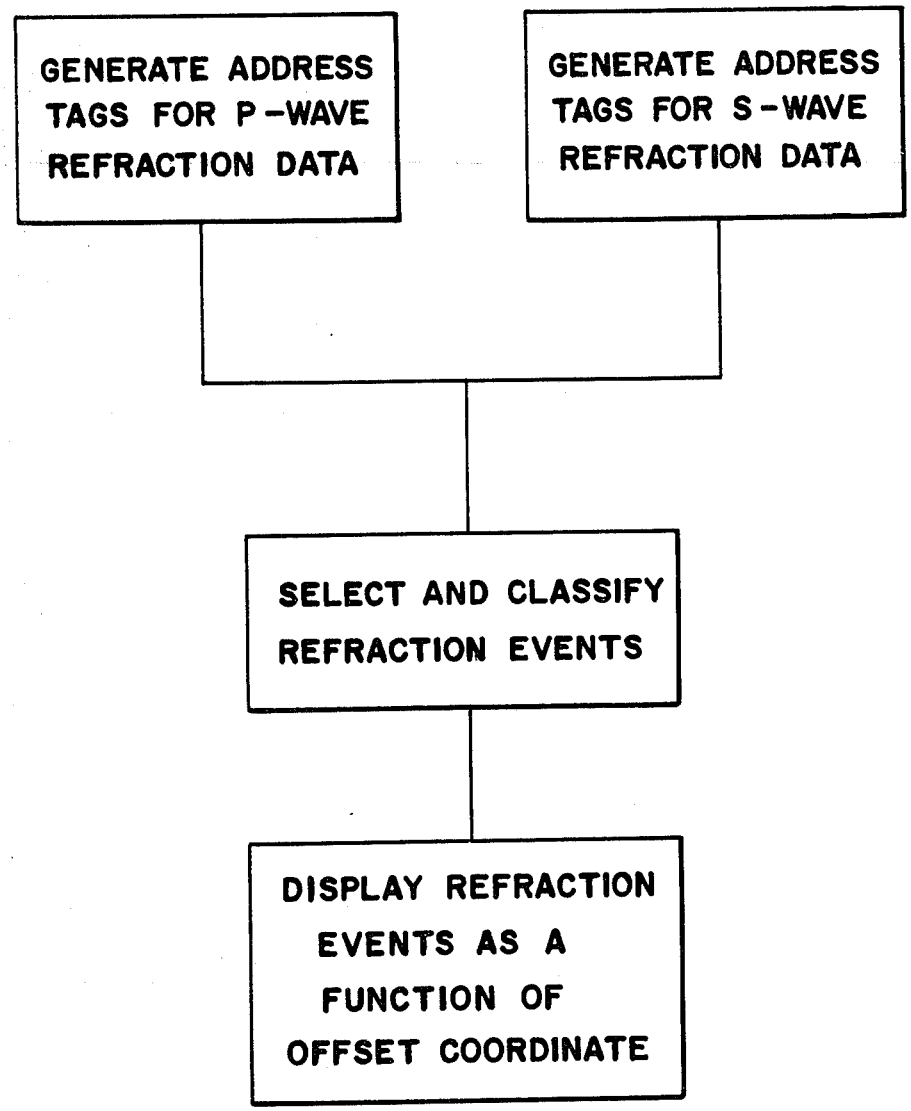
FIG_17

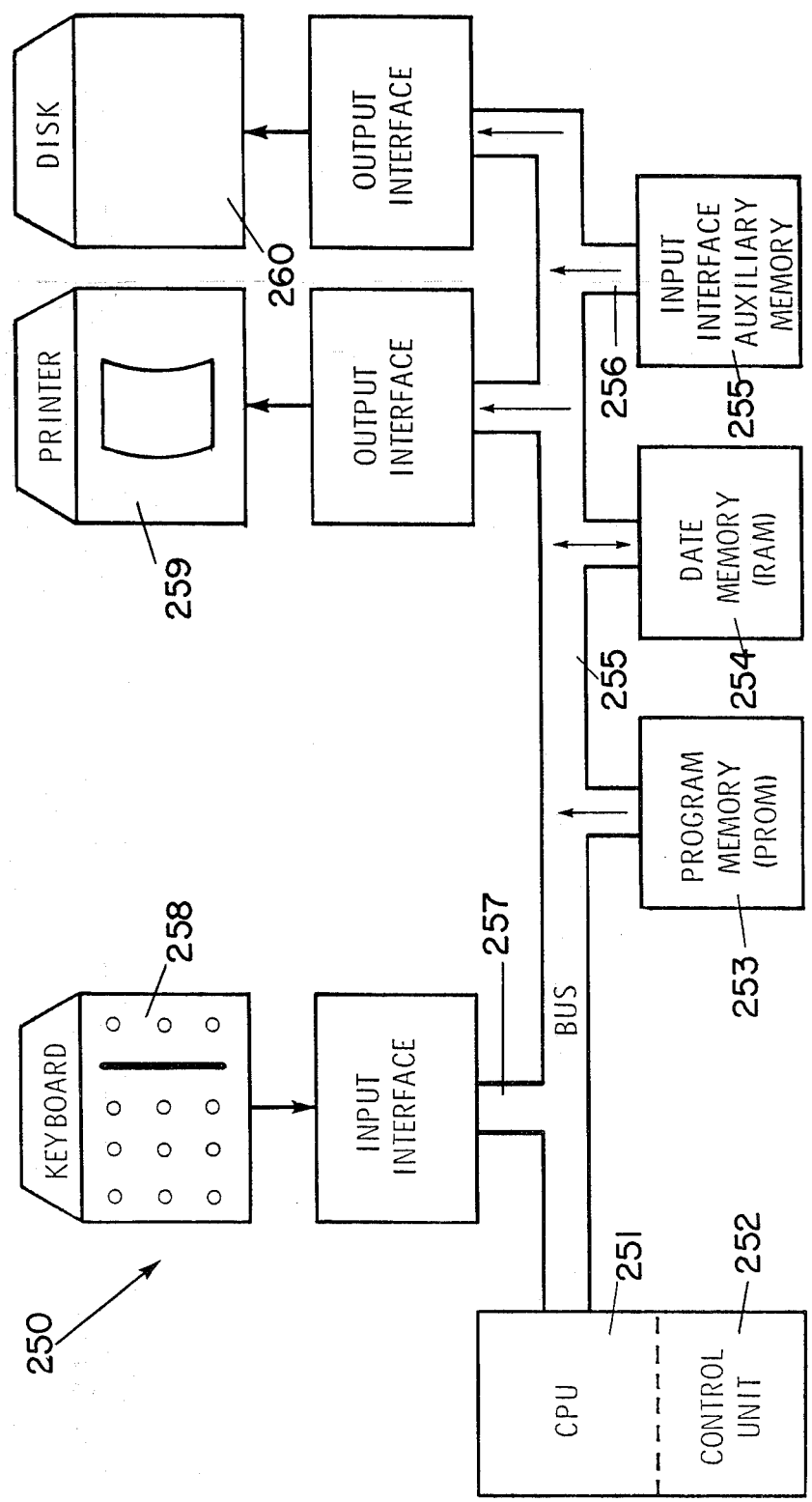
FIG_18

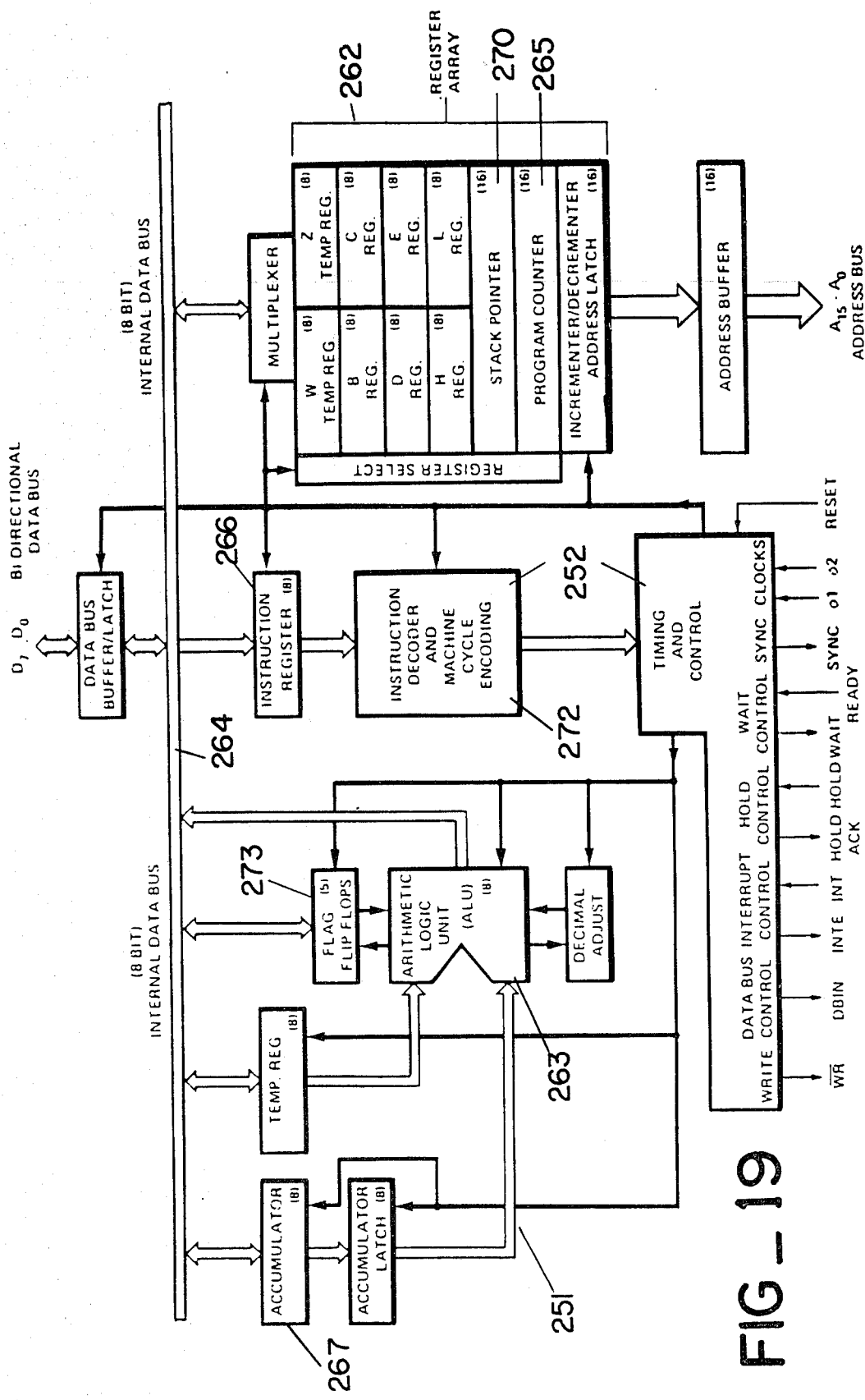
FIG_19

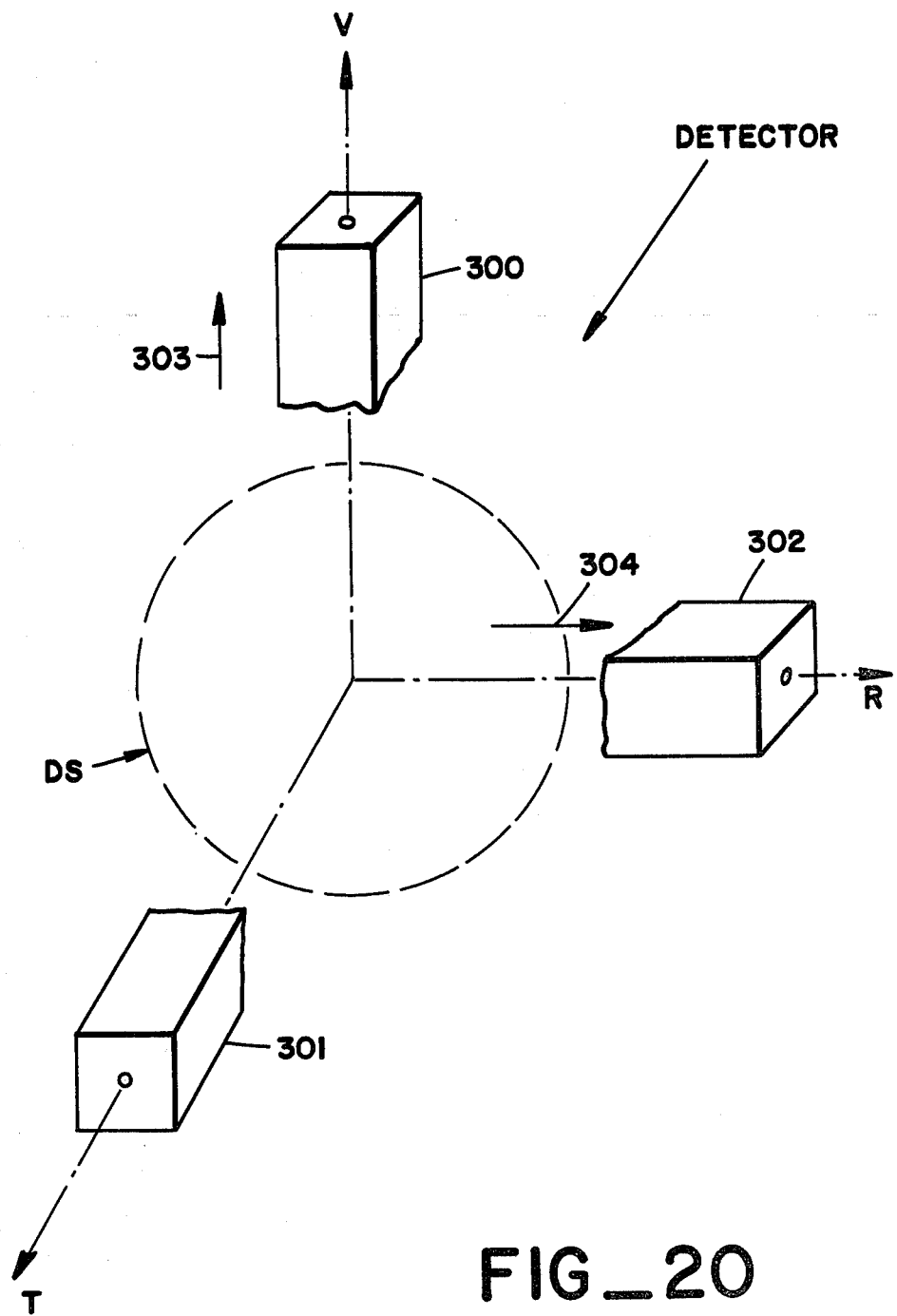
FIG_20

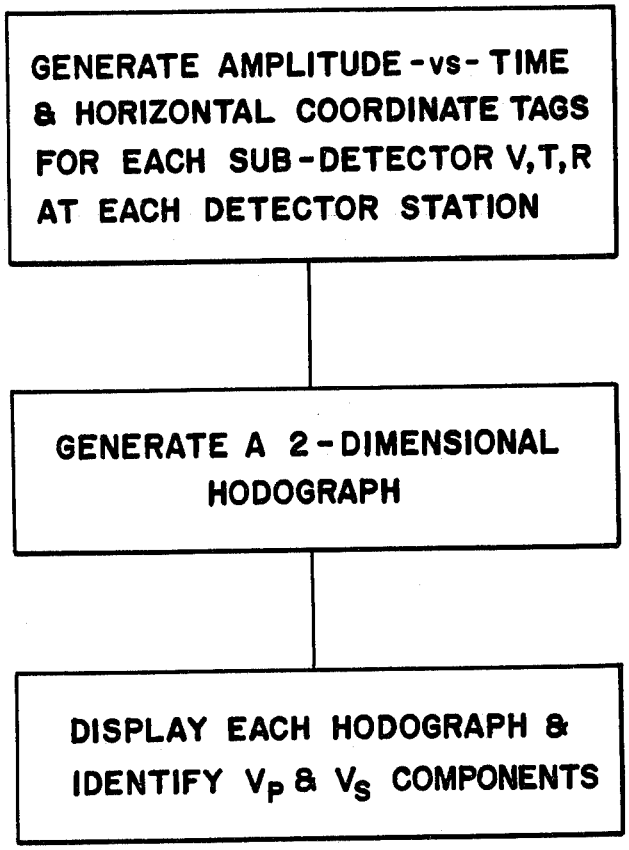
FIG_21

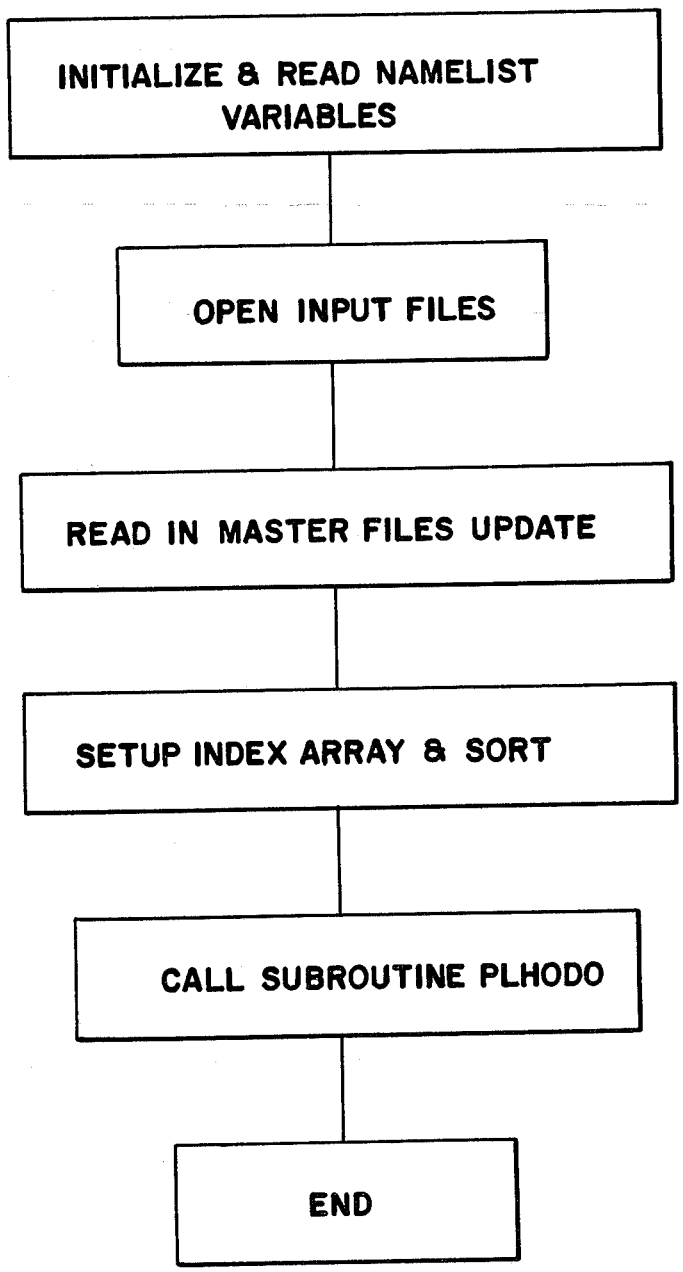
FIG_22

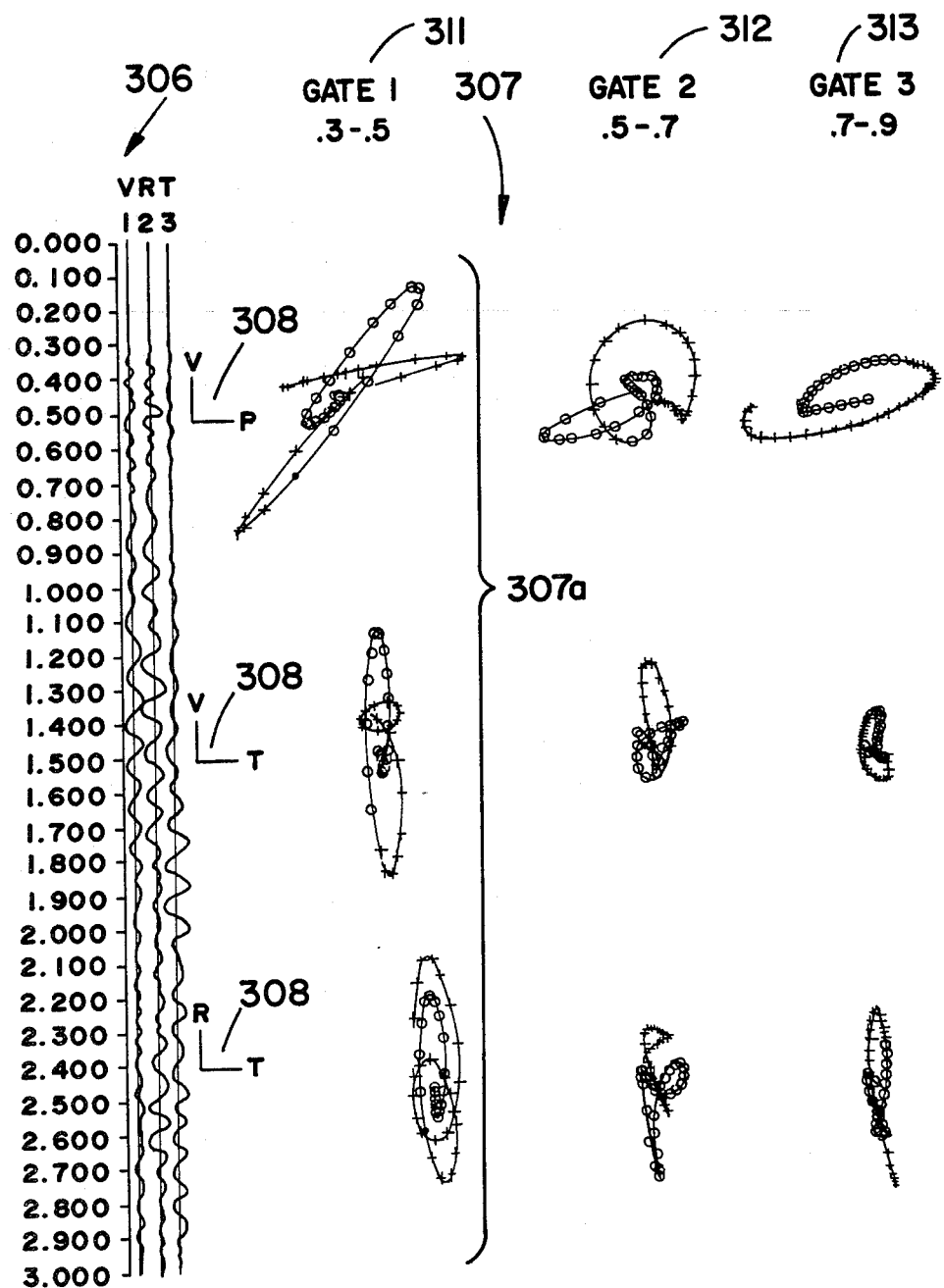
FIG_23a

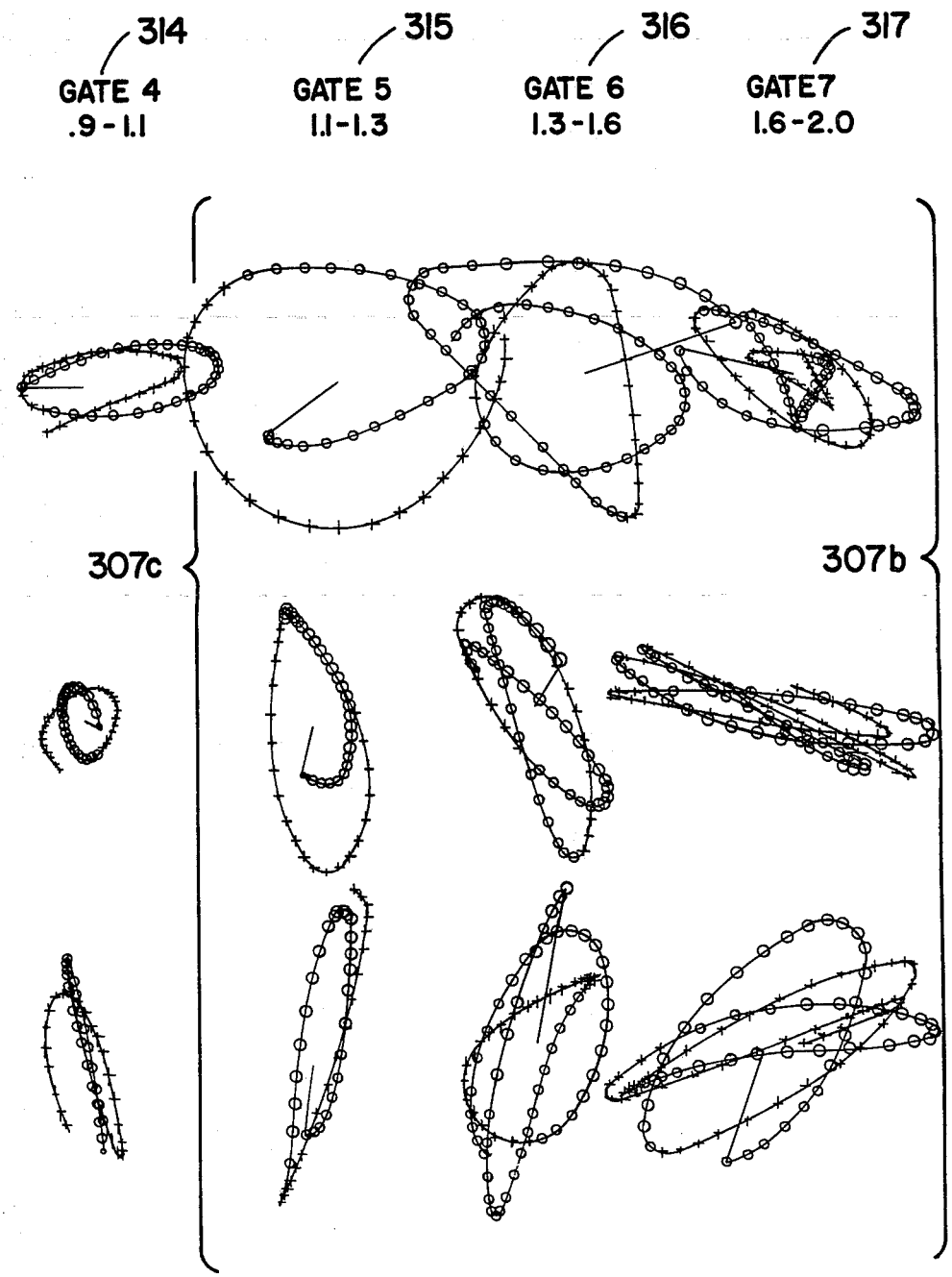
FIG _ 23b

EXPLORATION SYSTEM FOR ENHANCING THE LIKELIHOOD OF THE DISCOVERY OF DEPOSITS OF ORE, MARKER ROCK AND/OR ECONOMIC MINERALS

RELATED APPLICATION

This is a continuation of Application Ser. No. 952,888, filed Oct. 18, 1978, now abandoned which is a continuation-in-part of application Ser. No. 909,586, filed May 25, 1978, entitled "Exploration System for Discovering Deposits of Ore, Marker Rock and/or Economic Minerals", Gary S. Gassaway, Henry J. Richgels and James I. Foster, refiled as Ser. No. 238,503.

SCOPE OF THE INVENTION

The present invention relates to the exploration for deposits of ore, marker rock and economic minerals in the shallow crust of the earth using seismic exploration techniques, and more particularly to mapping the shallow crustal earth formation by means of refractive seismic waves separated by a computer-dominated 2-D hodograph process into shear and compressional responses, to identify structure as well as elastic parameters of the strata undergoing survey.

In this application several terms are used and are defined as follows: the term "hodograph" means a plot of particle motion in two-dimensional polar coordinate units as a function of time; the term "marker rock" means rock that identifies ores, economic minerals, metallic and non-metallic minerals and/or minerals or rocks capable of supporting and/or at one time containing steam or water at elevated temperatures. The term "ores" means rocks and minerals that can be recovered at a profit, and includes not only metals and metal-bearing minerals, but also a plurality of non-metallic minerals such as sulfur and fluorite. The definition may also be rock containing small amounts of useful minerals or may be rocks in a massive ore-bearing strata. The term "economic minerals" includes concentrations sufficient to allow economic recovery and/or are in a form that permits economic recovery such as building stones, industrial materials (abrasives, clays, refractories, lightweight aggregates, and salt), and includes the term "ore minerals" (compounds valued for their metal content only) within its definition.

BACKGROUND OF THE INVENTION

Accelerating growth of the world's population, combined with improved standards of living throughout the world, have greatly increased demand for all types of mineral products. At the same time, there have been attempts to shift to alternate sources of energy such as to use steam or water at elevated temperatures in situ for driving compressors and the like. Such geothermal reservoirs are likewise being sought for the same reasons described above and are usually in association with deposits which can be designated as "marker rocks". Unfortunately the contrast between physical properties of economic ore minerals and country or host rock surrounding them are not well defined by conventional surface exploration techniques. In zones of interest, whether an anomaly of interest is from a valuable ore, mineral, etc., or from some other associated rock material having no economic importance, is a most difficult question to answer. This is primarily due to the fact that ore, economic mineral and marker rock deposition are under cover and cannot be observed at the earth's surface.

In oil and gas exploration, seismic refraction shooting has been well known and practiced for decades. But because resolution of events is limited in the vertical direction to shallow structures, crews performing refraction shooting have not used arrays having severely overlapping incline positions. Additionally applicability in the exploration sense of such a refraction technique, say, for discovery of new deposits of ore, marker rock and economic minerals, did not exist. Heretofore, in such refraction shooting, as reported in the book, "Introduction To Geophysical Prospecting", M. B. Dobrin, 2nd Ed., McGraw-Hill, 1960, the detector positions are usually designated $X_1, X_2 \ldots X_n$, with the shot point and detector positions being positioned to provide end-shooting sequences only. Successive shots at uniform or almost uniform intervals, adjacent to the ends of detector spreads, say, adjacent to the near detector position $X_1$ and the far detector position $X_n$, provide source waves. Then the detector spread is advanced; its new end position $X_1'$ becomes superimposed on the $X_n$ position of the prior spread. In that way, provision can be made for a "tie point" from refraction record to refraction record but not for systematically associating at least two traces with each inline position along the line of survey.

SUMMARY OF THE INVENTION

The present invention has been surprisingly successful in indicating deposits of ore, economic minerals and marker rock in the earth's crust. A key to interpretation: extremely accurate resolution of refraction compression versus shear wave responses using a computer-dominated 2-D hodograph process. Such resolution uses techniques that are both practical and economic, to allow accurate identification of the shape of surveyed strata as well as to allow extremely accurate assessment of their seismic shear and compressional wave velocities as a function of depth.

In accordance with the present invention, resolution of refractor shape uses data provided by a field system that utilizes a "roll-along" technique of shifting source and detector arrays along a line or lines parallel with the line of survey whereby the resulting refracted seismic data can be systematically indexed to offset position. Preferred construction of the sources and detectors: each source is preferably a line source of dynamite, while the detectors are preferably 3 component detectors which provide outputs proportional to deviations in vertical and horizontal directions at the earth's surface, although single direction (vertical) detectors can also be used, in accordance with collection aspects of the present invention. During collection, an array of sources and detectors is advanced in selected increments along the line of survey, with the resulting refraction data processable to discern compressional from shear wave responses, to provide overlapping stackable displays indexed to common inline position and to refraction travel direction.

Data patterns can be classified so that: (1) velocities of the shear and compressional waves can be accurately indicated via 2-D hodographs; and (2) there is an indication of the shape of the strata under survey based on posted P-wave or S-wave breaktimes.

Ultimately, a final depth display of the refractor bed segments annotated with shear and compressional wave velocities as well as Poisson's ratio can be provided, such display being highly indicative of deposits of ore, marker rock and/or economic minerals in the refractor beds, especially if vertical dikes are shown.

SPECIFIC DESCRIPTION OF THE DRAWINGS

FIG. 1 is a schematic section of an earth formation illustrating the mechanism of transmission of refracted seismic waves;

FIGS. 2 and 3 are time-distance and ray path plots respectively for the earth formation of FIG. 1;

FIGS. 4A, 4B and 4C are schematic diagrams of wave propagation within solids to illustrate compressional waves, shear waves and Rayleigh waves, respectively.

FIG. 5 is a schematic diagram of an array of sources and detectors positionally arranged along a line of survey in which the sources and detectors are incrementally moved along the lines of survey to provide higher resolution of refracting interfaces, such advancement being analogous to a "roll-along" technique conventional in reflection seismology;

FIG. 6 is a perspective view of a seismic source used in the array of FIG. 5;

FIG. 7 is a refraction record shot in opposite directions using the array of FIG. 5;

FIG. 8 is a schematic diagram of equipment useful in carrying out the present invention;

FIGS. 9, 12A and 12B are plots of data provided in the array of FIG. 5 transformed in accordance with the teachings of the present invention;

FIGS. 10 and 11 are details of the plot of FIG. 9;

FIG. 13 is a depth plot constructed from the plot of FIG. 12;

FIGS. 14 and 15 are typical final displays in accordance with the teachings of the present invention;

FIGS. 16, 17, 18 and 19 relate to modified forms of the present invention;

FIG. 20 is a partially schematic diagram of a 3-component detector useful in the array of FIG. 5 for distinguishing compressional and shear wave responses at the detector stations $DS_1$, $DS_2$ ... etc., in accordance with a modified aspect of the present invention;

FIGS. 21 and 22 are flow charts of a computer-dominated process for distinguishing the compressional and shear wave responses of the detector of FIG. 20;

FIG. 23 is a typical plot provided by the modified method of FIGS. 21 and 22.

DESCRIPTION OF THE PREFERRED EMBODIMENT OF THE INVENTION

In order to understand certain aspects of the invention a brief review of the history of refraction seismology is in order and is presented below.

FIG. 1 illustrates the mechanism for transmission of refracting waves in an earth formation 9.

In FIG. 1 the formation 9 consists of a two-bed model, i.e., beds 10 and 11, each with homogeneous and isotropic elastic properties. Upper bed 10 is separated from the lower bed 11 by horizontal interface 12. The upper bed 10 has a velocity less than that of lower bed 11, i.e., the beds increase in velocity as a function of depth. The surface 13 of the formation 9 is separated from interface 12 by a depth z. Compressional velocity of the seismic wave in the upper bed 10 is assumed to be $V_0$ while the compressional velocity in the lower bed 11 is $V_1$. If a seismic wave is generated at point S, the energy travels with hemispherical wavefronts through bed 10. Detector 14 is placed at point D, at the earth's surface 13, a distance x from S; the wave traveling horizontally through upper bed 10 reaches the detector 14 before any other wave (if X is small). For large values of X, the wave traveling along the top of the lower bed 11 (having a higher speed $V_1$) overtakes the direct wave, however. The mechanism by which energy is transmitted from S to D along the indirect paths SA, AB, and BD has been analyzed mathematically. Briefly, when the spherical wavefronts from S strike the interface 12 the velocity changes and energy is refracted into the lower bed 11 according to Snell's law. At some point A on the wavefront, the tangent is a sphere in the lower bed 11 and is perpendicular to the boundary interface 12. The ray corresponding to this wavefront now begins to travel along the interface 12 with the speed $V_1$ of the lower bed 11. By definition, the ray SA strikes the interface 12 at the critical angle. In FIG. 1, the wavefronts below the interface 12 travel faster than those above. The interface 12 is subjected to oscillating stresses. As a consequence, continuous new disturbances are generated along interface 12 spreading out in the upper bed 10 with a speed $V_0$. The spherical waves adjacent to point B in the lower bed 11 travel a distance BC during the time the wave in the upper bed 10 attains a radius of BE. The resultant wave front above the interface 12 follows the line CE, making an angle $i_c$ with the boundary interface 12 in accordance with the following equations:

$$\sin i_c = \frac{BE}{BC} = \frac{V_0 t}{V_1 t} = \frac{V_0}{V_1}$$

The angle ($i_c$) which the wavefront makes with the horizontal is the same as the ray makes with the vertical so that the wavefront will return to the surface at the critical angle ($\sin^{-1} V_0/V_1$) with respect to the vertical.

FIGS. 2 and 3 illustrate time-distance and ray path plots of data associated with the earth formation 9 of FIG. 1.

In FIG. 3, the wave is seen to travel along paths AB-BC-$CD_2$ and AB-BC-$C'D_3$. In FIG. 2, a distance called the "critical distance $X_c$" is shown, and is defined as the distance measured from the shot point to intersection 15 of linear segments 16 and 17. Note with respect to FIGS. 2 and 3 that a direct wave can travel from point A to a detector at a speed $V_0$, so that $T=X/V_0$. This is represented on the plot of the T-vs.-X in FIG. 2 as straight line segment 16 which passes through the origin and has a slope of $1/V_0$. At distances less than the critical distance $X_C$, the direct wave reaches the detector first. At greater distances, the wave refracted by the interface arrives before the direct wave since it has been previously shown that the wave that travels fastest from point A to points $D_2$ or $D_3$ approaches the interface 12 at the critical angle and propagates horizontally along the interface 12 with the speed $V_1$ of lower bed 11 and returns to the surface 13 at the critical angle, i.e., along paths $ABCD_2$ and $ABC'D_3$ of FIG. 3.

From FIGS. 2 and 3, the following equations can be derived:

$$\sin i_c = V_0/T_1; \tag{1}$$

$$T = X/V_1 + 2Z/V_1^2 - V_0^2/V_1V_0; \tag{2}$$

and $$T_i = 2Z/V_1^2 - V_0^2/V_1V_0, \quad (3)$$

where

T is the total time along the ray path of interest and $T_i$ is the intercept time of the time-distance plot.

While FIGS. 1-3 deal with compressive seismic wave propagation within the earth, similar plots explain the travel of transverse or shear waves within the earth. In order to understand the differences as well as similarities of these types of waves, reference should now be made to FIGS. 4A, 4B and 4C. Before such discussion a brief explanation of elastic waves is in order and is presented below.

Briefly, the simplest type of elastic wave propagation in a homogeneous, isotropic infinite elastic medium consists of alternating condensations and rarefactions in which adjacent particles of solid are moved closer together and then farther apart. If a pressure is suddenly applied to a medium at a point source, the region within the material of the medium that is most compressed will move outwardly from the disturbance, the disturbance having a radius increasing at a rate determined by the elastic properties of the medium.

In FIG. 4A the wave has a direction of particle motion that is the same (or at an angle of 180°) as the direction of wave propagation. Such waves are referred to as compressional or P-waves. The speed of the compressional waves is related to the elastic constants and density of the medium in a well-known manner.

In FIG. 4B, the particle motion within the transmitting medium is at right angles to the direction of the wave propagation. Since the deformation is essentially a shearing motion, such waves are often referred to as "shear waves". The velocity of any transverse waves also depends on the elastic constants and the density of the medium.

Rayleigh waves of FIG. 4C are waves travelling along a free surface of any elastic solid. The particle motion (in a vertical plane) is elliptical and retrograde with respect to the direction of propagation. Amplitude decreases exponentially with depth. The speed is slower than P-waves or S-waves, and can vary when a low-speed surface layer overlays a much thicker material.

Having now established a firm theoretical foundation for the invention, the latter will now be described below with reference to FIG. 5.

In FIG. 5, an array 20 of detectors $D_1$, $D_2$ . . . is aligned along a parallel line 21, designated "the line of survey" of the array. Each detector can be provided with the ability to discern shear waves, and compressional waves through the use of a three-component system of response. By the term "three-component" is meant that one or more of separate detectors is provided with the capability of detecting vibrations in two directions in the horizontal plane and in a single direction along the vertical axis. In that way, electrical signals associated with the "three components" can be transmitted via cable array 22 to recorder/storage unit 26, as separate signals for further processing as discussed below.

Sources $S_1$, $S_2$ . . . etc. of seismic waves are placed as sourcepoints $SP_1$, $SP_2$ . . . etc. adjacent to end detector positions $DS_1$, $DS_{40}$ . . . etc. Sequential shots can be taken at each end.

FIG. 6 illustrates a typical source. It consists of dynamite cylinders 23. A group of cylinders of dynamite, say, nine, may be formed into 3 separate longitudinally aligned segments 24a, 24b and 24c such that the axis of symmetry of each is substantially perpendicular to the earth's surface and parallel to each other. Within each segment, contact between each group of the three cylinders 23 is along substantially parallel lines. Each group of three cylinders of each segment 24a-24c provides three separate lines of contact in a "closest packing order" arrangement; that is to say, each cylinder 23 is in-line contact with the remaining members of each group along an exterior wall thereof. The source is activated via a dynamite cap conventional in the art.

Returning to FIG. 5, the detectors $D_1$, $D_2$. . . etc. are positionable at a series of stations, such as detector stations $DS_1$, $DS_2$. . . etc. When the sources are located at the sourcepoints $SP_1$ and $SP_2$, and when sources therein are energized in sequence, the refraction data that are produced are capable of being indexed to detector positions $DP_1$, $DP_2$. . . etc. at the recorder/storage unit 26.

Since spacing between adjacent detector stations $DS_1$, $DS_2$ . . . etc. and source points $SP_1$, $SP_2$, $SP_3$ . . . etc. determines the resolution pattern of the array, the closer the spacing, the better the dip resolution. And the longer the array, the greater the depth resolution. Offset positions of detector and sources in a typical field arrangement are as indicated in FIG. 5. Preferred spread length: 3900 feet. In-line spacing of detectors: 100 feet. In-line spacing of the sources with respect to the detector spread: 50 feet. Variations, of course, occur depending on the many factors indicated above.

Recorder/storage unit 26 connects to the outputs of the detectors through cable array 22 and other appropriate signal processing circuits (not shown) which can include indexing and recording address means. The latter annotates the positions—in the field—of the seismic source producing the energy (viz., the source at each sourcepoint $SP_1$ or $SP_2$ . . . etc., as well as the detector stations receiving the refracted energy, viz. stations $DS_1$, $DS_2$. . . etc. In operation, after activation of sources $S_1$ and $S_2$ at sourcepoints $SP_1$ and $SP_2$, data records are produced at the detector stations $DS_1$, $DS_2$ . . . etc. Thereafter, the array is advanced in the direction of arrow 29; that is to say, the array of FIG. 5 is "roller forward" whereby station $DS_1$ is advanced to station $DS_5$ with appropriate relocation of the remaining detectors at original stations $DS_6$, $DS_7$ . . . etc., occurring. After new sources $S_3$ and $S_4$ at the sourcepoints $SP_3$ and $SP_4$ are energized, and seismic energy is received at the detector stations $DS_5$, $DS_6$ . . . etc., a new field data record is generated at recorder/storage unit 26. It should be noted in FIG. 5 in this regard that the detector stations, $DS_5$, $DS_6$. . . etc., define common offset positions so that indexing of the refraction location data as a function of offset position at the recorder/storage unit 26 is a somewhat firm requirement. In this regard, efficiency of the "roll-along" technique can be somewhat enhanced by using a roll-along switch such as described in U.S. Pat. No. 3,618,000, issued Nov. 2, 1971, for "Roll-along Switch" and assigned to the assignee of this application.

Data addressing is also a function of the nature of the detector positioned at stations $DS_1$, $DS_2$, etc. Assume at each detector station $DS_1$, $DS_2$ . . . etc., e.g., the transverse component output of each three-component detector is used, independently, to measure shear wave response. Similarly, the vertical component output of the same three-component detector can be recorded, directly, as the compressional wave response. Hence, processing and addressing problems can be lessened.

As previously described, separate outputs of each detector measure velocity of the displacement (movement) of the earth's surface in three directions: (i) vertical displacement; and (ii) two horizontal displacements at right angles to each other. The former measures P-wave response; the latter relate to S-wave response. Hence, three-component detectors are preferred as array detectors under usual circumstances. However, it should be noted that it is possible to use a single vertical component detector under selected circumstances. Also a combination of both types is possible, i.e., a 3-component detector can be used at the stations $DS_1$, $DS_5$, etc. in conjunction with conventional vertical detectors in between, i.e., at stations $DS_2$, $DS_3$, $DS_4$, $DS_6$, etc.

Recorder/storage unit 26 can record and/or store the P-wave and S-wave data in separate data files in analog or digital formats with such signals being convertible either at the field site or at a remote location to conventional side-by-side wiggle trace records. The data can also be annotated as to the directions that the refractions were received, i.e., the data can be associated with a source at a leading or at a trailing position with respect to the detector spread.

FIG. 7, illustrates a typical record 27 of record/storage unit 26.

As shown, timing marks are designated above the top of the pair of records 27a and 27b, and indicate that the first wave arrived about 1.75 seconds after the explosion of the source. The first arrivals are indicated by a pronounced rise in amplitude after which the traces remain disturbed, each arrival being characterized by an upkick followed by a peak and a subsequent trough. From the moveouts the apparent velocity can be calculated. In the present invention, first-event refraction shooting is utilized, as are second- and third-event refraction events.

In order to indicate interrupt times—and hence true velocities—the shape of the underlying strata including dip of the bedding interfaces must be taken into account.

For example, consider that the refractions of a given record have respective speeds of $V_0$ and $V_1$ and an interface dipping at a particular angle alpha between first and second beds, see FIG. 1. If $Z_d$ is defined as the perpendicular distance from shot to the interface at the up end of the line and $Z_u$ is the perpendicular distance from shot at the downdip end of the line, then the following formulas described the refraction travel times for such a geometry.

$T_d$ (total time shooting downdip) =

$$\frac{2zd \cos i_c/V_0}{V_0} + \frac{X}{V_0} \sin(i_c + \alpha)$$

$T_u$ (total time shooting up-dip) = $\frac{2zu \cos i_c}{V_0} + \frac{X}{V_0} \sin(i_c - \alpha)$ If the refracting interface is horizontal, however, the actual depths are easily calculated as follows:

(Two layer case) $Z$ (depth) = $\frac{T_i}{2} \frac{V_1 V_0}{\sqrt{V_1^2 - V_0^2}}$ (Three layer case) $Z_1$ =

-continued $$\frac{1}{2}\left(T_i^2 - 2Z_0 \frac{\sqrt{V_2^2 - V_0^2}}{V_2 V_0}\right) \frac{V_2 V_1}{\sqrt{V_2^2 - V_1^2}}$$

But if there is dipping, further refinements must be made, as suggested above, before the depths of the dipping beds can be determined, as set forth in Dobrin, op. cit.

PROCESSING

After collection, processing of the data is required. Object of such processing: to associate a series of travel time vs. offset plots of FIG. 7 with selected detector spreads of FIG. 5 to provide a guide to the shape of the strata under survey.

While various types of equipment of both an analog and digital nature can be used, the equipment of FIG. 8 has advantages of simplicity and low cost, and so is presented in detail below. Briefly, such processing utilizes either one of two data files: (i) a P-wave data file associated with results of a vertical component of each three-component detector of the field array, or (ii) an S-wave record associated with the horizontal component of the same detector of the same array.

In FIG. 8, separate magnetic recording and playback systems are illustrated at 33 and 36. While the method of the present invention could be performed with less apparatus than shown herein by physically moving records back and forth between recording systems, the process is more easily described and understood by referring to the two systems as shown. It should be understood that other combinations of the apparatus, as well as other types of recording, reproducing and data processing systems are contemplated. An example of other such combinations would be a properly programmed digital computer.

The magnetic recording system 33 constitutes a drum 34 supported on a rotatable drive shaft 35 driven by a suitable mechanism such as gear 37 through the worm shaft 38 and motor 39. Actual record processing in accordance with the present invention will require careful speed control for rotation of the systems 33 and 36, as well as synchronization between the rotation of the record drums and the movements of magnetic heads within each system. The drum 33 is adapted with conventional apparatus, not shown, for securing a record in the form of a magnetic tape 40 to the periphery of the drum. Separate scanners 44 and 45 are carried adjacent to drum 34. The tape 40 includes two sets of data: amplitude-vs.-time refraction data and a timing trace or marks associated with activation of the source. The tape 40 is scanned simultaneously by scanners 44 and 45 as a function of rotation of drum 34. Movement of scanner 45 also occurs along the drum 33. That is to say, after a single revolution of the drum 34, motor 41 is energized by apparatus to be described, to cause one step of movement of the scanner 45 in the lateral direction. Scanner 44 is not activated by the motor 41, however; instead it remains fixed at a known circumferential position relative to the drum 34.

It should be understood that different schemes may be employed to provide individual control for the movement of each of the heads. For example, the magnetic heads need not mounted on a simple bar, but instead can be mounted as separate members that are capable of individual circumferential movements around the drum. The bar-type mechanism is illustrated here for didactic clarity.

Scanner 45 is mounted on a threaded block 42 positioned by rotation of worm 43. The threaded block 42 is guided by a fixed rod 46 to prevent its rotation about worm 43. The worm 43 is driven from gear box 47 by a gear 48 and its engagement with gear 49. Energization of motor 41 causes rotation of gears 48 and 49 and the consequent movement of the scanner 45 parallel to the axis of drum 34. With each energization, the scanner 45 is moved one trace transversely across the record to read the side-by-side refraction traces.

Recording system 36 constitutes a drum 51 supported on a rotatable shaft 52 driven by suitable mechanism such as gear 53, worm shaft 38 and motor 39. The drum 51 is adapted with apparatus, not shown, for securing the recording medium in the form of magnetic tape 54 to the periphery of the drum 51. A single recording head 55, connected through switchable contact 56, to be described later, which cooperates with the tape 54 to produce a recorded magnetic record. The single recording head 55 is mounted on a threaded block 59 positioned by rotation of worm 60. The threaded block is guided by fixed rod 61 to prevent its rotation. Energization of motor 62 causes rotation of gear box 63 and the consequent movement of the recording head 55 parallel to the axis of drum 51.

The pitch of the worms 43 and 60 are so related that the scanners 44 and 45 are moved step-by-step from one side to the other of their respective drums while the cam 64 makes one complete revolution from one limiting position to another. Stepping switches likewise can aid in providing appropriate synchronization of the system, as previously mentioned.

Energization of the system illustrated in FIG. 8 is provided from a power source 65 to motor 39 and through switch contact 66 to the motors 41 and 62. Cam 64 on shaft 52 pushes on rod 67, against the bias of spring 68 to close the switch 66, the eccentric projection 69 of the cam 64 being the cause of contact 66 closing during the part of the revolution in which the magentic tapes on drums 34 and 51 are in such a position that their respective heads 44 and 45 are in the peripheral gap between the beginning and the end of the tapes. During the relatively short time that these heads are in that gap and, therefore, not transmitting useful information, the heads are repositioned axially along their respective drums while the drums 34 and 51 continue to revolve at constant speed.

In operations refraction data on tape 40 of drum 34 flows via scanner 45 to a storage unit 70 and through an event selector 71 to counter 72, and hence to tape 54 on drum 51. Analysis of refraction data requires more than one trace to identify events of interest. Hence, both storage 70 and event selector 71 are interposed between scanner 45 and connector 56 as shown.

Event selector 71 compares a group of three adjacent refraction traces to detect arrival times within the central trace, as set forth in U.S. Pat. No. 3,149,302, Klein et al, for "Information Selection Programmer Emphasizing Relative Amplitude, Attribute Amplitude and Time Coherence," issued Sept. 15, 1964, assigned to the assignee of the instant application. The output of selector 71 is a single trace, modified in accordance with selection code described in the above-identified patent.

Storage unit 70 can include a multi-position relay connected to a recording means, as described in U.S. Pat. No. 3,149,303, Klein et al, for "Seismic Cross Section Plotter," issued Sept. 15, 1964 and assigned to the instant assignee.

Counter 72 is selectively operated on a predetermined "on-off" basis as follows: the activation spike of the source via scanner 45 activates the counter 72 while the occurrence of a refraction event on tape 40 of drum 33 terminates operations of the counter 72, after which a reset signal resets the counter 72 to zero and simultaneously activates the marker of head 55. Result: a refraction measure of time—a "mark"—is placed on the tape 54 wound about drum 51. As the process is repeated, a series of "timing marks" vs. offset position is provided, in the manner of FIG. 9. Operations cease through opening switch contacts 56 and 73 controlled by rod 74.

FIG. 9 illustrates a series of refraction travel time vs. common offset plots 75 annotated by sourcepoint activation number and/or position, provided by the apparatus of FIG. 8.

As shown, plots 75 are assembled in a paired, obliquely segmented basis to better aid in stratigraphic interpretation. In general, FIG. 9 shows individual plots of forward and reverse line vs. offset signature diagrams displayed side-by-side using adjacent profile oblique segments 76 and 77, each containing a series of normalizing "H" signature bars 78.

FIG. 9 is akin to the conventional common depth point stacking charts used in reflection seismology, and described in detail in Ser. No. 756,584, filed Jan. 3, 1977, for "Method for Interpretation of Seismic Records to Yield Indications of Gaseous Hydrocarbons," W. S. Ostrander, now U.S. Pat. No. 4,316,268, and assigned to the assignee of the instant application.

In usual stacking diagrams as described in U.S. Pat. No. 4,355,379, above, several separate variables are addressable including amplitude vs. time values, offset positions (say, detector, sourcepoint, centerpoint positions), sourcepoint, profile line number, common offset lines, common centerpoint lines, and common detector location lines, etc.

In the above-identified application, emphasis was placed upon centerpoint location in a two-dimensional coordinate system, say in a X-Y domain along oblique lines, with the third dimension being reserved for analysis and processing of the amplitude-vs.-time traces.

In FIG. 9, in the instant invention, centerpoint position in the offset direction and common centerpoint locations have been assigned to the third dimension, remaining coordinates of interest addressable in the X-Y domain.

Of particular importance: travel time vs. offset coordinate of refraction events annotated as to direction of refraction arrivals and their sourcepoints.

For example, along the top of FIG. 9, the detector stations are numbered in sequence, while along the bottom of FIG. 9, the sourcepoint locations are likewise indicated. Each set of refraction-vs.-time values is plotted as shown with reference to the series of normalizing signature bars 78. Each bar 78 has a length equal to that of the detector spread plus twice the sourcepoint offset distance with respect to the spread ends, as discussed below.

In particular in FIG. 9, since plots 75 were generated using an end-shooting array in which sources and detectors advance 4 detector intervals per shot point, the "H" bars 78 overlap. Note further that each offset position (after initialization) is associated with 8 separate time values so that such values can be associated with common surface detector positions.

In order to geometrically associate generated data with common surface position, or common offset position, address guidance, as provided by printed "H" bars 78, is of some importance.

Signature bars 78 form the ordinates of the display and are seen to be paired into sets, each associated with an opposite arrival direction of the refraction wave. Each pair is spaced a constant distance, say, a value 2d feet where d is the rollalong increment of the field procedure.

Vertical upright segments 79 of each bar 78 coincides with the offset position of the sourcepoints, say $SP_1$, $SP_3$, $SP_5$... alignable along oblique line 80, and $SP_{12}$, $SP_{14}$... etc. alignable along oblique line 81.

Annotation of each H-bar 78 is preferably based on sourcepoint position, and direction of wave travel. "Forward" data profiles 76 designate that wave travel is in the same "forward" direction as array progression, while "reverse" data profiles 77 refer to wave travel in the opposite direction as array progression.

At the bottom of the display, the last-in-line profiles, say the profiles $S_z$ of profile segment 76 and profile column $S_{z+c}$ of segment 77, are related to the detector and shot point positions in a manner convenient for easy display. Note that if sourcepoint $S_z$ is odd, then sourcepoint $S_{z+c}$ is even, and vice versa.

FIGS. 10, 11, 12A, 12B and 13 illustrate how the plots of FIG. 9 can be used to indicate shape and model depth of a formation under survey.

In FIG. 10, note that the travel time data are associated with certain particular H-signature bars of FIG. 9, viz., bars 78a, 78b, 78c and 78d. I.e., the latter relate to and are associated with the forward profile column 76 of FIG. 9, say, annotated to sourcepoints $SP_9$, $SP_{11}$, $SP_{13}$ and $SP_{15}$, as shown.

Values of travel time vs. offset are plotted as shown.

Note the intersection points of the plotted points occur at breakpoints 82a, 82b, 82c and 82d. These breakpoints can be connected by a line 83 having a slope about equal to that line 80 through the sourcepoints $SP_9$, $SP_{11}$, $SP_{15}$... etc., of the signature bars 78a–78d. Result: the interpreter of the data can confidently assume that bedding to which the data relate is horizontal.

FIG. 11 illustrates travel times plotted for other certain H-signature bars occurring later in time in the survey, say, data associated with bars 78f, 78g, 78h, 78i and 78j, are also related to forward column profile 76 of FIG. 9. These are annotated to, say, sourcepoints $SP_{21}$, $SP_{23}$, $SP_{25}$, $SP_{27}$ and $SP_{29}$ as shown.

Note that here the breakpoints 85a, 85b, 85c, 85d and 85e do not align themselves parallel to line 80 through the sourcepoints $SP_{21}$, $SP_{23}$... etc. But instead these breakpoints aligned themselves along a line 87 whose slope is the vertical. Result: the interpreter can assume a vertical contact exists below the near bed undergoing survey. Hence, appropriate formulas for the geometry change can be implemented in the depth model as discussed below.

FIGS. 12A, 12B and 13 illustrate a further example of the method of the present invention in which the pairing of "H" signature bars 78 of FIG. 9 has been changed to provide more interpretive insight for the user.

As shown in FIGS. 12A, 12B, the adjacent pairing of H-bars has been changed so that oblique column segments 91 and 92 no longer are a combination of odd-/even or even/odd sourcepoints as before. Instead, the pairings are changed to emphasize a particular bedding structure of FIG. 13 below a certain sourcepoint location, viz. sourcepoint 11 of FIG. 13.

In FIGS. 12A, 12B note that the compressional travel time data are associated with certain particular H-signature bars, viz. bars 90a, 90b, 90c, ... 90k, and bars 90l, 90m ... 90v.

The former, in turn, relate to and are associated with the forward profile segment 91, say, annotated to sourcepoints $SP_1$, $SP_2$ ... $SP_{11}$, as shown. The latter in turn relate to and are associated with the rear profile segment 92 annotated to sourcepoints $SP_{11}$, $SP_{12}$ ... $SP_{21}$.

Breakpoints are as indicated, with vertical lines 97a–97f being drawn through them for emphasis.

Note that since the lines 97a–97f are somewhat vertical and deviate radially from common lines through sourcepoints $SP_1$, $SP_2$, $SP_3$ ... etc., and through $SP_{12}$, $SP_{13}$ ... etc., the bedding of interest is not horizontally disposed.

The compressional data of FIG. 12A, 12B further illustrate that apparent refraction times have been greatly affected by the shape of formation undergoing surveying, viz. by the presence of dike 93 of FIG. 13 uplifted through deeper beds 94 and 95 but terminating well below upper bed 96.

Of course, it is apparent that the above H-bar data can be easily used to indicate apparent compressional velocities as set forth in FIGS. 12A, 12B. True velocity of the bed 96 can then be calculated using intercept time-distance relationships well understood in the art, see Dobrin, op. cit., assuming correct pairs of forward and reverse plots, are utilized.

As to dike 93 of FIG. 13, the importance of using intercept times and apparent velocities associated with sourcepoint "H"-bars which do not straddle breaklines 97a–97b and 97d–97e must be emphasized. That is to say, intercept times and apparent velocities associated with "H"-bars 90k and 90v do not provide correct results which can be directly associated with dike 93, i.e., intercept times and apparent velocity deduced therefrom, from which the velocity and depth can be calculated as shown in FIG. 13, would be erroneous. Note that the slopes of the breakpoint lines are directly associated with the vertical slope of the walls of the dike 93 of FIG. 13, however.

On the other hand, if the data of H-bars 90j and 90m are used, the interpretive results would be correct.

Key to correctly interpreting H-bars 90a–90v: pick H-bar data closest to breakpoints in the forward and reverse direction but which do not straddle them, and so provide true indications of the intercept time and apparent velocity of the dike 93 of FIG. 13. Note also that the velocity magnitudes and intercept times associated with chosen forward and reverse pairs of H-bars also indicate the magnitude of the dips of the strata under survey. From such data, the interpreter can be provided with information from which true velocity data can be determined; while the intercept times and other distance-time data of FIG. 12A, 12B are used to calculate true compressional velocity, similar plots and values associated with shear waves are used, in a similar manner to calculate true shear velocity of each bed of interest with appropriate final displays of such data being available, as required.

FIGS. 14 and 15 illustrate a field example of final displays associated with various structures that have been surveyed using the method of the present invention.

FIG. 14 is a plot of various elastic parameters at a specific depth for a porphyry copper prospect, Stafford Mining District, Arizona.

Curve 100 is a plot of compressional velocity at a specific depth taken at various cross-sectional horizons; Curve 101 is a plot of shear velocity as a function of the same locations; Curve 102 is a diagram of Poisson's ratio at the same depth; and Curve 103 is a plot of a bulk modulus-bulk density ratio at the same depth for the above-identified prospect.

Note at fault 104 and dike 105 the dramatic change in values of interest.

FIG. 15 is a depth-versus-horizontal survey position plot of the above Stafford District, Ariz., copper prospect.

Note that the depth values were calculated using the methods of FIGS. 12 and 13 in conjunction with appropriate geometrial formulas set forth in Dobrin, op. cit. Note further that over a given but changeable depth interval, interface bedding segments can be identified. The segments to the left of fault 104 are seen to exist at 106-119, and each can be addressed and stored for future reference, say, as to length, end-point locations, compressional and shear velocity values, Poisson's ratio etc., as required. In that way, values storable in files within any analog or digital computer can be ordered out as required onto, say, a disk unit. Thereafter, any off-line digital plotter capable of generating the display of FIG. 15 is used in conjunction with the data on the disk unit. In this regard, equipment illustrated in "Continuous Automatic Migration," Ser. No. 567,458, filed Apr. 14, 1975, John W. Sherwood, now U.S. Pat. No. 4,355,379, assigned to the assignee of the instant application, is of interest, and can be used to address, index and store segments of data in accordance with the teachings of the present invention.

Such plotters are available in the art, and one proprietary model uses a computer-controlled CRT for optically merging onto photographic paper, as a display mechanism, the seismic data. Briefly, in such a plotter the data are converted to CRT deflection signals; the resulting beam is drawn on the face of the CRT and the optically merged record of the data is thereafter indicated, say, via photographic film. Then the film is processed in a photography laboratory and hard copies returned to the interpreters for their review. Additionally, the data could be plotted by hand, if desired. But for usual applications, in which speed is important, the plotter described above is preferred.

Modification

In some case, it may be desirable to use only single component detectors in the field spread so that only vertical displacement data is available. In such cases, modification of processing equipment to provide separate P-wave and S-wave plots prior to use of the apparatus of FIG. 8, is required. FIG. 16 provides such equipment.

With reference to FIG. 16, note that three separate magnetic tape recording and playback systems are illustrated at 120, 130 and 160. While the method of the present invention could be performed with less apparatus than shown herein by physically moving records back and forth between recording systems, the process is more easily described and understood by referring to the three systems as shown. It should be understood that other combinations of the apparatus, as well as other types of recording, reproducing and data processing systems are contemplated. An example of other such combinations would be a properly programmed digital computer.

Since the record contains both P-wave and S-wave energy, velocity "filtering" in accordance with this aspect of the present invention can occur based on arrival time of the events of interest.

The first magnetic recording system 120 constitutes a drum 121 supported on a rotatable drive shaft 122 driven by a suitable mechanism such as gear 123, worm shaft 141 and motor 142. Actual record processing in accordance with the present invention will require careful speed control for rotation of the systems 120, 130 and 160, as well as synchronization between the rotation of the record drums and the movements of heads within each system. The drum 121 is adapted with conventional apparatus, not shown, for securing a refraction record in the form of a magnetic tape 124 to the periphery of the drum, such trace being one provided by the refraction system of the present invention using single-component detectors for measuring vertical displacement only. A plurality of magnetic heads, not individually illustrated, are carried by a pivotally mounted head moving bar 125. The head moving bar 125 is here illustrated with a pivot at its center so as to be positioned in different transverse alignments with respect to the periphery of the drum and the longitudinal axis of the seismic record mounted thereon. The pivot is outside of the drum so that the drum may be rotated with respect to the bar and the heads. The individual heads are aligned with traces on the record and reproduce the electrical signals represented on the traces with differential time adjustments between traces caused by the alignment of head moving bar 125 with respect to the record. Since each trace is associated with a selected detector field coordinate, the dimensional characteristics of the traces are amplitude-vs.-time-and-horizontal coordinate.

The pivotally mounted head moving bar 125 is moved about its pivot by movement of a mechanical push rod 143 following a cam 144. The cam is rotated through gear box 145 from motor 146, and the cam and gear reduction are appropriately designed to provide for a total movement of head moving bar 125 between its pivotal limits in a predetermined number of steps. After each single revolution of the drum 121, motor 146 is energized by apparatus to be described, to cause one step of movement of the cam 144. During each stop of the bar 125 per single revolution of the drum 121, it is evident that the group of traces thus generated can be identified by a horizontal coordinate corresponding to the horizontal position of the pivot point of FIG. 16.

It should be understood that different schemes may be employed to provide individual control for the movement of each of the reproducing heads and also that cams of a different contour may be employed to produce stepped head movement in different increments. For example, in apparatus actually used to carry out the method of this invention, the magnetic pickup heads are not mounted on a simple bar, but instead are mounted on separate members that are capable of individual circumferential movements around the drum. The bar-type mechanism is illustrated here for didactic clarity.

The signals from summing amplifier 97 are passed to storage device 98 and thence to an event selector 99. Sophisticated analysis of traces to detect events requires more than one trace in simultaneous processing. Hence, storage device 98 is positioned between the amplifier 97 and selector 99 as depicted in FIG. 16.

In U.S. Pat. No. 3,149,302, Klein et al, for "Informational Selection Programmer Employing Relative Amplitude, Absolute Amplitude and Time Coherence," issued Sept. 15, 1964, and assigned to the assignee of the present application, a method and apparatus for forming the comparative analysis of seismic traces was disclosed. In that patent, a group of three adjacent traces are compared for selectional purpose to detect events within the central one of the three traces. Since event selector 99 functions in accordance with predetermined selection codes (or sets of rules) to identify certain amplitude excursions along each of the sum traces from the storage device 98 that are believed to represent coherent energy on the original record that, in turn, represent probable refractions, the output from the selector 99 is a single trace whose amplitude or intensity is modified according to the picking selection code of the type described in U.S. Pat. No. 3,149,302. That patent further discloses that the use of three traces is arbitrary and the number of traces selected for the comparison will be determined by the sensitivity pattern of the array and by the time delay (moveout) employed in extracting the directional information from the original field traces. However, it should be noted that it is not necessary to produce and store all of the directional traces before the selection process occurs, since only a limited few are actually used at any one time in the selection of events. U.S. Pat. No. 3,149,303, Klein et al, for "Seismic Cross Section Plotter," issued Sept. 15, 1964, discloses a temporary storage device useful in accomplishing the temporary storage of directional seismic traces. As described in that patent, a typical storage device includes a multiposition relay connected to a multichannel recording means. As each sonogram trace is produced from the original traces, that trace is applied through the multiposition relay to the recording means. Each channel of the recording medium will have the necessary elements to record, reproduce and erase the signals within itself. Referring again to FIG. 16, if such a multiposition relay is used, it can be stepped through each of its positions using, say, linkage 143 connected as illustrated in FIG. 16 so that in each of its successive positions the directional seismic trace produced from a summing bar 125 will be applied to a different one of the separate channels of the recording means.

Attention should also be directed to the fact that other event selectors could be utilized in the present invention, as for example that event selector described in U.S. Pat. No. 3,273,114, Stephenson et al, for "Ergodic Signal Picking," issued Sept. 13, 1966 and assigned to the assignee of the present application. In that patent, there is described a method and apparatus for performing the selection of seismic events based on a statistical deviation of instantaneous measured characteristics from measured normalized average characteristics with respect to the original record. However, if such a picking method were used, the apparatus of FIG. 16 would be somewhat modified. Likewise, combinations of the aforementioned devices and methods may also be useful in carrying out the present invention. In this regard, since the tailoring of steps to achieve specified selection goals may now be of importance in the processing of seismic data, a method having particular utility in the operating modes of the present invention will now be described. It will become evident from the discussion which follows that the method is, in essence, time-averaging event detection and incorporates features of the event selectors and methods referenced above. Briefly, in this method, for each sonogram trace to be picked, a corresponding "control trace" is generated, whose amplitude values as a function of time may be only zero of unity. Multiplication of each sonogram trace by its corresponding control trace emphasizes those portions of the sonogram trace considered to contain seismically meaningful events.

Now in more detail, the generation of the control trace involves several steps, which may be thought of as being in two separate, parallel groups of steps: (i) the first group of steps consists of individually squaring and integrating each of the traces of the original seismic record to produce a set of individual traces which represent the power in the original individual traces. Then, the power traces are sonogrammed to produce a set of "sonogram average power traces", one for each moveout used in the sonogramming process; and (ii) the second group of steps consists of individually squaring and integrating each of the traces of the original seismic record to produce a set of individual traces which represent the power in the original individual traces. Then the power traces are sonogrammed to produce a set of "sonogram average power traces," one for each moveout used in the sonogramming process; and (ii) the second group of steps consists of, first, individually squaring and integrating the regular sonogram traces to obtain individual "power traces of a sonogram". Then, the amplitude values on these traces are divided, point by point, by the amplitude values on the previously derived, corresponding, sonogram average power traces. The result at this point is a set of "normalized power traces", one trace for each trace of the starting sonogram. The normalized traces are then scanned to find portions whose values are above a threshold number, e.g., 0.20, and for each of the normalized traces a control trace is then generated whose amplitude value is zero when that of the normalized power trace is greater than the threshold value and whose amplitude value is unity when that of the normalized power traces is greater than the threshold value. Finally, each of the starting sonogram traces is multiplied, point by point, by its corresponding control trace, to give a corresponding picked sonogram trace, whose amplitude values are those of the starting sonogram trace in the time intervals when the control trace was unity, and whose amplitude values are zeroed out when the control trace was zero.

The preceding steps to obtain picked sonogram traces by control trace multiplication may be varied in many possible ways. Variations include scanning the normalized power traces three at a time, fitting parabolas to the coincident peaks, and comparing the peak values of the fitted parabolas to the threshold value.

From event selector 99, the picked signals are passed through switchable contacts 183, to be described hereinafter, to recording system 130. System 130 constitutes a rotatable drum 131 mounted on shaft 132 driven by gear 133 through engagement with worm 141 rotated by motor 142. The recording system 130 is provided with a single recording head 134 to record the signals supplied from event selector 99. Recording head 134 is positioned parallel to the axis of the drum in accordance with rotation of worm 135 driven from drive motor 146 by mechanism similar to that employed for pickup head 125 in system 120 so that head 134 is moved step by step transversely across the surface of drum 131. In each of its positions, recording head 134 records onto the magnetic tape 136 of the recording system 130 a picked sonogram trace derived from the record 124 of recording system 120.

The recording system 130 further includes a plurality of pickup heads, not individually illustrated, carried on a pivotally mounted head moving bar 137 illustrated with a pivot at its center 138. Head moving bar 137 is mounted and movable similarly to bar 125 of system 120. The individual pickup heads reproduce the electrical signals represented on the traces of the record recorded on tape 136 and these signals are transmitted as individual signals through conductors 139 to a trace selector 151 and then to a summing amplifier 152. Switchable contacts 184, to be described, are provided between the recording system 130 and the trace selector 151.

The pivotally mounted head moving bar 137 is moved about its pivot 138 by movement of a mechanical push rod 153 following a cam 154. The cam is rotated through a gear box 155 from motor 156 and is appropriately designed to provide for a total movement of the head moving bar 137 between its pivotal limits in a predetermined number of steps. After each single revolution of the drum 131, motor 156 is energized to cause one step of movement of the cam 154.

When head moving bar 125 is aligned as illustrated in FIG. 16, attention should be directed to the fact that the sensitivity of the collectively moving heads will be most representative to signals having a moveout along the time axis of the record proportional to angle alpha where alpha is the angle between bar 125 and a horizontal line in the plane of tape 124. If the length of the bar 125 intersecting imaginary verticals emanating from the surface of tape 124 passing through the left-most and the most-right traces of the record 136 (or for that matter any N traces), then the time moveout along the record, $<t$, is equal to $(Sin)L$ where L is the bar length. The resulting summed signals from bar 125 aligned in the position depicted in FIG. 16, thus can be said to represent the largest and most negative directional trace of the process, and for reasons set forth in the specification, supra, will be designated the ($-60$) millisecond trace. The ($-60$) millisecond trace will be recorded as the left-most trace on record 136, as depicted in FIG. 16. Similarly, when the moving bar 125 is positioned as illustrated in FIG. 16, the heads will be most responsive to directional signals having a record moveout which is the largest and most positive value of the process. As the summed signals are recorded on record 136, such summed signals will be recorded at the right-most trace, and for reasons of clarification to be discussed below, it is designated ($+60$) millisecond trace. Between the aforementioned left- and right-most sonogram traces on record 136 there will be recorded additional traces representing proportional moveout magnitudes between the left-most and right-most traces with the zero moveout trace usually being centered therebetween. The number of additional traces can range between any convenient number, say, 10 to 30 traces, with about 20 being preferred.

By convention in the sonogram process, the summation trace signals are recorded on record 136 at a longitudinal position along the trace corresponding to the time position of the center or pivot point of summation angle or, in the case illustrated, the center of bar 125. An event, appearing first in time on the trace on the left of record 124 and later on the trace to the right, would appear on a trace on record 136 to the left of center with the event being recorded at a longitudinal position along the record determined by the position of the pivot point of the head moving bar 125 with respect to the longitudinal or time axis of record 124.

Trace selector 151 is for the purpose of including, or excluding, any individual sonogram trace from the sonogram record 136 so as to exclude or include only P-wave or only S-wave events in the final record. That is, P-wave and S-wave events can be easily separated with one or the other through selection codes provided in trace selector 151. In this regard, attendant circuitry within selector 151 is activated to cause inclusion of representations of the sonogram trace, those representations having either a positive or negative sign (with regard to the latter distinction, amplitudes having negative signs bring about amplitude inversion of the trace). Exclusion of representations can also occur in which individual sonogram traces are prevented from passage through the selector 151, and, accordingly, are prevented from further processing in accordance with the procedures of the present invention.

Trace selector 151 may be thought of as a set of transformers, one for each trace to be fed into the selector 151. Since it is usual to process traces in a selected group, selector 151 could consist of several separate transformers in parallel. With the secondary of each transformer center-tapped to ground, connection to one end of a secondary would give a voltage proportional to the input signal, and of the same sign, while connection to the other end of the secondary would give a similar voltage, but of the opposite sign. Non-connection to either end (switch means inactivated), of course, would simply exclude the trace in question. In actual practice, these conceptual transformers are replaced by pairs of operational amplifiers capable of giving, for each input channel, a pair of proportional outputs, one positive and the other negative, and also capable, of course, of giving zero output, when switched off.

Attention should now be directed to the fact that the decision whether or not to include or exclude a particular sonogram trace or group of traces at the selector 151 is not based on criteria developed after the processing of the data has begun. The criteria are developed and implemented by a seismologist prior to the initial sonogramming step. Once a particular decision has been made by the seismologist, the apparatus of FIG. 16 carries out his commands using conventional circuitry such as a series of switches whose actuation is scheduled prior to the initial processing steps. For example, mechanical linkage 140 could be a series of cams attached to a common shaft through gear box 155, the cams coming into effect as a function of the angle of rotation of that shaft. It should be pointed out, however, that linkage 140 is depicted as a mechanical unit for didactic simplicity only. It indicates that the same mechanism which determines the settings of head moving bar 137 should also determine the switch settings of the switch means within selector 151. In practice, both the head moving bar 137 and the switch means of trace selector 151 can be actuated by stepping switches which step as a function of drum rotation, to provide the required informational selection.

The traces passed through selector 151 are supplied to summing amplifier 152 where they are combined to produce a single output trace for each revolution of the drum 131. The summed signal output from summing amplifier 152 constitutes individual seismic trace-like signals and is passed to recording system 160.

Recording system 160 constitutes a drum 161 supported on a rotatable shaft 162 driven by suitable mechanism such as gear 163, worm shaft 141 and motor 142. The drum 161 is adapted with apparatus, not shown, for securing a recording medium in the form of a magnetic tape 164 to the periphery of the drum. A single recording head 165, connected to and through switchable contacts 185, to be described later, cooperates with the tape 164 to produce a recorded magnetic record. The single recording head 165 is mounted on a threaded block 166 positioned by rotation of worm 167. The threaded block is guided by fixed rod 168 to prevent its rotation. Energization of motor 156 causes rotation of gear 159 and the consequent movement of the recording head 165 parallel to the axis of the drum 161.

The pitch of the worms 135 and 167 and the contour of the cams 144 and 154 are related so that the heads 125, 137 and 165 are moved step by step from one side to the other of their respective drums while the cams make one complete revolution to move the head moving bars 125 and 137 from one limiting position to another. Stepping switches likewise can aid in providing appropriate synchronization of the system, as previously mentioned.

Energization of the system illustrated in FIG. 16 is provided from a power source 171 (through switch contacts 172 to motors 146 and 156) and directly to motor 142. Cam 173 on shaft 162 pushes on rod 174, against the bias of spring 175, to close the contacts 172. The eccentric projection 176 of the cam 173 causes contacts 172 to be closed only during the part of the revolution in which the magnetic tapes on drums 121, 131 and 161 are in such a position that their respective heads 134 and 165 are in the peripheral gap between the beginning and the end of the tapes. During the relatively short time that these heads are in that gap and, therefore, not transmitting useful information, the heads are repositioned axially along their respective drums while the drums 121, 131 and 161 continue to revolve at constant speed.

Individual switching contacts are shown at 182, 183, 184 and 185, between bar 125 and summing amplifier 97, between event selector 99 and recording head 134, and between cable 139 and trace selector 151, and between summing amplifier 152 and head 165. The switchable contacts 182, 183, 184 and 185 are collectively operated by a linkage 186 and a master control rod 187. It should be apparent that when contacts 182 and 183 are open, contacts 184 and 185 are closed, and that when contacts 182 and 183 are open, the contacts 184 and 185 are closed. In the "down" position, the first sonogramming process will be performed and in the "up" position the second sonogramming will be performed.

The operation of the mechanism in performing the method of the present invention should be readily apparent from the foregoing description of the apparatus schematically illustrated in FIG. 16. With a corrected seismic record positioned on the periphery of drum 121 of record system 110 and a blank recording tape placed on the periphery of drum 131 of the recording system 130 and with master control rod 187 in the illustrated position, the pivotally mounted head moving bar 125 as shown, and the recording head 134 as shown, the record of recording system 120 may be sonogrammed with each drum revolution to produce individual traces of an event-selected sonogram record on the recording tape 136. After each individual trace is completed, head moving bar 125 with pickup heads will be shifted for the production of the next trace until the full sonogram record has been completed.

After the complete sonogram record has been produced, the master control rod 187 will be moved from the position shown to a new position, and the recording system energized a second time. The first trace of the simulated trace record produced in recording system 130 is recorded as the first trace on a blank magnetic tape on the periphery of the drum 161 of recording system 160. When all of these traces have been produced, in sequence, the record now recorded on the tape 164 of the recording system 160 will be the new improved record in which P-wave and S-wave energy have been separated. And the improved P-wave or S-wave record on tape 164 is available for further processing in accordance with the apparatus of FIG. 8.

The following patents assigned to the assignee of the present invention which contain sorting and stacking techniques, including beam steering techniques, are of interest in carrying out the method of the present invention.

| Patent | Issued | Inventor | Title |
| --- | --- | --- | --- |
| 3,597,727 | 12/30/68 | Judson et al | Method of Attenuating Multiple Seismic Signals in the Determination of Inline and Cross Dips Employing Cross-Steered Seismic Data |
| 3,806,863 | 4/23/74 | Tilley et al | Method of Collecting Seismic Data of Strata Underlying Bodies of Water |
| 3,638,178 | 1/25/72 | Stephenson | Method for Processing Three-Dimensional Seismic Data to Select and Plot Said Data on a Two-Dimensional Display Surface |
| 3,346,840 | 10/10/67 | Lara | Double Sonogramming for Seismic Record Improvement |
| 3,766,519 | 10/16/73 | Stephenson | Method for Processing Surface Detected Seismic Data to Plotted Representations of Subsurface Directional Seismic Data |
| 3,784,967 | 1/8/74 | Graul | Seismic Record Processing Method |
| 3,149,302 | 9/15/74 | Klein et al | Information Selection Programmer Employing Relative Amplitude, Absolute Amplitude and Time Coherence |
| 3,149,303 | 9/15/64 | Klein et al | Seismic Cross-Section Plotter |

FIG. 17 is a flow diagram illustrative of a computer-dominated process in which the functions required by the method of the present invention can be easily ascertained.

The steps of FIG. 17 include generating addresses for the P-wave and S-wave refraction data. Variables to be addressed include: refraction amplitude-vs.-time values; offset position (detector, sourcepoint, centerpoint) sourcepoint-profile number, common offset lines, common centerpoint lines, and common detector location lines, as previously noted. After P-wave and S-wave refraction events have selected and classified, the resulting data are plotted, say, as a function of offset position in the manner of FIG. 9.

After the apparent refraction time-vs.-offset data have been displayed and shape of the formation determined as previously suggested, P-wave and S-wave velocity determinations can occur.

FIG. 18 illustrates particular elements of a computing system for carrying out the steps of FIG. 17. While many computing systems are available to carry out the process of the invention, perhaps to best illustrate operations at the lowest cost per instruction, a microcomputing system 250 is didactically best and is presented in detail below. The system 250 of FIG. 18 can be implemented on hardware provided by many different manufacturers, and for this purpose, elements provided by Intel Corporation, Santa Clara, Calif., may be preferred.

Such a system 250 can include a CPU 251 controlled by a control unit 252. Two memory units 253 and 254 connect to the CPU 251 through BUS 255. Program memory unit 253 stores instructions for directing the activities of the CPU 251 while data memory unit 254 contains data (as data words) related to the seismic data provided by the field acquisition system. Since the seismic traces contain large amounts of bit data, an auxiliary memory unit 255 can be provided. The CPU 251 can rapidly access data stored through addressing the particular input port, say, at 256 in the Figure. Additional input ports can also be provided to receive additional information as required from usual external equipment well known in the art, e.g., floppy disks, paper-tape readers, etc., including such equipment interfaced through input interface port 257 tied to a keyboard unit 258 for such devices. Using clock inputs, control circuitry 252 maintains the proper sequence of events required for any processing task. After an instruction is fetched and decoded, the control circuitry issues the appropriate signals (to units both internal and external) for initiating the proper processing action. Often the control circuitry will be capable of responding to external signals, such as an interrupt or wait request. An interrupt request will cause the control circuitry 252 to temporarily interrupt main program execution, jump to a special routine to service the interrupting device, then automatically return to the main program. A wait request is often issued by memory units 253 or 254 or an I/O element that operates slower than the CPU.

For outputting information, the system 250 can include a printer unit 259 whereby the amplitude of the summed traces as a function of time is printable. Of more use as an output unit, however, is disk unit 260, which can temporarily store the data. Thereafter, an off-line digital plotter capable of generating a side-by-side display is used in conjunction with the data on the disk unit 260. Such plotters are available in the art, and one proprietary model has been previously described as a computer-controlled CRT for optically merging onto photographic paper, as a display mechanism, the seismic data.

FIG. 19 illustrates CPU 251 and control unit 252 in more dtail.

As shown, the CPU 251 includes an array of registers generally indicated at 262 tied to an ALU 263 through an internal data bus 264 under control of control unit 252. The registers 262 are temporary storage areas. Program counter 263 and instruction register 266 have dedicated uses; the other registers, such as accumulator 267, have more general uses.

The accumulator 267 usually stores one of the seismic operands to be manipulated by the ALU 263. For example, in the summation of traces, the instruction may direct the ALU 263 to not only add in sequence the contents of the temporary registers containing predetermined trace amplitudes together with an amplitude value in the accumulator, but also store the result in the accumulator itself. Hence, the accumulator 267 operates as both a source (operand) and a destination (result) register. The additional registers of the array 262 are useful in manipulation of seismic data, since they eliminate the need to shuffle results back and forth between the external memory units of FIG. 18 and accumulator 267. In practice, most ALU's also provide other built-in functions, including hardware subtraction, boolean logic operations, and shift capabilities. The ALU 263 also can utilize flag bits generated by FF unit 273 which specify certain conditions that arise in the course of arithmetical and logical manipulations. Flags typically include carry, zero, sign, and parity. It is possible to program jumps which are conditionally dependent on the status of one or more flags. Thus, for example, the program may be designed to jump to a special routine if the carry bit is set following an addition instruction.

Instructions making up the program for operation involving seismic data are stored in the program memory unit 253 of the CPU 251 of FIG. 18. The program is operated upon in a sequential manner except when instructions in the memory units 253, 254 call for special commands such as "jump" (or "call") instructions. While the program associated with the present invention is a relatively straightforward one, hence avoiding most "jump" and "call" instructions, "call" instructions for subroutines are common in the processing of seismic data and could be utilized, if desired. In "call" instructions, the CPU 251 has a special way of handling subroutines in order to insure an orderly return to the main program. When the processor receives a call instruction, it increments the program counter 265 and notes the counter's contents in a reserved memory area of the memory unit known as the "stack".

CPU's have different ways of maintaining stack contents. Some have facilities for the storage of return addresses built into the CPU itself. Other CPU's use a reserved area of external memory as the stack and simply maintain a "pointer" register, such as pointer register 270, FIG. 19, which contains the address of the most recent stack entry. The stack thus saves the address of the instruction to be executed after the subroutine is completed. Then the CPU 251 loads the address specified in the call into its program counter 265. The next instruction fetched will therefore be the first step of the subroutine. The last instruction in any subroutine is a "return". Such an instruction need specify no address.

Having now briefly described the operations of the CPU 251, Table I is presented below containing a full instruction set for its operations.

TABLE I

| | Summary of Processor Instructions by Alphabetical Order | | | | | | | | | |
|---|---|---|---|---|---|---|---|---|---|---|
| | | Instruction Code[1] | | | | | | | | Clock[2] |
| Mnemonic | Description | $D_7$ | $D_6$ | $D_5$ | $D_4$ | $D_3$ | $D_2$ | $D_1$ | $D_0$ | Cycles |
| ACI | Add immediate to A with carry | 1 | 1 | 0 | 0 | 1 | 1 | 1 | 0 | 7 |
| ADC M | Add memory to A with carry | 1 | 0 | 0 | 0 | 1 | 1 | 1 | 0 | 7 |

TABLE I-continued
Summary of Processor Instructions by Alphabetical Order

| Mnemonic | Description | Instruction Code[1] | | | | | | | | Clock[2] Cycles |
|---|---|---|---|---|---|---|---|---|---|---|
| | | $D_7$ | $D_6$ | $D_5$ | $D_4$ | $D_3$ | $D_2$ | $D_1$ | $D_0$ | |
| ADC r | Add register to A with carry | 1 | 0 | 0 | 0 | 1 | S | S | S | 4 |
| ADD M | Add memory to A | 1 | 0 | 0 | 0 | 0 | 1 | 1 | 0 | 7 |
| ADD r | Add register to A | 1 | 0 | 0 | 0 | 0 | S | S | S | 4 |
| ADI | Add immediate to A | 1 | 1 | 0 | 0 | 0 | 1 | 1 | 0 | 7 |
| ANA M | And memory with A | 1 | 0 | 1 | 0 | 0 | 1 | 1 | 0 | 7 |
| ANA r | And register with A | 1 | 0 | 1 | 0 | 0 | S | S | S | 4 |
| ANI | And immediate with A | 1 | 1 | 1 | 0 | 0 | 1 | 1 | 0 | 7 |
| CALL | Call unconditional | 1 | 1 | 0 | 0 | 1 | 1 | 0 | 1 | 17 |
| CC | Call on carry | 1 | 1 | 0 | 1 | 1 | 1 | 0 | 0 | 11/17 |
| CM | Call on minus | 1 | 1 | 1 | 1 | 1 | 1 | 0 | 0 | 11/17 |
| CMA | Compliment A | 0 | 0 | 1 | 0 | 1 | 1 | 1 | 1 | 4 |
| CMC | Compliment carry | 0 | 0 | 1 | 1 | 1 | 1 | 1 | 1 | 4 |
| CMP M | Compare memory with A | 1 | 0 | 1 | 1 | 1 | 1 | 1 | 0 | 7 |
| CMP r | Compare register with A | 1 | 0 | 1 | 1 | 1 | S | S | S | 4 |
| CNC | Call on no carry | 1 | 1 | 0 | 1 | 0 | 1 | 0 | 0 | 11/17 |
| CNZ | Call on no zero | 1 | 1 | 0 | 0 | 0 | 1 | 0 | 0 | 11/17 |
| CP | Call on positive | 1 | 1 | 1 | 1 | 0 | 1 | 0 | 0 | 11/17 |
| CPE | Call on parity even | 1 | 1 | 1 | 0 | 1 | 1 | 0 | 0 | 11/17 |
| CPI | Compare immediate with A | 1 | 1 | 1 | 1 | 1 | 1 | 1 | 0 | 7 |
| CPO | Call on parity odd | 1 | 1 | 1 | 0 | 0 | 1 | 0 | 0 | 11/17 |
| CZ | Call on zero | 1 | 1 | 0 | 0 | 1 | 1 | 0 | 0 | 11/17 |
| DAA | Decimal adjust A | 0 | 0 | 1 | 0 | 0 | 1 | 1 | 1 | 4 |
| DAD B | Add B&C to H&L | 0 | 0 | 0 | 0 | 1 | 0 | 0 | 1 | 10 |
| DAD D | Add D&E to H&L | 0 | 0 | 0 | 1 | 1 | 0 | 0 | 1 | 10 |
| DAD H | Add H&L to H&L | 0 | 0 | 1 | 0 | 1 | 0 | 0 | 1 | 10 |
| DAD SP | Add stack pointer to H&L | 0 | 0 | 1 | 1 | 1 | 0 | 0 | 1 | 10 |
| DCR M | Decrement memory | 0 | 0 | 1 | 1 | 0 | 1 | 0 | 1 | 10 |
| DCR r | Decrement register | 0 | 0 | D | D | D | 1 | 0 | 1 | 5 |
| DCX B | Decrement B&C | 0 | 0 | 0 | 0 | 1 | 0 | 1 | 1 | 5 |
| DCX D | Decrement D&E | 0 | 0 | 0 | 1 | 1 | 0 | 1 | 1 | 5 |
| DCX H | Decrement H&L | 0 | 0 | 1 | 0 | 1 | 0 | 1 | 1 | 5 |
| DCX SP | Decrement stack pointer | 0 | 0 | 1 | 1 | 1 | 0 | 1 | 1 | 5 |
| DI | Disable interrupt | 1 | 1 | 1 | 1 | 0 | 0 | 1 | 1 | 4 |
| EI | Enable interrupts | 1 | 1 | 1 | 1 | 1 | 0 | 1 | 1 | 4 |
| HLT | Halt | 0 | 1 | 1 | 1 | 0 | 1 | 1 | 0 | 7 |
| IN | Input | 1 | 1 | 0 | 1 | 1 | 0 | 1 | 1 | 10 |
| INR M | Increment memory | 0 | 0 | 1 | 1 | 0 | 1 | 0 | 0 | 10 |
| INR r | Increment register | 0 | 0 | D | D | D | 1 | 0 | 0 | 5 |
| INX B | Increment B&C registers | 0 | 0 | 0 | 0 | 0 | 0 | 1 | 1 | 5 |
| INX D | Increment D&E registers | 0 | 0 | 0 | 1 | 0 | 0 | 1 | 1 | 5 |
| JC | Jump on carry | 1 | 1 | 0 | 1 | 1 | 0 | 1 | 0 | 10 |
| JM | Jump on minus | 1 | 1 | 1 | 1 | 1 | 0 | 1 | 0 | 10 |
| JMP | Jump unconditional | 1 | 1 | 0 | 0 | 0 | 0 | 1 | 1 | 10 |
| JNC | Jump on no carry | 1 | 1 | 0 | 1 | 0 | 0 | 1 | 0 | 10 |
| JNZ | Jump on no zero | 1 | 1 | 0 | 0 | 0 | 0 | 1 | 0 | 10 |
| JP | Jump on positive | 1 | 1 | 1 | 1 | 0 | 0 | 1 | 0 | 10 |
| JPE | Jump on parity even | 1 | 1 | 1 | 0 | 1 | 0 | 1 | 0 | 10 |
| JPO | Jump on parity odd | 1 | 1 | 1 | 0 | 0 | 0 | 1 | 0 | 10 |
| JZ | Jump on zero | 1 | 1 | 0 | 0 | 1 | 0 | 1 | 0 | 10 |
| LDA | Load A direct | 0 | 0 | 1 | 1 | 1 | 0 | 1 | 0 | 13 |
| LDAX B | Load A indirect | 0 | 0 | 0 | 0 | 1 | 0 | 1 | 0 | 7 |
| LDAX D | Load A indirect | 0 | 0 | 0 | 1 | 1 | 0 | 1 | 0 | 7 |
| LHLD | Load H&L direct | 0 | 0 | 1 | 0 | 1 | 0 | 1 | 0 | 16 |
| LXI B | Load immediate register pair B&C | 0 | 0 | 0 | 0 | 0 | 0 | 0 | 1 | 10 |
| LXI D | Load immediate register pair D&E | 0 | 0 | 0 | 1 | 0 | 0 | 0 | 1 | 10 |
| LXI H | Load immediate register Pair H&L | 0 | 0 | 1 | 0 | 0 | 0 | 0 | 1 | 10 |
| LXI SP | Load immediate stack pointer | 0 | 0 | 1 | 1 | 0 | 0 | 0 | 1 | 10 |
| MVI M | Move immediate memory | 0 | 0 | 1 | 1 | 0 | 1 | 1 | 0 | 10 |
| MVI r | Move immediate register | 0 | 0 | D | D | D | 1 | 1 | 0 | 7 |
| MOV m,r | Move register to memory | 0 | 1 | 1 | 1 | 0 | S | S | S | 7 |
| MOV r,M | Move memory to register | 0 | 1 | D | D | D | 1 | 1 | 0 | 7 |
| MOV r1,r2 | Move register to register | 0 | 1 | D | D | D | S | S | S | 5 |
| NOP | No operation | 0 | 0 | 0 | 0 | 0 | 0 | 0 | 0 | 4 |

TABLE I-continued

Summary of Processor Instructions by Alphabetical Order

| Mnemonic | Description | $D_7$ | $D_6$ | $D_5$ | $D_4$ | $D_3$ | $D_2$ | $D_1$ | $D_0$ | Clock[2] Cycles |
|---|---|---|---|---|---|---|---|---|---|---|
| ORA M | Or memory with A | 1 | 0 | 1 | 1 | 0 | 1 | 1 | 0 | 7 |
| ORA r | Or register with A | 1 | 0 | 1 | 1 | 0 | S | S | S | 4 |
| ORI | Or immediate with A | 1 | 1 | 1 | 1 | 0 | 1 | 1 | 0 | 7 |
| OUT | Output | 1 | 1 | 0 | 1 | 0 | 0 | 1 | 1 | 10 |
| PCHL | H&L to program counter | 1 | 1 | 1 | 0 | 1 | 0 | 0 | 1 | 5 |
| POP B | Pop register pair B&C off stack | 1 | 1 | 0 | 0 | 0 | 0 | 0 | 1 | 10 |
| POP D | Pop register pair D&E off stack | 1 | 1 | 0 | 1 | 0 | 0 | 0 | 1 | 10 |
| POP H | Pop register pair H&L off stack | 1 | 1 | 1 | 0 | 0 | 0 | 0 | 1 | 10 |
| POP PSW | Pop A and Flags off stack | 1 | 1 | 1 | 1 | 0 | 0 | 0 | 1 | 10 |
| PUSH B | Push register Pair B&C on stack | 1 | 1 | 0 | 0 | 0 | 1 | 0 | 1 | 11 |
| PUSH D | Push register Pair D&E on stack | 1 | 1 | 0 | 1 | 0 | 1 | 0 | 1 | 11 |
| PUSH H | Push register Pair H&L on stack | 1 | 1 | 1 | 0 | 0 | 1 | 0 | 1 | 11 |
| PUSH PSW | Push A and Flags on stack | 1 | 1 | 1 | 1 | 0 | 1 | 0 | 1 | 11 |
| RAL | Rotate A left through carry | 0 | 0 | 0 | 1 | 0 | 1 | 1 | 1 | 4 |
| RAR | Rotate A right through carry | 0 | 0 | 0 | 1 | 1 | 1 | 1 | 1 | 4 |
| RC | Return on carry | 1 | 1 | 0 | 1 | 1 | 0 | 0 | 0 | 5/11 |
| RET | Return | 1 | 1 | 0 | 0 | 1 | 0 | 0 | 1 | 10 |
| RLC | Rotate A Left | 0 | 0 | 0 | 0 | 0 | 1 | 1 | 1 | 4 |
| RM | Return on minus | 1 | 1 | 1 | 1 | 1 | 0 | 0 | 0 | 5/11 |
| RNC | Return on no carry | 1 | 1 | 0 | 1 | 0 | 0 | 0 | 0 | 5/11 |
| RNZ | Return on no zero | 1 | 1 | 0 | 0 | 0 | 0 | 0 | 0 | 5/11 |
| RP | Return on positive | 1 | 1 | 1 | 1 | 0 | 0 | 0 | 0 | 5/11 |
| RPE | Return on parity even | 1 | 1 | 1 | 0 | 1 | 0 | 0 | 0 | 5/11 |
| RPO | Return on parity odd | 1 | 1 | 1 | 0 | 0 | 0 | 0 | 0 | 5/11 |
| RRC | Rotate A right | 0 | 0 | 0 | 0 | 1 | 1 | 1 | 1 | 4 |
| RST | Restart | 1 | 1 | A | A | A | 1 | 1 | 1 | 11 |
| RZ | Return on zero | 1 | 1 | 0 | 0 | 1 | 0 | 0 | 0 | 5/11 |
| SBB M | Subtract memory from A with borrow | 1 | 0 | 0 | 1 | 1 | 1 | 1 | 0 | 7 |
| SBB r | Subtract register from A with borrow | 1 | 0 | 0 | 1 | 1 | S | S | S | 4 |
| SBI | Subtract immediate from A with borrow | 1 | 1 | 0 | 1 | 1 | 1 | 1 | 0 | 7 |
| SHLD | Store H&L direct | 0 | 0 | 1 | 0 | 0 | 0 | 1 | 0 | 16 |
| SPHL | H&L to stack pointer | 1 | 1 | 1 | 1 | 1 | 0 | 0 | 1 | 5 |
| STA | Store A direct | 0 | 0 | 1 | 1 | 0 | 0 | 1 | 0 | 13 |
| STAX B | Store A indirect | 0 | 0 | 0 | 0 | 0 | 0 | 1 | 0 | 7 |
| STAX D | Store A indirect | 0 | 0 | 0 | 1 | 0 | 0 | 1 | 0 | 7 |
| STC | Set carry | 0 | 0 | 1 | 1 | 0 | 1 | 1 | 1 | 4 |
| SUB M | Subtract memory from A | 1 | 0 | 0 | 1 | 0 | 1 | 1 | 0 | 7 |
| SUB r | Subtract register from A | 1 | 0 | 0 | 1 | 0 | S | S | S | 4 |
| SUI | Subtract immediate from A | 1 | 1 | 0 | 1 | 0 | 1 | 1 | 0 | 7 |
| XCHG | Exchange D&E, H&L Registers | 1 | 1 | 1 | 0 | 1 | 0 | 1 | 1 | 4 |
| XRA M | Exclusive Or memory with A | 1 | 0 | 1 | 0 | 1 | 1 | 1 | 0 | 7 |
| XRA r | Exclusive Or register with A | 1 | 0 | 1 | 0 | 1 | S | S | S | 4 |
| XRI | Exclusive Or immediate with A | 1 | 1 | 1 | 0 | 1 | 1 | 1 | 0 | 7 |
| XTHL | Exchange top of stack, H&L | 1 | 1 | 1 | 0 | 0 | 0 | 1 | 1 | 18 |

[1]DDD or SSS-000B-001C-010D-011E-100H-101L-110 Memory-111A.
[2]Two possible cycle times (5/11) indicate instruction cycles dependent on condition flags.

The method of the present invention provides a geophysicist with tools for determining shape of formations as well as elastic parameters of interest to indicate likelihood of the formation of interest containing ore, marker rock, economic minerals, and the like. However, the invention is not limited to the abovedescribed combinations alone. For example, under certain circumstances, it may be desirable to improve resolution of compressional and shear wave events in the records provided by the array of FIG. 5.

Modification

Initially, it should be mentioned that the array 20 of FIG. 5 provides records in which discernment of shear wave and compressional velocity values is more often than not adequate. But occasionally separation of these values into particular distinct components at each detector $D_1$, $D_2$... of the array 20 of FIG. 5 is not possible, since the ray-paths of the shear or compressional waves may not be parallel to one of the axes of response of each detector when the former emerge at each detector station $DS_1$, $DS_2$... of FIG. 5. That is to say, if the dip of the reflector of the earth formation undergoing survey and critical angle of the refracted waves are such that separation along the axes of response of the detector does occur, then compressional and shear wave arrival times at each detector $D_1$, $D_2$... etc., are usually ascertainable.

However, occasionally the ray-paths are not parallel to the response axes of the detectors. Hence, there are components of each in the outputs of two or more of the sub-detectors 300–302 of FIG. 20. In FIG. 20, assume that each detector $D_1$, $D_2$... of FIG. 5 is composed of three sub-detectors 300, 301, 302 whose axes of response are at right angles to each other. In more detail, sub-detector 300 is seen to have an axis of response "V" parallel to vertical arrow 303; sub-detector 301 is known to have an axis of response "T" normal to both the direction of array traverse 304 and response axes "V"; while sub-detector 302 is indicated to have an axis of response "R" parallel to the direction of array traverse 304 but to be normal to both axes of response "V" and "T" of the sub-detectors 300 and 301, respectively.

If the compressional or shear ray-path is not parallel to one respective axis of response, i.e., V, R or T, then components of both the compressional and shear waves can appear at two or more of the outputs of the sub-detectors 300–302. Such "combined" traces can be difficult to interpret. That is to say, in FIG. 17 the step of generating correct shear wave velocity and compressional velocity address tags might have been difficult to achieve in those circumstances mentioned above except for the fact that a modification of the present invention is available, as hereinafter described.

Referring now to FIGS. 21 and 22, there are shown flow diagrams of the modification of the present invention illustrating steps in a computer-dominated process for correctly interpreting detector outputs irrespective of orientation of ray-paths of the emerging shear or compressional waves, the dip of the subterranean reflector or the critical angle of the refracted wave, such detector outputs being rapidly and easily interpretable as compressional or shear-wave, as well as being separately displayed.

Generally, as shown in FIG. 21, the process contemplates the following steps:

(i) generating address tags for the outputs of each sub-detector 300–302 of FIG. 20;

(ii) manipulating the addressed data of (i), supra, to generate a series of 2-D hodographs in polar coordinates such that a set of V-T, V-R and R-T plots over preselected time gates indicate particle motion, and (iii) displaying the hodographs, individually or in combination, to indicate wave type, vis. either compressional, shear, Rayleigh, etc., as set forth in detail below.

Now in more detail, consider the flow chart of FIG. 22. As shown, the initial four steps of the process are standard procedures to the seismic processing industry, viz., (i) initializing and reading of variables of a namelist, (ii) opening the input files; (iii) reading in the master file, and (iv) setting up the index and sort array. Then, the main sub-routine is called, viz., "PLHODO" and the 2-D hodographs are generated in the manner set forth below.

Of import in the present aspect of the modification of the invention is the operation of the last-mentioned step of the computer-dominated process, viz. the sub-routine called "PLHODO". Essentially, during this aspect of the present invention, the process is controlled so as to manipulate the addressed traces to generate V-T, V-R and R-T values as a function of time and then to display the resulting plots. In this regard, note that 2-D hodographs are defined as plots of particle motion at a specific detector location in which particle motion in two dimensions is plotted as a function of time.

Assuming in the case to be described hereinbelow that only two-dimensional hodographs are to be generated, among input values required of the program are the usual "standard" parameters:

required space for the traces;
type of array to be used for each trace;
trace identification;
scaling interval;
sampling interval; and
number of traces per scaling interval.

After the traces are read into the system set forth in FIG. 18, the computer-dominated system there depicted provides individual trace plots of each detector. Assume that each detector is composed of the three finite sub-detectors of FIG. 20, and that the sub-detectors 300–302 have axes of response as shown.

From the three separate sub-detectors 300–302, there are provided three separate amplitude-vs.-time traces 306 as shown in FIG. 23, along with rows of two-dimensional hodographs 307. Note that the traces 306 as well as the hodographs 307 appear together as a single display at the output of the processing system of FIG. 18. Each two-dimensional hodograph 307 is a function of a time interval, such interval being generated as the amplitude-vs.-time traces are divided into a series of time gates for analysis purposes.

In more detail in FIG. 23, across the top of FIG. 23 note that separate time gates are indicated, viz. gates 311, 312, 313, 314, 315, 316 and 317. Each gate has a time interval of about 0.20 second. Prior to the actual generation of the hodographs, note that the interpreter controls the length of each time gate as well as the number of gates to be used per plot. Key to interpretation: gate length and gate numbers are chosen to provide distinguishing characteristics where confusion may occur in interpretation of the original outputs of the detectors. Since refraction studies are usually associated with near-surface phenomena, the last gate 317 of FIG. 23 covers the record interval between 1.6 and 2.0 seconds. Hence, the present invention provides efficient near-surface resolution of data.

Additional parameters controlled by the interpreter include: plot scale, length of axes of the plot, type of symbol used, thickness of the for each plot, etc.

Next, the two-dimensional hodographs are actually generated as a function of sub-detector output and time. Note in FIG. 23 that a series of V-R, V-T and R-T headers generally indicated at 308 appear along the left-hand side of the plot with the particular 2-D hodographs 307 being then displayed across the plot as a function of time. The plots themselves are the data points of the various amplitudes normalized as to both time and plot points, and the two adjacent plot points are connected by a line to provide the depicted hodograph 307.

By analysis of the resulting hodographs, the interpreter can determine, with precision, actual values of compressional and shear-wave velocities that have been received at the detector stations in the field. In general, in the interpretation of the hodographs 307 as provided by the present invention, a few keys should be apparent to those skilled in the art. For example, in the V-R hodographs, Rayleigh and P-wave responses dominate; but in the V-T hodographs, shear waves are most easily seen; and in the R-T hodographs, shear waves polarized in vertical or horizontal planes are easily distinguishable over other types of waves. In particular, in FIG. 23, hodographs identified by the number 307a and associated with gate 311, that is, associated with the 0.3–5 second gate indicate that compressional waves are present to almost the total exclusion of any other type of energy. Also note that the hodographs identified by the number 307b associated with gate 317 indicate shear waves are present; similarly, the hodographs identified by the number 307c associated with gate 315 indicate that Rayleigh waves are present over the particular indicated response period of the sub-detectors.

Note further with regard to FIG. 23, that the V, T and R traces 306 are usually plotted first on a side-by-side basis, followed by the rows of V-R, V-T and R-T hodographs 307 as a function of the columnar time gates 311–317. Annotation of the hodograph axes and time gates usually occurs before the particular tagged data points of the V, T and R traces are converted to plot scale, and the phantom points marked or otherwise indicated in the record. Lastly, lines are drawn through adjacent phantom scaled points to form the hodographs 307 depicted in FIG. 23.

Of course, during the interpretation aspects of the invention, the system itself its continuously cross-checking parameters to indicate occurrence of errors in the programming, if any.

Lastly, analysis can conclude by the interpretor classifying particle motion of each hodograph 307 as being horizontal, vertical or circular in the manner of the shear, compressional and Rayleigh wave patterns of FIGS. 4A–4C, supra.

A listing of the modifications of the present invention as carried out on the system of FIG. 18, including all the program statements, set forth below.

```
632000            LDA    L!!!!!06
632100            ADC    #0
632200            STA    L!!!!!06
632300            LDA    NR!N1!06+1
632400            CMP    L!!!!!06+1
632500            LDA    NR!N1!06
632600            SBC    L!!!!!06
632700            BMI    .L000439
632800   .L000440 EQU    *
632900        ;          AMP1=0.
633000            MELIASG.SET   1
633100            JSR    .FLIASGN
633200            .BYTE  0
633300            .WORD  C000443
633400            .WORD  AMP1!!06
633500        ;          AMP2=0.
633600            MELIASG.SET   1
633700            JSR    .FLIASGN
633800            .BYTE  0
633900            .WORD  C000444
634000            .WORD  AMP2!!06
634100        ;          AMP3=0.
634200            MELIASG.SET   1
634300            JSR    .FLIASGN
634400            .BYTE  0
634500            .WORD  C000445
634600            .WORD  AMP3!!06
634700        ;          DO 150 I=A,IZ
634800            LDA    NA!!!!06
634900            STA    I!!!!!06
635000            LDA    NA!!!!06+1
635100            STA    I!!!!!06+1
635200            JMP    .L000446
635300   .L000446 EQU    *
635400            LDA    I!!!!!06+1
635500            CLC
635600            ADC    #1
635700            STA    I!!!!!06+1
635800            LDA    I!!!!!06
635900            ADC    #0
636000            STA    I!!!!!06
636100            LDA    NZ!!!!06+1
636200            CMP    I!!!!!06+1
636300            LDA    NZ!!!!06
636400            SBC    I!!!!!06
636500            BMI    .L000447
636600   .L000448 EQU    *
636700        ;          AMP1=AMP1+IWX(I)**2.0
```

```
636800              LDA     I!!!!!06+1
636900              SEC
637000              SBC     #1
637100              ASL     A
637200              ASL     A
637300              ADC     TRX!!!06
637400              STA     .T000402
637500              LDA     #0
637600              ADC     TRX!!!06+1
637700              STA     .T000402+1
637800     .MFFADD  SEI     1
637900              JSR     .FFADD
638000              .BYTE   0
638100              .WORD   -.T000402,.C000451
638200              .WORD   AMP1!!!06
638300     ;        AMP2=AMP2+TRY(I)**2.0
638400              LDA     I!!!!!06+1
638500              SEC
638600              SBC     #1
638700              ASL     A
638800              ASL     A
638900              ADC     TRY!!!06
639000              STA     .T000402
639100              LDA     #0
639200              ADC     TRY!!!06+1
639300              STA     .T000402+1
639400     .MFFADD  SEI     1
639500              JSR     .FFADD
639600              .BYTE   0
639700              .WORD   -.T000402,.C000452
639800              .WORD   AMP2!!!06
639900     ;        AMP3=AMP3+TRZ(I)**2.0
640000              LDA     I!!!!!06+1
640100              SEC
640200              SBC     #1
640300              ASL     A
640400              ASL     A
640500              ADC     TRZ!!!06
640600              STA     .T000402
640700              LDA     #0
640800              ADC     TRZ!!!06+1
640900              STA     .T000402+1
641000     .MFFADD  SEI     1
641100              JSR     .FFADD
641200              .BYTE   0
641300              .WORD   -.T000402,.C000453
641400              .WORD   AMP3!!!06
641500     ;  180   CONTINUE
641600     .L000450 EQU     *
641700              JMP     .L000446
641800     .L000447 EQU     *
641900     ;        AMPX=SQRT(AMAX1(AMP1,AMP2,AMP3))
642000              LDA     #AMP3!!!06 MOD .M
642100              STA     AMAX1.03
642200              LDA     #AMP3!!!06/256
642300              STA     AMAX1.03+1
642400              LDA     #AMP2!!!06 MOD .M
642500              STA     AMAX1.02
642600              LDA     #AMP2!!!06/256
642700              STA     AMAX1.02+1
642800              LDA     #AMP1!!!06 MOD .M
642900              STA     AMAX1.01
643000              LDA     #AMP1!!!06/256
643100              STA     AMAX1.01+1
643200              LDA     #.T000410 MOD .M
643300              STA     AMAX1.00
643400              LDA     #.T000410/256
643500              STA     AMAX1.00+1
643600              JSR     AMAX1
643700              LDA     #.T000410 MOD .M
643800              STA     SQP1.001
643900              LDA     #.T000410/256
```

```
644000            STA    SQRT.001+1
644100            LDA    #.T000410 MOD .M
644200            STA    SQRT.000
644300            LDA    #.T000410/256
644400            STA    SQRT.000+1
644500            JSR    SQRT
644600   .MFLTASG SET    1
644700            JSR    .FLTASGN
644800            .BYTE  0
644900            .WORD  .T000410
645000            .WORD  AMPX!!06
645100   ;        NT=0.
645200   .MFLTASG SET    1
645300            JSR    .FLTASGN
645400            .BYTE  0
645500            .WORD  .C000454
645600            .WORD  NT!!!06
645700   ;        DO 220 I=NS,NT
645800            LDA    NS!!!06
645900            STA    I!!!!06
646000            LDA    NS!!!06+1
646100            STA    I!!!!06+1
646200            JMP    .L000457
646300   .L000456 EQU    *
646400            LDA    I!!!!06+1
646500            CLC
646600            ADC    #1
646700            STA    I!!!!06+1
646800            LDA    I!!!!06
646900            ADC    #0
647000            STA    I!!!!06
647100            LDA    NT!!!06+1
647200            CMP    I!!!!06+1
647300            LDA    NT!!!06
647400            SBC    I!!!!06
647500            BMI    .L000456
647600   .L000457 EQU    *
647700   ;        FACT=AMP+(AMPX-AMP)*NT/FLOAT(WINDOW)
647800   .MFFSUB  SET    1
647900            JSR    .FFSUB
648000            .BYTE  0
648100            .WORD  AMPX!!06,AMP!!06
648200            .WORD  .T000410
648300   .MFFLOAT SET    1
648400            JSR    .FFLOAT
648500            .BYTE  1
648600            .WORD  WINDOW06
648700            .WORD  .T000412
648800   .MFFMUL  SET    1
648900            JSR    .FFMUL
649000            .BYTE  0
649100            .WORD  .T000410,NT!!!06
649200            .WORD  .T000411
649300   .MFFDIV  SET    1
649400            JSR    .FFDIV
649500            .BYTE  0
649600            .WORD  .T000411,.T000412
649700            .WORD  .T000410
649800   .MFFADD  SET    1
649900            JSR    .FFADD
650000            .BYTE  0
650100            .WORD  AMP!!!06,.T000410
650200            .WORD  FACT!!06
650300   ;        IF(FACT.LT.1.E-4)GO TO 200
650400   .MFFLT   SET    1
650500            JSR    .FFLT
650600            .BYTE  0
650700            .WORD  FACT!!06,.C000460
650800            ASL    A
650900            BCS    *+5
651000            JMP    .L000461
651100            JMP    .L000462
```

```
651200        .L000461  EQU    *
651300        ;         TRX(I)=TRX(I)/FACT
651400                  LDA    I!!!!!06+1
651500                  SEC
651600                  SBC    #1
651700                  ASL    A
651800                  ASL    A
651900                  ADC    TRX!!!06
652000                  STA    .T000402
652100                  LDA    #0
652200                  ADC    TRX!!!06+1
652300                  STA    .T000402+1
652400                  LDA    I!!!!!06+1
652500                  SEC
652600                  SBC    #1
652700                  ASL    A
652800                  ASL    A
652900                  ADC    TRX!!!06
653000                  STA    .T000403
653100                  LDA    #0
653200                  ADC    TRX!!!06+1
653300                  STA    .T000403+1
653400         .NFEDIV  SET    1
653500                  JSR    .FFDIV
653600                  .BYTE  0
653700                  .WORD  -.T000402,FACT!!06
653800                  .WORD  -.T000403
653900        ;         TRY(I)=TRY(I)/FACT
654000                  LDA    I!!!!!06+1
654100                  SEC
654200                  SBC    #1
654300                  ASL    A
654400                  ASL    A
654500                  ADC    TRY!!!06
654600                  STA    .T000402
654700                  LDA    #0
654800                  ADC    TRY!!!06+1
654900                  STA    .T000402+1
655000                  LDA    I!!!!!06+1
655100                  SEC
655200                  SBC    #1
655300                  ASL    A
655400                  ASL    A
655500                  ADC    TRY!!!06
655600                  STA    .T000403
655700                  LDA    #0
655800                  ADC    TRY!!!06+1
655900                  STA    .T000403+1
656000         .NFFDIV  SET    1
656100                  JSR    .FFDIV
656200                  .BYTE  0
656300                  .WORD  -.T000402,FACT!!06
656400                  .WORD  -.T000403
656500        ;         TRZ(I)=TRZ(I)/FACT
656600                  LDA    I!!!!!06+1
656700                  SEC
656800                  SBC    #1
656900                  ASL    A
657000                  ASL    A
657100                  ADC    TRZ!!!06
657200                  STA    .T000402
657300                  LDA    #0
657400                  ADC    TRZ!!!06+1
657500                  STA    .T000402+1
657600                  LDA    I!!!!!06+1
657700                  SEC
657800                  SBC    #1
657900                  ASL    A
658000                  ASL    A
658100                  ADC    TRZ!!!06
658200                  STA    .T000403
658300                  LDA    #0
```

```
656400              ADC    IRZ!!!06+1
656500              STA    .L000403+1
656600       .FFDIV SET    1
658700              JSR    .FFDIV
658800              .BYTE  0
658900              .WORD  -.L000402,FACT!!06
659000              .WORD  -.L000403
659100    ; 200     NEXT+1.
659200       .L000402 EQU  *
659300       .FFADD  SET   1
659400              JSR    .FFADD
659500              .BYTE  0
659600              .WORD  NT!!!06,.C000403
659700              .WORD  NT!!!06
659800    ; 220     CONTINUE
659900       .L000459 EQU  *
660000              JMP    .L000455
660100       .L000456 EQU  *
660200    ;         AMP=AMPX
660300       .FLTASG SET   1
660400              JSR    .FLTASGN
660500              .BYTE  0
660600              .WORD  AMPX!!06
660700              .WORD  AMP!!06
660800    ;         NA=NA+WINDOW
660900              LDA    NA!!!06+1
661000              CLC
661100              ADC    WINDOW06+1
661200              STA    NA!!!06+1
661300              LDA    NA!!!06
661400              ADC    WINDOW06
661500              STA    NA!!!06
661600    ;         NZ=NZ+WINDOW
661700              LDA    NZ!!!06+1
661800              CLC
661900              ADC    WINDOW06+1
662000              STA    NZ!!!06+1
662100              LDA    NZ!!!06
662200              ADC    WINDOW06
662300              STA    NZ!!!06
662400    ;         NS=NS+WINDOW
662500              LDA    NS!!!06+1
662600              CLC
662700              ADC    WINDOW06+1
662800              STA    NS!!!06+1
662900              LDA    NS!!!06
663000              ADC    WINDOW06
663100              STA    NS!!!06
663200    ;         NT=NT+WINDOW
663300              LDA    NT!!!06+1
663400              CLC
663500              ADC    WINDOW06+1
663600              STA    NT!!!06+1
663700              LDA    NT!!!06
663800              ADC    WINDOW06
663900              STA    NT!!!06
664000    ; 300     CONTINUE
664100       .L000442 EQU  *
664200              JMP    .L000438
664300       .L000439 EQU  *
664400    ; C
664500    ; C TAKE CARE OF THE LAST HALF WINDOW
664600    ; C
664700    ;         NT=NT-HEWIN
664800              LDA    NT!!!06+1
664900              SEC
665000              SBC    HEWIN06+1
665100              STA    NT!!!06+1
665200              LDA    NT!!!06
665300              SBC    HEWIN06
665400              STA    NT!!!06
665500    ;         IF(AMP.LT.1.E-4)GO TO 340
```

```
665500          .MFFLT   SEI    1
665700                   JSR    .FFLT
665800                   .BYTE  0
665900                   .WORD  AMP!!!06,.C000464
666000                   ASL    A
666100                   BCS    *+5
666200                   JMP    .L000465
666300                   JMP    .L000466
666400   .L000465 EQU    *
666500   ;               DO 320 I=0S,NI
666600                   LDA    NS!!!06
666700                   STA    I!!!!!06
666800                   LDA    NS!!!06+1
666900                   STA    I!!!!!06+1
667000                   JMP    .L000469
667100   .L000467 EQU    *
667200                   LDA    I!!!!!06+1
667300                   CLC
667400                   ADC    #1
667500                   STA    I!!!!!06+1
667600                   LDA    I!!!!!06
667700                   ADC    #0
667800                   STA    I!!!!!06
667900                   LDA    NI!!!06+1
668000                   CMP    I!!!!!06+1
668100                   LDA    NI!!!06
668200                   SBC    I!!!!!06
668300                   BMI    .L000468
668400   .L000469 EQU    *
668500   ;               TRX(I)=TRX(I)/AMP
668600                   LDA    I!!!!!06+1
668700                   SEC
668800                   SBC    #1
668900                   ASL    A
669000                   ASL    A
669100                   ADC    TRX!!!06
669200                   STA    .T000402
669300                   LDA    #0
669400                   ADC    TRX!!!06+1
669500                   STA    .T000402+1
669600                   LDA    I!!!!!06+1
669700                   SEC
669800                   SBC    #1
669900                   ASL    A
670000                   ASL    A
670100                   ADC    TRX!!!06
670200                   STA    .T000403
670300                   LDA    #0
670400                   ADC    TRX!!!06+1
670500                   STA    .T000403+1
670600   .MFFDIV  SEI    1
670700                   JSR    .FFDIV
670800                   .BYTE  0
670900                   .WORD  -.T000402,AMP!!!06
671000                   .WORD  -.T000403
671100   ;               TRY(I)=TRY(I)/AMP
671200                   LDA    I!!!!!06+1
671300                   SEC
671400                   SBC    #1
671500                   ASL    A
671600                   ASL    A
671700                   ADC    TRY!!!06
671800                   STA    .T000402
671900                   LDA    #0
672000                   ADC    TRY!!!06+1
672100                   STA    .T000402+1
672200                   LDA    I!!!!!06+1
672300                   SEC
672400                   SBC    #1
672500                   ASL    A
672600                   ASL    A
672700                   ADC    TRY!!!06
```

```
672800              STA    .T000403
672900              LDA    #0
673000              ADC    TRY!!!06+1
673100              STA    .T000403+1
673200   .MFFDIV    SET    1
673300              JSR    .FFDIV
673400              .BYTE  0
673500              .WORD  -.T000402,AMP!!!06
673600              .WORD  -.T000403
673700   ;          TRZ(I)=TRZ(I)/AMP
673800              LDA    T!!!!!06+1
673900              SEC
674000              SBC    #1
674100              ASL    A
674200              ASL    A
674300              ADC    TRZ!!!06
674400              STA    .T000402
674500              LDA    #0
674600              ADC    TRZ!!!06+1
674700              STA    .T000402+1
674800              LDA    T!!!!!06+1
674900              SEC
675000              SBC    #1
675100              ASL    A
675200              ASL    A
675300              ADC    TRZ!!!06
675400              STA    .T000403
675500              LDA    #0
675600              ADC    TRZ!!!06+1
675700              STA    .T000403+1
675800   .MFFDIV    SET    1
675900              JSR    .FFDIV
676000              .BYTE  0
676100              .WORD  -.T000402,AMP!!!06
676200              .WORD  -.T000403
676300   ; 320      CONTINUE
676400   .L000471   EQU    *
676500              JMP    .L000467
676600   .L000468   EQU    *
676700   ; 340      RETURN
676800   .L000466   EQU    *
676900              JMP    .R000400
677000   ;          END

900    ;          PROGRAM PHAS3D
1000    .PGMLOC    EQU    *
1100    PHAS3D     EQU    *
1200    ; C
1300    ; C PHAS3D READS 3 COMPONENT DATA
1400    ; C                           OPTIONALLY, IT PLOTS HODOGRAPH
1500    ; C
1600    ;          REAL LEVELD,NAMED,LONAMS(100),FGY
1700    ; C        DATA LEVELD,NAMED/'PHAS3D'/
1800    ; C        DATA FGY/'FGPLOT'/
1900    ;          COMMON/SEISSI/LEVELD
2000    ;          INTEGER ICRCAT(3),MASTER(5000),IX66(2),IPH(2),IIPH(2),IAC(2),
2100    ;         1        ISUM,INDEX(5000),
2200    ;         2        JUMCAT(12)
2300    ; C        DATA     JUMCAT/20,21,22,24,25,26,28,29,30,32,33,34/
2400    ;          REAL A(5000),FGRPLT(5000),LIBECF(5000),AINDEX(5000),R(5000),
2500    ;         +  IR1(1200),IR2(1200),IR3(1200),IR4(1200),IR5(1200),
2600    ;         +  IR6(1200)
2700    ;          LOGICAL CHORU(7)
2800    ; C        DATA CHORU/7*' '/
2900    ; C
3000    ; C INITIALIZE AND CHECK NAMELIST VARIABLES.
3100    ; C
3200    ;          CALL NAMEL(NAMED,LEVELD)
3300              LDA    #LEVELD01 MOD .M
3400              STA    NAMEL.02
3500              LDA    #LEVELD01/256
3600              STA    NAMEL.02+1
```

```
3700            LDA     #NAMEL!!01 MOD .M
3800            STA     NAMEL.0
3900            LDA     #NAMEL!01/256
4000            STA     NAMEL.0+1
4100            JSR     NAMEL
4200   ;        CALL NLREAD(IDSRN,ICNCAT,NCNCAT,ICOM,IMAG,IPH,IIPH,IAC,
4300   ;        +   NWIN,STRECH,IDEBUG)
4400            LDA     #IDEBUG!01 MOD .M
4500            STA     NLREAD.1
4600            LDA     #IDEBUG!01/256
4700            STA     NLREAD.1+1
4800            LDA     #STRECH!01 MOD .M
4900            STA     NLREAD.0
5000            LDA     #STRECH!01/256
5100            STA     NLREAD.0+1
5200            LDA     #NWIN!!01 MOD .M
5300            STA     NLREAD.9
5400            LDA     #NWIN!!01/256
5500            STA     NLREAD.9+1
5600            LDA     #IAC!!!01 MOD .M
5700            STA     NLREAD.8
5800            LDA     #IAC!!!01/256
5900            STA     NLREAD.8+1
6000            LDA     #IIPH!!01 MOD .M
6100            STA     NLREAD.7
6200            LDA     #IIPH!!01/256
6300            STA     NLREAD.7+1
6400            LDA     #IPH!!!01 MOD .M
6500            STA     NLREAD.6
6600            LDA     #IPH!!!01/256
6700            STA     NLREAD.6+1
6800            LDA     #IMAG!!01 MOD .M
6900            STA     NLREAD.5
7000            LDA     #IMAG!!01/256
7100            STA     NLREAD.5+1
7200            LDA     #ICOM!!01 MOD .M
7300            STA     NLREAD.4
7400            LDA     #ICOM!!01/256
7500            STA     NLREAD.4+1
7600            LDA     #NCNCA!01 MOD .M
7700            STA     NLREAD.3
7800            LDA     #NCNCA!01/256
7900            STA     NLREAD.3+1
8000            LDA     #ICNCA!01 MOD .M
8100            STA     NLREAD.2
8200            LDA     #ICNCA!01/256
8300            STA     NLREAD.2+1
8400            LDA     #IDSRN!01 MOD .M
8500            STA     NLREAD.1
8600            LDA     #IDSRN!01/256
8700            STA     NLREAD.1+1
8800            JSR     NLREAD
8900   ; C
9000   ; C OPEN DIRACC INPUT FILE
9100   ; C
9200   ;        NTRACS=0
9300            LDA     #0
9400            STA     NTRACS01
9500            LDA     #0
9600            STA     NTRACS01+1
9700   ;        NWORDS=1
9800            LDA     #0
9900            STA     NWORDS01
10000           LDA     #1
10100           STA     NWORDS01+1
10200  ;        CALL AGLINE(IDSRN,NUMREC,NWORDS,1,0,NCNCAT,ICNCAT,NTRACS)
10300           LDA     #NTRACS01 MOD .M
10400           STA     AGLINE.8
10500           LDA     #NTRACS01/256
10600           STA     AGLINE.8+1
10700           LDA     #ICNCA!01 MOD .M
10800           STA     AGLINE.7
```

```
10900            LDA    #ICNCAT01/256
11000            STA    AGLINE.7+1
11100            LDA    #NCNCAT01 MOD .M
11200            STA    AGLINE.6
11300            LDA    #NCNCAT01/256
11400            STA    AGLINE.6+1
11500            LDA    #.C000002 MOD .M
11600            STA    AGLINE.5
11700            LDA    #.C000002/256
11800            STA    AGLINE.5+1
11900            LDA    #.C000003 MOD .M
12000            STA    AGLINE.4
12100            LDA    #.C000003/256
12200            STA    AGLINE.4+1
12300            LDA    #NWORDS01 MOD .M
12400            STA    AGLINE.3
12500            LDA    #NWORDS01/256
12600            STA    AGLINE.3+1
12700            LDA    #NUMREC01 MOD .M
12800            STA    AGLINE.2
12900            LDA    #NUMREC01/256
13000            STA    AGLINE.2+1
13100            LDA    #IDSRN101 MOD .M
13200            STA    AGLINE.1
13300            LDA    #IDSRN101/256
13400            STA    AGLINE.1+1
13500            JSR    AGLINE
13600      ; C
13700      ; C  OPEN INPUT FILES
13800      ; C
13900      ;         N3=N1RACS/3
14000      .M1DIV   SET    1
14100            JSR    .IDIV
14200            .BYTE  5
14300            .WORD  NTRACS01,.C000004
14400            .WORD  NTROUT01
14500      ;         N3=NTROUT*3
14600      .M1MUL   SET    1
14700            JSR    .IMUL
14800            .BYTE  5
14900            .WORD  NTROUT01,.C000004
15000            .WORD  N3:::101
15100      ;         IF(N3=NTRACS)GO TO 20
15200            LDA    N3:::101+1
15300            CMP    NTRACS01+1
15400            BNE    .L000008
15500            LDA    N3:::101
15600            CMP    NTRACS01
15700            BNE    .L000008
15800            JMP    .L000010
15900      .L000008 EQU    *
16000      ; C          WRITE(6,10)NTRACS
16100      ; C10         FORMAT(' *** NTRACS =',I10,' NOT AN INTEGRAL MULTIPLE OF 3 ***
16200      ;          CALL ABORT(16)
16300            LDA    #.C000011 MOD .M
16400            STA    ABORT.01
16500            LDA    #.C000011/256
16600            STA    ABORT.01+1
16700            JSR    ABORT
16800      ; 20       IF((IMAG(1)=1).OR.(IMAG(2)=1))
16900      .L000010 EQU    *
17000            LDA    #2
17100            ASL    A
17200            TAX
17300            LDA    IMAG!101-1,X
17400            CMP    #1
17500            BNE    .L000013
17600            LDA    IMAG!101-2,X
17700            CMP    #0
17800            BNE    .L000013
17900      .L000010 LDA    #60H
18000            BNE    *+4
```

```
18100        .L000015 LDA   #0
18200                 STA   .L000006
18300                 LDA   #1
18400                 ASL   A
18500                 TAX
18600                 LDA   IMAG!!01-1,X
18700                 CMP   #1
18800                 BNE   .L000015
18900                 LDA   IMAG!!01-2,X
19000                 CMP   #0
19100                 BGE   .L000015
19200        .L000016 LDA   #$0H
19300                 BNE   *+4
19400        .L000018 LDA   #0
19500        ;        *CALL AGLINE(19,NUMREC,NWORDS,0,0,3,JCNCAT(1),NTROUT)
19600                 ORA   .L000006
19700                 ASL   A
19800                 BCS   *+5
19900                 JMP   .L000017
20000                 LDA   #NTROUT01 MOD .M
20100                 STA   AGLINE.8
20200                 LDA   #NTROUT01/256
20300                 STA   AGLINE.8+1
20400                 LDA   #1
20500                 ASL   A
20600                 CLC
20700                 ADC   #(JCNCAT01-2) MOD .M
20800                 STA   AGLINE.7
20900                 LDA   #0
21000                 ADC   #(JCNCAT01-2)/256
21100                 STA   AGLINE.7+1
21200                 LDA   #.C000004 MOD .M
21300                 STA   AGLINE.6
21400                 LDA   #.C000004/256
21500                 STA   AGLINE.6+1
21600                 LDA   #.C000002 MOD .M
21700                 STA   AGLINE.5
21800                 LDA   #.C000002/256
21900                 STA   AGLINE.5+1
22000                 LDA   #.C000002 MOD .M
22100                 STA   AGLINE.4
22200                 LDA   #.C000002/256
22300                 STA   AGLINE.4+1
22400                 LDA   #NWORDS01 MOD .M
22500                 STA   AGLINE.3
22600                 LDA   #NWORDS01/256
22700                 STA   AGLINE.3+1
22800                 LDA   #NUMREC01 MOD .M
22900                 STA   AGLINE.2
23000                 LDA   #NUMREC01/256
23100                 STA   AGLINE.2+1
23200                 LDA   #.C000018 MOD .M
23300                 STA   AGLINE.1
23400                 LDA   #.C000018/256
23500                 STA   AGLINE.1+1
23600                 JSR   AGLINE
23700        .L000017 EQU   *
23800        ;        IF((IPH(1)=1).OR.(IPH(2)=1))
23900                 LDA   #2
24000                 ASL   A
24100                 TAX
24200                 LDA   IPH!!01-1,X
24300                 CMP   #1
24400                 BNE   .L000019
24500                 LDA   IPH!!01-2,X
24600                 CMP   #0
24700                 BNE   .L000019
24800        .L000020 LDA   #$0H
24900                 BNE   *+4
25000        .L000019 LDA   #0
25100                 STA   .L000005
```

```
25500          ASL    A
25600          TAX
25500          LDA    IIPH1101-1,X
25700          CMP    #1
25700          BNE    .L000021
25800          LDA    IIPH1101-2,X
25900          CMP    #0
26000          BNE    .L000021
26100  .L000022 LDA   #80H
26200          BNE    *+4
26300  .L000021 LDA   #0
26400  ;       CALL AGLINE(23,NUMREC,NWURDS,0,0,3,JCNCAT(0),NTROUT)
26500          ORA    .T000006
26600          ASL    A
26700          BCS    *+5
26800          JMP    .L000023
26900          LDA    #.TROUT01 MOD .M
27000          STA    AGLINE.8
27100          LDA    #.TROUT01/256
27200          STA    AGLINE.8+1
27300          LDA    #4
27400          ASL    A
27500          CLC
27600          ADC    #(JCNCAT01-2) MOD .M
27700          STA    AGLINE.7
27800          LDA    #0
27900          ADC    #(JCNCAT01-2)/256
28000          STA    AGLINE.7+1
28100          LDA    #.C000004 MOD .M
28200          STA    AGLINE.6
28300          LDA    #.C000004/256
28400          STA    AGLINE.6+1
28500          LDA    #.C000002 MOD .M
28600          STA    AGLINE.5
28700          LDA    #.C000002/256
28800          STA    AGLINE.5+1
28900          LDA    #.C000002 MOD .M
29000          STA    AGLINE.4
29100          LDA    #.C000002/256
29200          STA    AGLINE.4+1
29300          LDA    #NWURDS01 MOD .M
29400          STA    AGLINE.3
29500          LDA    #NWURDS01/256
29600          STA    AGLINE.3+1
29700          LDA    #NUMREC01 MOD .M
29800          STA    AGLINE.2
29900          LDA    #NUMREC01/256
30000          STA    AGLINE.2+1
30100          LDA    #.C000024 MOD .M
30200          STA    AGLINE.1
30300          LDA    #.C000024/256
30400          STA    AGLINE.1+1
30500          JSR    AGLINE
30600  .L000023 EQU   *
30700  ;       IF((LIPH(1)=1).OR.(LIPH(2)=1))
30800          LDA    #2
30900          ASL    A
31000          TAX
31100          LDA    IIPH1101-1,X
31200          CMP    #1
31300          BNE    .L000026
31400          LDA    IIPH1101-2,X
31500          CMP    #0
31600          BNE    .L000026
31700  .L000027 LDA   #80H
31800          BNE    *+4
31900  .L000026 LDA   #0
32000          STA    .T000006
32100          LDA    #1
32200          ASL    A
32300          TAX
32400          LDA    IIPH1101-1,X
```

```
32500            CMP      #1
32600            BNE      .L000028
32700            LDA      IIPM!!01-2,X
32800            CMP      #0
32900            BNE      .L000028
33000  .L000029  LDA      #80H
33100            BNE      *+4
33200  .L000028  LDA      #0
33300       ;    +CALL AGLINE(27,NUMREC,NWORDS,0,0,3,JCNCAT(7),NTROUT)
33400            ORA      .L000006
33500            ASL      A
33600            BCS      *+5
33700            JMP      .L000050
33800            LDA      #NTROUT01 MOD .M
33900            STA      AGLINE.8
34000            LDA      #NTROUT01/256
34100            STA      AGLINE.8+1
34200            LDA      #7
34300            ASL      A
34400            CLC
34500            ADC      #(JCNCAT01-2) MOD .M
34600            STA      AGLINE.7
34700            LDA      #0
34800            ADC      #(JCNCAT01-2)/256
34900            STA      AGLINE.7+1
35000            LDA      #.C000004 MOD .M
35100            STA      AGLINE.6
35200            LDA      #.C000004/256
35300            STA      AGLINE.6+1
35400            LDA      #.C000002 MOD .M
35500            STA      AGLINE.5
35600            LDA      #.C000002/256
35700            STA      AGLINE.5+1
35800            LDA      #.C000002 MOD .M
35900            STA      AGLINE.4
36000            LDA      #.C000002/256
36100            STA      AGLINE.4+1
36200            LDA      #NWORDS01 MOD .M
36300            STA      AGLINE.3
36400            LDA      #NWORDS01/256
36500            STA      AGLINE.3+1
36600            LDA      #NUMREC01 MOD .M
36700            STA      AGLINE.2
36800            LDA      #NUMREC01/256
36900            STA      AGLINE.2+1
37000            LDA      #.C000031 MOD .M
37100            STA      AGLINE.1
37200            LDA      #.C000031/256
37300            STA      AGLINE.1+1
37400            JSR      AGLINE
37500  .L000030  EQU      *
37600       ;    IF((IAC(1)=1).OR.(IAC(2)=1))
37700            LDA      #2
37800            ASL      A
37900            TAX
38000            LDA      IAC!!01-1,X
38100            CMP      #1
38200            BNE      .L000033
38300            LDA      IAC!!01-2,X
38400            CMP      #0
38500            BNE      .L000033
38600  .L000034  LDA      #80H
38700            BNE      *+4
38800  .L000033  LDA      #0
38900            STA      .L000006
39000            LDA      #1
39100            ASL      A
39200            TAX
39300            LDA      IAC!!01-1,X
39400            CMP      #1
39500            BNE      .L000035
39600            LDA      IAC!!01-2,X
```

```
34700              CMP    #0
39800              BNE    .L000035
39900   .L000036   LDA    #80H
40000              BNE    *+4
40100   .L000035   LDA    #0
40200   ;          *CALL AGLINE(31,NUMREC,NWORDS,0,0,3,JCNCAT(10),NTROUT)
40300              ORA    .L000006
40400              ASL    A
40500              BCS    *+5
40600              JMP    .L000037
40700              LDA    #NTROUT01 MOD .M
40800              STA    AGLINE.8
40900              LDA    #NTROUT01/256
41000              STA    AGLINE.8+1
41100              LDA    #10
41200              ASL    A
41300              CLC
41400              ADC    #(JCNCAT01-2) MOD .M
41500              STA    AGLINE.7
41600              LDA    #0
41700              ADC    #(JCNCAT01-2)/256
41800              STA    AGLINE.7+1
41900              LDA    #.C000004 MOD .M
42000              STA    AGLINE.6
42100              LDA    #.C000004/256
42200              STA    AGLINE.6+1
42300              LDA    #.C000002 MOD .M
42400              STA    AGLINE.5
42500              LDA    #.C000002/256
42600              STA    AGLINE.5+1
42700              LDA    #.C000002 MOD .M
42800              STA    AGLINE.4
42900              LDA    #.C000002/256
43000              STA    AGLINE.4+1
43100              LDA    #NWORDS01 MOD .M
43200              STA    AGLINE.3
43300              LDA    #NWORDS01/256
43400              STA    AGLINE.3+1
43500              LDA    #NUMREC01 MOD .M
43600              STA    AGLINE.2
43700              LDA    #NUMREC01/256
43800              STA    AGLINE.2+1
43900              LDA    #.C000038 MOD .M
44000              STA    AGLINE.1
44100              LDA    #.C000038/256
44200              STA    AGLINE.1+1
44300              JSR    AGLINE
44400   .L000037   EQU    *
44500   ; C
44600   ; C CREAD IN THE MASTER FILE AND UPDATE.
44700   ; C
44800   ;          CALL AGMHIN(IDSRN,MASTER,NHMH)
44900              LDA    #NHMH!!01 MOD .M
45000              STA    AGMHIN.3
45100              LDA    #NHMH!!01/256
45200              STA    AGMHIN.3+1
45300              LDA    #MASTER01 MOD .M
45400              STA    AGMHIN.2
45500              LDA    #MASTER01/256
45600              STA    AGMHIN.2+1
45700              LDA    #IDSRN!01 MOD .M
45800              STA    AGMHIN.1
45900              LDA    #IDSRN!01/256
46000              STA    AGMHIN.1+1
46100              JSR    AGMHIN
46200   ;          CALL HINSRI('INDEXL',MASTER,NTROUT,1,NHMH)
46300              LDA    #NHMH!!01 MOD .M
46400              STA    HINSRI.5
46500              LDA    #NHMH!!01/256
46600              STA    HINSRI.5+1
46700              LDA    #.C000003 MOD .M
46800              STA    HINSRI.4
```

```
46900            LDA     #.C000003/256
47000            STA     HINSRT.4+1
47100            LDA     #NTROUT01 MOD .M
47200            STA     HINSRT.3
47300            LDA     #NTROUT01/256
47400            STA     HINSRT.3+1
47500            LDA     #MASTER01 MOD .M
47600            STA     HINSRT.2
47700            LDA     #MASTER01/256
47800            STA     HINSRT.2+1
47900            LDA     #.C000040 MOD .M
48000            STA     HINSRT.1
48100            LDA     #.C000040/256
48200            STA     HINSRT.1+1
48300            JSR     HINSRT
48400    ;       IF((IMAG(1)=1).OR.(IMAG(2)=1))CALL AGMHEX(19,MASTER,NHMH)
48500            LDA     #2
48600            ASL     A
48700            TAX
48800            LDA     IMAG!!01-1,X
48900            CMP     #1
49000            BNE     .L000041
49100            LDA     IMAG!!01-2,X
49200            CMP     #0
49300            BNE     .L000041
49400    .L000042 LDA    #80H
49500            BNE     *+4
49600    .L000041 LDA    #0
49700            STA     ..I000006
49800            LDA     #1
49900            ASL     A
50000            TAX
50100            LDA     IMAG!!01-1,X
50200            CMP     #1
50300            BNE     .L000043
50400            LDA     IMAG!!01-2,X
50500            CMP     #0
50600            BNE     .L000043
50700    .L000044 LDA    #80H
50800            BNE     *+4
50900    .L000043 LDA    #0
51000            ORA     .I000006
51100            ASL     A
51200            BCS     *+5
51300            JMP     .L000045
51400            LDA     #NHMH!!01 MOD .M
51500            STA     AGMHEX.3
51600            LDA     #NHMH!!01/256
51700            STA     AGMHEX.3+1
51800            LDA     #MASTER01 MOD .M
51900            STA     AGMHEX.2
52000            LDA     #MASTER01/256
52100            STA     AGMHEX.2+1
52200            LDA     #.C000018 MOD .M
52300            STA     AGMHEX.1
52400            LDA     #.C000018/256
52500            STA     AGMHEX.1+1
52600            JSR     AGMHEX
52700    .L000045 EQU    *
52800    ;       IF((IPH (1)=1).OR.(IPH (2)=1))CALL AGMHEX(23,MASTER,NHMH)
52900            LDA     #2
53000            ASL     A
53100            TAX
53200            LDA     IPH!!01-1,X
53300            CMP     #1
53400            BNE     .L000046
53500            LDA     IPH!!01-2,X
53600            CMP     #0
53700            BNE     .L000046
53800    .L000047 LDA    #80H
53900            BNE     *+4
54000    .L000046 LDA    #0
```

```
54100            STA     .1000006
54200            LDA     #1
54300            ASL     A
54400            TAX
54500            LDA     IIPH!!01-1,X
54600            CMP     #1
54700            BNE     .L000048
54800            LDA     IPH!!01-2,X
54900            CMP     #0
55000            BNE     .L000048
55100   .L000049 LDA     #80H
55200            BNE     *+4
55300   .L000048 LDA     #0
55400            ORA     .1000006
55500            ASL     A
55600            BCS     *+5
55700            JMP     .L000050
55800            LDA     #NHMH!!01 MOD .M
55900            STA     AGMHEX.3
56000            LDA     #NHMH!!01/256
56100            STA     AGMHEX.3+1
56200            LDA     #MASTER01 MOD .M
56300            STA     AGMHEX.2
56400            LDA     #MASTER01/256
56500            STA     AGMHEX.2+1
56600            LDA     #.C000024 MOD .M
56700            STA     AGMHEX.1
56800            LDA     #.C000024/256
56900            STA     AGMHEX.1+1
57000            JSR     AGMHEX
57100   .L000050 EQU     *
57200   ;        IF((IIPH(1)=1).OR.(IIPH(2)=1))CALL AGMHEX(27,MASTER,NHMH)
57300            LDA     #2
57400            ASL     A
57500            TAX
57600            LDA     IIPH!!01-1,X
57700            CMP     #1
57800            BNE     .L000051
57900            LDA     IIPH!!01-2,X
58000            CMP     #0
58100            BNE     .L000051
58200   .L000052 LDA     #80H
58300            BNE     *+4
58400   .L000051 LDA     #0
58500            STA     .1000006
58600            LDA     #1
58700            ASL     A
58800            TAX
58900            LDA     IIPH!!01-1,X
59000            CMP     #1
59100            BNE     .L000053
59200            LDA     IIPH!!01-2,X
59300            CMP     #0
59400            BNE     .L000053
59500   .L000054 LDA     #80H
59600            BNE     *+4
59700   .L000053 LDA     #0
59800            ORA     .1000006
59900            ASL     A
60000            BCS     *+5
60100            JMP     .L000055
60200            LDA     #NHMH!!01 MOD .M
60300            STA     AGMHEX.3
60400            LDA     #NHMH!!01/256
60500            STA     AGMHEX.3+1
60600            LDA     #MASTER01 MOD .M
60700            STA     AGMHEX.2
60800            LDA     #MASTER01/256
60900            STA     AGMHEX.2+1
61000            LDA     #.C000031 MOD .M
61100            STA     AGMHEX.1
61200            LDA     #.C000031/256
```

```
61300              STA     AGMHEX.1+1
61400              JSR     .GMHEX
61500    .L000055 EQU     *
61600    ;         IF((IAC(1)=1).OR.(IAC(2)=1))CALL AGMHEX(31,MASTER,NHMH)
61700              LDA     #2
61800              ASL     A
61900              TAX
62000              LDA     IAC!!!01-1,X
62100              CMP     #1
62200              BNE     .L000056
62300              LDA     IAC!!!01-2,X
62400              CMP     #0
62500              BNE     .L000056
62600    .L000057 LDA     #80H
62700              BNE     *+4
62800    .L000056 LDA     #0
62900              STA     .I000006
63000              LDA     #1
63100              ASL     A
63200              TAX
63300              LDA     IAC!!!01-1,X
63400              CMP     #1
63500              BNE     .L000058
63600              LDA     IAC!!!01-2,X
63700              CMP     #0
63800              BNE     .L000058
63900    .L000059 LDA     #80H
64000              BNE     *+4
64100    .L000058 LDA     #0
64200              ORA     .I000006
64300              ASL     A
64400              BCS     *+5
64500              JMP     .L000060
64600              LDA     #NHMH!!01 MOD .M
64700              STA     AGMHEX.3
64800              LDA     #NHMH!!01/256
64900              STA     AGMHEX.3+1
65000              LDA     #MASTER!01 MOD .M
65100              STA     AGMHEX.2
65200              LDA     #MASTER!01/256
65300              STA     AGMHEX.2+1
65400              LDA     #.C000058 MOD .M
65500              STA     AGMHEX.1
65600              LDA     #.C000058/256
65700              STA     AGMHEX.1+1
65800              JSR     AGMHEX
65900    .L000060 EQU     *
66000    ; C
66100    ; C SETUP INDEX ARRAY AND SORT
66200    ; C
66300    ;         CALL GETLU(IDSRN,FGY,FGRPCY,NLU1,0)
66400              LDA     #.C000002 MOD .M
66500              STA     GETLU.05
66600              LDA     #.C000002/256
66700              STA     GETLU.05+1
66800              LDA     #NLU1!!01 MOD .M
66900              STA     GETLU.04
67000              LDA     #NLU1!!01/256
67100              STA     GETLU.04+1
67200              LDA     #FGRPCY01 MOD .M
67300              STA     GETLU.03
67400              LDA     #FGRPCY01/256
67500              STA     GETLU.03+1
67600              LDA     #FGY!!!01 MOD .M
67700              STA     GETLU.02
67800              LDA     #FGY!!!01/256
67900              STA     GETLU.02+1
68000              LDA     #IDSRN!01 MOD .M
68100              STA     GETLU.01
68200              LDA     #IDSRN!01/256
68300              STA     GETLU.01+1
68400              JSR     GETLU
```

```
66500        ;          DO 40 I=1,NIRACS
66600                   LDA      #0
66700                   STA      I!!!!!01
66800                   LDA      #1
66900                   STA      I!!!!!01+1
69000                   JMP      .L000065
69100   .L000061 EQU    *
69200                   LDA      I!!!!!01+1
69300                   CLC
69400                   ADC      #1
69500                   STA      I!!!!!01+1
69600                   LDA      I!!!!!01
69700                   ADC      #0
69800                   STA      I!!!!!01
69900                   LDA      NIRACS01+1
70000                   CMP      I!!!!!01+1
70100                   LDA      NIRACS01
70200                   SBC      I!!!!!01
70300                   BMI      .L000062
70400   .L000063 EQU    *
70500        ;          INDEX(I)=I
70600                   LDA      I!!!!!01+1
70700                   ASL      A
70800                   STA      .T000005
70900                   LDA      I!!!!!01
71000                   LDX      .T000005
71100                   STA      INDEX!01-2,X
71200                   LDA      I!!!!!01+1
71300                   STA      INDEX!01-1,X
71400        ;          AINDEX(I)=FLOAT(I)
71500                   LDA      I!!!!!01+1
71600                   ASL      A
71700                   ASL      A
71800                   CLC
71900                   ADC      #(AINDEX01-4) MOD M
72000                   STA      .T000006
72100                   LDA      #0
72200                   ADC      #(AINDEX01-4)/256
72300                   STA      .T000006+1
72400   .MFFLOAT SET    1
72500                   JSR      .FFLOAT
72600                   .BYTE    1
72700                   .WORD    I!!!!!01
72800                   .WORD    -.T000006
72900        ;          A(I)=FGRPCY(I)
73000                   LDA      I!!!!!01+1
73100                   ASL      A
73200                   ASL      A
73300                   CLC
73400                   ADC      #(FGRPCY01-4) MOD M
73500                   STA      .T000005
73600                   LDA      #0
73700                   ADC      #(FGRPCY01-4)/256
73800                   STA      .T000005+1
73900                   LDA      I!!!!!01+1
74000                   ASL      A
74100                   ASL      A
74200                   CLC
74300                   ADC      #(A!!!!!01-4) MOD M
74400                   STA      .T000006
74500                   LDA      #0
74600                   ADC      #(A!!!!!01-4)/256
74700                   STA      .T000006+1
74800   .MFLTASG SET    1
74900                   JSR      .FLTASGN
75000                   .BYTE    0
75100                   .WORD    -.T000005
75200                   .WORD    -.T000006
75300        ;   40     CONTINUE
75400   .L000065 EQU    *
75500                   JMP      .L000061
75600   .L000062 EQU    *
```

```
75700        ; C
75800        ;          IF(IDEBUG.LE.0)GO TO 70
75900                 LDA    #0
76000                 CMP    IDEBUG01+1
76100                 LDA    #0
76200                 SBC    IDEBUG01
76300                 BMI    .L000067
76400                 JMP    .L000069
76500     .L000067 EQU   *
76600        ; C       WRITE(6,50)(A(I),I=1,NTRACS)
76700        ; C50     FORMAT('   INPUT ARRAY'/(1X,10G12.5))
76800        ; C       WRITE(6,60)(INDEX(I),I=1,NTRACS)
76900        ; C60     FORMAT('   INPUT INDEX'/(1X,10I12))
77000        ; 70      CALL SORTLX(A,AINDEX,W,INDEX,NTRACS)
77100     .L000069 EQU   *
77200                 LDA    #NTRACS01 MOD .M
77300                 STA    SORTLX.5
77400                 LDA    #NTRACS01/256
77500                 STA    SORTLX.5+1
77600                 LDA    #INDEX101 MOD .M
77700                 STA    SORTLX.4
77800                 LDA    #INDEX101/256
77900                 STA    SORTLX.4+1
78000                 LDA    #W!!!!01 MOD .M
78100                 STA    SORTLX.3
78200                 LDA    #W!!!!01/256
78300                 STA    SORTLX.3+1
78400                 LDA    #AINDEX01 MOD .M
78500                 STA    SORTLX.2
78600                 LDA    #AINDEX01/256
78700                 STA    SORTLX.2+1
78800                 LDA    #A!!!!01 MOD .M
78900                 STA    SORTLX.1
79000                 LDA    #A!!!!01/256
79100                 STA    SORTLX.1+1
79200                 JSR    SORTLX
79300        ;          IF(IDEBUG.LE.0)GO TO 100
79400                 LDA    #0
79500                 CMP    IDEBUG01+1
79600                 LDA    #0
79700                 SBC    IDEBUG01
79800                 BMI    .L000070
79900                 JMP    .L000072
80000     .L000070 EQU   *
80100        ; C       WRITE(6,80)(A(I),I=1,NTRACS)
80200        ; C80     FORMAT('   OUTPUT ARRAY'/(1X,10G12.5))
80300        ; C       WRITE(6,90)(INDEX(I),I=1,NTRACS)
80400        ; C90     FORMAT('   OUTPUT INDEX'/(1X,10I12))
80500        ; C
80600        ; C SORT OTHER LU'S AND OUTPUT AS NECESSARY.
80700        ; C
80800        ; 100     CALL AGLUS(IOSRN,LUNAMS,NLU)
80900     .L000072 EQU   *
81000                 LDA    #NLU!!!01 MOD .M
81100                 STA    AGLUS.03
81200                 LDA    #NLU!!!01/256
81300                 STA    AGLUS.03+1
81400                 LDA    #LUNAMS01 MOD .M
81500                 STA    AGLUS.02
81600                 LDA    #LUNAMS01/256
81700                 STA    AGLUS.02+1
81800                 LDA    #IOSRN101 MOD .M
81900                 STA    AGLUS.01
82000                 LDA    #IOSRN101/256
82100                 STA    AGLUS.01+1
82200                 JSR    AGLUS
82300        ;          DO 220 I=1,NLU
82400                 LDA    #0
82500                 STA    I!!!!01
82600                 LDA    #1
82700                 STA    I!!!!01+1
82800                 JMP    .L000075
```

```
82900          .L000073 EQU    *
83000                   LDA    I!!!!!01+1
83100                   CLC
83200                   ADC    #1
83300                   STA    I!!!!!01+1
83400                   LDA    I!!!!!01
83500                   ADC    #0
83600                   STA    I!!!!!01
83700                   LDA    NLU!!!01+1
83800                   CMP    I!!!!!01+1
83900                   LDA    NLU!!!01
84000                   SBC    I!!!!!01
84100                   BMI    .L000074
84200          .L000075 EQU    *
84300          ;              CALL GETLU(IUSRN,LUNAMS(I),LINELU,NLU1,0)
84400                   LDA    #.C000002 MOD .M
84500                   STA    GETLU.05
84600                   LDA    #.C000002/256
84700                   STA    GETLU.05+1
84800                   LDA    #NLU1!!01 MOD .M
84900                   STA    GETLU.04
85000                   LDA    #NLU1!!01/256
85100                   STA    GETLU.04+1
85200                   LDA    #LINELU01 MOD .M
85300                   STA    GETLU.03
85400                   LDA    #LINELU01/256
85500                   STA    GETLU.03+1
85600                   LDA    I!!!!!01+1
85700                   ASL    A
85800                   ASL    A
85900                   CLC
86000                   ADC    #(LUNAMS01-4) MOD .M
86100                   STA    GETLU.02
86200                   LDA    #0
86300                   ADC    #(LUNAMS01-4)/256
86400                   STA    GETLU.02+1
86500                   LDA    #IUSRN!01 MOD .M
86600                   STA    GETLU.01
86700                   LDA    #IUSRN!01/256
86800                   STA    GETLU.01+1
86900                   JSR    GETLU
87000          ;              DO 160 J=1,NTROUT
87100                   LDA    #0
87200                   STA    J!!!!!01
87300                   LDA    #1
87400                   STA    J!!!!!01+1
87500                   JMP    .L000080
87600          .L000078 EQU    *
87700                   LDA    J!!!!!01+1
87800                   CLC
87900                   ADC    #1
88000                   STA    J!!!!!01+1
88100                   LDA    J!!!!!01
88200                   ADC    #0
88300                   STA    J!!!!!01
88400                   LDA    NTROUT01+1
88500                   CMP    J!!!!!01+1
88600                   LDA    NTROUT01
88700                   SBC    J!!!!!01
88800                   BMI    .L000074
88900          .L000080 EQU    *
89000          ;              A(J)=LINELU(INDEX(J))
89100                   LDA    J!!!!!01+1
89200                   ASL    A
89300                   TAX
89400                   LDA    INDEX!01-1,X
89500                   STA    .L000005
89600                   LDA    .L000005
89700                   ASL    A
89800                   ASL    A
89900                   CLC
90000                   ADC    #(LINELU01-4) MOD .M
```

```
90100           STA     .T000006
90200           LDA     #0
90300           ADC     #(LINELU01-4)/256
90400           STA     .T000006+1
90500           LDA     J!!!!!01+1
90600           ASL     A
90700           ASL     A
90800           CLC
90900           ADC     #(A!!!!!01-4) MOD .M
91000           STA     .T000005
91100           LDA     #0
91200           ADC     #(A!!!!!01-4)/256
91300           STA     .T000005+1
91400   .FLTASG SET     1
91500           JSR     .FLTASGN
91600           .BYTE 0
91700           .WORD -.T000006
91800           .WORD -.T000005
91900   .; 180  CONTINUE
92000   .L000082 EQU    *
92100           JMP     .L000078
92200   .L000079 EQU    *
92300   .; C
92400   .; 200  IF((IMAG(,1)=1).OR.(IMAG(2)=1))CALL PUTLU(19,LUNAMS(I),A,NTROUT)
92500   .L000083 EQU    *
92600           LDA     #2
92700           ASL     A
92800           TAX
92900           LDA     IMAG!!01-1,X
93000           CMP     #1
93100           BNE     .L000084
93200           LDA     IMAG!!01-2,X
93300           CMP     #0
93400           BNE     .L000084
93500   .L000085 LDA    #80H
93600           BNE     *+4
93700   .L000084 LDA    #0
93800           STA     .T000006
93900           LDA     #1
94000           ASL     A
94100           TAX
94200           LDA     IMAG!!01-1,X
94300           CMP     #1
94400           BNE     .L000086
94500           LDA     IMAG!!01-2,X
94600           CMP     #0
94700           BNE     .L000086
94800   .L000087 LDA    #80H
94900           BNE     *+4
95000   .L000086 LDA    #0
95100           ORA     .T000006
95200           ASL     A
95300           BCS     *+5
95400           JMP     .L000088
95500           LDA     #NTROUT01 MOD .M
95600           STA     PUTLU.04
95700           LDA     #NTROUT01/256
95800           STA     PUTLU.04+1
95900           LDA     #A!!!!!01 MOD .M
96000           STA     PUTLU.03
96100           LDA     #A!!!!!01/256
96200           STA     PUTLU.03+1
96300           LDA     I!!!!!01+1
96400           ASL     A
96500           ASL     A
96600           CLC
96700           ADC     #(LUNAMS01-4) MOD .M
96800           STA     PUTLU.02
96900           LDA     #0
97000           ADC     #(LUNAMS01-4)/256
97100           STA     PUTLU.02+1
97200           LDA     #.L000018 MOD .M
```

```
97300           STA     PUTLU.01
97400           LDA     #.C000018/256
97500           STA     PUTLU.01+1
97600           JSR     PUTLU
97700  .L000088 EQU     *
97800  ;            IF((IPH.(1)=1).OR.(IPH.(2)=1))CALL PUTLU(23,LUNAMS(1),A,NTROUT)
97900           LDA     #2
98000           ASL     A
98100           TAX
98200           LDA     IPH!!!01-1,X
98300           CMP     #1
98400           BNE     .L000089
98500           LDA     IPH!!!01-2,X
98600           CMP     #0
98700           BNE     .L000089
98800  .L000090 LDA     #80H
98900           BNE     *+4
99000  .L000089 LDA     #0
99100           STA     .L000006
99200           LDA     #1
99300           ASL     A
99400           TAX
99500           LDA     IPH!!!01-1,X
99600           CMP     #1
99700           BNE     .L000091
99800           LDA     IPH!!!01-2,X
99900           CMP     #0
00000           BNE     .L000091
00100  .L000092 LDA     #80H
00200           BNE     *+4
00300  .L000091 LDA     #0
00400           ORA     .L000006
00500           ASL     A
00600           BCS     *+5
00700           JMP     .L000093
00800           LDA     #NTROUT01 MOD .M
00900           STA     PUTLU.04
01000           LDA     #NTROUT01/256
01100           STA     PUTLU.04+1
01200           LDA     #A!!!!!01 MOD .M
01300           STA     PUTLU.03
01400           LDA     #A!!!!!01/256
01500           STA     PUTLU.03+1
01600           LDA     I!!!!!01+1
01700           ASL     A
01800           ASL     A
01900           CLC
02000           ADC     #(LUNAMS01-4) MOD .M
02100           STA     PUTLU.02
02200           LDA     #0
02300           ADC     #(LUNAMS01-4)/256
02400           STA     PUTLU.02+1
02500           LDA     #.C000024 MOD .M
02600           STA     PUTLU.01
02700           LDA     #.C000024/256
02800           STA     PUTLU.01+1
02900           JSR     PUTLU
03000  .L000093 EQU     *
03100  ;            IF((I1PH(1)=1).OR.(I1PH(2)=1))CALL PUTLU(27,LUNAMS(1),A,NTROUT)
03200           LDA     #2
03300           ASL     A
03400           TAX
03500           LDA     I1PH!!01-1,X
03600           CMP     #1
03700           BNE     .L000094
03800           LDA     I1PH!!01-2,X
03900           CMP     #0
04000           BNE     .L000094
04100  .L000095 LDA     #80H
04200           BNE     *+4
04300  .L000094 LDA     #0
04400           STA     .L000006
```

```
104500              LDA     #1
104600              ASL     A
104700              TAX
104800              LDA     IIPH!!01-1,X
104900              CMP     #1
105000              BNE     .L000096
105100              LDA     IIPH!!01-2,X
105200              CMP     #0
105300              BNE     .L000096
105400   .L000097   LDA     #80H
105500              BNE     *+4
105600   .L000096   LDA     #0
105700              ORA     .T000006
105800              ASL     A
105900              BCS     *+5
106000              JMP     .L000098
106100              LDA     #NTROUT01 MOD .M
106200              STA     PUTLU.04
106300              LDA     #NTROUT01/256
106400              STA     PUTLU.04+1
106500              LDA     #A!!!!!01 MOD .M
106600              STA     PUTLU.03
106700              LDA     #A!!!!!01/256
106800              STA     PUTLU.03+1
106900              LDA     I!!!!!01+1
107000              ASL     A
107100              ASL     A
107200              CLC
107300              ADC     #(LUNAMS01-4) MOD .M
107400              STA     PUTLU.02
107500              LDA     #0
107600              ADC     #(LUNAMS01-4)/256
107700              STA     PUTLU.02+1
107800              LDA     #.C000031 MOD .M
107900              STA     PUTLU.01
108000              LDA     #.C000031/256
108100              STA     PUTLU.01+1
108200              JSR     PUTLU
108300   .L000098   EQU     *
108400         ;    IF((IAC (I)=1).OR.(IAC (2)=1))CALL PUTLU(31,LUNAMS(I),A,NTROUT)
108500              LDA     #2
108600              ASL     A
108700              TAX
108800              LDA     IAC!!!01-1,X
108900              CMP     #1
109000              BNE     .L000099
109100              LDA     IAC!!!01-2,X
109200              CMP     #0
109300              BNE     .L000099
109400   .L000100   LDA     #80H
109500              BNE     *+4
109600   .L000099   LDA     #0
109700              STA     .T000006
109800              LDA     #1
109900              ASL     A
110000              TAX
110100              LDA     IAC!!!01-1,X
110200              CMP     #1
110300              BNE     .L000101
110400              LDA     IAC!!!01-2,X
110500              CMP     #0
110600              BNE     .L000101
110700   .L000102   LDA     #80H
110800              BNE     *+4
110900   .L000101   LDA     #0
111000              ORA     .T000006
111100              ASL     A
111200              BCS     *+5
111300              JMP     .L000103
111400              LDA     #NTROUT01 MOD .M
111500              STA     PUTLU.04
111600              LDA     #NTROUT01/256
```

```
111700          SIA     PUTLU.04+1
111800          LDA     #A!!!!!01 MOD .M
111900          SIA     PUTLU.03
112000          LDA     #A!!!!!01/256
112100          SIA     PUTLU.03+1
112200          LDA     I!!!!!01+1
112300          ASL     A
112400          ASL     A
112500          CLC
112600          ADC     #(LUNAMS01-4) MOD .M
112700          SIA     PUTLU.02
112800          LDA     #0
112900          ADC     #(LUNAMS01-4)/256
113000          SIA     PUTLU.02+1
113100          LDA     #.C000038 MOD .M
113200          SIA     PUTLU.01
113300          LDA     #.C000038/256
113400          SIA     PUTLU.01+1
113500          JSR     PUTLU
113600  .L000103 EQU    *
113700  ; 220   CONTINUE
113800  .L000077 EQU    *
113900          JMP     .L000073
114000  .L000078 EQU    *

157200  ; 300   CALL PLMODU(IDSRN,TR1,TR2,TR3,TR4,TR5,TR6,INDEX,NTRACS,MASTER,
157300  .L000111 EQU    *
157400  ;               + STRECH,IDEBUG)
157500          LDA     #IDEBUG01 MOD .M
157600          SIA     PLMODU.2
157700          LDA     #IDEBUG01/256
157800          SIA     PLMODU.2+1
157900          LDA     #STRECH01 MOD .M
158000          SIA     PLMODU.1
158100          LDA     #STRECH01/256
158200          SIA     PLMODU.1+1
158300          LDA     #MASTER01 MOD .M
158400          SIA     PLMODU.0
158500          LDA     #MASTER01/256
158600          SIA     PLMODU.0+1
158700          LDA     #NTRACS01 MOD .M
158800          SIA     PLMODU.9
158900          LDA     #NTRACS01/256
159000          SIA     PLMODU.9+1
159100          LDA     #INDEX101 MOD .M
159200          SIA     PLMODU.8
159300          LDA     #INDEX101/256
159400          SIA     PLMODU.8+1
159500          LDA     #TR6!!!01 MOD .M
159600          SIA     PLMODU.7
159700          LDA     #TR6!!!01/256
159800          SIA     PLMODU.7+1
159900          LDA     #TR5!!!01 MOD .M
160000          SIA     PLMODU.6
160100          LDA     #TR5!!!01/256
160200          SIA     PLMODU.6+1
160300          LDA     #TR4!!!01 MOD .M
160400          SIA     PLMODU.5
160500          LDA     #TR4!!!01/256
160600          SIA     PLMODU.5+1
160700          LDA     #TR3!!!01 MOD .M
160800          SIA     PLMODU.4
160900          LDA     #TR3!!!01/256
161000          SIA     PLMODU.4+1
161100          LDA     #TR2!!!01 MOD .M
161200          SIA     PLMODU.3
161300          LDA     #TR2!!!01/256
161400          SIA     PLMODU.3+1
161500          LDA     #TR1!!!01 MOD .M
161600          SIA     PLMODU.2
161700          LDA     #TR1!!!01/256
161800          SIA     PLMODU.2+1
161900          LDA     #IDSRN01 MOD .M
```

```
162000            STA     PLHODO.1
162100            LDA     #HSRG1517/256
162200            STA     PLHODO.1+1
162300            JSR     PLHODO
162400  ;         RETURN
162500            JMP     .R000001
162600  ;         END
162700  .R000001  RTS
162800  ;         SUBROUTINE ARROW (X1,Y1,X2,Y2,ARX,RAT)
162900  ARROW     EQU     *
163000  X1!!!!02  EQU     ARROW.01
163100  Y1!!!!02  EQU     ARROW.02
163200  X2!!!!02  EQU     ARROW.03
163300  Y2!!!!02  EQU     ARROW.04
163400  ARX!!!02  EQU     ARROW.05
163500  RAT!!!02  EQU     ARROW.06
163600  ; C
163700  ; C       SUBROUTINE ARROW PLOTS A SMALL ARROW (TRIANGLE) IN THE CENTER
163800  ; C          OF A LINE SEGMENT.
163900  ; C
164000  ; C          X1 = X COORDINATE OF THE BEGINNING OF THE LINE SEGMENT.
164100  ; C          Y1 = Y COORDINATE OF BEGINNING OF THE LINE SEGMENT.
164200  ; C          X2 = X COORDINATE OF THE END OF THE LINE SEGMENT.
164300  ; C          Y2 = Y COORDINATE OF THE END OF THE LINE SEGMENT.
164400  ; C          ARX = LENGTH OF THE ARROW.
164500  ; C          RAT = RATIO OF THE WIDTH OF THE ARROW TO THE LENGTH OF THE
164600  ; C             ARROW.
164700  ; C             = 1. IS A FAT ARROW.
164800  ; C             = .5 IS A SKINNY ARROW.
164900  ; C
165000  ; C       NOTE: ALL ARGUMENTS ARE IN PLOTTER UNITS.
165100  ; C             THE SIZE OF THE ARROW IS REDUCED IF THE LINE LENGTH IS
165200  ; C             LESS THAN 4 TIMES THE LENGTH OF THE ARROW (ARX).
165300  ; C             THE PEN IS LEFT AT THE END OF THE LINE SEGMENT.
165400  ; C
165500  ; C
165600  ;         DX = X2 - X1
165700  .MFFSUB   SET     1
165800            JSR     .FFSUB
165900            .BYTE   0
166000            .WORD   -X2!!!!02,-X1!!!!02
166100            .WORD   DX!!!!02
166200  ;         DY = Y2 - Y1
166300  .MFFSUB   SET     1
166400            JSR     .FFSUB
166500            .BYTE   0
166600            .WORD   -Y2!!!!02,-Y1!!!!02
166700            .WORD   DY!!!!02
166800  ;         DL = DX * DX + DY * DY
166900  .MFFMUL   SET     1
167000            JSR     .FFMUL
167100            .BYTE   0
167200            .WORD   DY!!!!02,DY!!!!02
167300            .WORD   .T000123
167400  .MFFMUL   SET     1
167500            JSR     .FFMUL
167600            .BYTE   0
167700            .WORD   DX!!!!02,DX!!!!02
167800            .WORD   .T000120
167900  .MFFADD   SET     1
168000            JSR     .FFADD
168100            .BYTE   0
168200            .WORD   .T000120,.T000123
168300            .WORD   DL!!!!02
168400  ;         IF (DL.LE.0.) GO TO 50
168500  .MFFLE    SET     1
168600            JSR     .FFLE
168700            .BYTE   0
168800            .WORD   DL!!!!02,.C000126
168900            ASL     A
169000            BCS     *+5
169100            JMP     .L000127
```

```
169200              JMP     .L000128
169300      .L000127 EQU    *
169400      ;       DL = SQRT(DL / 16.)
169500      .MFFDIV SET     1
169600              JSR     .FFDIV
169700              .BYTE   0
169800              .WORD   DL!!!!02,.C000129
169900              .WORD   .T000120
170000              LDA     #.T000120 MOD .M
170100              STA     SQRT.001
170200              LDA     #.T000120/256
170300              STA     SQRT.001+1
170400              LDA     #.T000120 MOD .M
170500              STA     SQRT.000
170600              LDA     #.T000120/256
170700              STA     SQRT.000+1
170800              JSR     SQRT
170900      .MFLTASG SET    1
171000              JSR     .FLTASGN
171100              .BYTE   0
171200              .WORD   .T000120
171300              .WORD   DL!!!!02
171400      ;       XPT = X1 + 0.5 * DX
171500      .MFFMUL SET     1
171600              JSR     .FMUL
171700              .BYTE   0
171800              .WORD   .C000130,DX!!!!02
171900              .WORD   .T000120
172000      .MFFADD SET     1
172100              JSR     .FFADD
172200              .BYTE   0
172300              .WORD   =X1!!!!02,.T000120
172400              .WORD   XP!!!!02
172500      ;       YPT = Y1 + 0.5 * DY
172600      .MFFMUL SET     1
172700              JSR     .FFMUL
172800              .BYTE   0
172900              .WORD   .C000131,DY!!!!02
173000              .WORD   .T000120
173100      .MFFADD SET     1
173200              JSR     .FFADD
173300              .BYTE   0
173400              .WORD   =Y1!!!!02,.T000120
173500              .WORD   YP!!!!02
173600      ;       ANGL = ATAN2(DY,DX)
173700              LDA     #DX!!!!02 MOD .M
173800              STA     ATAN2.02
173900              LDA     #DX!!!!02/256
174000              STA     ATAN2.02+1
174100              LDA     #DY!!!!02 MOD .M
174200              STA     ATAN2.01
174300              LDA     #DY!!!!02/256
174400              STA     ATAN2.01+1
174500              LDA     #.T000120 MOD .M
174600              STA     ATAN2.00
174700              LDA     #.T000120/256
174800              STA     ATAN2.00+1
174900              JSR     ATAN2
175000      .MFLTASG SET    1
175100              JSR     .FLTASGN
175200              .BYTE   0
175300              .WORD   .T000120
175400              .WORD   ANGL!!02
175500      ;       CANGL = COS(ANGL)
175600              LDA     #ANGL!!02 MOD .M
175700              STA     COS.0001
175800              LDA     #ANGL!!02/256
175900              STA     COS.0001+1
176000              LDA     #.T000120 MOD .M
176100              STA     COS.0000
176200              LDA     #.T000120/256
176300              STA     COS.0000+1
```

```
176400              JSR     COS
176500      .MFLTASG SET    1
176600              JSR     .FLTASGN
176700              .BYTE   0
176800              .WORD   .1000120
176900              .WORD   CANGL!!02
177000      ;       SANGL = SIN(ANGL)
177100              LDA     #ANGL!!02 MOD .M
177200              STA     SIN.0001
177300              LDA     #ANGL!!02/256
177400              STA     SIN.0001+1
177500              LDA     #.1000120 MOD .M
177600              STA     SIN.0000
177700              LDA     #.1000120/256
177800              STA     SIN.0000+1
177900              JSR     SIN
178000      .MFLTASG SET    1
178100              JSR     .FLTASGN
178200              .BYTE   0
178300              .WORD   .1000120
178400              .WORD   SANGL!!02
178500      ;       IF (DL.GT.ARX) DL = ARX
178600      .MFFGT  SET     1
178700              JSR     .FFGT
178800              .BYTE   0
178900              .WORD   DL!!!02,-ARX!!02
179000              ASL     A
179100              BCS     *+5
179200              JMP     .L000132
179300      .MFLTASG SET    1
179400              JSR     .FLTASGN
179500              .BYTE   0
179600              .WORD   -ARX!!02
179700              .WORD   DL!!!02
179800      .L000132 EQU    *
179900      ;       ARXS = DL
180000      .MFLTASG SET    1
180100              JSR     .FLTASGN
180200              .BYTE   0
180300              .WORD   DL!!!02
180400              .WORD   ARXS!!02
180500      ;       ARYS = RAT * DL
180600      .MFFMUL SET     1
180700              JSR     .FFMUL
180800              .BYTE   0
180900              .WORD   -RAT!!!02,DL!!!02
181000              .WORD   ARYS!!02
181100      ;       CX = CANGL * ARXS
181200      .MFFMUL SET     1
181300              JSR     .FFMUL
181400              .BYTE   0
181500              .WORD   CANGL!02,ARXS!!02
181600              .WORD   CX!!!02
181700      ;       SX = SANGL * ARXS
181800      .MFFMUL SET     1
181900              JSR     .FFMUL
182000              .BYTE   0
182100              .WORD   SANGL!02,ARXS!!02
182200              .WORD   SX!!!02
182300      ;       CY = CANGL * ARYS
182400      .MFFMUL SET     1
182500              JSR     .FFMUL
182600              .BYTE   0
182700              .WORD   CANGL!02,ARYS!!02
182800              .WORD   CY!!!02
182900      ;       SY = SANGL * ARYS
183000      .MFFMUL SET     1
183100              JSR     .FFMUL
183200              .BYTE   0
183300              .WORD   SANGL!02,ARYS!!02
183400              .WORD   SY!!!02
183500      ;       CALL PLOT (XPT,YPT,3)
```

```
183600          LDA     #.C000004 MOD .M
183700          STA     PLOT.003
183800          LDA     #.C000004/256
183900          STA     PLOT.003+1
184000          LDA     #YPT!!!02 MOD .M
184100          STA     PLOT.002
184200          LDA     #YPT!!!02/256
184300          STA     PLOT.002+1
184400          LDA     #XPT!!!02 MOD .M
184500          STA     PLOT.001
184600          LDA     #XPT!!!02/256
184700          STA     PLOT.001+1
184800          JSR     PLOT
184900  ;       CALL PLOT (XPT - CX - SY,YPT - SX + CY,2)
185000  .MFFSUB SET     1
185100          JSR     .FFSUB
185200          .BYTE   0
185300          .WORD   XPT!!!02,CX!!!02
185400          .WORD   .T000120
185500  .MFFSUB SET     1
185600          JSR     .FFSUB
185700          .BYTE   0
185800          .WORD   .T000120,SY!!!02
185900          .WORD   .T000123
186000  .MFFSUB SET     1
186100          JSR     .FFSUB
186200          .BYTE   0
186300          .WORD   YPT!!!02,SX!!!02
186400          .WORD   .T000120
186500  .MFFADD SET     1
186600          JSR     .FFADD
186700          .BYTE   0
186800          .WORD   .T000120,CY!!!02
186900          .WORD   .T000125
187000          LDA     #.C000012 MOD .M
187100          STA     PLOT.003
187200          LDA     #.C000012/256
187300          STA     PLOT.003+1
187400          LDA     #.T000125 MOD .M
187500          STA     PLOT.002
187600          LDA     #.T000125/256
187700          STA     PLOT.002+1
187800          LDA     #.T000123 MOD .M
187900          STA     PLOT.001
188000          LDA     #.T000123/256
188100          STA     PLOT.001+1
188200          JSR     PLOT
188300  ;       CALL PLOT (XPT - CX + SY,YPT - SX - CY
188400  .MFFSUB SET     1
188500          JSR     .FFSUB
188600          .BYTE   0
188700          .WORD   XPT!!!02,CX!!!02
188800          .WORD   .T000120
188900  .MFFADD SET     1
189000          JSR     .FFADD
189100          .BYTE   0
189200          .WORD   .T000120,SY!!!02
189300          .WORD   .T000123
189400  .MFFSUB SET     1
189500          JSR     .FFSUB
189600          .BYTE   0
189700          .WORD   YPT!!!02,SX!!!02
189800          .WORD   .T000120
189900  .MFFSUB SET     1
190000          JSR     .FFSUB
190100          .BYTE   0
190200          .WORD   .T000120,CY!!!02
190300          .WORD   .T000125
190400          LDA     #.C000012 MOD .M
190500          STA     PLOT.003
190600          LDA     #.C000012/256
190700          STA     PLOT.003+1
```

```
190800              LDA    #.T000125 MOD .M
190900              STA    PLOT.002
191000              LDA    #.T000125/256
191100              STA    PLOT.002+1
191200              LDA    #.T000123 MOD .M
191300              STA    PLOT.001
191400              LDA    #.T000123/256
191500              STA    PLOT.001+1
191600              JSR    PLOT
191700      ;       CALL PLOT (XPT,YPT,2)
191800              LDA    #.C000012 MOD .M
191900              STA    PLOT.003
192000              LDA    #.C000012/256
192100              STA    PLOT.003+1
192200              LDA    #YPT!!!02 MOD .M
192300              STA    PLOT.002
192400              LDA    #YPT!!!02/256
192500              STA    PLOT.002+1
192600              LDA    #XPT!!!02 MOD .M
192700              STA    PLOT.001
192800              LDA    #XPT!!!02/256
192900              STA    PLOT.001+1
193000              JSR    PLOT
193100      ;       CALL PLOT (X2,Y2,3)
193200              LDA    #.C000004 MOD .M
193300              STA    PLOT.003
193400              LDA    #.C000004/256
193500              STA    PLOT.003+1
193600              LDA    Y2!!!02
193700              STA    PLOT.002
193800              LDA    Y2!!!02+1
193900              STA    PLOT.002+1
194000              LDA    X2!!!02
194100              STA    PLOT.001
194200              LDA    X2!!!02+1
194300              STA    PLOT.001+1
194400              JSR    PLOT
194500      ;       50 RETURN
194600          .L000128 EQU    *
194700              JMP    .R000119
194800      ;       END
194900          .R000119 RTS
195000      ;       SUBROUTINE CHKPLT(ITRNO,RGATES,RTSC,RTRSP,AXLEN,RT1,RT2,RENDPL,
195100          CHKPLT  EQU    *
195200          ITRNO!03 EQU   CHKPLT.1
195300          RGATES03 EQU   CHKPLT.2
195400          RTSC!03 EQU    CHKPLT.3
195500          RTRSP!03 EQU   CHKPLT.4
195600          AXLEN!03 EQU   CHKPLT.5
195700          RT1!!!03 EQU   CHKPLT.6
195800          RT2!!!03 EQU   CHKPLT.7
195900          RENDPL03 EQU   CHKPLT.8
196000      ;      + RTHREE,NGATES,IWIN,XORG)
196100          RTHRE!03 EQU   CHKPLT.9
196200          NGATES03 EQU   CHKPLT.0
196300          IWIN!!03 EQU   CHKPLT.1
196400          XORG!!03 EQU   CHKPLT.2
196500      ; C       NAMELIST/PLOTN/TRNO,GATES,TSC,TRSP,T1,T2,ENDPLT,THREED,GAIN,
196600      ; C     + NLINES
196700      ;       INTEGER TRNO,NPLOTS
196800      ;       REAL*4 GATES(50),RGATES(50)
196900      ;       LOGICAL TITLE(80),BLANK,COMPL
197000      ; C
197100      ; C THIS PROGRAM READS XPLOTN NAMELIST AND CHECKS PARAMETERS
197200      ; C
197300      ;       NPLOTS=NPLOTS+1
197400              LDA    NPLOTS03+1
197500              CLC
197600              ADC    #1
197700              STA    NPLOTS03+1
197800              LDA    NPLOTS03
197900              ADC    #0
```

```
198000              STA     NPLOTS03
198100       ;      IF(NPLOTS.GT.1)GO TO 120
198200              LDA     #1
198300              CMP     NPLOTS03+1
198400              LDA     #0
198500              SBC     NPLOTS03
198600              BMI     .L000136
198700              JMP     .L000135
198800       .L000136 EQU   *
198900              JMP     .L000137
199000       .L000135 EQU   *
199100       ;      TSC=10.
199200       .MFLTASG SET   1
199300              JSR     .FLTASGN
199400              .BYTE 0
199500              .WORD .C000138
199600              .WORD TSC!!!03
199700       ;      TRSP=3.
199800       .MFLTASG SET   1
199900              JSR     .FLTASGN
200000              .BYTE 0
200100              .WORD .C000140
200200              .WORD TRSP!!03
200300       ;      NWIN=0
200400              LDA     #0
200500              STA     NWIN!!03
200600              LDA     #0
200700              STA     NWIN!!03+1
200800       ;      T1=0.
200900       .MFLTASG SET   1
201000              JSR     .FLTASGN
201100              .BYTE 0
201200              .WORD .C000141
201300              .WORD T1!!!!03
201400       ;      T2=2.0
201500       .MFLTASG SET   1
201600              JSR     .FLTASGN
201700              .BYTE 0
201800              .WORD .C000142
201900              .WORD T2!!!!03
202000       ;      ENDPLT=0.
202100       .MFLTASG SET   1
202200              JSR     .FLTASGN
202300              .BYTE 0
202400              .WORD .C000143
202500              .WORD ENDPLT03
202600       ;      THREED=1.
202700       .MFLTASG SET   1
202800              JSR     .FLTASGN
202900              .BYTE 0
203000              .WORD .C000144
203100              .WORD THREED03
203200       ;      AXLEN=20.
203300       .MFLTASG SET   1
203400              JSR     .FLTASGN
203500              .BYTE 0
203600              .WORD .C000145
203700              .WORD -AXLEN!03
203800       ;      DO 100 I=1,50
203900              LDA     #0
204000              STA     I!!!!!03
204100              LDA     #1
204200              STA     I!!!!!03+1
204300              JMP     .L000149
204400       .L000146 EQU   *
204500              LDA     I!!!!!03+1
204600              CLC
204700              ADC     #1
204800              STA     I!!!!!03+1
204900              LDA     I!!!!!03
205000              ADC     #0
205100              STA     I!!!!!03
```

```
205200            LDA     #50
205300            CMP     I!!!!!!03+1
205400            LDA     #0
205500            SBC     I!!!!!!03
205600            BMI     .L000147
205700   .L000149 EQU     *
205800   ;        GATES(I)=-1.
205900            LDA     I!!!!!!03+1
206000            ASL     A
206100            ASL     A
206200            CLC
206300            ADC     #(GATES!03-4) MOD .M
206400            STA     .1000139
206500            LDA     #0
206600            ADC     #(GATES!03-4)/256
206700            STA     .1000139+1
206800   .MFUNMIN SET     1
206900            JSR     .FUNMIN
207000            .BYTE   0
207100            .WORD   .C000152
207200            .WORD   -.1000139
207300   ; 100    CONTINUE
207400   .L000151 EQU     *
207500            JMP     .L000146
207600   .L000147 EQU     *
207700   ; 120    IRNU=0
207800   .L000137 EQU     *
207900            LDA     #0
208000            STA     IRNU!!03
208100            LDA     #0
208200            STA     IRNU!!03+1
208300   ;        NLINES=0
208400            LDA     #0
208500            STA     NLINES03
208600            LDA     #0
208700            STA     NLINES03+1
208800   ;        NCHARS=0
208900   ; C
209000   ; C      READ(N0,PLOTH)
209100            LDA     #0
209200            STA     NCHARS03
209300            LDA     #0
209400            STA     NCHARS03+1
209500   ;        ABIFLG=0.0
209600   ; C
209700   ; C CHECK PARAMETERS
209800   ; C
209900   .MFLIASG SET     1
210000            JSR     .FLIASGN
210100            .BYTE   0
210200            .WORD   .C000154
210300            .WORD   ABIFLG03
210400   ;        DO 140 I=1,50,2
210500            LDA     #0
210600            STA     I!!!!!!03
210700            LDA     #1
210800            STA     I!!!!!!03+1
210900            JMP     .L000157
211000   .L000155 EQU     *
211100            LDA     I!!!!!!03+1
211200            CLC
211300            ADC     #2
211400            STA     I!!!!!!03+1
211500            LDA     I!!!!!!03
211600            ADC     #0
211700            STA     I!!!!!!03
211800            LDA     #50
211900            CMP     I!!!!!!03+1
212000            LDA     #0
212100            SBC     I!!!!!!03
212200            BMI     .L000156
212300   .L000157 EQU     *
```

```
212400    ;         IF(GATES(I).LT.0.)GO TO 160
212500              LDA    I!!!!!03+1
212600              ASL    A
212700              ASL    A
212800              CLC
212900              ADC    #(GATES!03-4) MOD .M
213000              STA    .T000153
213100              LDA    #0
213200              ADC    #(GATES!03-4)/256
213300              STA    .T000153+1
213400   .MFFLT    SET    1
213500              JSR    .FFLT
213600              .BYTE  0
213700              .WORD  -.T000153,.C000150
213800              ASL    A
213900              BCS    *+5
214000              JMP    .L000161
214100              JMP    .L000162
214200   .L000161  EQU    *
214300    ;         I1=I+1
214400              LDA    I!!!!!03+1
214500              CLC
214600              ADC    #1
214700              STA    I!!!!!03+1
214800              LDA    I!!!!!03
214900              ADC    #0
215000              STA    I!!!!!03
215100    ;         IF(GATES(I).LE.GATES(I1))GO TO 140
215200              LDA    I!!!!!03+1
215300              ASL    A
215400              ASL    A
215500              CLC
215600              ADC    #(GATES!03-4) MOD .M
215700              STA    .T000139
215800              LDA    #0
215900              ADC    #(GATES!03-4)/256
216000              STA    .T000139+1
216100              LDA    I!!!!!03+1
216200              ASL    A
216300              ASL    A
216400              CLC
216500              ADC    #(GATES!03-4) MOD .M
216600              STA    .T000153
216700              LDA    #0
216800              ADC    #(GATES!03-4)/256
216900              STA    .T000153+1
217000   .MFFLE    SET    1
217100              JSR    .FFLE
217200              .BYTE  0
217300              .WORD  -.T000153,-.T000139
217400              ASL    A
217500              BCS    *+5
217600              JMP    .L000163
217700              JMP    .L000154
217800   .L000163  EQU    *
217900    ; C       WRITE(6,130)I,I1,GATES(I),GATES(I1)
218000    ; C130    FORMAT(' *** GATE NO.',2I3,2F15.3,' ARE NOT INCREASING.***')
218100    ;         ABTFLG=1.0
218200   .MFLTASG  SET    1
218300              JSR    .FLTASGN
218400              .BYTE  0
218500              .WORD  .C000164
218600              .WORD  ABTFLG03
218700    ; 140     CONTINUE
218800   .L000154  EQU    *
218900              JMP    .L000155
219000   .L000156  EQU    *
219100    ; 160     NGATES=(I-1)/2
219200   .L000162  EQU    *
219300              LDA    I!!!!!03+1
219400              SEC
219500              SBC    #1
```

```
219600            STA     .T000134+1
219700            LDA     1!!!!!03
219800            SBC     #0
219900            STA     .T000134
220000    .MIDIV  SET     1
220100            JSR     .IDIV
220200            .BYTE   5
220300            .WORD   .T000134,.C000012
220400            .WORD   -NGATES03
220500   ;        N2=NGATES*2
220600   ; C      WRITE(6,180)TRNO,TSC,TRSP,NWIN,T1,T2,ENDPLT,THREED,NLINES,
220700   ; C     + (GATES(I),I=1,N2)
220800   ; C180   FORMAT('0*** PLOTH NAMELIST ***',' TRNO =',I3/' TSC   =',F10.
220900   ; C     + ' TRSP  =',F10.1/' NWIN  =',I3/'  T1   =',F10.3/' T2    =',
221000   ; C     + F10.3/' ENDPLT=',F10.0/' THREED=',F10.0/' NLINES=',I10/
221100   . ; C   + ' GATES'/(1X,5(2F10.3,5X)))
221200   .MIMUL  SET      1
221300           JSR      .IMUL
221400           .BYTE    5
221500           .WORD   -NGATES03,.C000012
221600           .WORD    N2!!!!03
221700   ;       IF(T1.LT.T2)GO TO 220
221800   .MFFLT  SET      1
221900           JSR      .FFLT
222000           .BYTE    0
222100           .WORD   T1!!!!03,T2!!!!03
222200           ASL      A
222300           BCS     *+5
222400           JMP     .L000166
222500           JMP     .L000167
222600   .L000166 EQU    *
222700   ; C      WRITE(6,200)
222800   ; C200   FORMAT('0*** T1 IS GREATER THAN OR EQUAL TO T2 ***')
222900   ;       ABTFLG=1.
223000   .MFLTASG SET    1
223100           JSR      .FLTASGN
223200           .BYTE    0
223300           .WORD   .C000168
223400           .WORD    ABTFLG03
223500   ; 220    AXLEN=(T2-T1)*TSC
223600   .L000167 EQU    *
223700   .MFFSUB SET      1
223800           JSR      .FFSUB
223900           .BYTE    0
224000           .WORD   T2!!!!03,T1!!!!03
224100           .WORD   .T000153
224200   .MFFMUL SET      1
224300           JSR      .FFMUL
224400           .BYTE    0
224500           .WORD   .T000153,TSC!!!03
224600           .WORD   -AXLEN!03
224700   ;       IF(AXLEN.LE.22.)GO TO 260
224800   .MFFLE  SET      1
224900           JSR      .FFLE
225000           .BYTE    0
225100           .WORD   -AXLEN!03,.C000170
225200           ASL      A
225300           BCS     *+5
225400           JMP     .L000171
225500           JMP     .L000172
225600   .L000171 EQU    *
225700   ; C      WRITE(6,240)AXLEN
225800   ; C240   FORMAT('0*** WIDTH OF PLOT =',F20.5,' GREATER THAN 22 INCHES**
225900   ;       ABTFLG=1.
226000   .MFLTASG SET     1
226100           JSR      .FLTASGN
226200           .BYTE    0
226300           .WORD   .C000173
226400           .WORD    ABTFLG03
226500   ; 260    IF((TRSP.LT.6.0).AND.(TRSP.GT.0.5))GO TO 285
226600   .L000172 EQU    *
226700   .MFFGT  SET      1
```

```
226800              JSR     .FFGT
226900              .BYTE   0
227000              .WORD   TRSP!!03,.C000175
227100              STA     .1000139
227200   .MFFLT     SET     1
227300              JSR     .FFLT
227400              .BYTE   0
227500              .WORD   TRSP!!03,.C000174
227600              AND     .1000139
227700              ASL     A
227800              BCS     *+5
227900              JMP     .L000176
228000              JMP     .L000177
228100   .L000176   EQU     *
228200   ; C        WRITE(6,280)
228300   ; C280     FORMAT('0*** TRSP IS UNREASUNABLE ***')
228400   ;          ABTFLG=1.
228500   .MFLTASG   SET     1
228600              JSR     .FLTASGN
228700              .BYTE   0
228800              .WORD   .C000178
228900              .WORD   ABTFLG03
229000   ; 265      IF(FLOAT(NLINES)*0.5 .LE.AXLEN)GO TO 300
229100   .L000177   EQU     *
229200   .MFFLOAT   SET     1
229300              JSR     .FFLOAT
229400              .BYTE   1
229500              .WORD   NLINES03
229600              .WORD   .1000153
229700   .MFFMUL    SET     1
229800              JSR     .FFMUL
229900              .BYTE   0
230000              .WORD   .1000153,.C000179
230100              .WORD   .1000164
230200   .MFFLE     SET     1
230300              JSR     .FFLE
230400              .BYTE   0
230500              .WORD   .1000169,-AXLEN!03
230600              ASL     A
230700              BCS     *+5
230800              JMP     .L000180
230900              JMP     .L000181
231000   .L000180   EQU     *
231100   ; C        WRITE(6,290)
231200   ; C290     FORMAT('0*** NLINES IS TOO LARGE ***')
231300   ;          ABTFLG=1.
231400   ; C
231500   ; C COPY VARIABLES AND RETURN
231600   ; C
231700   .MFLTASG   SET     1
231800              JSR     .FLTASGN
231900              .BYTE   0
232000              .WORD   .C000182
232100              .WORD   ABTFLG03
232200   ; 300      IF(ABTFLG=1.)CALL ABORT(16)
232300   .L000181   EQU     *
232400   .MFFEQ     SET     1
232500              JSR     .FFEQ
232600              .BYTE   0
232700              .WORD   ABTFLG03,.C000183
232800              ASL     A
232900              BCS     *+5
233000              JMP     .L000184
233100              LDA     #.C000011 MOD M
233200              STA     ABORT.01
233300              LDA     #.C000011/256
233400              STA     ABORT.01+1
233500              JSR     ABORT
233600   .L000184   EQU     *
233700   ;          ITRNO=LRNO
233800              LDA     TRNO!!03
233900              STA     (ITRNO!03)
```

```
234000                  LDA     IRNU!!03+1
234100                  LDY     #1
234200                  STA     (ITRNU!03),Y
234300          ;       IF(N2.LE.0)GO TO 330
234400                  LDA     #0
234500                  CMP     N2!!!!03+1
234600                  LDA     #0
234700                  SBC     N2!!!!03
234800                  BMI     .L000185
234900                  JMP     .L000187
235000          .L000185 EQU    *
235100          ;       DO 320 I=1,N2
235200                  LDA     #0
235300                  STA     I!!!!!03
235400                  LDA     #1
235500                  STA     I!!!!!03+1
235600                  JMP     .L000190
235700          .L000188 EQU    *
235800                  LDA     I!!!!!03+1
235900                  CLC
236000                  ADC     #1
236100                  STA     I!!!!!03+1
236200                  LDA     I!!!!!03
236300                  ADC     #0
236400                  STA     I!!!!!03
236500                  LDA     N2!!!!03+1
236600                  CMP     I!!!!!03+1
236700                  LDA     N2!!!!03
236800                  SBC     I!!!!!03
236900                  BMI     .L000189
237000          .L000190 EQU    *
237100          ;       RGATES(I)=GATES(I)
237200                  LDA     I!!!!!03+1
237300                  ASL     A
237400                  ASL     A
237500                  CLC
237600                  ADC     #(GATES!03-4) MOD .M
237700                  STA     .T000134
237800                  LDA     #0
237900                  ADC     #(GATES!03-4)/256
238000                  STA     .T000134+1
238100                  LDA     I!!!!!03+1
238200                  SEC
238300                  SBC     #1
238400                  ASL     A
238500                  ASL     A
238600                  ADC     RGATES03
238700                  STA     .T000139
238800                  LDA     #0
238900                  ADC     RGATES03+1
239000                  STA     .T000139+1
239100          .MFLTASG SET    1
239200                  JSR     .FLTASGN
239300                  .BYTE   0
239400                  .WORD   -.T000134
239500                  .WORD   -.T000139
239600          ; 320   CONTINUE
239700          .L000192 EQU    *
239800                  JMP     .L000188
239900          .L000189 EQU    *
240000          ; 330   RTSC=TSC
240100          .L000187 EQU    *
240200          .MFLTASG SET    1
240300                  JSR     .FLTASGN
240400                  .BYTE   0
240500                  .WORD   TSC!!03
240600                  .WORD   -RTSC!!03
240700          ;       RIRSP=IRSP
240800          .MFLTASG SET    1
240900                  JSR     .FLTASGN
241000                  .BYTE   0
241100                  .WORD   TRSP!!03
```

```
241200              .WORD   -RTRSP!03
241300      ;       RT1=T1
241400      .MFLTASG SET    1
241500              JSR     .FLTASGN
241600              .BYTE   0
241700              .WORD   T1!!!03
241800              .WORD   -RT1!!!03
241900      ;       RT2=T2
242000      .MFLTASG SET    1
242100              JSR     .FLTASGN
242200              .BYTE   0
242300              .WORD   T2!!!03
242400              .WORD   -RT2!!!03
242500      ;       RENDPL=ENDPLT
242600      .MFLTASG SET    1
242700              JSR     .FLTASGN
242800              .BYTE   0
242900              .WORD   ENDPLT03
243000              .WORD   -RENDPL03
243100      ;       RTHREE=THREED
243200      .MFLTASG SET    1
243300              JSR     .FLTASGN
243400              .BYTE   0
243500              .WORD   THREED03
243600              .WORD   -RTHREE03
243700      ;       IWIN=NWIN
243800      ; C
243900      ; C PLOT TITLE
244000      ; C
244100              LDA     NWIN!!03
244200              STA     (IWIN!!03)
244300              LDA     NWIN!!03+1
244400              LDY     #1
244500              STA     (IWIN!!03),Y
244600      ;       IF(NLINES.LE.0)GO TO 500
244700              LDA     #0
244800              CMP     NLINES03+1
244900              LDA     #0
245000              SBC     NLINES03
245100              BMI     .L000193
245200              JMP     .L000195
245300      .L000193 EQU    *
245400      ;       DO 400 I=1,NLINES
245500              LDA     #0
245600              STA     I!!!!!03
245700              LDA     #1
245800              STA     I!!!!!03+1
245900      ; C     READ(80,340)(TITLE(J),J=1,80)
246000      ; C340  FORMAT(80A1)
246100      ; C     WRITE(6,360)I,(TITLE(J),J=1,80)
246200      ; C360  FORMAT(' TITLE CARD NO. ',I3,'    ',80A1)
246300              JMP     .L000198
246400      .L000196 EQU    *
246500              LDA     I!!!!!03+1
246600              CLC
246700              ADC     #1
246800              STA     I!!!!!03+1
246900              LDA     I!!!!!03
247000              ADC     #0
247100              STA     I!!!!!03
247200              LDA     NLINES03+1
247300              CMP     I!!!!!03+1
247400              LDA     NLINES03
247500              SBC     I!!!!!03
247600              BMI     .L000197
247700      .L000198 EQU    *
247800      ;       DO 370 J=1,80
247900              LDA     #0
248000              STA     J!!!!!03
248100              LDA     #1
248200              STA     J!!!!!03+1
248300              JMP     .L000204
```

```
248400        .L000201 EQU    *
248500                 LDA    J!!!!!03+1
248600                 CLC
248700                 ADC    #1
248800                 STA    J!!!!!03+1
248900                 LDA    J!!!!!03
249000                 ADC    #0
249100                 STA    J!!!!!03
249200                 LDA    #80
249300                 CMP    J!!!!!03+1
249400                 LDA    #0
249500                 SBC    J!!!!!03
249600                 BMI    .L000202
249700        .L000204 EQU    *
249800        ;        K=81-J
249900                 LDA    #81
250000                 SEC
250100                 SBC    J!!!!!03+1
250200                 STA    K!!!!!03+1
250300                 LDA    #0
250400                 SBC    J!!!!!03
250500                 STA    K!!!!!03
250600        ;        IF(.NOT.COMPL(TITLE(K),BLANK,1))GO TO 380
250700                 LDA    #.C000003 MOD .M
250800                 STA    COMPL.03
250900                 LDA    #.C000003/256
251000                 STA    COMPL.03+1
251100                 LDA    #BLANK!03 MOD .M
251200                 STA    COMPL.02
251300                 LDA    #BLANK!03/256
251400                 STA    COMPL.02+1
251500                 LDA    K!!!!!03+1
251600                 CLC
251700                 ADC    #(TITLE!03-1) MOD .M
251800                 STA    COMPL.01
251900                 LDA    #0
252000                 ADC    #(TITLE!03-1)/256
252100                 STA    COMPL.01+1
252200                 LDA    #.T000134 MOD .M
252300                 STA    COMPL.00
252400                 LDA    #.T000134/256
252500                 STA    COMPL.00+1
252600                 JSR    COMPL
252700                 LDA    .T000134
252800                 EOR    #0FFH
252900                 ASL    A
253000                 BCS    *+5
253100                 JMP    .L000208
253200                 JMP    .L000209
253300        .L000208 EQU    *
253400        ; 370    CONTINUE
253500        .L000206 EQU    *
253600                 JMP    .L000201
253700        .L000202 EQU    *
253800        ; 380    NCHARS=MAX0(K,NCHARS)
253900        .L000209 EQU    *
254000                 LDA    #NCHARS03 MOD .M
254100                 STA    MAX0.002
254200                 LDA    #NCHARS03/256
254300                 STA    MAX0.002+1
254400                 LDA    #K!!!!!03 MOD .M
254500                 STA    MAX0.001
254600                 LDA    #K!!!!!03/256
254700                 STA    MAX0.001+1
254800                 LDA    #.T000134 MOD .M
254900                 STA    MAX0.000
255000                 LDA    #.T000134/256
255100                 STA    MAX0.000+1
255200                 JSR    MAX0
255300                 LDA    .T000134
255400                 STA    NCHARS03
255500                 LDA    .T000134+1
```

```
255600              STA     NCHARS03+1
255700       ;              Y=AXLEN*0.5-(FLOA1(1)-1.0)*0.5
255800       .MFFLOAT SET    1
255900              JSR     .FFLOAT
256000              .BYTE   1
256100              .WORD   1!!!!!03
256200              .WORD   .T000169
256300       .MFESUB  SET    1
256400              JSR     .FFSUB
256500              .BYTE   0
256600              .WORD   .T000169,.C000211
256700              .WORD   .T000212
256800       .MFFMUL  SET    1
256900              JSR     .FFMUL
257000              .BYTE   0
257100              .WORD   .T000212,.C000213
257200              .WORD   .T000169
257300       .MFFADD  SET    1
257400              JSR     .FFADD
257500              .BYTE   0
257600              .WORD   =AXLEN!!03,.C000210
257700              .WORD   .T000153
257800       .MFESUB  SET    1
257900              JSR     .FFSUB
258000              .BYTE   0
258100              .WORD   .T000153,.T000169
258200              .WORD   Y!!!!!03
258300       ;              CALL SYMBUL(XORG,Y,0.2,TITLE,0.,K)
258400              LDA     #K!!!!03 MOD .M
258500              STA     SYMBUL.6
258600              LDA     #K!!!!03/256
258700              STA     SYMBUL.6+1
258800              LDA     #.C000215 MOD .M
258900              STA     SYMBUL.5
259000              LDA     #.C000215/256
259100              STA     SYMBUL.5+1
259200              LDA     #TITLE!03 MOD .M
259300              STA     SYMBUL.4
259400              LDA     #TITLE!03/256
259500              STA     SYMBUL.4+1
259600              LDA     #.C000214 MOD .M
259700              STA     SYMBUL.3
259800              LDA     #.C000214/256
259900              STA     SYMBUL.3+1
260000              LDA     #Y!!!!!03 MOD .M
260100              STA     SYMBUL.2
260200              LDA     #Y!!!!!03/256
260300              STA     SYMBUL.2+1
260400              LDA     XORG!!03
260500              STA     SYMBUL.1
260600              LDA     XORG!!03+1
260700              STA     SYMBUL.1+1
260800              JSR     SYMBUL
260900       ; 400  CONTINUE
261000       .L000200 EQU   *
261100              JMP     .L000196
261200       .L000197 EQU   *
261300       ;      XORG=XORG+0.2*FLOAT(NCHARS)
261400       .MFFLOAT SET    1
261500              JSR     .FFLOAT
261600              .BYTE   1
261700              .WORD   NCHARS03
261800              .WORD   .T000153
261900       .MFFMUL  SET    1
262000              JSR     .FFMUL
262100              .BYTE   0
262200              .WORD   .C000216,.T000153
262300              .WORD   .T000169
262400       .MFFADD  SET    1
262500              JSR     .:FADD
262600              .BYTE   0
262700              .WORD   =XORG!!03,.T000169
```

```
262800              .WORD  -XORG!!103
262900      ; 500   RETURN
263000      .C000195 EQU   *
263100              JMP    .R000133
263200      ;       END
263300      .R000133 RTS
263400      ;       SUBROUTINE DCSQDU  (X,Y,NX,C,IC,A,B,U,IER)
263500      DCSQDU  EQU    *
263600      X!!!!!04 EQU   DCSQDU.1
263700      Y!!!!!04 EQU   DCSQDU.2
263800      NX!!!!04 EQU   DCSQDU.3
263900      C!!!!!04 EQU   DCSQDU.4
264000      IC!!!!04 EQU   DCSQDU.5
264100      A!!!!!04 EQU   DCSQDU.6
264200      B!!!!!04 EQU   DCSQDU.7
264300      U!!!!!04 EQU   DCSQDU.8
264400      IER!!!04 EQU   DCSQDU.9

336600      ;       SUBROUTINE HODO2(IRX,IRY,JDIF,AXMAX,X,Y,XANO,YANO,HAXLEN,IDEBUG
336700      HODO2   EQU    *
336800      IRX!!!05 EQU   HODO2.01
336900      IRY!!!05 EQU   HODO2.02
337000      JDIF!!05 EQU   HODO2.03
337100      AXMAX!05 EQU   HODO2.04
337200      X!!!!!05 EQU   HODO2.05
337300      Y!!!!!05 EQU   HODO2.06
337400      XANO!!05 EQU   HODO2.07
337500      YANO!!05 EQU   HODO2.08
337600      HAXLEN05 EQU   HODO2.09
337700      IDEBUG05 EQU   HODO2.10
337800      ;       + GATE1,GATE2)
337900      GATE1!05 EQU   HODO2.11
338000      GATE2!05 EQU   HODO2.12
338100      ;       REAL*4 IRX(1),IRY(1)
338200      ; C
338300      ; C THIS PROGRAM PLOTS A HODOGRAPH
338400      ; C
338500      ; C  IRX    - ARRAY CONTAINING X VARIABLE
338600      ; C  IRY    - ARRAY CONTAINING Y VARIABLE
338700      ; C  JDIF   - MAXIMUM TRACE INDEX
338800      ; C  AXMAX  - MAXIMUM AMPLITUDE TO BE USED FOR PLOT
338900      ; C  X      - X COORDINATE OF UPPER LEFT CORNER OF HODOGRAPH
339000      ; C  Y      - Y
339100      ; C  XANO   - 1 CHARACTER TO ANNOTATE X-AXIS
339200      ; C  YANO   -                         Y
339300      ; C  HAXLEN - LENGTH OF AXES
339400      ; C  GATE1  - STARTING TIME IN SECONDS
339500      ; C  GATE2  - ENDING TIME IN SECONDS
339600      ; C
339700      ; C      IF(IDEBUG.GT.0)WRITE(6,80)JDIF,AXMAX,X,Y,XANO,YANO,HAXLEN
339800      ; C80   FORMAT(' *** SUBROUTINE HODO2 ***'/' JDIF =',I10,' AXMAX=',
339900      ; C    + E15.6,' X=',E15.6,' Y=',E15.6/' XANO=',A4,
340000      ; C    + ' YANO=',A4,' HAXLEN=',E15.6)
340100      ;       HAXLE2=HAXLEN/2.0
340200      .MFFDIV SET    1
340300              JSR    .FFDIV
340400              .BYTE  0
340500              .WORD  -HAXLEN05,.C000251
340600              .WORD  HAXLE205
340700      ;       HAXLE4=HAXLEN/4.0
340800      ; C
340900      ; C PLOT AXES AND ANNOTATE
341000      ; C
341100      ; C VERTICAL AXIS
341200      ; C
341300      .MFFDIV SET    1
341400              JSR    .FFDIV
341500              .BYTE  0
341600              .WORD  -HAXLEN05,.C000265
341700              .WORD  HAXLE405
341800      ;       XP=X+HAXLE2+0.5
341900      .MFFADD SET    1
342000              JSR    .FFADD
```

```
342100                    .BYTE 0
342200                    .WORD -X!!!!!!05,HAXLE205
342300                    .WORD .T000262
342400      .MFFADD   SET    1
342500                    JSR    .FFADD
342600                    .BYTE  0
342700                    .WORD .T000262,.C000266
342800                    .WORD XP!!!!05
342900      ;         DO 120 I=1,5
343000                    LDA    #0
343100                    STA    I!!!!!05
343200                    LDA    #1
343300                    STA    I!!!!!05+1
343400                    JMP    .L000272
343500      .L000269 EQU    *
343600                    LDA    I!!!!!05+1
343700                    CLC
343800                    ADC    #1
343900                    STA    I!!!!!05+1
344000                    LDA    I!!!!!05
344100                    ADC    #0
344200                    STA    I!!!!!05
344300                    LDA    #5
344400                    CMP    I!!!!!05+1
344500                    LDA    #0
344600                    SBC    I!!!!!05
344700                    BMI    .L000270
344800      .L000272 EQU    *
344900      ;         YP=Y-0.5-FLOAT(I-1)*HAXLE4
345000                    LDA    I!!!!!05+1
345100                    SEC
345200                    SBC    #1
345300                    STA    .T000263+1
345400                    LDA    I!!!!!05
345500                    SBC    #0
345600                    STA    .T000263
345700      .MFFLOAT SET    1
345800                    JSR    .FFLOAT
345900                    .BYTE  1
346000                    .WORD .T000263
346100                    .WORD .T000268
346200      .MFFMUL  SET    1
346300                    JSR    .FFMUL
346400                    .BYTE  0
346500                    .WORD .T000268,HAXLE405
346600                    .WORD .T000276
346700      .MFFSUB  SET    1
346800                    JSR    .FFSUB
346900                    .BYTE  0
347000                    .WORD -Y!!!!!05,.C000275
347100                    .WORD .T000262
347200      .MFFSUB  SET    1
347300                    JSR    .FFSUB
347400                    .BYTE  0
347500                    .WORD .T000262,.T000276
347600                    .WORD YP!!!!05
347700      ;         IF(I=3)GO TO 110
347800                    LDA    I!!!!!05+1
347900                    CMP    #3
348000                    BNE    .L000277
348100                    LDA    I!!!!!05
348200                    CMP    #0
348300                    BNE    .L000277
348400                    JMP    .L000279
348500      .L000277 EQU    *
348600      ;         CALL PLOT(XP,YP,3)
348700                    LDA    #.C000004 MOD .M
348800                    STA    PLOT.003
348900                    LDA    #.C000004/256
349000                    STA    PLOT.003+1
349100                    LDA    #YP!!!!05 MOD .M
349200                    STA    PLOT.002
```

```
349300              LDA     #YP!!!!05/256
349400              STA     PLOT.002+1
349500              LDA     #XP!!!!05 MOD .M
349600              STA     PLOT.001
349700              LDA     #XP!!!!05/256
349800              STA     PLOT.001+1
349900              JSR     PLOT
350000       ;      CALL PLOT(XP+0.07,YP,2)
350100  .MFFADD     SET     1
350200              JSR     .FFADD
350300              .BYTE   0
350400              .WORD   XP!!!!05,.C000280
350500              .WORD   .T000262
350600              LDA     #.C000012 MOD .M
350700              STA     PLOT.003
350800              LDA     #.C000012/256
350900              STA     PLOT.003+1
351000              LDA     #YP!!!!05 MOD .M
351100              STA     PLOT.002
351200              LDA     #YP!!!!05/256
351300              STA     PLOT.002+1
351400              LDA     #.T000262 MOD .M
351500              STA     PLOT.001
351600              LDA     #.T000262/256
351700              STA     PLOT.001+1
351800              JSR     PLOT
351900       ;      FPN=AXMAX-FLOAT(I-1)*AXMAX/2.0
352000              LDA     I!!!!!05+1
352100              SEC
352200              SBC     #1
352300              STA     .T000262+1
352400              LDA     I!!!!!05
352500              SBC     #0
352600              STA     .T000262
352700  .MFFLOAT    SET     1
352800              JSR     .FFLOAT
352900              .BYTE   1
353000              .WORD   .T000262
353100              .WORD   .T000268
353200  .MFFMUL     SET     1
353300              JSR     .FFMUL
353400              .BYTE   0
353500              .WORD   .T000268,-AXMAX!05
353600              .WORD   .T000262
353700  .MFFDIV     SET     1
353800              JSR     .FFDIV
353900              .BYTE   0
354000              .WORD   .T000262,.C000281
354100              .WORD   .T000268
354200  .MFFSUB     SET     1
354300              JSR     .FFSUB
354400              .BYTE   0
354500              .WORD   -AXMAX!05,.T000268
354600              .WORD   FPN!!!05
354700       ;      CALL NUMBER(XP+0.09,YP,0.06,FPN,0.,3)
354800  .MFFADD     SET     1
354900              JSR     .FFADD
355000              .BYTE   0
355100              .WORD   XP!!!!05,.C000282
355200              .WORD   .T000262
355300              LDA     #.C000004 MOD .M
355400              STA     NUMBER.6
355500              LDA     #.C000004/256
355600              STA     NUMBER.6+1
355700              LDA     #.C000284 MOD .M
355800              STA     NUMBER.5
355900              LDA     #.C000284/256
356000              STA     NUMBER.5+1
356100              LDA     #FPN!!!05 MOD .M
356200              STA     NUMBER.4
356300              LDA     #FPN!!!05/256
356400              STA     NUMBER.4+1
```

```
356500            LDA     #.C000283 MOD .M
356600            STA     NUMBER.3
356700            LDA     #.C000283/256
356800            STA     NUMBER.3+1
356900            LDA     #YP!!!!05 MOD .M
357000            STA     NUMBER.2
357100            LDA     #YP!!!!05/256
357200            STA     NUMBER.2+1
357300            LDA     #.T000262 MOD .M
357400            STA     NUMBER.1
357500            LDA     #.T000262/256
357600            STA     NUMBER.1+1
357700            JSR     NUMBER
357800       ; 110    IF(I=5)GO TO 120
357900       .L000279 EQU     *
358000            LDA     I!!!!!05+1
358100            CMP     #5
358200            BNE     .L000285
358300            LDA     I!!!!!05
358400            CMP     #0
358500            BNE     .L000285
358600            JMP     .L000274
358700       .L000285 EQU     *
358800       ;     CALL PLOT(XP,YP,3)
358900            LDA     #.C000004 MOD .M
359000            STA     PLOT.003
359100            LDA     #.C000004/256
359200            STA     PLOT.003+1
359300            LDA     #YP!!!!05 MOD .M
359400            STA     PLOT.002
359500            LDA     #YP!!!!05/256
359600            STA     PLOT.002+1
359700            LDA     #XP!!!!05 MOD .M
359800            STA     PLOT.001
359900            LDA     #XP!!!!05/256
360000            STA     PLOT.001+1
360100            JSR     PLOT
360200       ;     CALL PLOT(XP,YP-HAXLE4,2)
360300       .MFFSUB SET     1
360400            JSR     .EESUB
360500            .BYTE 0
360600            .WORD YP!!!!05,HAXLE405
360700            .WORD .T000262
360800            LDA     #.C000012 MOD .M
360900            STA     PLOT.003
361000            LDA     #.C000012/256
361100            STA     PLOT.003+1
361200            LDA     #.T000262 MOD .M
361300            STA     PLOT.002
361400            LDA     #.T000262/256
361500            STA     PLOT.002+1
361600            LDA     #XP!!!!05 MOD .M
361700            STA     PLOT.001
361800            LDA     #XP!!!!05/256
361900            STA     PLOT.001+1
362000            JSR     PLOT
362100       ; 120 CONTINUE
362200       .L000274 EQU     *
362300            JMP     .L000269
362400       .L000270 EQU     *
362500       ; C
362600       ;     CALL SYMBOL(XP,Y-0.2,0.2,YANO,0.,2)
362700       .MFFSUB SET     1
362800            JSR     .EESUB
362900            .BYTE 0
363000            .WORD -!!!!!05,.C000287
363100            .WORD .T000262
363200            LDA     #.C000012 MOD .M
363300            STA     SYMBOL.6
363400            LDA     #.C000012/256
363500            STA     SYMBOL.6+1
363600            LDA     #.C000289 MOD .M
```

```
363700              STA     SYMBOL.5
363800              LDA     #.C000269/256
363900              STA     SYMBOL.5+1
364000              LDA     YANG!!!05
364100              STA     SYMBOL.4
364200              LDA     YANG!!05+1
364300              STA     SYMBOL.4+1
364400              LDA     #.C000268 MOD .M
364500              STA     SYMBOL.3
364600              LDA     #.C000268/256
364700              STA     SYMBOL.3+1
364800              LDA     #.1000262 MOD .M
364900              STA     SYMBOL.2
365000              LDA     #.1000262/256
365100              STA     SYMBOL.2+1
365200              LDA     #XP!!!!05 MOD .M
365300              STA     SYMBOL.1
365400              LDA     #XP!!!!05/256
365500              STA     SYMBOL.1+1
365600              JSR     SYMBOL
365700      ; C
365800      ; C HORIZONTAL AXIS
365900      ; C
366000      ;       YP=Y-0.5-HAXLE2.
366100      .MFFSUB SET     1
366200              JSR     .FFSUB
366300              .BYTE   0
366400              .WORD   -Y!!!!!05,.C000290
366500              .WORD   .1000262
366600      .MFFSUB SET     1
366700              JSR     .FFSUB
366800              .BYTE   0
366900              .WORD   .1000262,HAXLE205
367000              .WORD   YP!!!!05
367100      ;       DO 140 I=1,5
367200              LDA     #0
367300              STA     I!!!!!05
367400              LDA     #1
367500              STA     I!!!!!05+1
367600              JMP     .L000293
367700      .L000291 EQU    *
367800              LDA     I!!!!!05+1
367900              CLC
368000              ADC     #1
368100              STA     I!!!!!05+1
368200              LDA     I!!!!!05
368300              ADC     #0
368400              STA     I!!!!!05
368500              LDA     #5
368600              CMP     I!!!!!05+1
368700              LDA     #0
368800              SBC     I!!!!!05
368900              BMI     .L000292
369000      .L000293 EQU    *
369100      ;       XP=X+0.5+FLOAT(I-1)*HAXLE4
369200              LDA     I!!!!!05+1
369300              SEC
369400              SBC     #1
369500              STA     .1000263+1
369600              LDA     I!!!!!05
369700              SBC     #0
369800              STA     .1000263
369900      .MFFLOAT SET    1
370000              JSR     .FFLOAT
370100              .BYTE   1
370200              .WORD   .1000263
370300              .WORD   .1000268
370400      .MFFMUL SET     1
370500              JSR     .FFMUL
370600              .BYTE   0
370700              .WORD   .1000268,HAXLE405
370800              .WORD   .1000276
```

```
370900        .MFFADD    SET    1
371000                   JSR    .FFADD
371100                   .BYTE  0
371200                   .WORD  -X!!!!!05,.C000296
371300                   .WORD  .T000262
371400        .MFFADD    SET    1
371500                   JSR    .FFADD
371600                   .BYTE  0
371700                   .WORD  .T000262,.T000276
371800                   .WORD  XP!!!!05
371900        ;          IF(I=3)GO TO 130
372000                   LDA    I!!!!!05+1
372100                   CMP    #3
372200                   BNE    .L000297
372300                   LDA    I!!!!!05
372400                   CMP    #0
372500                   BNE    .L000297
372600                   JMP    .L000299
372700        .L000297 EQU  *
372800        ;          CALL PLOT(XP,YP,3)
372900                   LDA    #.C000004 MOD .M
373000                   STA    PLOT.003
373100                   LDA    #.C000004/256
373200                   STA    PLOT.003+1
373300                   LDA    #YP!!!!05 MOD .M
373400                   STA    PLOT.002
373500                   LDA    #YP!!!!05/256
373600                   STA    PLOT.002+1
373700                   LDA    #XP!!!!05 MOD .M
373800                   STA    PLOT.001
373900                   LDA    #XP!!!!05/256
374000                   STA    PLOT.001+1
374100                   JSR    PLOT
374200        ;          CALL PLOT(XP,YP+0.07,2)
374300        .MFFADD    SET    1
374400                   JSR    .FFADD
374500                   .BYTE  0
374600                   .WORD  YP!!!!05,.C000300
374700                   .WORD  .T000262
374800                   LDA    #.C000012 MOD .M
374900                   STA    PLOT.003
375000                   LDA    #.C000012/256
375100                   STA    PLOT.003+1
375200                   LDA    #.T000262 MOD .M
375300                   STA    PLOT.002
375400                   LDA    #.T000262/256
375500                   STA    PLOT.002+1
375600                   LDA    #XP!!!!05 MOD .M
375700                   STA    PLOT.001
375800                   LDA    #XP!!!!05/256
375900                   STA    PLOT.001+1
376000                   JSR    PLOT
376100        ;          FPM=-AXMAX+FLOAT(I-1)*AXMAX/2.0
376200                   LDA    I!!!!!05+1
376300                   SEC
376400                   SBC    #1
376500                   STA    .T000263+1
376600                   LDA    I!!!!!05
376700                   SBC    #0
376800                   STA    .T000263
376900        .MFFLOAT   SET    1
377000                   JSR    .FFLOAT
377100                   .BYTE  1
377200                   .WORD  .T000263
377300                   .WORD  .T000268
377400        .MFFMUL    SET    1
377500                   JSR    .FFMUL
377600                   .BYTE  0
377700                   .WORD  .T000268,-AXMAX!05
377800                   .WORD  .T000276
377900        .MFFDIV    SET    1
378000                   JSR    .FFDIV
```

```
378100              .BYTE 0
378200              .WORD .T000276,.C000301
378300              .WORD .T000268
378400  .MFUNMIN    SET    1
378500              JSR    .FUNMIN
378600              .BYTE 0
378700              .WORD .AXMAX!05
378800              .WORD .T000262
378900  .MFFADD     SET    1
379000              JSR    .FFADD
379100              .BYTE 0
379200              .WORD .T000262,.T000268
379300              .WORD FPN!!!05
379400  ;           CALL NUMBER(XP-0.05,YP-0.09,0.06,FPN,0.,3)
379500  .MFFSUB     SET    1
379600              JSR    .FFSUB
379700              .BYTE 0
379800              .WORD XP!!!05,.C000302
379900              .WORD .T000262
380000  .MFFSUB     SET    1
380100              JSR    .FFSUB
380200              .BYTE 0
380300              .WORD YP!!!05,.C000303
380400              .WORD .T000268
380500              LDA    #.C000004 MOD .M
380600              STA    NUMBER.6
380700              LDA    #.C000004/256
380800              STA    NUMBER.6+1
380900              LDA    #.C000305 MOD .M
381000              STA    NUMBER.5
381100              LDA    #.C000305/256
381200              STA    NUMBER.5+1
381300              LDA    #FPN!!!05 MOD .M
381400              STA    NUMBER.4
381500              LDA    #FPN!!!05/256
381600              STA    NUMBER.4+1
381700              LDA    #.C000304 MOD .M
381800              STA    NUMBER.3
381900              LDA    #.C000304/256
382000              STA    NUMBER.3+1
382100              LDA    #.T000268 MOD .M
382200              STA    NUMBER.2
382300              LDA    #.T000268/256
382400              STA    NUMBER.2+1
382500              LDA    #.T000262 MOD .M
382600              STA    NUMBER.1
382700              LDA    #.T000262/256
382800              STA    NUMBER.1+1
382900              JSR    NUMBER
383000  ; 130       IF(I=5)GO TO 140
383100  .L000299 EQU   *
383200              LDA    I!!!!!05+1
383300              CMP    #5
383400              BNE    .L000306
383500              LDA    I!!!!!05
383600              CMP    #0
383700              BNE    .L000306
383800              JMP    .L000295
383900  .L000306 EQU   *
384000  ;           CALL PLOT(XP,YP,3)
384100              LDA    #.C000004 MOD .M
384200              STA    PLOT.003
384300              LDA    #.C000004/256
384400              STA    PLOT.003+1
384500              LDA    #YP!!!05 MOD .M
384600              STA    PLOT.002
384700              LDA    #YP!!!05/256
384800              STA    PLOT.002+1
384900              LDA    #XP!!!05 MOD .M
385000              STA    PLOT.001
385100              LDA    #XP!!!05/256
385200              STA    PLOT.001+1
```

```
385300              JSR     PLOT
385400       ;      CALL PLOT(XP+HAXLE4,YP,2)
385500       .MFFADD SET    1
385600              JSR     .FFADD
385700              .BYTE   0
385800              .WORD   XP!!!!05,HAXLE405
385900              .WORD   .1000262
386000              LDA     #.C000012 MOD .M
386100              STA     PLOT.003
386200              LDA     #.C000012/256
386300              STA     PLOT.003+1
386400              LDA     #YP!!!!05 MOD .M
386500              STA     PLOT.002
386600              LDA     #.YP!!!!05/256
386700              STA     PLOT.002+1
386800              LDA     #.T000262 MOD .M
386900              STA     PLOT.001
387000              LDA     #.T000262/256
387100              STA     PLOT.001+1
387200              JSR     PLOT
387300       ; 140. CONTINUE
387400       .L000245 EQU   *
387500              JMP     .L000291
387600       .L000292 EQU   *
387700       ; C
387800       ;      CALL SYMBOL(XP+0.3,YP,0.2,XANO,0.,2)
387900       .MFFADD SET    1
388000              JSR     .FFADD
388100              .BYTE   0
388200              .WORD   XP!!!!05,.C000308
388300              .WORD   .1000262
388400              LDA     #.C000012 MOD .M
388500              STA     SYMBOL.6
388600              LDA     #.C000012/256
388700              STA     SYMBOL.6+1
388800              LDA     #.C000310 MOD .M
388900              STA     SYMBOL.5
389000              LDA     #.C000310/256
389100              STA     SYMBOL.5+1
389200              LDA     XANO!!05
389300              STA     SYMBOL.4
389400              LDA     XANO!!05+1
389500              STA     SYMBOL.4+1
389600              LDA     #.C000309 MOD .M
389700              STA     SYMBOL.3
389800              LDA     #.C000309/256
389900              STA     SYMBOL.3+1
390000              LDA     #YP!!!!05 MOD .M
390100              STA     SYMBOL.2
390200              LDA     #YP!!!!05/256
390300              STA     SYMBOL.2+1
390400              LDA     #.T000262 MOD .M
390500              STA     SYMBOL.1
390600              LDA     #.T000262/256
390700              STA     SYMBOL.1+1
390800              JSR     SYMBOL
390900       ; C
391000       ; C ANNOTATE GATE
391100       ; C
391200       ;      XP=X+HAXLE2-0.5
391300       .MFFADD SET    1
391400              JSR     .FFADD
391500              .BYTE   0
391600              .WORD   -X!!!!05,HAXLE205
391700              .WORD   .1000262
391800       .MFFSUB SET    1
391900              JSR     .FFSUB
392000              .BYTE   0
392100              .WORD   .1000262,.C000311
392200              .WORD   XP!!!!05
392300       ;      YP=Y-HAXLEN-0.7
392400       .MFFSUB SET    1
```

```
392500              JSR     .FFSUB
392600              .BYTE   0
392700              .WORD   -YP!!!!05,-MAXLEN05
392800              .WORD   .I000262
392900    .MFFSUB   SET     1
393000              JSR     .FFSUB
393100              .BYTE   0
393200              .WORD   .I000262,.C000312
393300              .WORD   YP!!!!05
393400    ;         CALL NUMBER(XP,YP,0.1,GATE1,0.0,3)
393500              LDA     #.C000004 MOD .M
393600              STA     NUMBER.6
393700              LDA     #.C000004/256
393800              STA     NUMBER.6+1
393900              LDA     #.C000314 MOD .M
394000              STA     NUMBER.5
394100              LDA     #.C000314/256
394200              STA     NUMBER.5+1
394300              LDA     GATE1!05
394400              STA     NUMBER.4
394500              LDA     GATE1!05+1
394600              STA     NUMBER.4+1
394700              LDA     #.C000313 MOD .M
394800              STA     NUMBER.3
394900              LDA     #.C000313/256
395000              STA     NUMBER.3+1
395100              LDA     #YP!!!!05 MOD .M
395200              STA     NUMBER.2
395300              LDA     #YP!!!!05/256
395400              STA     NUMBER.2+1
395500              LDA     #XP!!!!05 MOD .M
395600              STA     NUMBER.1
395700              LDA     #XP!!!!05/256
395800              STA     NUMBER.1+1
395900              JSR     NUMBER
396000    ;         XP=XP+0.6
396100    .MFFADD   SET     1
396200              JSR     .FFADD
396300              .BYTE   0
396400              .WORD   XP!!!!05,.C000315
396500              .WORD   XP!!!!05
396600    ;         CALL SYMBOL(XP,YP,0.1,'SEC 10',0.,6)
396700              LDA     #.C000319 MOD .M
396800              STA     SYMBOL.6
396900              LDA     #.C000319/256
397000              STA     SYMBOL.6+1
397100              LDA     #.C000318 MOD .M
397200              STA     SYMBOL.5
397300              LDA     #.C000318/256
397400              STA     SYMBOL.5+1
397500              LDA     #.C000317 MOD .M
397600              STA     SYMBOL.4
397700              LDA     #.C000317/256
397800              STA     SYMBOL.4+1
397900              LDA     #.C000316 MOD .M
398000              STA     SYMBOL.3
398100              LDA     #.C000316/256
398200              STA     SYMBOL.3+1
398300              LDA     #YP!!!!05 MOD .M
398400              STA     SYMBOL.2
398500              LDA     #YP!!!!05/256
398600              STA     SYMBOL.2+1
398700              LDA     #XP!!!!05 MOD .M
398800              STA     SYMBOL.1
398900              LDA     #XP!!!!05/256
399000              STA     SYMBOL.1+1
399100              JSR     SYMBOL
399200    ;         XP=XP+0.7
399300    .MFFADD   SET     1
399400              JSR     .FFADD
399500              .BYTE   0
399600              .WORD   XP!!!!05,.C000320
```

```
394700              .WORD  XP!!!!05
394800         ;    CALL NUMBER(XP,YP,0.1,GATE2,0.0,3)
394900              LDA    #.C000004 MOD .M
400000              STA    NUMBER.6
400100              LDA    #.C000004/256
400200              STA    NUMBER.6+1
400300              LDA    #.C000322 MOD .M
400400              STA    NUMBER.5
400500              LDA    #.C000322/256
400600              STA    NUMBER.5+1
400700              LDA    GATE2!05
400800              STA    NUMBER.4
400900              LDA    GATE2!05+1
401000              STA    NUMBER.4+1
401100              LDA    #.C000321 MOD .M
401200              STA    NUMBER.3
401300              LDA    #.C000321/256
401400              STA    NUMBER.3+1
401500              LDA    #YP!!!!05 MOD .M
401600              STA    NUMBER.2
401700              LDA    #YP!!!!05/256
401800              STA    NUMBER.2+1
401900              LDA    #XP!!!!05 MOD .M
402000              STA    NUMBER.1
402100              LDA    #XP!!!!05/256
402200              STA    NUMBER.1+1
402300              JSR    NUMBER
402400         ;    XP=XP+0.6
402500  .MFFADD     SET    1
402600              JSR    .FFADD
402700              .BYTE  0
402800              .WORD  XP!!!!05,.C000323
402900              .WORD  XP!!!!05
403000         ;    CALL SYMBOL(XP,YP,0.1,'SEC',0.,3)
403100              LDA    #.C000004 MOD .M
403200              STA    SYMBOL.6
403300              LDA    #.C000004/256
403400              STA    SYMBOL.6+1
403500              LDA    #.C000326 MOD .M
403600              STA    SYMBOL.5
403700              LDA    #.C000326/256
403800              STA    SYMBOL.5+1
403900              LDA    #.C000325 MOD .M
404000              STA    SYMBOL.4
404100              LDA    #.C000325/256
404200              STA    SYMBOL.4+1
404300              LDA    #.C000324 MOD .M
404400              STA    SYMBOL.3
404500              LDA    #.C000324/256
404600              STA    SYMBOL.3+1
404700              LDA    #YP!!!!05 MOD .M
404800              STA    SYMBOL.2
404900              LDA    #YP!!!!05/256
405000              STA    SYMBOL.2+1
405100              LDA    #XP!!!!05 MOD .M
405200              STA    SYMBOL.1
405300              LDA    #XP!!!!05/256
405400              STA    SYMBOL.1+1
405500              JSR    SYMBOL
405600         ; C
405700         ; C CONVERT ALL C    DATA POINTS TO PLOTTER SCALE
405800         ; C
405900         ;    IF(AXMAX.LE.1.E-10)GO TO 180
406000  .MFFLE      SET    1
406100              JSR    .FFLE
406200              .BYTE  0
406300              .WORD  -AXMAX!05,.C000327
406400              ASL    A
406500              BCS    *+5
406600              JMP    .L000328
406700              JMP    .L000329
406800  .L000328    LDA    A
```

```
406900      ;           SCALE=HAXLEN/(2.0*AXMAX)
407000      .MFFMUL     SET     1
407100                  JSR     .FFMUL
407200                  .BYTE   0
407300                  .WORD   .C000330,-AXMAX!05
407400                  .WORD   .T000262
407500      .MFFDIV     SET     1
407600                  JSR     .FFDIV
407700                  .BYTE   0
407800                  .WORD   -HAXLE!05,.T000262
407900                  .WORD   SCALE!05
408000      ;           XORG=X+HAXLE2+0.5
408100      .MFFADD     SET     1
408200                  JSR     .FFADD
408300                  .BYTE   0
408400                  .WORD   -X!!!!!05,HAXLE2!05
408500                  .WORD   .T000262
408600      .MFFADD     SET     1
408700                  JSR     .FFADD
408800                  .BYTE   0
408900                  .WORD   .T000262,.C000331
409000                  .WORD   XORG!!05
409100      ;           YORG=Y-HAXLE2-0.5
409200      .MFFSUB     SET     1
409300                  JSR     .FFSUB
409400                  .BYTE   0
409500                  .WORD   -Y!!!!!05,HAXLE2!05
409600                  .WORD   .T000262
409700      .MFFSUB     SET     1
409800                  JSR     .FFSUB
409900                  .BYTE   0
410000                  .WORD   .T000262,.C000332
410100                  .WORD   YORG!!05
410200      ;           XP=IRX(L)*SCALE+XORG
410300                  LDA     #1
410400                  SEC
410500                  SBC     #1
410600                  ASL     A
410700                  ASL     A
410800                  ADC     IRX!!!05
410900                  STA     .T000264
411000                  LDA     #0
411100                  ADC     IRX!!!05+1
411200                  STA     .T000264+1
411300      .MFFMUL     SET     1
411400                  JSR     .FFMUL
411500                  .BYTE   0
411600                  .WORD   -.T000264,SCALE!05
411700                  .WORD   .T000262
411800      .MFFADD     SET     1
411900                  JSR     .FFADD
412000                  .BYTE   0
412100                  .WORD   .T000262,XORG!!05
412200                  .WORD   XP!!!05
412300      ;           YP=IRY(L)*SCALE+YORG
412400                  LDA     #1
412500                  SEC
412600                  SBC     #1
412700                  ASL     A
412800                  ASL     A
412900                  ADC     IRY!!!05
413000                  STA     .T000264
413100                  LDA     #0
413200                  ADC     IRY!!!05+1
413300                  STA     .T000264+1
413400      .MFFMUL     SET     1
413500                  JSR     .FFMUL
413600                  .BYTE   0
413700                  .WORD   -.T000264,SCALE!05
413800                  .WORD   .T000262
413900      .MFFADD     SET     1
414000                  JSR     .FFADD
```

```
414100                .BYTE 0
414200                .WORD .T000262,YORG!!!05
414300                .WORD YP!!!!05
414400       ;        CALL SYMBOL(XP,YP,0.05,133,0.,-1)
414500                LDA     #.C000110 MOD .M
414600                STA     SYMBOL.6
414700                LDA     #.C000110/256
414800                STA     SYMBOL.6+1
414900                LDA     #.C000335 MOD .M
415000                STA     SYMBOL.5
415100                LDA     #.C000335/256
415200                STA     SYMBOL.5+1
415300                LDA     #.C000334 MOD .M
415400                STA     SYMBOL.4
415500                LDA     #.C000334/256
415600                STA     SYMBOL.4+1
415700                LDA     #.C000333 MOD .M
415800                STA     SYMBOL.3
415900                LDA     #.C000333/256
416000                STA     SYMBOL.3+1
416100                LDA     #YP!!!!05 MOD .M
416200                STA     SYMBOL.2
416300                LDA     #YP!!!!05/256
416400                STA     SYMBOL.2+1
416500                LDA     #XP!!!!05 MOD .M
416600                STA     SYMBOL.1
416700                LDA     #XP!!!!05/256
416800                STA     SYMBOL.1+1
416900                JSR     SYMBOL
417000       ;        JEND=JDIF-1
417100                LDY     #1
417200                LDA     (JDIF!!!05),Y
417300                SEC
417400                SBC     #1
417500                STA     JEND!!05+1
417600                LDA     (JDIF!!!05)
417700                SBC     #0
417800                STA     JEND!!05
417900       ;        DO 160 J=1,JEND
418000                LDA     #0
418100                STA     J!!!!!05
418200                LDA     #1
418300                STA     J!!!!!05+1
418400                JMP     .L000338
418500  .L000336 EQU  *
418600                LDA     J!!!!!05+1
418700                CLC
418800                ADC     #1
418900                STA     J!!!!!05+1
419000                LDA     J!!!!!05
419100                ADC     #0
419200                STA     J!!!!!05
419300                LDA     JEND!!05+1
419400                CMP     J!!!!!05+1
419500                LDA     JEND!!05
419600                SBC     J!!!!!05
419700                BMI     .L000337
419800  .L000338 EQU  *
419900       ;        XP1=IRX(J+1)*SCALE+XORG
420000                LDA     J!!!!!05+1
420100                CLC
420200                ADC     #1
420300                STA     .T000262
420400                LDA     .T000262
420500                SEC
420600                SBC     #1
420700                ASL     A
420800                ASL     A
420900                ADC     IRX!!!05
421000                STA     .T000264
421100                LDA     #0
421200                ADC     IRX!!!05+1
```

```
421300              STA     .T000264+1
421400   .MFFMUL    SET     1
421500              JSR     .FFMUL
421600              .BYTE   0
421700              .WORD   -.T000264,SCALE!!05
421800              .WORD   .T000268
421900   .MFFADD    SET     1
422000              JSR     .FFADD
422100              .BYTE   0
422200              .WORD   .T000268,XORG!!05
422300              .WORD   XP1!!!05
422400   ;          YP1=TRY(J+1)*SCALE+YORG
422500              LDA     J!!!!!05+1
422600              CLC
422700              ADC     #1
422800              STA     .T000262
422900              LDA     .T000262
423000              SEC
423100              SBC     #1
423200              ASL     A
423300              ASL     A
423400              ADC     TRY!!!05
423500              STA     .T000264
423600              LDA     #0
423700              ADC     TRY!!!05+1
423800              STA     .T000264+1
423900   .MFFMUL    SET     1
424000              JSR     .FFMUL
424100              .BYTE   0
424200              .WORD   -.T000264,SCALE!!05
424300              .WORD   .T000268
424400   .MFFADD    SET     1
424500              JSR     .FFADD
424600              .BYTE   0
424700              .WORD   .T000268,YORG!!05
424800              .WORD   YP1!!!05
424900   ;          CALL SYMBOL(XP1,YP1,0.05,133,0.,-2)
425000              LDA     #.C000343 MOD .M
425100              STA     SYMBOL.6
425200              LDA     #.C000343/256
425300              STA     SYMBOL.6+1
425400              LDA     #.C000342 MOD .M
425500              STA     SYMBOL.5
425600              LDA     #.C000342/256
425700              STA     SYMBOL.5+1
425800              LDA     #.C000334 MOD .M
425900              STA     SYMBOL.4
426000              LDA     #.C000334/256
426100              STA     SYMBOL.4+1
426200              LDA     #.C000341 MOD .M
426300              STA     SYMBOL.3
426400              LDA     #.C000341/256
426500              STA     SYMBOL.3+1
426600              LDA     #YP1!!!05 MOD .M
426700              STA     SYMBOL.2
426800              LDA     #YP1!!!05/256
426900              STA     SYMBOL.2+1
427000              LDA     #XP1!!!05 MOD .M
427100              STA     SYMBOL.1
427200              LDA     #XP1!!!05/256
427300              STA     SYMBOL.1+1
427400              JSR     SYMBOL
427500   ;          CALL ARROW(XP,YP,XP1,YP1,0.1,0.5)
427600              LDA     #.C000345 MOD .M
427700              STA     ARROW.06
427800              LDA     #.C000345/256
427900              STA     ARROW.06+1
428000              LDA     #.C000344 MOD .M
428100              STA     ARROW.05
428200              LDA     #.C000344/256
428300              STA     ARROW.05+1
428400              LDA     #YP1!!!05 MOD .M
```

```
428500              STA     ARROW.04
428600              LDA     #YP1!!!05/256
428700              STA     ARROW.04+1
428800              LDA     #XP1!!!05 MOD .M
428900              STA     ARROW.03
429000              LDA     #XP1!!!05/256
429100              STA     ARROW.03+1
429200              LDA     #YP1!!!05 MOD .M
429300              STA     ARROW.02
429400              LDA     #YP1!!!05/256
429500              STA     ARROW.02+1
429600              LDA     #XP1!!!05 MOD .M
429700              STA     ARROW.01
429800              LDA     #XP1!!!05/256
429900              STA     ARROW.01+1
430000              JSR     ARROW
430100      ;       XP=XP1
430200      .MFLTASG SET    1
430300              JSR     .FLTASGN
430400              .BYTE   0
430500              .WORD   XP1!!!05
430600              .WORD   XP1!!!05
430700      ;       YP=YP1
430800      .MFLTASG SET    1
430900              JSR     .FLTASGN
431000              .BYTE   0
431100              .WORD   YP1!!!05
431200              .WORD   YP1!!!05
431300      ; 160   CONTINUE
431400      .L000340 EQU    *
431500              JMP     .L000336
431600      .L000337 EQU    *
431700      ; 180   RETURN
431800      .L000329 EQU    *
431900              JMP     .R000260
432000      ;       END
432100      .R000260 RTS
525100      ;       SUBROUTINE NLREAD(JDSRN,JCNCAT,NCNCAT,JCOM,IMAG,IPH,IIPH,IAC,
525200      .NLREAD EQU     *
525300      JDSRN!07 EQU    .NLREAD.1
525400      JCNCAT!07 EQU   .NLREAD.2
525500      NCNCAT!07 EQU   .NLREAD.3
525600      JCOM!!!07 EQU   .NLREAD.4
525700      IMAG!!!07 EQU   .NLREAD.5
525800      IPH!!!07 EQU    .NLREAD.6
525900      IIPH!!!07 EQU   .NLREAD.7
526000      IAC!!!07 EQU    .NLREAD.8
526100      ;      1 IRWIN,RSTREC,IDEBUG)
526200      IRWIN!07 EQU    .NLREAD.9
526300      RSTREC!07 EQU   .NLREAD.0
526400      IDEBUG!07 EQU   .NLREAD.1
526500      ; C
526600      ; C SUBROUTINE NLREAD INITIALIZES AND READS NAMELIST VARIABLES.
526700      ; C
526800      ;       INTEGER ICNCAT(3),JCNCAT(3),IMAG(2),IPH(2),IIPH(2),IAC(2),
526900      ;      1 IUPT(2),IRWG,PLOTER,PAPER,IBULD,ISPEED
527000      ; C    1 IUPT(2),IRWG,PLOTER/1/,PAPER/1/,IBULD/-99/,ISPEED/-99/
527100      ; C    REAL*4 PEN1/'OBLK'/,XPORT/9.7/,YDISPL/-99./,CPAPER/'501'/
527200      ;       REAL*4 PEN1,XPORT,YDISPL,CPAPER
527300      ;       LOGICAL CHGND(7)
527400      ;       REAL DEBUG
527500      ; C     NAMELIST/PHASSD/IDSRN,NCNCAT,ICNCAT,ICOM,IUPT,NWIN,DEBUG,
527600      ; C    1 CHGND,PLOTER,PAPER,XPORT,YDISPL,IBULD,ISPEED,PEN1,CPAPER,
527700      ; C    2 STRECH
527800      ; C
527900      ;       DEBUG=0.0
528000      .MFLTASG SET    1
528100              JSR     .FLTASGN
528200              .BYTE   0
528300              .WORD   .C000591
528400              .WORD   DEBUG!07
```

```
528500      ;         IDSRN=40
528600                LDA      #0
528700                STA      IDSRN!07
528800                LDA      #40
528900                STA      IDSRN!07+1
529000      ;         NCNCAT=3
529100                LDA      #0
529200                STA      NCNCAT07
529300                LDA      #3
529400                STA      NCNCAT07+1
529500      ;         ICNCAT(1)=41
529600                LDA      #1
529700                ASL      A
529800                STA      .T000392
529900                LDA      #0
530000                LDX      .T000392
530100                STA      ICNCAT07-2,X
530200                LDA      #41
530300                STA      ICNCAT07-1,X
530400      ;         ICNCAT(2)=42
530500                LDA      #2
530600                ASL      A
530700                STA      .T000392
530800                LDA      #0
530900                LDX      .T000392
531000                STA      ICNCAT07-2,X
531100                LDA      #42
531200                STA      ICNCAT07-1,X
531300      ;         ICNCAT(3)=43
531400                LDA      #3
531500                ASL      A
531600                STA      .T000392
531700                LDA      #0
531800                LDX      .T000392
531900                STA      ICNCAT07-2,X
532000                LDA      #43
532100                STA      ICNCAT07-1,X
532200      ;         ICOM=0
532300                LDA      #0
532400                STA      ICOM!07
532500                LDA      #0
532600                STA      ICOM!07+1
532700      ;         IOPT(1)=0
532800                LDA      #1
532900                ASL      A
533000                STA      .T000392
533100                LDA      #0
533200                LDX      .T000392
533300                STA      IOPT!07-2,X
533400                LDA      #0
533500                STA      IOPT!07-1,X
533600      ;         IOPT(2)=0
533700                LDA      #2
533800                ASL      A
533900                STA      .T000392
534000                LDA      #0
534100                LDX      .T000392
534200                STA      IOPT!07-2,X
534300                LDA      #0
534400                STA      IOPT!07-1,X
534500      ;         NWIN=0
534600                LDA      #0
534700                STA      NWIN!07
534800                LDA      #0
534900                STA      NWIN!07+1
535000      ;         STRECH=10.0
535100      ; C
535200      ; C       READ(80,PHAS30)
535300      ; C
535400      .NFLTASG  SET      1
535500                JSR      .FLTASG
535600                .BYTE    0
535700                .WORD    .C000398
```

```
535800                  .WORD STRECH07
535900       ;          IDEBUG=INT(LEBUG+.5)
536000       .MFFADD    SET   1
536100                  JSR   .FFADD
536200                  .BYTE 0
536300                  .WORD DEBUG07,.C000399
536400                  .WORD .I000400
536500                  LDA   #.I000400 MOD .M
536600                  STA   INT.0001
536700                  LDA   #.I000400/256
536800                  STA   INT.0001+1
536900                  LDA   #.I000392 MOD .M
537000                  STA   INT.0000
537100                  LDA   #.I000392/256
537200                  STA   INT.0000+1
537300                  JSR   INT
537400                  LDA   .I000392
537500                  STA   (IDEBUG07)
537600                  LDA   .I000392+1
537700                  LDY   #1
537800                  STA   (IDEBUG07),Y
537900       ;          IF(IDEBUG.GT.0)CALL ERDUMP(207)
538000                  LDA   #0
538100                  LDY   #1
538200                  CMP   (IDEBUG07),Y
538300                  LDA   #0
538400                  SBC   (IDEBUG07)
538500                  BMI   .L000403
538600                  JMP   .L000402
538700       .L000403 EQU  *
538800                  LDA   #.C000404 MOD .M
538900                  STA   ERDUMP.1
539000                  LDA   #.C000404/256
539100                  STA   ERDUMP.1+1
539200                  JSR   ERDUMP
539300       .L000402 EQU  *
539400       ;          JDSRN=IDSRN
539500                  LDA   IDSRN!07
539600                  STA   (JDSRN!07)
539700                  LDA   IDSRN!07+1
539800                  LDY   #1
539900                  STA   (JDSRN!07),Y
540000       ;          MCNCAT=NCNCAT
540100                  LDA   NCNCAT07
540200                  STA   (MCNCAT07)
540300                  LDA   NCNCAT07+1
540400                  LDY   #1
540500                  STA   (MCNCAT07),Y
540600       ;          DO 100 I=1,3
540700                  LDA   #0
540800                  STA   I!!!!!07
540900                  LDA   #1
541000                  STA   I!!!!!07+1
541100                  JMP   .L000407
541200       .L000405 EQU  *
541300                  LDA   I!!!!!07+1
541400                  CLC
541500                  ADC   #1
541600                  STA   I!!!!!07+1
541700                  LDA   I!!!!!07
541800                  ADC   #0
541900                  STA   I!!!!!07
542000                  LDA   #3
542100                  CMP   I!!!!!07+1
542200                  LDA   #0
542300                  SBC   I!!!!!07
542400                  BMI   .L000405
542500       .L000407 EQU  *
542600       ;          JCNCAT(I)=ICNCAT(I)
542700                  LDA   I!!!!!07+1
542800                  ASL   A
542900                  STA   .I000392
```

```
545000              LDA     I!!!!!07+1
545100              ASL     A
545200              TAX
545300              LDA     ICNCAT07-2,X
545400              LDY     .L000392
545500              DEY
545600              DEY
545700              STA     (JCNCAT07),Y
545800              LDA     ICNCAT07-1,X
545900              INY
544000              STA     (JCNCAT07),Y
544100      ;  100  CONTINUE
544200      .L000409 EQU     *
544300              JMP     .L000405
544400      .L000406 EQU     *
544500      ;       JCUM=ICUM
544600              LDA     ICUM!!07
544700              STA     (JCUM!!07)
544800              LDA     ICUM!!07+1
544900              LDY     #1
545000              STA     (JCUM!!07),Y
545100      ;       RSTREC=STRECH
545200      ; C
545300      ; C     WRITE(6,110)IDSRN,NCNCAT,(ICNCAT(I),I=1,3),ICUM,(IOPT(I),I=1,2)
545400      ; C110  FORMAT('0*** PHAS3D NAMELIST ***'/' IDSRN =',I12,I5,' NCNCAT =
545500      ; C     1 I50,I5,' ICNCAT =',I50,3I5/' ICUM =',I12,I5/' IOPT =',I12,2I5)
545600      ; C     WRITE(6,115)NWIN,STRECH
545700      ; C115  FORMAT(' NWIN =',I12,I5/' STRECH=',I12,E10.1)
545800      ; C
545900      ; C ANALYZE IOPT
546000      ; C
546100      .MFLTASG SET     1
546200              JSR     .FLTASGN
546300              .BYTE 0
546400              .WORD STRECH07
546500              .WORD -RSTREC07
546600      ;       DO 180 I=1,2
546700              LDA     #0
546800              STA     I!!!!!07
546900              LDA     #1
547000              STA     I!!!!!07+1
547100              JMP     .L000412
547200      .L000410 EQU     *
547300              LDA     I!!!!!07+1
547400              CLC
547500              ADC     #1
547600              STA     I!!!!!07+1
547700              LDA     I!!!!!07
547800              ADC     #0
547900              STA     I!!!!!07
548000              LDA     #2
548100              CMP     I!!!!!07+1
548200              LDA     #0
548300              SBC     I!!!!!07
548400              BMI     .L000411
548500      .L000412 EQU     *
548600      ;       IMAG(I)=0
548700              LDA     I!!!!!07+1
548800              ASL     A
548900              STA     .L000392
549000              LDA     #0
549100              LDY     .L000392
549200              DEY
549300              DEY
549400              STA     (IMAG!!07),Y
549500              LDA     #0
549600              INY
549700              STA     (IMAG!!07),Y
549800      ;       IPH(I)=0
549900              LDA     I!!!!!07+1
550000              ASL     A
550100              STA     .L000392
```

```
550200            LDA    #0
550300            LDY    .T000392
550400            DEY
550500            DEY
550600            STA    (IPH!!!07),Y
550700            LDA    #0
550800            INY
550900            STA    (IPH!!!07),Y
551000    ;   IIPH(I)=0
551100            LDA    I!!!!!07+1
551200            ASL    A
551300            STA    .T000392
551400            LDA    #0
551500            LDY    .T000392
551600            DEY
551700            DEY
551800            STA    (IIPH!!07),Y
551900            LDA    #0
552000            INY
552100            STA    (IIPH!!07),Y
552200    ;   IAC(I)=0
552300            LDA    I!!!!!07+1
552400            ASL    A
552500            STA    .T000392
552600            LDA    #0
552700            LDY    .T000392
552800            DEY
552900            DEY
553000            STA    (IAC!!!07),Y
553100            LDA    #0
553200            INY
553300            STA    (IAC!!!07),Y
553400    ;   IF(IOPT(I).LT.8 )GO TO 120
553500            LDA    I!!!!!07+1
553600            ASL    A
553700            TAX
553800            LDA    IOPT!!07-1,X
553900            CMP    #0
554000            LDA    IOPT!!07-2,X
554100            SBC    #0
554200            BMI    .L000417
554300            JMP    .L000418
554400    .L000417 EQU    *
554500            JMP    .L000418
554600    .L000418 EQU    *
554700    ;         IAC(I)=1
554800            LDA    I!!!!!07+1
554900            ASL    A
555000            STA    .T000392
555100            LDA    #0
555200            LDY    .T000392
555300            DEY
555400            DEY
555500            STA    (IAC!!!07),Y
555600            LDA    #1
555700            INY
555800            STA    (IAC!!!07),Y
555900    ;         IOPT(I)=IOPT(I)-8
556000            LDA    I!!!!!07+1
556100            ASL    A
556200            STA    .T000392
556300            LDA    I!!!!!07+1
556400            ASL    A
556500            TAX
556600            LDA    IOPT!!07-1,X
556700            SEC
556800            SBC    #8
556900            LDY    .T000392
557000            STA    IOPT!!07-1,Y
557100            LDA    IOPT!!07-2,X
557200            SBC    #0
557300            STA    IOPT!!07-2,Y
```

```
557400      ; 120     IF(IOPT(I).LT.4)GO TO 140
557500      .L000418 EQU   *
557600               LDA   I!!!!!07+1
557700               ASL   A
557800               TAX
557900               LDA   IOPT!!07-1,X
558000               CMP   #4
558100               LDA   IOPT!!07-2,X
558200               SBC   #0
558300               BMI   .L000420
558400               JMP   .L000419
558500      .L000420 EQU   *
558600               JMP   .L000421
558700      .L000419 EQU   *
558800      ;        IPH(I)=1
558900               LDA   I!!!!!07+1
559000               ASL   A
559100               STA   .1000392
559200               LDA   #0
559300               LDY   .1000392
559400               DEY
559500               DEY
559600               STA   (IIPH!!07),Y
559700               LDA   #1
559800               INY
559900               STA   (IIPH!!07),Y
560000      ;        IOPT(I)=IOPT(I)-4
560100               LDA   I!!!!!07+1
560200               ASL   A
560300               STA   .1000392
560400               LDA   I!!!!!07+1
560500               ASL   A
560600               TAX
560700               LDA   IOPT!!07-1,X
560800               SEC
560900               SBC   #4
561000               LDY   .1000392
561100               STA   IOPT!!07-1,Y
561200               LDA   IOPT!!07-2,X
561300               SBC   #0
561400               STA   IOPT!!07-2,Y
561500      ; 140    IF(IOPT(I).LL.2)GO TO 160
561600      .L000421 EQU   *
561700               LDA   I!!!!!07+1
561800               ASL   A
561900               TAX
562000               LDA   IOPT!!07-1,X
562100               CMP   #2
562200               LDA   IOPT!!07-2,X
562300               SBC   #0
562400               BMI   .L000423
562500               JMP   .L000422
562600      .L000423 EQU   *
562700               JMP   .L000424
562800      .L000422 EQU   *
562900      ;        IPH(I)=1
563000               LDA   I!!!!!07+1
563100               ASL   A
563200               STA   .1000392
563300               LDA   #0
563400               LDY   .1000392
563500               DEY
563600               DEY
563700               STA   (IPH!!!07),Y
563800               LDA   #1
563900               INY
564000               STA   (IPH!!!07),Y
564100      ;        IOPT(I)=IOPT(I)-2
564200               LDA   I!!!!!07+1
564300               ASL   A
564400               STA   .1000392
564500               LDA   I!!!!!07+1
```

```
564600                  ASL     A
564700                  TAX
564800                  LDA     IOPT!!07-1,X
564900                  SEC
565000                  SBC     #2
565100                  LDY     .L000392
565200                  STA     IOPT!!07-1,Y
565300                  LDA     IOPT!!07-2,X
565400                  SBC     #0
565500                  STA     IOPT!!07-2,Y
565600          ; 160   IF(IOPT(I).LT.1)GO TO 180
565700          .L000424 EQU    *
565800                  LDA     I!!!!!07+1
565900                  ASL     A
566000                  TAX
566100                  LDA     IOPT!!07-1,X
566200                  CMP     #1
566300                  LDA     IOPT!!07-2,X
566400                  SBC     #0
566500                  BMI     .L000426
566600                  JMP     .L000425
566700          .L000426 EQU    *
566800                  JMP     .L000414
566900          .L000425 EQU    *
567000          ;       JMAG(I)=1
567100                  LDA     I!!!!!07+1
567200                  ASL     A
567300                  STA     .L000392
567400                  LDA     #0
567500                  LDY     .L000392
567600                  DEY
567700                  CLY
567800                  STA     (IMAG!!07),Y
567900                  LDA     #1
568000                  INY
568100                  STA     (IMAG!!07),Y
568200          ; 180   CONTINUE
568300          .L000414 EQU    *
568400                  JMP     .L000410
568500          .L000411 EQU    *
568600          ;       INWIN=NWIN
568700          ; C
568800          ; C CHECK ICOM
568900          ; C
569000                  LDA     NWIN!!07
569100                  STA     (INWIN!07)
569200                  LDA     NWIN!!07+1
569300                  LDY     #1
569400                  STA     (INWIN!07),Y
569500          ;       IF((ICOM.GE.0).AND.(ICOM.LT.4))GO TO 240
569600                  LDA     ICOM!!07+1
569700                  CMP     #4
569800                  LDA     ICOM!!07
569900                  SBC     #0
570000                  BMI     .L000428
570100                  LDA     #0
570200                  BEQ     *+4
570300          .L000428 LDA    #80H
570400                  STA     .L000393
570500                  LDA     #0
570600                  CMP     ICOM!!07+1
570700                  LDA     #0
570800                  SBC     ICOM!!07
570900                  BMI     .L000430
571000                  LDA     #0
571100                  BEQ     *+4
571200          .L000430 LDA    #80H
571300                  AND     .L000393
571400                  ASL     A
571500                  BCS     *+5
571600                  JMP     .L000431
571700                  JMP     .L000432
```

```
571800        .L000431 EQU     *
571900     ;           IF(IOPT(2).GT.0)GO TO 240
572000                 LDA     #2
572100                 ASL     A
572200                 STA     .T000393
572300                 LDA     #0
572400                 LDX     .T000393
572500                 CMP     IOPT!!07-1,X
572600                 LDA     #0
572700                 SBC     IOPT!!07-2,X
572800                 BMI     .L000434
572900                 JMP     .L000433
573000        .L000434 EQU     *
573100                 JMP     .L000432
573200        .L000433 EQU     *
573300     ; C         WRITE(6,210)
573400     ; C210      FORMAT(' *** VALUE OF ICOM IS ILLEGAL ***')
573500     ;           CALL ABORT(16)
573600                 LDA     #.C000011 MOD .M
573700                 STA     ABORT.01
573800                 LDA     #.C000011/256
573900                 STA     ABORT.01+1
574000                 JSR     ABORT
574100     ; 240       CALL PARAM(DEBUG,CHGNO,PLOTER,PAPER,XPORT,YDISPL,IBOLD,
574200        .L000432 EQU     *
574300     ;         1 ISPEED,PEN1,CPAPER)
574400                 LDA     #CPAPER07 MOD .M
574500                 STA     PARAM.10
574600                 LDA     #CPAPER07/256
574700                 STA     PARAM.10+1
574800                 LDA     #PEN1!!07 MOD .M
574900                 STA     PARAM.09
575000                 LDA     #PEN1!!07/256
575100                 STA     PARAM.09+1
575200                 LDA     #ISPEED07 MOD .M
575300                 STA     PARAM.08
575400                 LDA     #ISPEED07/256
575500                 STA     PARAM.08+1
575600                 LDA     #IBOLD!07 MOD .M
575700                 STA     PARAM.07
575800                 LDA     #IBOLD!07/256
575900                 STA     PARAM.07+1
576000                 LDA     #YDISPL07 MOD .M
576100                 STA     PARAM.06
576200                 LDA     #YDISPL07/256
576300                 STA     PARAM.06+1
576400                 LDA     #XPORT!07 MOD .M
576500                 STA     PARAM.05
576600                 LDA     #XPORT!07/256
576700                 STA     PARAM.05+1
576800                 LDA     #PAPER!07 MOD .M
576900                 STA     PARAM.04
577000                 LDA     #PAPER!07/256
577100                 STA     PARAM.04+1
577200                 LDA     #PLOTER07 MOD .M
577300                 STA     PARAM.03
577400                 LDA     #PLOTER07/256
577500                 STA     PARAM.03+1
577600                 LDA     #CHGNO!07 MOD .M
577700                 STA     PARAM.02
577800                 LDA     #CHGNO!07/256
577900                 STA     PARAM.02+1
578000                 LDA     #DEBUG!07 MOD .M
578100                 STA     PARAM.01
578200                 LDA     #DEBUG!07/256
578300                 STA     PARAM.01+1
578400                 JSR     PARAM
578500     ; C         WRITE(6,310)CHGNO,PLOTER,PAPER,XPORT,YDISPL,IBOLD,ISPEED,
578600     ; C        +  PEN1,CPAPER
578700     ; C310      FORMAT(' CHGNO =',7A1/' PLOTER=',I10/' PAPER =',I10/' XPORT =',
578800     ; C       1 F10.0,/' YDISPL =',F10.3/' IBOLD =',I10/' ISPEED=',I10/
578900     ; C       2 ' PEN1  =',A4/' CPAPER=',A4)
```

```
579000    ;           CALL PNAME(R2,CHGNO,PLOTER,PAPER,XPORT,YDISPL,IHOLD,ISPEED,
579100    ;          +            CPAPER,PEN1)
579200              LDA     #PEN1!!07 MOD .M
579300              STA     PNAME.10
579400              LDA     #PEN1!!07/256
579500              STA     PNAME.10+1
579600              LDA     #CPAPER07 MOD .M
579700              STA     PNAME.09
579800              LDA     #CPAPER07/256
579900              STA     PNAME.09+1
580000              LDA     #ISPEED07 MOD .M
580100              STA     PNAME.08
580200              LDA     #ISPEED07/256
580300              STA     PNAME.08+1
580400              LDA     #IHOLD!07 MOD .M
580500              STA     PNAME.07
580600              LDA     #IHOLD!07/256
580700              STA     PNAME.07+1
580800              LDA     #YDISPL07 MOD .M
580900              STA     PNAME.06
581000              LDA     #YDISPL07/256
581100              STA     PNAME.06+1
581200              LDA     #XPORT!07 MOD .M
581300              STA     PNAME.05
581400              LDA     #XPORT!07/256
581500              STA     PNAME.05+1
581600              LDA     #PAPER!07 MOD .M
581700              STA     PNAME.04
581800              LDA     #PAPER!07/256
581900              STA     PNAME.04+1
582000              LDA     #PLOTER07 MOD .M
582100              STA     PNAME.03
582200              LDA     #PLOTER07/256
582300              STA     PNAME.03+1
582400              LDA     #CHGNO!07 MOD .M
582500              STA     PNAME.02
582600              LDA     #CHGNO!07/256
582700              STA     PNAME.02+1
582800              LDA     #.C000435 MOD .M
582900              STA     PNAME.01
583000              LDA     #.C000435/256
583100              STA     PNAME.01+1
583200              JSR     PNAME
583300    ; C
583400    ; 800 CONTINUE
583500    .C000436 EQU     *
583600    ; C800 IF(IDEBUG.GT.0)WRITE(6,820)RSTREC
583700    ; C820 FORMAT(' RSTREC IN SUBROUTINE NCREAD=',E20.5)
583800    ;           RETURN
583900              JMP     .R000390
584000    ;           END
584100    .R000390 RTS
584200    ;           SUBROUTINE PARAM(DEBUG,CHGNO,PLOTER,PAPER,
584300    PARAM   EQU     *
584400    DEBUG!08 EQU    PARAM.01
584500    CHGNO!08 EQU    PARAM.02
584600    PLOTER08 EQU    PARAM.03
584700    PAPER!08 EQU    PARAM.04
584800    ;          +  XPORT,YDISPL,IHOLD,ISPEED,PEN1,CPAPER)
584900    XPORT!08 EQU    PARAM.05
585000    YDISPL08 EQU    PARAM.06
585100    IHOLD!08 EQU    PARAM.07
585200    ISPEED08 EQU    PARAM.08
585300    PEN1!!08 EQU    PARAM.09
585400    CPAPER08 EQU    PARAM.10
585500    ; C
585600    ; C PARAM CHECKS VALUES OF PARAMETERS IN NAMELIST FKPLT.
585700    ; C
585800    ;           LOGICAL CHGNO(7)
585900    ;           INTEGER PLOTER,PAPER
586000    ; C
586100    ; C110 FORMAT('0*** NSAMMX =',I10,' ***')
```

```
586200      ; C120     FORMAT('0*** NIRCMX =',I10,' ***')
586300      ; C130     FORMAT('0*** PLOTER =',I10,' ***')
586400      ; C140     FORMAT('0*** PAPER =',I10,' ***')
586500      ;          IF((PLOTER.GE.1).AND.(PLOTER.LE.7))GO TO 260
586600                 LDA       #7
586700                 LDY       #1
586800                 CMP       (PLOTER!08),Y
586900                 LDA       #0
587000                 SBC       (PLOTER!08)
587100                 BMI       .L000440
587200                 LDA       #80H
587300                 BNE       *+4
587400      .L000440   LDA       #0
587500                 LDY       #1
587600                 STA       .T000439
587700                 LDA       (PLOTER!08),Y
587800                 CMP       #1
587900                 LDA       (PLOTER!08)
588000                 SBC       #0
588100                 BMI       .L000442
588200                 LDA       #80H
588300                 BNE       *+4
588400      .L000442   LDA       #0
588500                 AND       .T000439
588600                 ASL       A
588700                 BCS       *+5
588800                 JMP       .L000445
588900                 JMP       .L000446
589000      .L000445   EQU       *
589100      ; C        WRITE(6,130)PLOTER
589200      ;          GO TO 1000
589300                 JMP       .L000447
589400      ; 260      IF((PAPER=0).OR.(PAPER=1))GO TO 320
589500      .L000446   EQU       *
589600                 LDY       #1
589700                 LDA       (PAPER!08),Y
589800                 CMP       #1
589900                 BNE       .L000448
590000                 LDA       (PAPER!08)
590100                 CMP       #0
590200                 BNE       .L000448
590300      .L000449   LDA       #80H
590400                 BNE       *+4
590500      .L000448   LDA       #0
590600                 LDY       #1
590700                 STA       .T000439
590800                 LDA       (PAPER!08),Y
590900                 CMP       #0
591000                 BNE       .L000450
591100                 LDA       (PAPER!08)
591200                 CMP       #0
591300                 BNE       .L000450
591400      .L000451   LDA       #80H
591500                 BNE       *+4
591600      .L000450   LDA       #0
591700                 ORA       .T000439
591800                 ASL       A
591900                 BCS       *+5
592000                 JMP       .L000452
592100                 JMP       .L000453
592200      .L000452   EQU       *
592300      ; C        WRITE(6,140)PAPER
592400      ;          GO TO 1000
592500                 JMP       .L000447
592600      ; 320      IF(IBOLD.NE.-99)GO TO 340
592700      .L000453   EQU       *
592800                 LDY       #1
592900                 LDA       (IBOLD!08),Y
593000                 CMP       .C000455+1
593100                 BNE       .L000457
593200                 LDA       (IBOLD!08)
593300                 CMP       .C000455
```

```
593400              BEQ     .L000456
593500      .L000457 EQU    *
593600              JMP     .L000458
593700      .L000456 EQU    *
593800       ;       IF(PLOTER=1)IHOLD=25
593900              LDY     #1
594000              LDA     (PLOTER08),Y
594100              CMP     #1
594200              BNE     .L000459
594300              LDA     (PLOTER08)
594400              CMP     #0
594500              BNE     .L000459
594600              LDA     #0
594700              STA     (IHOLD08)
594800              LDA     #25
594900              LDY     #1
595000              STA     (IHOLD08),Y
595100      .L000459 EQU    *
595200       ;       IF(PLOTER.NE.1)IHOLD=0
595300              LDY     #1
595400              LDA     (PLOTER08),Y
595500              CMP     #1
595600              BNE     .L000463
595700              LDA     (PLOTER08)
595800              CMP     #0
595900              BEQ     .L000462
596000      .L000463 EQU    *
596100              LDA     #0
596200              STA     (IHOLD08)
596300              LDA     #0
596400              LDY     #1
596500              STA     (IHOLD08),Y
596600      .L000462 EQU    *
596700       ; 340   IF(ISPEED.NE.-99)GO TO 360
596800      .L000458 EQU    *
596900              LDY     #1
597000              LDA     (ISPEED08),Y
597100              CMP     .C000455+1
597200              BNE     .L000465
597300              LDA     (ISPEED08)
597400              CMP     .C000455
597500              BEQ     .L000464
597600      .L000465 EQU    *
597700              JMP     .L000466
597800      .L000464 EQU    *
597900       ;       IF(PLOTER=1)ISPEED=1
598000              LDY     #1
598100              LDA     (PLOTER08),Y
598200              CMP     #1
598300              BNE     .L000467
598400              LDA     (PLOTER08)
598500              CMP     #0
598600              BNE     .L000467
598700              LDA     #0
598800              STA     (ISPEED08)
598900              LDA     #1
599000              LDY     #1
599100              STA     (ISPEED08),Y
599200      .L000467 EQU    *
599300       ;       IF(PLOTER.NE.1)ISPEED=0
599400              LDY     #1
599500              LDA     (PLOTER08),Y
599600              CMP     #1
599700              BNE     .L000470
599800              LDA     (PLOTER08)
599900              CMP     #0
600000              BEQ     .L000469
600100      .L000470 EQU    *
600200              LDA     #0
600300              STA     (ISPEED08)
600400              LDA     #0
600500              LDY     #1
```

```
600600              STA    (ISPEED08),Y
600700     .L000469 EQU    *
600800  ; 380       IF(YDISPL.NE.-99.)GO TO 380
600900     .L000450 EQU    *
601000     .FFUMIN  SET    1
601100              JSR    .FUNMIN
601200              .BYTE  0
601300              .WORD  .C000471
601400              .WORD  .L000472
601500     .FFNE    SET    1
601600              JSR    .FFNE
601700              .BYTE  0
601800              .WORD  -YDISPL08,.L000472
601900              ASL    A
602000              BCS    *+5
602100              JMP    .L000475
602200              JMP    .L000476
602300     .L000475 EQU    *
602400  ;           IF(PLOTER=1)YDISPL=0.6
602500              LDY    #1
602600              LDA    (PLOTER08),Y
602700              CMP    #1
602800              BNE    .L000477
602900              LDA    (PLOTER08)
603000              CMP    #0
603100              BNE    .L000477
603200  ; C         IF(PLOTER.NE.1)YDISPL=0.0
603300     .MFLTASG SET    1
603400              JSR    .FLTASGN
603500              .BYTE  0
603600              .WORD  .C000479
603700              .WORD  -YDISPL08
603800     .L000477 EQU    *
603900  ; 380       CONTINUE
604000     .L000476 EQU    *
604100  ; C380      IF(DEBUG.GT.0)WRITE(6,600)DEBUG,CHGNO,PLOTER,
604200  ; C         + PAPER,XPORT,YDISPL,IBOLD,ISPEED,PEN1,CPAPER
604300  ; C600      FORMAT(120,'PHAS3D NAMELIST'//T10,'DEBUG',T20,
604400  ; C         1 F10.0/T10,'CHGNO',T20,7A1/
604500  ; C         2 T10,'PLOTER',T20,I10/T10,'PAPER',T20,I10/T10,'XPORT',T20,
604600  ; C         3 F10.0/T10,'YDISPL',T20,F10.3/T10,'IBOLD',T20,I10/T10,'ISPEED',
604700  ; C         4 T20,I10/T10,'PEN1',T20,A4/T10,'CPAPER',T20,A4)
604800  ;           GO TO 1040
604900              JMP    .L000480
605000  ; 1000      CONTINUE
605100     .L000487 EQU    *
605200  ; C1000     WRITE(6,1020)
605300  ; C1020     FORMAT(' *** ERROR IN PHAS3D NAMELIST PARAMETER - ABORT ***')
605400  ;           CALL ABORT(16)
605500              LDA    #.C000011.MOD.M
605600              STA    ABORT.01
605700              LDA    #.C000011/256
605800              STA    ABORT.01+1
605900              JSR    ABORT
606000  ; 1040      RETURN
606100     .L000480 EQU    *
606200              JMP    .R000437
606300  ;           END
606400     .R000437 RTS
  900  ;           SUBROUTINE PLHODO(IDSHN,TRX,TRY,TRZ,XPROJ,YPROJ,ZPROJ,INDEX,
 1000     PLHODO   EQU    *
 1100     IDSHN!01 EQU    PLHODO.1
 1200     TRX!!!01 EQU    PLHODO.2
 1300     TRY!!!01 EQU    PLHODO.3
 1400     TRZ!!!01 EQU    PLHODO.4
 1500     XPROJ!01 EQU    PLHODO.5
 1600     YPROJ!01 EQU    PLHODO.6
 1700     ZPROJ!01 EQU    PLHODO.7
 1800     INDEX!01 EQU    PLHODO.8
 1900  ;           + ITRACS,MASTER,STRECH,IDEBUG)
 2000     ITRACS!01 EQU   PLHODO.9
 2100     MASTER!01 EQU   PLHODO.0
```

```
2200       STRECH01 EQU   PLHOD0.1
2300       IDEBUG01 EQU   PLHOD0.2
2400    ;          REAL*8 GATES(50),TRX(1),TRY(1),TRZ(1),XPROJ(1),YPROJ(1),FLU(2),
2500    ;        +        TRACID(5000),CH,CV,CT,ZPROJ(1)
2600    ;          INTEGER INDEX(5000),TRNO,MASTER(1)
2700    ; C
2800    ; C  THIS SUBROUTINE CONTROLS ALL THE PLOTS.
2900    ; C
3000    ; C   IDFSN   - DIRACC FILE UNIT NO.
3100    ; C   TRX, TRY, TRZ - SPACE TO BE USED FOR TRACES.
3200    ; C   XPROJ, YPROJ  - SPACE TO BE USED FOR PROJECTION PLOT.
3300    ; C   TRACID  - ARRAY TO BE USED FOR TRACID.
3400    ; C   SAMINT  - SAMPLE INTERVAL IN MS.
3500    ; C   NTRACS  - TOTAL NO. OF TRACES IN DIRACC FILE.
3600    ; C   INDEX   - ARRAY OF TRACE INDICES ALREADY SORTED.
3700    ; C   SCALE   - FLAG TO SCALE TRACES.
3800    ; C  PREPARE FOR PLOT
3900    ; C
4000    ; C         IF(IDEBUG.GT.0)WRITE(6,80)IDSRN,NTRACS,STRECH
4100    ; C80      FORMAT(' ',//,' SUBROUTINE PLHOD0 ***',/,' IDSRN=',I4,' NTRACS=',I4,
4200    ; C       +      ' STRECH=',E20.5)
4300    ;          CALL HEAD('FSAMIN',MASTER,FLU,NX,0)
4400             LDA   #.C000005 MOD .M
4500             STA   HEAD.005
4600             LDA   #.C000005/256
4700             STA   HEAD.005+1
4800             LDA   #NX!!!01 MOD .M
4900             STA   HEAD.004
5000             LDA   #NX!!!01/256
5100             STA   HEAD.004+1
5200             LDA   #FLU!!!01 MOD .M
5300             STA   HEAD.003
5400             LDA   #FLU!!!01/256
5500             STA   HEAD.003+1
5600             LDA   MASTER01
5700             STA   HEAD.002
5800             LDA   MASTER01+1
5900             STA   HEAD.002+1
6000             LDA   #.C000002 MOD .M
6100             STA   HEAD.001
6200             LDA   #.C000002/256
6300             STA   HEAD.001+1
6400             JSR   HEAD
6500    ;        SAMINT=FLU(1)
6600             LDA   #1
6700             ASL   A
6800             ASL   A
6900             CLC
7000             ADC   #(FLU!!!01-4) MOD .M
7100             STA   .T000005
7200             LDA   #0
7300             ADC   #(FLU!!!01-4)/256
7400             STA   .T000005+1
7500             MFL!ASG SET 1
7600             JSR   .FLIASGN
7700             .BYTE 0
7800             .WORD .T000005
7900             .WORD SAMIN101
8000    ;        CALL PTYPE(8)
8100             LDA   #.C000007 MOD .M
8200             STA   PTYPE.01
8300             LDA   #.C000007/256
8400             STA   PTYPE.01+1
8500             JSR   PTYPE
8600    ;        CALL BKSET(IBLK1)
8700             LDA   #IBLK1!01 MOD .M
8800             STA   BKSET.01
8900             LDA   #IBLK1!01/256
9000             STA   BKSET.01+1
9100             JSR   BKSET
9200    ;        XORG=0.
9300    ; C
```

```
 9400      ; C ENTER LOOP TO CREAD &PLOTH NAMELIST, AND CREAD IN TRACES.
 9500      ; C
 9600           .MELTASG  SET   1
 9700                     JSR   .FLTASGN
 9800                     .BYTE 0
 9900                     .WORD .C000008
10000                     .WORD XORG1!01
10100      ;  100    CALL CHKPLT(IRNO,GATES,TSC,IRSP,AXLEN,I1,I2,ENDPLT,THREED,NGAT
10200           .C000009  EQU   .
10300      ;       + N&IN,XORG)
10400                     LDA   #XORG1!01 MOD .M
10500                     STA   CHKPLT.2
10600                     LDA   #XORG1!01/256
10700                     STA   CHKPLT.2+1
10800                     LDA   #N&IN1!01 MOD .M
10900                     STA   CHKPLT.1
11000                     LDA   #N&IN1!01/256
11100                     STA   CHKPLT.1+1
11200                     LDA   #NGATES!01 MOD .M
11300                     STA   CHKPLT.0
11400                     LDA   #NGATES!01/256
11500                     STA   CHKPLT.0+1
11600                     LDA   #THREED!01 MOD .M
11700                     STA   CHKPLT.9
11800                     LDA   #THREED!01/256
11900                     STA   CHKPLT.9+1
12000                     LDA   #ENDPLT!01 MOD .M
12100                     STA   CHKPLT.8
12200                     LDA   #ENDPLT!01/256
12300                     STA   CHKPLT.8+1
12400                     LDA   #I2!!!!01 MOD .M
12500                     STA   CHKPLT.7
12600                     LDA   #I2!!!!01/256
12700                     STA   CHKPLT.7+1
12800                     LDA   #I1!!!!01 MOD .M
12900                     STA   CHKPLT.6
13000                     LDA   #I1!!!!01/256
13100                     STA   CHKPLT.6+1
13200                     LDA   #AXLEN!01 MOD .M
13300                     STA   CHKPLT.5
13400                     LDA   #AXLEN!01/256
13500                     STA   CHKPLT.5+1
13600                     LDA   #IRSP!!01 MOD .M
13700                     STA   CHKPLT.4
13800                     LDA   #IRSP!!01/256
13900                     STA   CHKPLT.4+1
14000                     LDA   #TSC!!!01 MOD .M
14100                     STA   CHKPLT.3
14200                     LDA   #TSC!!!01/256
14300                     STA   CHKPLT.3+1
14400                     LDA   #GATES!01 MOD .M
14500                     STA   CHKPLT.2
14600                     LDA   #GATES!01/256
14700                     STA   CHKPLT.2+1
14800                     LDA   #IRNO!!01 MOD .M
14900                     STA   CHKPLT.1
15000                     LDA   #IRNO!!01/256
15100                     STA   CHKPLT.1+1
15200                     JSR   CHKPLT
15300      ;         ;CALL GETLU(IDSRN,'TRACID',TRACID,NLU,0)
15400                     LDA   #.C000005 MOD .M
15500                     STA   GETLU.05
15600                     LDA   #.C000005/256
15700                     STA   GETLU.05+1
15800                     LDA   #NLU!!!01 MOD .M
15900                     STA   GETLU.04
16000                     LDA   #NLU!!!01/256
16100                     STA   GETLU.04+1
16200                     LDA   #TRACID01 MOD .M
16300                     STA   GETLU.03
16400                     LDA   #TRACID01/256
16500                     STA   GETLU.03+1
```

```
16600            LDA     #.C000010 MOD .M
16700            STA     GETLU.02
16800            LDA     #.C000010/256
16900            STA     GETLU.02+1
17000            LDA     IDSRN!01
17100            STA     GETLU.01
17200            LDA     IDSRN!01+1
17300            STA     GETLU.01+1
17400            JSR     GETLU
17500      ;             NTR=NTRACS/3
17600   .MIDLV   SET     1
17700            JSR     .IDIV
17800            .BYTE   5
17900            .WORD   =NTRACS01,.C000011
18000            .WORD   NTR!!!01
18100      ;             INX=INDEX(TRNO)
18200            LDA     TRNO!!!01+1
18300            ASL     A
18400            TAY
18500            DEY
18600            DEY
18700            LDA     (INDEX!01),Y
18800            STA     INX!!!01
18900            INY
19000            LDA     (INDEX!01),Y
19100            STA     INX!!!01+1
19200      ;             INZ=INDEX(TRNO+NTR)
19300            LDA     TRNO!!!01+1
19400            CLC
19500            ADC     NTR!!!01+1
19600            ASL     A
19700            TAY
19800            DEY
19900            DEY
20000            LDA     (INDEX!01),Y
20100            STA     INZ!!!01
20200            INY
20300            LDA     (INDEX!01),Y
20400            STA     INZ!!!01+1
20500      ;             INY=INDEX(TRNO+NTR*2)
20600   .MIMUL   SET     1
20700            JSR     .IMUL
20800            .BYTE   5
20900            .WORD   NTR!!!01,.C000013
21000            .WORD   .T000005
21100            LDA     TRNO!!!01+1
21200            CLC
21300            ADC     .T000005+1
21400            ASL     A
21500            TAY
21600            DEY
21700            DEY
21800            LDA     (INDEX!01),Y
21900            STA     INY!!!01
22000            INY
22100            LDA     (INDEX!01),Y
22200            STA     INY!!!01+1
22300      ;     CALL AGTRIN(IDSRN,TRACID(INX),TRX,RN)
22400            LDA     #RN!!!01 MOD .M
22500            STA     AGTRIN.4
22600            LDA     #RN!!!01/256
22700            STA     AGTRIN.4+1
22800            LDA     TRX!!!01
22900            STA     AGTRIN.3
23000            LDA     TRX!!!01+1
23100            STA     AGTRIN.3+1
23200            LDA     INX!!!01+1
23300            ASL     A
23400            ASL     A
23500            CLC
23600            ADC     #(TRACID01-4) MOD .M
23700            STA     AGTRIN.2
23800            LDA     #0
```

```
23900              ADC    #(TRACID01-4)/256
24000              STA    AGTRIN.2+1
24100              LDA    IDSRN!01
24200              STA    AGTRIN.1
24300              LDA    IDSRN!01+1
24400              STA    AGTRIN.1+1
24500              JSR    AGTRIN
24600       ;     CALL AGTRIN(IDSRN,TRACID(INY),TRY,NW)
24700              LDA    #NW!!!!01 MOD .M
24800              STA    AGTRIN.4
24900              LDA    #NW!!!!01/256
25000              STA    AGTRIN.4+1
25100              LDA    TRY!!!01
25200              STA    AGTRIN.3
25300              LDA    TRY!!!01+1
25400              STA    AGTRIN.3+1
25500              LDA    INY!!!01+1
25600              ASL    A
25700              ASL    A
25800              CLC
25900              ADC    #(TRACID01-4) MOD .M
26000              STA    AGTRIN.2
26100              LDA    #0
26200              ADC    #(TRACID01-4)/256
26300              STA    AGTRIN.2+1
26400              LDA    IDSRN!01
26500              STA    AGTRIN.1
26600              LDA    IDSRN!01+1
26700              STA    AGTRIN.1+1
26800              JSR    AGTRIN
26900       ;     CALL AGTRIN(IDSRN,TRACID(INZ),TRZ,NW)
27000              LDA    #NW!!!!01 MOD .M
27100              STA    AGTRIN.4
27200              LDA    #NW!!!!01/256
27300              STA    AGTRIN.4+1
27400              LDA    TRZ!!!01
27500              STA    AGTRIN.3
27600              LDA    TRZ!!!01+1
27700              STA    AGTRIN.3+1
27800              LDA    INZ!!!01+1
27900              ASL    A
28000              ASL    A
28100              CLC
28200              ADC    #(TRACID01-4) MOD .M
28300              STA    AGTRIN.2
28400              LDA    #0
28500              ADC    #(TRACID01-4)/256
28600              STA    AGTRIN.2+1
28700              LDA    IDSRN!01
28800              STA    AGTRIN.1
28900              LDA    IDSRN!01+1
29000              STA    AGTRIN.1+1
29100              JSR    AGTRIN
29200       ; C
29300       ; C DETERMIN THE SAMPLE NO. TO BE USED
29400       ; C
29500       ;           JEST=INT(T1/SAMINT*1000.+1.-1)
29600       .MFFDIV SET   1
29700              JSR    .FFDIV
29800              .BYTE  0
29900              .WORD  T1!!!!01,SAMIN!01
30000              .WORD  .T000015
30100       .MFFMUL SET   1
30200              JSR    .FFMUL
30300              .BYTE  0
30400              .WORD  .T000015,.C000016
30500              .WORD  .T000017
30600       .MFFADD SET   1
30700              JSR    .FFADD
30800              .BYTE  0
30900              .WORD  .T000017,.C000018
31000              .WORD  .T000015
31100              LDA    #.T000015 MOD .M
```

```
31200            STA    INT.0001
31300            LDA    #.1000015/256
31400            STA    INT.0001+1
31500            LDA    #.1000005 MOD .M
31600            STA    INT.0000
31700            LDA    #.1000005/256
31800            STA    INT.0000+1
31900            JSR    INT
32000            LDA    .1000005
32100            STA    JFST!!01
32200            LDA    .1000005+1
32300            STA    JFST!!01+1
32400     ;      JLST=INT(T2/SAMINT*1000.+1.1)
32500   .FFFDIV  SET    1
32600            JSR    .FFDIV
32700            .BYTE  0
32800            .WORD  T2!!!01,SAMINT01
32900            .WORD  .1000015
33000   .MFFMUL  SET    1
33100            JSR    .FFMUL
33200            .BYTE  0
33300            .WORD  .1000015,.C000019
33400            .WORD  .1000017
33500   .MFFADD  SET    1
33600            JSR    .FFADD
33700            .BYTE  0
33800            .WORD  .1000017,.C000020
33900            .WORD  .1000015
34000            LDA    #.1000015 MOD .M
34100            STA    INT.0001
34200            LDA    #.1000015/256
34300            STA    INT.0001+1
34400            LDA    #.1000005 MOD .M
34500            STA    INT.0000
34600            LDA    #.1000005/256
34700            STA    INT.0000+1
34800            JSR    INT
34900            LDA    .1000005
35000            STA    JLST!!01
35100            LDA    .1000005+1
35200            STA    JLST!!01+1
35300     ;      NSAMP=JLST-JFST+1
35400     ; C IF REQUESTED, SCALE THE TRACES.
35500     ; C
35600            LDA    JLST!!01+1
35700            SEC
35800            SBC    JFST!!01+1
35900            STA    .1000005+1
36000            LDA    JLST!!01
36100            SBC    JFST!!01
36200            STA    .1000005
36300            LDA    .1000005+1
36400            CLC
36500            ADC    #1
36600            STA    NSAMP!01+1
36700            LDA    .1000005
36800            ADC    #0
36900            STA    NSAMP!01
37000     ;      IF(NWIN.GE.1)CALL SCALE3(TRX(JFST),TRY(JFST),TRZ(JFST),NWIN,
37100            LDA    NWIN!!01+1
37200            CMP    #1
37300            LDA    NWIN!!01
37400            SBC    #0
37500            BMI    .L000021
37600     ;     + NSAMP,IDEBUG)
37700            LDA    IDEBUG01
37800            STA    SCALE3.6
37900            LDA    IDEBUG01+1
38000            STA    SCALE3.6+1
38100            LDA    #NSAMP!01 MOD .M
38200            STA    SCALE3.5
38300            LDA    #NSAMP!01/256
38400            STA    SCALE3.5+1
```

```
38500           LDA     #NWIN!!!01 MOD .M
38600           STA     SCALE3.4
38700           LDA     #NWIN!!!01/256
38800           STA     SCALE3.4+1
38900           LDA     JFST!!!01+1
39000           SEC
39100           SBC     #1
39200           ASL     A
39300           ASL     A
39400           ADC     TRZ!!!01
39500           STA     SCALE3.3
39600           LDA     #0
39700           ADC     TRZ!!!01+1
39800           STA     SCALE3.3+1
39900           LDA     JFST!!!01+1
40000           SEC
40100           SBC     #1
40200           ASL     A
40300           ASL     A
40400           ADC     TRY!!!01
40500           STA     SCALE3.2
40600           LDA     #0
40700           ADC     TRY!!!01+1
40800           STA     SCALE3.2+1
40900           LDA     JFST!!!01+1
41000           SEC
41100           SBC     #1
41200           ASL     A
41300           ASL     A
41400           ADC     TRX!!!01
41500           STA     SCALE3.1
41600           LDA     #0
41700           ADC     TRX!!!01+1
41800           STA     SCALE3.1+1
41900           JSR     SCALE3
42000   .L000021 EQU    *
42100   ; C
42200   ; C PREPARE TO PLOT THREE TRACES
42300   ; C
42400   ;       TRXMAX=0.
42500   .MFLTASG SET    1
42600           JSR     .FLTASGN
42700           .BYTE   0
42800           .WORD   .C000023
42900           .WORD   TRXMAX01
43000   ;       TRYMAX=0.
43100   .MFLTASG SET    1
43200           JSR     .FLTASGN
43300           .BYTE   0
43400           .WORD   .C000024
43500           .WORD   TRYMAX01
43600   ;       TRZMAX=0.
43700   .MFLTASG SET    1
43800           JSR     .FLTASGN
43900           .BYTE   0
44000           .WORD   .C000025
44100           .WORD   TRZMAX01
44200   ;       DO 120 I=JFST,JLST
44300           LDA     JFST!!!01
44400           STA     I!!!!!01
44500           LDA     JFST!!!01+1
44600           STA     I!!!!!01+1
44700           JMP     .L000026
44800   .L000026 EQU    *
44900           LDA     I!!!!!01+1
45000           CLC
45100           ADC     #1
45200           STA     I!!!!!01+1
45300           LDA     I!!!!!01
45400           ADC     #0
45500           STA     I!!!!!01
45600           LDA     JLST!!!01+1
45700           CMP     I!!!!!01+1
```

```
45800            LDA     JLST!!01
45900            SBC     !!!!!!01
46000            BPI     .L000027
46100  .L000028 EQU     A
46200  ;        TRXMAX=AMAX1(ABS(TRX(I)),TRXMAX)
46300            LDA     !!!!!01+1
46400            SEC
46500            SBC     #1
46600            ASL     A
46700            ASL     A
46800            ADC     TRX!!!01
46900            STA     ABS.0001
47000            LDA     #0
47100            ADC     TRX!!!01+1
47200            STA     ABS.0001+1
47300            LDA     #.T000015 MOD .M
47400            STA     ABS.0000
47500            LDA     #.T000015/256
47600            STA     ABS.0000+1
47700            JSR     ABS
47800            LDA     #TRXMAX01 MOD .M
47900            STA     AMAX1.02
48000            LDA     #TRXMAX01/256
48100            STA     AMAX1.02+1
48200            LDA     #.T000015 MOD .M
48300            STA     AMAX1.01
48400            LDA     #.T000015/256
48500            STA     AMAX1.01+1
48600            LDA     #.T000015 MOD .M
48700            STA     AMAX1.00
48800            LDA     #.T000015/256
48900            STA     AMAX1.00+1
49000            JSR     AMAX1
49100  .MFLTASG SET     1
49200            JSR     .FLTASGN
49300            .BYTE   0
49400            .WORD   .T000015
49500            .WORD   TRXMAX01
49600  ;        TRYMAX=AMAX1(ABS(TRY(I)),TRYMAX)
49700            LDA     !!!!!01+1
49800            SEC
49900            SBC     #1
50000            ASL     A
50100            ASL     A
50200            ADC     TRY!!!01
50300            STA     ABS.0001
50400            LDA     #0
50500            ADC     TRY!!!01+1
50600            STA     ABS.0001+1
50700            LDA     #.T000015 MOD .M
50800            STA     ABS.0000
50900            LDA     #.T000015/256
51000            STA     ABS.0000+1
51100            JSR     ABS
51200            LDA     #TRYMAX01 MOD .M
51300            STA     AMAX1.02
51400            LDA     #TRYMAX01/256
51500            STA     AMAX1.02+1
51600            LDA     #.T000015 MOD .M
51700            STA     AMAX1.01
51800            LDA     #.T000015/256
51900            STA     AMAX1.01+1
52000            LDA     #.T000015 MOD .M
52100            STA     AMAX1.00
52200            LDA     #.T000015/256
52300            STA     AMAX1.00+1
52400            JSR     AMAX1
52500  .MFLTASG SET     1
52600            JSR     .FLTASGN
52700            .BYTE   0
52800            .WORD   .T000015
52900            .WORD   TRYMAX01
53000  ;        TRZMAX=AMAX1(ABS(TRZ(I)),TRZMAX)
```

```
53100              LDA    !!!!!!01+1
53200              SEC
53300              SBC    #1
53400              ASL    A
53500              ASL    A
53600              ADC    TRZ!!!!01
53700              STA    ABS.0001
53800              LDA    #0
53900              ADC    TRZ!!!01+1
54000              STA    ABS.0001+1
54100              LDA    #.T000015 MOD .M
54200              STA    ABS.0000
54300              LDA    #.T000015/256
54400              STA    ABS.0000+1
54500              JSR    .ABS
54600              LDA    #TRZMAX01 MOD .M
54700              STA    AMAX1.02
54800              LDA    #TRZMAX01/256
54900              STA    AMAX1.02+1
55000              LDA    #.T000015 MOD .M
55100              STA    AMAX1.01
55200              LDA    #.T000015/256
55300              STA    AMAX1.01+1
55400              LDA    #.T000015 MOD .M
55500              STA    AMAX1.00
55600              LDA    #.T000015/256
55700              STA    AMAX1.00+1
55800              JSR    .AMAX1
55900   .MFLTASG   SET    1
56000              JSR    .FLTASGN
56100              .BYTE  0
56200              .WORD  .T000015
56300              .WORD  TRZMAX01
56400   ; 120  CONTINUE
56500   .L000030   EQU    *
56600              JMP    .L000026
56700   .L000027   EQU    *
56800   ; C
56900   ; C  ANNOTATE TRACE NUMBER
57000   ; C
57100   ;          X=XORG+0.5
57200   .MFFADD    SET    1
57300              JSR    .FFADD
57400              .BYTE  0
57500              .WORD  XORG!!01,.C000031
57600              .WORD  X!!!!!01
57700   ;          AXLEN=(12-11)*TSC
57800   .MFFSUB    SET    1
57900              JSR    .FFSUB
58000              .BYTE  0
58100              .WORD  T2!!!!01,!!!!!01
58200              .WORD  .T000015
58300   .MFFMUL    SET    1
58400              JSR    .FFMUL
58500              .BYTE  0
58600              .WORD  .T000015,TSC!!!01
58700              .WORD  AXLEN!01
58800   ;          YTOP=AXLEN+0.5
58900   .MFFADD    SET    1
59000              JSR    .FFADD
59100              .BYTE  0
59200              .WORD  AXLEN!01,.C000032
59300              .WORD  YTOP!!01
59400   ;          Y=YTOP+1.0
59500   .MFFADD    SET    1
59600              JSR    .FFADD
59700              .BYTE  0
59800              .WORD  YTOP!!01,.C000033
59900              .WORD  Y!!!!!01
60000   ;          CALL SYMBOL(X,Y,0.2,'TRACE NO.',0.,9)
60100              LDA    #.C000037 MOD .M
60200              STA    SYMBL.0
60300              LDA    #.C000037/256
```

```
60400              STA    SYMBOL.5+1
60500              LDA    #.C000036 MOD .M
60600              STA    SYMBOL.5
60700              LDA    #.C000036/256
60800              STA    SYMBOL.5+1
60900              LDA    #.C000035 MOD .M
61000              STA    SYMBOL.4
61100              LDA    #.C000035/256
61200              STA    SYMBOL.4+1
61300              LDA    #.C000034 MOD .M
61400              STA    SYMBOL.3
61500              LDA    #.C000034/256
61600              STA    SYMBOL.3+1
61700              LDA    #Y!!!!!01 MOD .M
61800              STA    SYMBOL.2
61900              LDA    #Y!!!!!01/256
62000              STA    SYMBOL.2+1
62100              LDA    #X!!!!!01 MOD .M
62200              STA    SYMBOL.1
62300              LDA    #X!!!!!01/256
62400              STA    SYMBOL.1+1
62500              JSR    SYMBOL
62600       ;      FPN=FLOAT(IRRD)
62700       .MFFLOAT   SET   1
62800              JSR    .FFLOAT
62900              .BYTE  1
63000              .WORD  IRND!!01
63100              .WORD  FPN!!01
63200       ;      CALL NUMBER(X+2.,Y,0.2,FPN,0.,-1)
63300       .MFFADD    SET   1
63400              JSR    .FFADD
63500              .BYTE  0
63600              .WORD  X!!!!!01,.C000038
63700              .WORD  T000015
63800              LDA    #.C000041 MOD .M
63900              STA    NUMBER.6
64000              LDA    #.C000041/256
64100              STA    NUMBER.6+1
64200              LDA    #.C000040 MOD .M
64300              STA    NUMBER.5
64400              LDA    #.C000040/256
64500              STA    NUMBER.5+1
64600              LDA    #FPN!!01 MOD .M
64700              STA    NUMBER.4
64800              LDA    #FPN!!01/256
64900              STA    NUMBER.4+1
65000              LDA    #.C000039 MOD .M
65100              STA    NUMBER.3
65200              LDA    #.C000039/256
65300              STA    NUMBER.3+1
65400              LDA    #Y!!!!!01 MOD .M
65500              STA    NUMBER.2
65600              LDA    #Y!!!!!01/256
65700              STA    NUMBER.2+1
65800              LDA    #.T000015 MOD .M
65900              STA    NUMBER.1
66000              LDA    #.T000015/256
66100              STA    NUMBER.1+1
66200              JSR    NUMBER
66300       ; C
66400       ; C PLOT SCALE
66500       ; C
66600       ;      N1=IFIX(T1*10.+0.01)
66700       .MFFMUL    SET   1
66800              JSR    .FFMUL
66900              .BYTE  0
67000              .WORD  T!!!!!01,.C000042
67100              .WORD  .T000015
67200       .MFFADD    SET   1
67300              JSR    .FFADD
67400              .BYTE  0
67500              .WORD  .T000015,.C000043
67600              .WORD  .T000017
```

```
67700        .MFIFIX  SET    1
67800                 JSR    .FIFIX
67900                 .BYTE  1
68000                 .WORD  .T000017
68100                 .WORD  N1!!!!01
68200        ;        N2=IFIX(T2*10.+0.01)
68300        .MFFMUL  SET    1
68400                 JSR    .FFMUL
68500                 .BYTE  0
68600                 .WORD  T2!!!!01,.C000044
68700                 .WORD  .T000015
68800        .MFFADD  SET    1
68900                 JSR    .FFADD
69000                 .BYTE  0
69100                 .WORD  .T000015,.C000005
69200                 .WORD  .T000017
69300        .MFIFIX  SET    1
69400                 JSR    .FIFIX
69500                 .BYTE  1
69600                 .WORD  .T000017
69700                 .WORD  N2!!!!01
69800        ;        NANNO=N2-N1
69900                 LDA    N2!!!!01+1
70000                 SEC
70100                 SBC    N1!!!!01+1
70200                 STA    NANNO!01+1
70300                 LDA    N2!!!!01
70400                 SBC    N1!!!!01
70500                 STA    NANNO!01
70600        ;        AXINT=AXLEN/FLOAT(NANNO)
70700        .MFFLOAT SET    1
70800                 JSR    .FFLOAT
70900                 .BYTE  1
71000                 .WORD  NANNO!01
71100                 .WORD  .T000015
71200        .MFFDIV  SET    1
71300                 JSR    .FFDIV
71400                 .BYTE  0
71500                 .WORD  AXLEN!01,.T000015
71600                 .WORD  AXINT!01
71700        ;        ANOINT=FLOAT(N2-N1)/FLOAT(NANNO)/10.
71800                 LDA    N2!!!!01+1
71900                 SEC
72000                 SBC    N1!!!!01+1
72100                 STA    .T000005+1
72200                 LDA    N2!!!!01
72300                 SBC    N1!!!!01
72400                 STA    .T000005
72500        .MFFLOAT SET    1
72600                 JSR    .FFLOAT
72700                 .BYTE  1
72800                 .WORD  NANNO!01
72900                 .WORD  .T000017
73000        .MFFLOAT SET    1
73100                 JSR    .FFLOAT
73200                 .BYTE  1
73300                 .WORD  .T000005
73400                 .WORD  .T000015
73500        .MFFDIV  SET    1
73600                 JSR    .FFDIV
73700                 .BYTE  0
73800                 .WORD  .T000015,.T000017
73900                 .WORD  .T000046
74000        .MFFDIV  SET    1
74100                 JSR    .FFDIV
74200                 .BYTE  0
74300                 .WORD  .T000046,.C000047
74400                 .WORD  ANOINT01
74500        ;        N=NANNO+1
74600                 LDA    NANNO!01+1
74700                 CLC
74800                 ADC    #1
74900                 STA    N!!!!01+1
```

```
75000           LDA     NANNO:01
75100           ADC     #0
75200           STA     N!!!!!01
75300   ;       DO 140 I=1,N
75400           LDA     #0
75500           STA     I!!!!!01
75600           LDA     #1
75700           STA     I!!!!!01+1
75800           JMP     .L000050
75900   .L000048 EQU    *
76000           LDA     I!!!!!01+1
76100           CLC
76200           ADC     #1
76300           STA     I!!!!!01+1
76400           LDA     I!!!!!01
76500           ADC     #0
76600           STA     I!!!!!01
76700           LDA     N!!!!!01+1
76800           CMP     I!!!!!01+1
76900           LDA     N!!!!!01
77000           SBC     I!!!!!01
77100           BMI     .L000049
77200   .L000050 EQU    *
77300   ;       Y=YTOP-FLOAT(I-1)*AXINT
77400           LDA     I!!!!!01+1
77500           SEC
77600           SBC     #1
77700           STA     .T000005+1
77800           LDA     I!!!!!01
77900           SBC     #0
78000           STA     .T000005
78100   .MFFLOAT SET    1
78200           JSR     .FFLOAT
78300           .BYTE   1
78400           .WORD   .T000005
78500           .WORD   .T000015
78600   .MFFMUL SET     1
78700           JSR     .FFMUL
78800           .BYTE   0
78900           .WORD   .T000015,AXINT:01
79000           .WORD   .T000017
79100   .MFFSUB SET     1
79200           JSR     .FFSUB
79300           .BYTE   0
79400           .WORD   YTOP!!01,.T000017
79500           .WORD   Y!!!!!01
79600   ;       FPN=FLOAT(N1)/10.+FLOAT(I-1)*ANOINT
79700   .MFFLOAT SET    1
79800           JSR     .FFLOAT
79900           .BYTE   1
80000           .WORD   N!!!!!01
80100           .WORD   .T000015
80200           LDA     I!!!!!01+1
80300           SEC
80400           SBC     #1
80500           STA     .T000005+1
80600           LDA     I!!!!!01
80700           SBC     #0
80800           STA     .T000005
80900   .MFFLOAT SET    1
81000           JSR     .FFLOAT
81100           .BYTE   1
81200           .WORD   .T000005
81300           .WORD   .T000046
81400   .MFFMUL SET     1
81500           JSR     .FFMUL
81600           .BYTE   0
81700           .WORD   .T000046,ANOINT:01
81800           .WORD   .T000054
81900   .MFFDIV SET     1
82000           JSR     .FFDIV
82100           .BYTE   0
82200           .WORD   .T000015,.C000053
```

```
82300           .WORD   .1000017
82400   .MFFADD SET     1
82500           JSR     .FFADD
82600           .BYTE   0
82700           .WORD   .1000017,.T000054
82800           .WORD   FPN!!!01
82900   ;       CALL NUMBER(X+0.25,Y-0.05,0.1,FPN,0.,3)
83000   .MFFADD SET     1
83100           JSR     .FFADD
83200           .BYTE   0
83300           .WORD   X!!!!101,.C000055
83400           .WORD   .1000015
83500   .MFFSUB SET     1
83600           JSR     .FFSUB
83700           .BYTE   0
83800           .WORD   Y!!!!!01,.C000056
83900           .WORD   .1000017
84000           LDA     #.C000011 MOD .M
84100           STA     NUMBER.6
84200           LDA     #.C000011/256
84300           STA     NUMBER.6+1
84400           LDA     #.C000058 MOD .M
84500           STA     NUMBER.5
84600           LDA     #.C000058/256
84700           STA     NUMBER.5+1
84800           LDA     #FPN!!!01 MOD .M
84900           STA     NUMBER.4
85000           LDA     #FPN!!!01/256
85100           STA     NUMBER.4+1
85200           LDA     #.C000057 MOD .M
85300           STA     NUMBER.3
85400           LDA     #.C000057/256
85500           STA     NUMBER.3+1
85600           LDA     #.1000017 MOD .M
85700           STA     NUMBER.2
85800           LDA     #.1000017/256
85900           STA     NUMBER.2+1
86000           LDA     #.1000015 MOD .M
86100           STA     NUMBER.1
86200           LDA     #.1000015/256
86300           STA     NUMBER.1+1
86400           JSR     NUMBER
86500   ;       CALL PLOT(X+1.,Y,3)
86600   .MFFADD SET     1
86700           JSR     .FFADD
86800           .BYTE   0
86900           .WORD   X!!!!101,.C000059
87000           .WORD   .1000015
87100           LDA     #.C000011 MOD .M
87200           STA     PLOT.003
87300           LDA     #.C000011/256
87400           STA     PLOT.003+1
87500           LDA     #Y!!!!!01 MOD .M
87600           STA     PLOT.002
87700           LDA     #Y!!!!!01/256
87800           STA     PLOT.002+1
87900           LDA     #.1000015 MOD .M
88000           STA     PLOT.001
88100           LDA     #.1000015/256
88200           STA     PLOT.001+1
88300           JSR     PLOT
88400   ;       CALL PLOT(X+1.25,Y,2)
88500   .MFFADD SET     1
88600           JSR     .FFADD
88700           .BYTE   0
88800           .WORD   X!!!!101,.C000060
88900           .WORD   .1000015
89000           LDA     #.C000013 MOD .M
89100           STA     PLOT.003
89200           LDA     #.C000013/256
89300           STA     PLOT.003+1
89400           LDA     #Y!!!!!01 MOD .M
89500           STA     PLOT.002
```

```
89500            LDA     #.T!!!!!01/256
89700            STA     PLOT.002+1
89800            LDA     #.T000015 MOD .M
89900            STA     PLOT.001
90000            LDA     #.T000015/256
90100            STA     PLOT.001+1
90200            JSR     PLOT
90300   ; 140    CONTINUE
90400   .L000052 EQU     *
90500            JMP     .L000048
90600   .L000049 EQU     *
90700   ;        CALL PLOT(X+1.25,YTOP,2)
90800   .MFFADD  SET     1
90900            JSR     .FFADD
91000            .BYTE   0
91100            .WORD   X!!!!101,.C000061
91200            .WORD   .T000015
91300            LDA     #.C000013 MOD .M
91400            STA     PLOT.003
91500            LDA     #.C000013/256
91600            STA     PLOT.003+1
91700            LDA     #YTOP!!101 MOD .M
91800            STA     PLOT.002
91900            LDA     #YTOP!!101/256
92000            STA     PLOT.002+1
92100            LDA     #.T000015 MOD .M
92200            STA     PLOT.001
92300            LDA     #.T000015/256
92400            STA     PLOT.001+1
92500            JSR     PLOT
92600   ; C
92700   ; C PLOT TRACES - H, T AND V
92800   ; C
92900   ;        AMP=TRXMAX*TRSP
93000   .MFEMUL  SET     1
93100            JSR     .FFMUL
93200            .BYTE   0
93300            .WORD   TRXMAX01,TRSP!!101
93400            .WORD   AMP!!101
93500   ;        IF(AMP.GT.1.E-4)GO TO 150
93600   .MFEGT   SET     1
93700            JSR     .FFGT
93800            .BYTE   0
93900            .WORD   AMP!!101,.C000062
94000            ASL     A
94100            BCS     *+5
94200            JMP     .L000063
94300            JMP     .L000064
94400   .L000063 EQU     *
94500   ; C      WRITE(6,145)
94600   ; C145   FORMAT('0*** ALL TRACES ARE ZERO OR NEARLY ZERO - ABORT ***')
94700   ;        CALL ABORT(16)
94800            LDA     #.C000065 MOD .M
94900            STA     ABORT.01
95000            LDA     #.C000065/256
95100            STA     ABORT.01+1
95200            JSR     ABORT
95300   ; 150    X=XORG+1.75+2./TRSP
95400   .L000064 EQU     *
95500   .MFFDIV  SET     1
95600            JSR     .FFDIV
95700            .BYTE   0
95800            .WORD   .C000067,TRSP!!101
95900            .WORD   .T000017
96000   .MFFADD  SET     1
96100            JSR     .FFADD
96200            .BYTE   0
96300            .WORD   XORG!!101,.C000066
96400            .WORD   .T000015
96500   .MFFADD  SET     1
96600            JSR     .FFADD
96700            .BYTE   0
96800            .WORD   .T000015,.T000017
```

```
96900                   .WORD  X!!!!!01
97000         ;         YP=YTOP+0.2
97100         .MFFADD   SET    1
97200                   JSR    .FFADD
97300                   .BYTE  0
97400                   .WORD  YTOP!!01,.C000068
97500                   .WORD  YP!!!!01
97600         ;         CALL SYMBOL(X-0.05,YP,0.2,CR,0.,2)
97700         .MFFSUB   SET    1
97800                   JSR    .FFSUB
97900                   .BYTE  0
98000                   .WORD  X!!!!!01,.C000069
98100                   .WORD  .T000015
98200                   LDA    #.C000013 MOD .M
98300                   STA    SYMBOL.6
98400                   LDA    #.C000013/256
98500                   STA    SYMBOL.6+1
98600                   LDA    #.C000071 MOD .M
98700                   STA    SYMBOL.5
98800                   LDA    #.C000071/256
98900                   STA    SYMBOL.5+1
99000                   LDA    #CR!!!!01 MOD .M
99100                   STA    SYMBOL.4
99200                   LDA    #CR!!!!01/256
99300                   STA    SYMBOL.4+1
99400                   LDA    #.C000070 MOD .M
99500                   STA    SYMBOL.3
99600                   LDA    #.C000070/256
99700                   STA    SYMBOL.3+1
99800                   LDA    #YP!!!!01 MOD .M
99900                   STA    SYMBOL.2
100000                  LDA    #YP!!!!01/256
100100                  STA    SYMBOL.2+1
100200                  LDA    #.T000015 MOD .M
100300                  STA    SYMBOL.1
100400                  LDA    #.T000015/256
100500                  STA    SYMBOL.1+1
100600                  JSR    SYMBOL
100700        ;         YINT=AXLEN/FLOAT(JLST-JFST)
100800                  LDA    JLST!!01+1
100900                  SEC
101000                  SBC    JFST!!01+1
101100                  STA    .T000005+1
101200                  LDA    JLST!!01
101300                  SBC    JFST!!01
101400                  STA    .T000005
101500        .MFFLOAT  SET    1
101600                  JSR    .FFLOAT
101700                  .BYTE  1
101800                  .WORD  .T000005
101900                  .WORD  .T000015
102000        .MFFDIV   SET    1
102100                  JSR    .FFDIV
102200                  .BYTE  0
102300                  .WORD  AXLEN!01,.T000015
102400                  .WORD  YINT!!01
102500        ;         Y=YTOP+FLOAT(JFST-1)*YINT
102600                  LDA    JFST!!01+1
102700                  SEC
102800                  SBC    #1
102900                  STA    .T000005+1
103000                  LDA    JFST!!01
103100                  SBC    #0
103200                  STA    .T000005
103300        .MFFLOAT  SET    1
103400                  JSR    .FFLOAT
103500                  .BYTE  1
103600                  .WORD  .T000005
103700                  .WORD  .T000015
103800        .MFFMUL   SET    1
103900                  JSR    .FFMUL
104000                  .BYTE  0
104100                  .WORD  .T000015,YINT!!01
```

```
104200              .WORD  .1000017
104300    .MFFADD   SET    1
104400              JSR    .FFADD
104500              .BYTE  0
104600              .WORD  YTOP!!!01,.1000017
104700              .WORD  Y!!!!!01
104800    ;         XP=X+TRX(JFST)/AMP
104900              LDA    JFST!!01+1
105000              SEC
105100              SBC    #1
105200              ASL    A
105300              ASL    A
105400              ADC    TRX!!!01
105500              STA    .1000006
105600              LDA    #0
105700              ADC    TRX!!!01+1
105800              STA    .1000006+1
105900    .MFFDIV   SET    1
106000              JSR    .FFDIV
106100              .BYTE  0
106200              .WORD  -.1000006,AMP!!!01
106300              .WORD  .1000015
106400    .MFFADD   SET    1
106500              JSR    .FFADD
106600              .BYTE  0
106700              .WORD  X!!!!!01,.1000015
106800              .WORD  XP!!!!01
106900    ;         YP=Y-FLOAT(JFST-1)*YINT
107000              LDA    JFST!!01+1
107100              SEC
107200              SBC    #1
107300              STA    .1000005+1
107400              LDA    JFST!!01
107500              SBC    #0
107600              STA    .1000005
107700    .MFFLOAT  SET    1
107800              JSR    .FFLOAT
107900              .BYTE  1
108000              .WORD  .1000005
108100              .WORD  .1000015
108200    .MFFMUL   SET    1
108300              JSR    .FFMUL
108400              .BYTE  0
108500              .WORD  .1000015,YINT!!!01
108600              .WORD  .1000017
108700    .MFFSUB   SET    1
108800              JSR    .FFSUB
108900              .BYTE  0
109000              .WORD  Y!!!!!01,.1000017
109100              .WORD  YP!!!!01
109200    ;         CALL PLOT(XP,YP,3)
109300              LDA    #.C000011 MOD .M
109400              STA    PLOT.003
109500              LDA    #.C000011/256
109600              STA    PLOT.003+1
109700              LDA    #YP!!!!01 MOD .M
109800              STA    PLOT.002
109900              LDA    #YP!!!!01/256
110000              STA    PLOT.002+1
110100              LDA    #XP!!!!01 MOD .M
110200              STA    PLOT.001
110300              LDA    #XP!!!!01/256
110400              STA    PLOT.001+1
110500              JSR    PLOT
110600    ;         JFST1=JFST+1
110700              LDA    JFST!!01+1
110800              CLC
110900              ADC    #1
111000              STA    JFST1!01+1
111100              LDA    JFST!!01
111200              ADC    #0
111300              STA    JFST1!01
111400    ;         DO 160 I=JFST1,JLST
```

```
111500              LDA     JFST!!!01
111600              STA     I!!!!!01
111700              LDA     JFST!!!01+1
111800              STA     I!!!!!01+1
111900              JMP     .L000074
112000  .L000072 EQU    *
112100              LDA     I!!!!!01+1
112200              CLC
112300              ADC     #1
112400              STA     I!!!!!01+1
112500              LDA     I!!!!!01
112600              ADC     #0
112700              STA     I!!!!!01
112800              LDA     JLST!!01+1
112900              CMP     I!!!!!01+1
113000              LDA     JLST!!01
113100              SBC     I!!!!!01
113200              BMI     .L000073
113300  .L000074 EQU    *
113400  ;           XP=X+TRX(I)/AMP
113500              LDA     I!!!!!01+1
113600              SEC
113700              SBC     #1
113800              ASL     A
113900              ASL     A
114000              ADC     TRX!!!01
114100              STA     .1000006
114200              LDA     #0
114300              ADC     TRX!!!01+1
114400              STA     .1000006+1
114500  .MFFDIV  SET     1
114600              JSR     .FFDIV
114700              .BYTE   0
114800              .WORD   -.1000006,AMP!!!01
114900              .WORD   .1000015
115000  .MFFADD  SET     1
115100              JSR     .FFADD
115200              .BYTE   0
115300              .WORD   X!!!!!01,.1000015
115400              .WORD   XP!!!01
115500  ;           YP=Y+TRY(I-1)*YINI
115600              LDA     I!!!!!01+1
115700              SEC
115800              SBC     #1
115900              STA     .1000005+1
116000              LDA     I!!!!!01
116100              SBC     #0
116200              STA     .1000005
116300  .MFFLOAT SET     1
116400              JSR     .FFLOAT
116500              .BYTE   1
116600              .WORD   .1000005
116700              .WORD   .1000015
116800  .MFFMUL  SET     1
116900              JSR     .FFMUL
117000              .BYTE   0
117100              .WORD   .1000015,YINI!!01
117200              .WORD   .1000017
117300  .MFFSUB  SET     1
117400              JSR     .FFSUB
117500              .BYTE   0
117600              .WORD   Y!!!!!01,.1000017
117700              .WORD   YP!!!01
117800  ;           CALL PLOT(XP,YP,2)
117900              LDA     #.C000013 MOD .M
118000              STA     PLOT.003
118100              LDA     #.C000013/256
118200              STA     PLOT.003+1
118300              LDA     #YP!!!01 MOD .M
118400              STA     PLOT.002
118500              LDA     #YP!!!01/256
118600              STA     PLOT.002+1
118700              LDA     #XP!!!01 MOD .M
```

```
118800            STA     PLOT.001
118900            LDA     #XP!!!!01/256
119000            STA     PLOT.001+1
119100            JSR     PLOT
119200   ;  460   CONTINUE
119300   .L000076 EQU     *
119400            JMP     .L000072
119500   .L000073 EQU     *
119600   ;        CALL PLOT(X,0.5,3)
119700            LDA     #.C000011 MOD .M
119800            STA     PLOT.003
119900            LDA     #.C000011/256
120000            STA     PLOT.003+1
120100            LDA     #.C000077 MOD .M
120200            STA     PLOT.002
120300            LDA     #.C000077/256
120400            STA     PLOT.002+1
120500            LDA     #X!!!!01 MOD .M
120600            STA     PLOT.001
120700            LDA     #X!!!!01/256
120800            STA     PLOT.001+1
120900            JSR     PLOT
121000   ;        CALL PLOT(X,YTOP,2)
121100            LDA     #.C000013 MOD .M
121200            STA     PLOT.003
121300            LDA     #.C000013/256
121400            STA     PLOT.003+1
121500            LDA     #YTOP!!01 MOD .M
121600            STA     PLOT.002
121700            LDA     #YTOP!!01/256
121800            STA     PLOT.002+1
121900            LDA     #X!!!!01 MOD .M
122000            STA     PLOT.001
122100            LDA     #X!!!!01/256
122200            STA     PLOT.001+1
122300            JSR     PLOT
122400   ; C
122500   ;        X=X+2./TRSP
122600   .MFFDIV  SET     1
122700            JSR     .FFDIV
122800            .BYTE   0
122900            .WORD   .C000078,TRSP!!01
123000            .WORD   .T000015
123100   .MFFADD  SET     1
123200            JSR     .FFADD
123300            .BYTE   0
123400            .WORD   X!!!!01,.T000015
123500            .WORD   X!!!!01
123600   ;        YP=YTOP+0.2
123700   .MFFADD  SET     1
123800            JSR     .FFADD
123900            .BYTE   0
124000            .WORD   YTOP!!01,.C000079
124100            .WORD   YP!!!!01
124200   ;        CALL SYMBOL(X-0.05,YP,0.2,CT,0.,2)
124300   .MFFSUB  SET     1
124400            JSR     .FFSUB
124500            .BYTE   0
124600            .WORD   X!!!!01,.C000080
124700            .WORD   .T000015
124800            LDA     #.C000013 MOD .M
124900            STA     SYMBOL.6
125000            LDA     #.C000013/256
125100            STA     SYMBOL.6+1
125200            LDA     #.C000082 MOD .M
125300            STA     SYMBOL.5
125400            LDA     #.C000082/256
125500            STA     SYMBOL.5+1
125600            LDA     #CT!!!!01 MOD .M
125700            STA     SYMBOL.4
125800            LDA     #CT!!!!01/256
125900            STA     SYMBOL.4+1
126000            LDA     #.C000081 MOD .M
```

```
125100            STA     SYMBOL.3
126200            LDA     #.C000001/256
126300            STA     SYMBOL.3+1
126400            LDA     #YP!!!!01 MOD .M
126500            STA     SYMBOL.2
126600            LDA     #YP!!!!01/256
126700            STA     SYMBOL.2+1
126800            LDA     #.1000015 MOD .M
126900            STA     SYMBOL.1
127000            LDA     #.1000015/256
127100            STA     SYMBOL.1+1
127200            JSR     SYMBOL
127300    ;       AMP=TRYMAX*TRSP
127400    .MFFMUL SET     1
127500            JSR     .FFMUL
127600            .BYTE   0
127700            .WORD   TRYMAX01,TRSP!!01
127800            .WORD   AMP!!01
127900    ;       XP=X+TRY(JFST)/AMP
128000            LDA     JFST!!01+1
128100            SEC
128200            SBC     #1
128300            ASL     A
128400            ASL     A
128500            ADC     TRY!!01
128600            STA     .1000006
128700            LDA     #0
128800            ADC     TRY!!01+1
128900            STA     .1000006+1
129000    .MFFDIV SET     1
129100            JSR     .FFDIV
129200            .BYTE   0
129300            .WORD   -.1000006,AMP!!01
129400            .WORD   .1000015
129500    .MFFADD SET     1
129600            JSR     .FFADD
129700            .BYTE   0
129800            .WORD   X!!!!01,.1000015
129900            .WORD   XP!!!01
130000    ;       YP=Y-FLOAT(JFST-1)*YINT
130100            LDA     JFST!!01+1
130200            SEC
130300            SBC     #1
130400            STA     .1000005+1
130500            LDA     JFST!!01
130600            SBC     #0
130700            STA     .1000005
130800    .MFFLOAT SET    1
130900            JSR     .FFLOAT
131000            .BYTE   1
131100            .WORD   .1000005
131200            .WORD   .1000015
131300    .MFFMUL SET     1
131400            JSR     .FFMUL
131500            .BYTE   0
131600            .WORD   .1000015,YINT!!01
131700            .WORD   .1000017
131800    .MFFSUB SET     1
131900            JSR     .FFSUB
132000            .BYTE   0
132100            .WORD   Y!!!!01,.1000017
132200            .WORD   YP!!!01
132300    ;       CALL PLOT(XP,YP,3)
132400            LDA     #.C000011 MOD .M
132500            STA     PLOT.003
132600            LDA     #.C000011/256
132700            STA     PLOT.003+1
132800            LDA     #YP!!!01 MOD .M
132900            STA     PLOT.002
133000            LDA     #YP!!!01/256
133100            STA     PLOT.002+1
133200            LDA     #XP!!!01 MOD .M
133300            STA     PLOT.001
```

```
133400              LDA     #XP!!!!01/256
133500              STA     PLOT.001+1
133600              JSR     PLOT
133700      ;       DO 180 I=JFST1,JLST
133800              LDA     JFST!!01
133900              STA     I!!!!!01
134000              LDA     JFST!!01+1
134100              STA     I!!!!!01+1
134200              JMP     .L000085
134300      .L000083 EQU   *
134400              LDA     I!!!!!01+1
134500              CLC
134600              ADC     #1
134700              STA     I!!!!!01+1
134800              LDA     I!!!!!01
134900              ADC     #0
135000              STA     I!!!!!01
135100              LDA     JLST!!01+1
135200              CMP     I!!!!!01+1
135300              LDA     JLST!!01
135400              SBC     I!!!!!01
135500              BMI     .L000084
135600      .L000085 EQU   *
135700      ;       XP=X+IHY(I)/AMP
135800              LDA     I!!!!!01+1
135900              SEC
136000              SBC     #1
136100              ASL     A
136200              ASL     A
136300              ADC     IHY!!01
136400              STA     .T000006
136500              LDA     #0
136600              ADC     IHY!!01+1
136700              STA     .T000006+1
136800      .MFFDIV SET     1
136900              JSR     .FFDIV
137000              .BYTE   0
137100              .WORD   -.T000006,AMP!!01
137200              .WORD   .T000015
137300      .MFFADD SET     1
137400              JSR     .FFADD
137500              .BYTE   0
137600              .WORD   X!!!!!01,.T000015
137700              .WORD   XP!!!!01
137800      ;       YP=Y+FLOAT(I-1)*YINT
137900              LDA     I!!!!!01+1
138000              SEC
138100              SBC     #1
138200              STA     .T000005+1
138300              LDA     I!!!!!01
138400              SBC     #0
138500              STA     .T000005
138600      .MFFLOAT SET    1
138700              JSR     .FFLOAT
138800              .BYTE   1
138900              .WORD   .T000005
139000              .WORD   .T000015
139100      .MFFMUL SET     1
139200              JSR     .FFMUL
139300              .BYTE   0
139400              .WORD   .T000015,YINT!!01
139500              .WORD   .T000017
139600      .MFFSUB SET     1
139700              JSR     .FFSUB
139800              .BYTE   0
139900              .WORD   Y!!!!!01,.T000017
140000              .WORD   YP!!!!01
140100      ;       CALL PLOT(XP,YP,2)
140200              LDA     #.C000013 MOD .M
140300              STA     PLOT.003
140400              LDA     #.C000013/256
140500              STA     PLOT.003+1
140600              LDA     #YP!!!!01 MOD .M
```

```
140700              STA     PLOT.002
140800              LDA     #YP!!!!01/256
140900              STA     PLOT.002+1
141000              LDA     #XP!!!!01 MOD .M
141100              STA     PLOT.001
141200              LDA     #XP!!!!01/256
141300              STA     PLOT.001+1
141400              JSR     PLOT
141500      ; 180 CONTINUE
141600      .C000087 EQU    *
141700              JMP     .C000083
141800      .C000084 EQU    *
141900      ;       CALL PLOT(X,0.5,3)
142000              LDA     #.C000011 MOD .M
142100              STA     PLOT.003
142200              LDA     #.C000011/256
142300              STA     PLOT.003+1
142400              LDA     #.C000088 MOD .M
142500              STA     PLOT.002
142600              LDA     #.C000088/256
142700              STA     PLOT.002+1
142800              LDA     #X!!!!01 MOD .M
142900              STA     PLOT.001
143000              LDA     #X!!!!01/256
143100              STA     PLOT.001+1
143200              JSR     PLOT
143300      ;       CALL PLOT(X,YTOP,2)
143400              LDA     #.C000013 MOD .M
143500              STA     PLOT.003
143600              LDA     #.C000013/256
143700              STA     PLOT.003+1
143800              LDA     #YTOP!!01 MOD .M
143900              STA     PLOT.002
144000              LDA     #YTOP!!01/256
144100              STA     PLOT.002+1
144200              LDA     #X!!!!01 MOD .M
144300              STA     PLOT.001
144400              LDA     #X!!!!01/256
144500              STA     PLOT.001+1
144600              JSR     PLOT
144700      ; C
144800      ;       X=X+2./IRSP
144900      .MFFDIV  SET    1
145000              JSR     .FFDIV
145100              .BYTE   0
145200              .WORD   .C000089,.IRSP!!01
145300              .WORD   .T000015
145400      .MFFADD SET     1
145500              JSR     .FFADD
145600              .BYTE   0
145700              .WORD   X!!!!01,.T000015
145800              .WORD   X!!!!01
145900      ;       YP=YTOP+0.2
146000      .MFFADD SET     1
146100              JSR     .FFADD
146200              .BYTE   0
146300              .WORD   YTOP!!01,.C000090
146400              .WORD   YP!!!!01
146500      ;       CALL SYMBOL(X-0.05,YP,0.2,CV,0.,2)
146600      .MFFSUB SET     1
146700              JSR     .FFSUB
146800              .BYTE   0
146900              .WORD   X!!!!01,.C000091
147000              .WORD   .T000015
147100              LDA     #.C000013 MOD .M
147200              STA     SYMBOL.6
147300              LDA     #.C000013/256
147400              STA     SYMBOL.6+1
147500              LDA     #.C000093 MOD .M
147600              STA     SYMBOL.5
147700              LDA     #.C000093/256
147800              STA     SYMBOL.5+1
147900              LDA     #CV!!!!01 MOD .M
```

```
148000              STA     SYMBOL.4
148100              LDA     #CV!!!01/256
148200              STA     SYMBOL.4+1
148300              LDA     #.C000092 MOD .M
148400              STA     SYMBOL.3
148500              LDA     #.C000092/256
148600              STA     SYMBOL.3+1
148700              LDA     #YP!!!01 MOD .M
148800              STA     SYMBOL.2
148900              LDA     #YP!!!01/256
149000              STA     SYMBOL.2+1
149100              LDA     #.T000015 MOD .M
149200              STA     SYMBOL.1
149300              LDA     #.T000015/256
149400              STA     SYMBOL.1+1
149500              JSR     SYMBOL
149600      ;       AMP=TRZMAX*IRSP
149700      .MFFMUL SET     1
149800              JSR     .FFMUL
149900              .BYTE   0
150000              .WORD   TRZMAX!01,IRSP!!01
150100              .WORD   AMP!!01
150200      ;       XP=X+IRZ(JFST)/AMP
150300              LDA     JFST!!01+1
150400              SEC
150500              SBC     #1
150600              ASL     A
150700              ASL     A
150800              ADC     TRZ!!!01
150900              STA     .T000006
151000              LDA     #0
151100              ADC     TRZ!!!01+1
151200              STA     .T000006+1
151300      .MFFDIV SET     1
151400              JSR     .FFDIV
151500              .BYTE   0
151600              .WORD   .T000006,AMP!!01
151700              .WORD   .T000015
151800      .MFFADD SET     1
151900              JSR     .FFADD
152000              .BYTE   0
152100              .WORD   X!!!!01,.T000015
152200              .WORD   YP!!!!01
152300      ;       YP=Y-FLOAT(JFST-1)*YINT
152400              LDA     JFST!!01+1
152500              SEC
152600              SBC     #1
152700              STA     .T000005+1
152800              LDA     JFST!!01
152900              SBC     #0
153000              STA     .T000005
153100      .MFFLOAT SET    1
153200              JSR     .FFLOAT
153300              .BYTE   1
153400              .WORD   .T000005
153500              .WORD   .T000015
153600      .MFFMUL SET     1
153700              JSR     .FFMUL
153800              .BYTE   0
153900              .WORD   .T000015,YINT!!01
154000              .WORD   .T000017
154100      .MFFSUB SET     1
154200              JSR     .FFSUB
154300              .BYTE   0
154400              .WORD   Y!!!!!01,.T000017
154500              .WORD   YP!!!01
154600      ;       CALL PLOT(XP,YP,3)
154700              LDA     #.C000011 MOD .M
154800              STA     PLOT.003
154900              LDA     #.C000011/256
155000              STA     PLOT.003+1
155100              LDA     #YP!!!01 MOD .M
155200              STA     PLOT.002
```

```
155300              LDA       #YP!!!!01/256
155400              STA       PLOT.002+1
155500              LDA       #XP!!!!01 MOD .M
155600              STA       PLOT.001
155700              LDA       #XP!!!!01/256
155800              STA       PLOT.001+1
155900              JSR       PLOT
156000      ;       DO 200 I=JFST1,JLST
156100              LDA       JFST1!01
156200              STA       I!!!!!01
156300              LDA       JFST1!01+1
156400              STA       I!!!!!01+1
156500              JMP       .L000096
156600   .L000094   EQU       *
156700              LDA       I!!!!!01+1
156800              CLC
156900              ADC       #1
157000              STA       I!!!!!01+1
157100              LDA       I!!!!!01
157200              ADC       #0
157300              STA       I!!!!!01
157400              LDA       JLST!!01+1
157500              CMP       I!!!!!01+1
157600              LDA       JLST!!01
157700              SBC       I!!!!!01
157800              BMI       .L000095
157900   .L000096   EQU       *
158000      ;       XP=X+IRZ(I)/AMP
158100              LDA       I!!!!!01+1
158200              SEC
158300              SBC       #1
158400              ASL       A
158500              ASL       A
158600              ADC       IRZ!!!01
158700              STA       .T000006
158800              LDA       #0
158900              ADC       IRZ!!!01+1
159000              STA       .T000006+1
159100   .MFFDIV    SET       1
159200              JSR       .FFDIV
159300              .BYTE     0
159400              .WORD     -.T000006,AMP!!!01
159500              .WORD     .T000015
159600   .MFFADD    SET       1
159700              JSR       .FFADD
159800              .BYTE     0
159900              .WORD     X!!!!01,.T000015
160000              .WORD     XP!!!!01
160100      ;       YP=Y-FLOAT(I-1)*YINT
160200              LDA       I!!!!!01+1
160300              SEC
160400              SBC       #1
160500              STA       .T000005+1
160600              LDA       I!!!!!01
160700              SBC       #0
160800              STA       .T000005
160900   .MFFLOAT   SET       1
161000              JSR       .FFLOAT
161100              .BYTE     1
161200              .WORD     .T000005
161300              .WORD     .T000015
161400   .MFFMUL    SET       1
161500              JSR       .FFMUL
161600              .BYTE     0
161700              .WORD     .T000015,YINT!!01
161800              .WORD     .T000017
161900   .MFFSUB    SET       1
162000              JSR       .FFSUB
162100              .BYTE     0
162200              .WORD     Y!!!!01,.T000017
162300              .WORD     YP!!!!01
162400      ;       CALL PLOT(XP,YP,2)
162500              LDA       #.C000013 MOD .M
```

```
162600            STA     PLOT.003
162700            LDA     #.C000013/256
162800            STA     PLOT.003+1
162900            LDA     #YP!!!!01 MOD .M
163000            STA     PLOT.002
163100            LDA     #YP!!!!01/256
163200            STA     PLOT.002+1
163300            LDA     #XP!!!!01 MOD .M
163400            STA     PLOT.001
163500            LDA     #XP!!!!01/256
163600            STA     PLOT.001+1
163700            JSR     PLOT
163800   ; 200    CONTINUE
163900   .L000098 EQU     *
164000            JMP     .L000094
164100   .L000095 EQU     *
164200   ;        CALL PLOT(X,0.5,3)
164300            LDA     #.C000011 MOD .M
164400            STA     PLOT.003
164500            LDA     #.C000011/256
164600            STA     PLOT.003+1
164700            LDA     #.C000099 MOD .M
164800            STA     PLOT.002
164900            LDA     #.C000099/256
165000            STA     PLOT.002+1
165100            LDA     #X!!!!01 MOD .M
165200            STA     PLOT.001
165300            LDA     #X!!!!01/256
165400            STA     PLOT.001+1
165500            JSR     PLOT
165600   ;        CALL PLOT(X,TTOP,2)
165700            LDA     #.C000013 MOD .M
165800            STA     PLOT.003
165900            LDA     #.C000013/256
166000            STA     PLOT.003+1
166100            LDA     #TTOP!!01 MOD .M
166200            STA     PLOT.002
166300            LDA     #TTOP!!01/256
166400            STA     PLOT.002+1
166500            LDA     #X!!!!01 MOD .M
166600            STA     PLOT.001
166700            LDA     #X!!!!01/256
166800            STA     PLOT.001+1
166900            JSR     PLOT
167000   ; C
167100   ; C PLOT PROJECTED TRACE IF REQUESTED
167200   ; C
167300   ;        IF(THREED.LE.0)GO TO 300
167400   .MFFLE   SET     1
167500            JSR     .FFLE
167600            .BYTE   0
167700            .WORD   THREED01,.C000100
167800            ASL     A
167900            BCS     *+5
168000            JMP     .L000101
168100            JMP     .L000102
168200   .L000101 EQU     *
168300   ;        ADD=AXLEN/FLOAT(NSAMP)/STRECH
168400   .FFLOAT  SET     1
168500            JSR     .FFLOAT
168600            .BYTE   1
168700            .WORD   NSAMP!01
168800            .WORD   .T000015
168900   .MFFDIV  SET     1
169000            JSR     .FFDIV
169100            .BYTE   0
169200            .WORD   AXLEN!01,.T000015
169300            .WORD   .T000017
169400   .MFFDIV  SET     1
169500            JSR     .FFDIV
169600            .BYTE   0
169700            .WORD   .T000017,-STRECH01
169800            .WORD   ADD!!!01
```

```
169900        ;         CALL PROJCT(TRX(JEST),TRY(JEST),TRZ(JEST),NSAMP,XPROJ,YPROJ,
170000        ;       + ZPROJ,ADD,IDEBUG)
170100                LDA     IDEBUG!01
170200                STA     PROJCT.9
170300                LDA     IDEBUG!01+1
170400                STA     PROJCT.9+1
170500                LDA     #ADD!!!01 MOD .M
170600                STA     PROJCT.8
170700                LDA     #ADD!!!01/256
170800                STA     PROJCT.8+1
170900                LDA     ZPROJ!01
171000                STA     PROJCT.7
171100                LDA     ZPROJ!01+1
171200                STA     PROJCT.7+1
171300                LDA     YPROJ!01
171400                STA     PROJCT.6
171500                LDA     YPROJ!01+1
171600                STA     PROJCT.6+1
171700                LDA     XPROJ!01
171800                STA     PROJCT.5
171900                LDA     XPROJ!01+1
172000                STA     PROJCT.5+1
172100                LDA     #NSAMP!01 MOD .M
172200                STA     PROJCT.4
172300                LDA     #NSAMP!01/256
172400                STA     PROJCT.4+1
172500                LDA     JEST!!01+1
172600                SEC
172700                SBC     #1
172800                ASL     A
172900                ASL     A
173000                ADC     TRZ!!!01
173100                STA     PROJCT.3
173200                LDA     #0
173300                ADC     TRZ!!!01+1
173400                STA     PROJCT.3+1
173500                LDA     JEST!!01+1
173600                SEC
173700                SBC     #1
173800                ASL     A
173900                ASL     A
174000                ADC     TRY!!!01
174100                STA     PROJCT.2
174200                LDA     #0
174300                ADC     TRY!!!01+1
174400                STA     PROJCT.2+1
174500                LDA     JEST!!01+1
174600                SEC
174700                SBC     #1
174800                ASL     A
174900                ASL     A
175000                ADC     TRX!!!01
175100                STA     PROJCT.1
175200                LDA     #0
175300                ADC     TRX!!!01+1
175400                STA     PROJCT.1+1
175500                JSR     PROJCT
175600        ;       XMAX=0.
175700        .MFLTASG SET    1
175800                JSR     .FLTASG
175900                .BYTE   0
176000                .WORD   C00103
176100                .WORD   XMAX!01
176200        ;       YMAX=-1.E30
176300        .MFUNMIN SET    1
176400                JSR     .FUNMIN
176500                .BYTE   0
176600                .WORD   C00104
176700                .WORD   YMAX!01
176800        ;       YMIN=1.E30
176900        .MFLTASG SET    1
177000                JSR     .FLTASG
177100                .BYTE   0
```

```
177200                .WORD  .C000105
177300                .WORD  YMIN!!01
177400       ;        DO 220 I=1,NSAMP
177500                LDA    #0
177600                STA    I!!!!!01
177700                LDA    #1
177800                STA    I!!!!!01+1
177900                JMP    .L000106
178000   .L000106 EQU  *
178100                LDA    I!!!!!01+1
178200                CLC
178300                ADC    #1
178400                STA    I!!!!!01+1
178500                LDA    I!!!!!01
178600                ADC    #0
178700                STA    I!!!!!01
178800                LDA    NSAMP!01+1
178900                CMP    I!!!!!01+1
179000                LDA    NSAMP!01
179100                SBC    I!!!!!01
179200                BMI    .L000107
179300   .L000108 EQU  *
179400       ;        XMAX=AMAX1(XMAX,ABS(XPROJ(I)))
179500                LDA    I!!!!!01+1
179600                SEC
179700                SBC    #1
179800                ASL    A
179900                ASL    A
180000                ADC    XPROJ!01
180100                STA    ABS.0001
180200                LDA    #0
180300                ADC    XPROJ!01+1
180400                STA    ABS.0001+1
180500                LDA    #.T000015 MOD .M
180600                STA    ABS.0000
180700                LDA    #.T000015/256
180800                STA    ABS.0000+1
180900                JSR    ABS
181000                LDA    #.T000015 MOD .M
181100                STA    AMAX1.02
181200                LDA    #.T000015/256
181300                STA    AMAX1.02+1
181400                LDA    #XMAX!!01 MOD .M
181500                STA    AMAX1.01
181600                LDA    #XMAX!!01/256
181700                STA    AMAX1.01+1
181800                LDA    #.T000015 MOD .M
181900                STA    AMAX1.00
182000                LDA    #.T000015/256
182100                STA    AMAX1.00+1
182200                JSR    AMAX1
182300   .RELIASG SET  1
182400                JSR    .RELIASGN
182500                .BYTE  0
182600                .WORD  .T000015
182700                .WORD  XMAX!!01
182800       ;        YMAX=AMAX1(YMAX,YPROJ(I))
182900                LDA    I!!!!!01+1
183000                SEC
183100                SBC    #1
183200                ASL    A
183300                ASL    A
183400                ADC    YPROJ!01
183500                STA    AMAX1.02
183600                LDA    #0
183700                ADC    YPROJ!01+1
183800                STA    AMAX1.02+1
183900                LDA    #YMAX!!01 MOD .M
184000                STA    AMAX1.01
184100                LDA    #YMAX!!01/256
184200                STA    AMAX1.01+1
184300                LDA    #.T000015 MOD .M
```

```
184400             STA    AMAX1.00
184500             LDA    #.T000015/256
184600             STA    AMAX1.00+1
184700             JSR    AMAX1
184800    .MFLTASG SET    1
184900             JSR    .FLTASGN
185000             .BYTE  0
185100             .WORD  .T000015
185200             .WORD  YMAX!!01
185300   ;         YMIN=AMIN1(YMIN,YPROJ(I))
185400             LDA    I!!!!!01+1
185500             SEC
185600             SBC    #1
185700             ASL    A
185800             ASL    A
185900             ADC    YPROJ!01
186000             STA    AMIN1.02
186100             LDA    #0
186200             ADC    YPROJ!01+1
186300             STA    AMIN1.02+1
186400             LDA    #YMIN!!01 MOD .M
186500             STA    AMIN1.01
186600             LDA    #YMIN!!01/256
186700             STA    AMIN1.01+1
186800             LDA    #.T000015 MOD .M
186900             STA    AMIN1.00
187000             LDA    #.T000015/256
187100             STA    AMIN1.00+1
187200             JSR    AMIN1
187300    .MFLTASG SET    1
187400             JSR    .FLTASGN
187500             .BYTE  0
187600             .WORD  .T000015
187700             .WORD  YMIN!!01
187800   ; 220     CONTINUE
187900   .L000110  EQU    *
188000             JMP    .L000106
188100   .L000107  EQU    *
188200   ;         XFACTR=1.5/XMAX
188300    .MFFDIV  SET    1
188400             JSR    .FFDIV
188500             .BYTE  0
188600             .WORD  .C000111,XMAX!!01
188700             .WORD  XFACTR01
188800   ;         YFACTR=AXLEN/(YMAX-YMIN)
188900    .MFFSUB  SET    1
189000             JSR    .FFSUB
189100             .BYTE  0
189200             .WORD  YMAX!!01,YMIN!!01
189300             .WORD  .T000015
189400    .MFFDIV  SET    1
189500             JSR    .FFDIV
189600             .BYTE  0
189700             .WORD  AXLEN!01,.T000015
189800             .WORD  YFACTR01
189900   ;         X=X+2.0
190000   ; C
190100   ; C MAKE PROVISION TO CHANGE PLOTTING SYMBOL EVERY 100 MSEC.
190200   ; C
190300    .MFFADD  SET    1
190400             JSR    .FFADD
190500             .BYTE  0
190600             .WORD  X!!!!!01,.C000112
190700             .WORD  X!!!!!01
190800   ;         NHUNDR=INT(100./SAMINT+0.1)
190900    .MFFDIV  SET    1
191000             JSR    .FFDIV
191100             .BYTE  0
191200             .WORD  .C000113,SAMINT01
191300             .WORD  .T000015
191400    .MFFADD  SET    1
191500             JSR    .FFADD
```

```
191600              .BYTE 0
191700              .WORD .T000015,.C000114
191800              .WORD .T000017
191900              LDA   #.T000017 MOD .M
192000              STA   INT.0001
192100              LDA   #.T000017/256
192200              STA   INT.0001+1
192300              LDA   #.T000005 MOD .M
192400              STA   INT.0000
192500              LDA   #.T000005/256
192600              STA   INT.0000+1
192700              JSR   INT
192800              LDA   .T000005
192900              STA   NHUNDR01
193000              LDA   .T000005+1
193100              STA   NHUNDR01+1
193200        ;     NI=NSAMP/NHUNDR
193300  .MIDIV SET  1
193400              JSR   .IDIV.
193500              .BYTE 7
193600              .WORD NSAMP!01,NHUNDR01
193700              .WORD NI!!!!01
193800        ;     YORG=YTOP-AXLEN
193900  .MFSUB SET  1
194000              JSR   .FFSUB
194100              .BYTE 0
194200              .WORD YTOP!!01,AXLEN!01
194300              .WORD YORG!!01
194400        ;     XP=X+XPROJ(I)*XFACTR
194500              LDA   #I
194600              SEC
194700              SBC   #1
194800              ASL   A
194900              ASL   A
195000              ADC   XPROJ!01
195100              STA   .T000006
195200              LDA   #0
195300              ADC   XPROJ!01+1
195400              STA   .T000006+1
195500  .MFMUL SET  1
195600              JSR   .FFMUL
195700              .BYTE 0
195800              .WORD -.T000006,XFACTR01
195900              .WORD .T000015
196000  .MFFADD SET 1
196100              JSR   .FFADD
196200              .BYTE 0
196300              .WORD X!!!!!01,.T000015
196400              .WORD XP!!!!01
196500        ;     YP=YORG+YPROJ(I)*YFACTR
196600              LDA   #I
196700              SEC
196800              SBC   #1
196900              ASL   A
197000              ASL   A
197100              ADC   YPROJ!01
197200              STA   .T000006
197300              LDA   #0
197400              ADC   YPROJ!01+1
197500              STA   .T000006+1
197600  .MFFMUL SET 1
197700              JSR   .FFMUL
197800              .BYTE 0
197900              .WORD -.T000006,YFACTR01
198000              .WORD .T000015
198100  .MFFADD SET 1
198200              JSR   .FFADD
198300              .BYTE 0
198400              .WORD YORG!!01,.T000015
198500              .WORD YP!!!!01
198600        ;     CALL PLOT.(XP,YP,3)
198700              LDA   #.C000011 MOD .M
198800              STA   PLOT.005
```

```
198900              LDA    #.L000011/256
199000              STA    PLOT.005+1
199100              LDA    #XP111101 MOD .M
199200              STA    PLOT.002
199300              LDA    #XP111101/256
199400              STA    PLOT.002+1
199500              LDA    #XP111101 MOD .M
199600              STA    PLOT.001
199700              LDA    #XP111101/256
199800              STA    PLOT.001+1
199900              JSR    PLOT
200000       ;      K=0
200100              LDA    #0
200200              STA    K111101
200300              LDA    #0
200400              STA    K111101+1
200500       ;      DO 200 I=1,N
200600              LDA    #0
200700              STA    I111101
200800              LDA    #1
200900              STA    I111101+1
201000              JMP    .L000117
201100      .L000115 EQU   *
201200              LDA    I111101+1
201300              CLC
201400              ADC    #1
201500              STA    I111101+1
201600              LDA    I111101
201700              ADC    #0
201800              STA    I111101
201900              LDA    NI111101+1
202000              CMP    I111101+1
202100              LDA    NI111101
202200              SBC    I111101
202300              BMI    .L000116
202400      .L000117 EQU   *
202500       ;      INTEU=2+(-1)*A+1
202600              LDA    .L000041+1
202700              CLC
202800              ADC    I111101+1
202900              STA    #2
203000       ;      DO 240 J=1,NHUNDR
203100              LDA    #0
203200              STA    J111101
203300              LDA    #1
203400              STA    J111101+1
203500              JMP    .L000122
203600      .L000120 EQU   *
203700              LDA    J111101+1
203800              CLC
203900              ADC    #1
204000              STA    J111101+1
204100              LDA    J111101
204200              ADC    #0
204300              STA    J111101
204400              LDA    NHUNDR01+1
204500              CMP    J111101+1
204600              LDA    NHUNDR01
204700              SBC    J111101
204800              BMI    .L000121
204900      .L000122 EQU   *
205000       ;      K=K+1
205100              LDA    K111101+1
205200              CLC
205300              ADC    #1
205400              STA    K111101+1
205500              LDA    K111101
205600              ADC    #0
205700              STA    K111101
205800       ;      XP=X+XPROJ(K)*XFACTR
205900              LDA    K111101+1
206000              SEC
206100              SBC    #1
```

```
206200              ASL    A
206300              ASL    A
206400              ADC    XPROJ!01
206500              STA    .T00006
206600              LDA    #0
206700              ADC    XPROJ!01+1
206800              STA    .T00006+1
206900    .MFFMUL   SET    1
207000              JSR    .FFMUL
207100              .BYTE  0
207200              .WORD  =.T00006,XFACTR01
207300              .WORD  .T00015
207400    .MFFADD   SET    1
207500              JSR    .FFADD
207600              .BYTE  0
207700              .WORD  X!!!!!01,.T00015
207800              .WORD  XP!!!01
207900    ;         YP=YORG+(YPROJ(K)-YMIN)*YFACTR
208000              LDA    K!!!!!01+1
208100              SEC
208200              SBC    #1
208300              ASL    A
208400              ASL    A
208500              ADC    YPROJ!01
208600              STA    .T00006
208700              LDA    #0
208800              ADC    YPROJ!01+1
208900              STA    .T00006+1
209000    .MFFSUB   SET    1
209100              JSR    .FFSUB
209200              .BYTE  0
209300              .WORD  =.T00006,YMIN!!01
209400              .WORD  .T00015
209500    .MFFMUL   SET    1
209600              JSR    .FFMUL
209700              .BYTE  0
209800              .WORD  .T00015,YFACTR01
209900              .WORD  .T00017
210000    .MFFADD   SET    1
210100              JSR    .FFADD
210200              .BYTE  0
210300              .WORD  YORG!!01,.T00017
210400              .WORD  YP!!!01
210500    ;         CALL SYMBOL(XP,YP,ZPROJ(K),INTEQ,0.,-2)
210600              LDA    #.C00126 MOD .M
210700              STA    SYMBOL.6
210800              LDA    #.C00126/256
210900              STA    SYMBOL.6+1
211000              LDA    #.C00125 MOD .M
211100              STA    SYMBOL.5
211200              LDA    #.C00125/256
211300              STA    SYMBOL.5+1
211400              LDA    #INTEQ!01 MOD .M
211500              STA    SYMBOL.4
211600              LDA    #INTEQ!01/256
211700              STA    SYMBOL.4+1
211800              LDA    K!!!!!01+1
211900              SEC
212000              SBC    #1
212100              ASL    A
212200              ASL    A
212300              ADC    ZPROJ!01
212400              STA    SYMBOL.3
212500              LDA    #0
212600              ADC    ZPROJ!01+1
212700              STA    SYMBOL.3+1
212800              LDA    #YP!!!01 MOD .M
212900              STA    SYMBOL.2
213000              LDA    #YP!!!01/256
213100              STA    SYMBOL.2+1
213200              LDA    #XP!!!01 MOD .M
213300              STA    SYMBOL.1
213400              LDA    #XP!!!01/256
```

```
213500                  STA     SYMBOL.1+1
213600                  JSR     SYMBOL
213700          ; 240   CONTINUE
213800          .L000124 EQU    *
213900                  JMP     .L000120
214000          .L000121 EQU    *
214100          ; 260   CONTINUE
214200          .L000119 EQU    *
214300                  JMP     .L000115
214400          .L000116 EQU    *
214500          ;       CALL PLOT(X,0.5,3)
214600                  LDA     #.C000011 MOD .M
214700                  STA     PLOT.003
214800                  LDA     #.C000011/256
214900                  STA     PLOT.003+1
215000                  LDA     #.C000127 MOD .M
215100                  STA     PLOT.002
215200                  LDA     #.C000127/256
215300                  STA     PLOT.002+1
215400                  LDA     #X!!!!!01 MOD .M
215500                  STA     PLOT.001
215600                  LDA     #X!!!!!01/256
215700                  STA     PLOT.001+1
215800                  JSR     PLOT
215900          ;       CALL PLOT(X,Y1UP,2)
216000                  LDA     #.C000013 MOD .M
216100                  STA     PLOT.003
216200                  LDA     #.C000013/256
216300                  STA     PLOT.003+1
216400                  LDA     #Y1UP!!01 MOD .M
216500                  STA     PLOT.002
216600                  LDA     #Y1UP!!01/256
216700                  STA     PLOT.002+1
216800                  LDA     #X!!!!!01 MOD .M
216900                  STA     PLOT.001
217000                  LDA     #X!!!!!01/256
217100                  STA     PLOT.001+1
217200                  JSR     PLOT
217300          ; C
217400          ; C PLOT HODOGRAPHS
217500          ; C
217600          ; 300   IF(NGATES.LE.0)GO TO 420
217700          .L000102 EQU    *
217800                  LDA     #0
217900                  CMP     NGATES01+1
218000                  LDA     #0
218100                  SBC     NGATES01
218200                  BMI     .L000128
218300                  JMP     .L000130
218400          .L000128 EQU    *
218500          ;       HAXLEN=AXLEN/3.-1.0
218600          .MFFDIV SET     1
218700                  JSR     .FFDIV
218800                  .BYTE   0
218900                  .WORD   AXLEN!01,.C000131
219000                  .WORD   .T000015
219100          .MFFSUB SET     1
219200                  JSR     .FFSUB
219300                  .BYTE   0
219400                  .WORD   .T000015,.C000132
219500                  .WORD   HAXLEN01
219600          ;       X=X+1.5
219700          .MFFADD SET     1
219800                  JSR     .FFADD
219900                  .BYTE   0
220000                  .WORD   X!!!!!01,.C000133
220100                  .WORD   X!!!!!01
220200          ;       DO 400 I=1,NGATES
220300                  LDA     #0
220400                  STA     I!!!!!01
220500                  LDA     #1
220600                  STA     I!!!!!01+1
```

```
220700              JMP     .L000136
220800  .L000134    EQU     *
220900              LDA     I!!!!!01+1
221000              CLC
221100              ADC     #1
221200              STA     I!!!!!01+1
221300              LDA     I!!!!!01
221400              ADC     #0
221500              STA     I!!!!!01
221600              LDA     NGATES01+1
221700              CMP     I!!!!!01+1
221800              LDA     NGATES01
221900              SBC     I!!!!!01
222000              BMI     .L000135
222100  .L000136    EQU     *
222200      ;       GATE1=GATES(2*I-1)
222300  .MIMUL      SET     1
222400              JSR     .IMUL
222500              .BYTE   6
222600              .WORD   .C000013,I!!!!!01
222700              .WORD   .T000005
222800              LDA     .T000005+1
222900              SEC
223000              SBC     #1
223100              STA     .T000006
223200              LDA     .T000006
223300              ASL     A
223400              ASL     A
223500              CLC
223600              ADC     #(GATES101-4) MOD .M
223700              STA     .T000005
223800              LDA     #0
223900              ADC     #(GATES101-4)/256
224000              STA     .T000005+1
224100  .MFLTASG    SET     1
224200              JSR     .FLTASGN
224300              .BYTE   0
224400              .WORD   -.T000005
224500              .WORD   GATE1101
224600      ;       GATE2=GATES(2*I)
224700  .MIMUL      SET     1
224800              JSR     .IMUL
224900              .BYTE   2
225000              .WORD   .C000013,I!!!!!01
225100              .WORD   .T000005
225200              LDA     .T000005
225300              ASL     A
225400              ASL     A
225500              CLC
225600              ADC     #(GATES101-4) MOD .M
225700              STA     .T000006
225800              LDA     #0
225900              ADC     #(GATES101-4)/256
226000              STA     .T000006+1
226100  .MFLTASG    SET     1
226200              JSR     .FLTASGN
226300              .BYTE   0
226400              .WORD   -.T000006
226500              .WORD   GATE2101
226600      ;       JBEG=INT(GATE1/SAMINT*1000.+1.1)
226700  .MFFDIV     SET     1
226800              JSR     .FFDIV
226900              .BYTE   0
227000              .WORD   GATE1101,SAMINT01
227100              .WORD   .T000015
227200  .MFFMUL     SET     1
227300              JSR     .FFMUL
227400              .BYTE   0
227500              .WORD   .T000015,.C000139
227600              .WORD   .T000017
227700  .MFFADD     SET     1
227800              JSR     .FFADD
```

```
227900                .BYTE  0
228000                .WORD  .T000017,.C000140
228100                .WORD  .T000015
228200                LDA    #.T000015 MOD .M
228300                STA    INT.0001
228400                LDA    #.T000015/256
228500                STA    INT.0001+1
228600                LDA    #.T000005 MOD .M
228700                STA    INT.0000
228800                LDA    #.T000005/256
228900                STA    INT.0000+1
229000                JSR    INT
229100                LDA    .T000005
229200                STA    JBEG!!01
229300                LDA    .T000005+1
229400                STA    JBEG!!01+1
229500     ;          JEND=INT(GATE2/SAMINT*1000.+1.1)
229600     .FFDIV     SET    1
229700                JSR    .FFDIV
229800                .BYTE  0
229900                .WORD  GATE2!!01,SAMINT!01
230000                .WORD  .T000015
230100     .FFMUL     SET    1
230200                JSR    .FFMUL
230300                .BYTE  0
230400                .WORD  .T000015,.C000141
230500                .WORD  .T000017
230600     .FFADD     SET    1
230700                JSR    .FFADD
230800                .BYTE  0
230900                .WORD  .T000017,.C000142
231000                .WORD  .T000015
231100                LDA    #.T000015 MOD .M
231200                STA    INT.0001
231300                LDA    #.T000015/256
231400                STA    INT.0001+1
231500                LDA    #.T000005 MOD .M
231600                STA    INT.0000
231700                LDA    #.T000005/256
231800                STA    INT.0000+1
231900                JSR    INT
232000                LDA    .T000005
232100                STA    JEND!!01
232200                LDA    .T000005+1
232300                STA    JEND!!01+1
232400     ;          JDIF=JEND-JBEG+1
232500     ; C
232600     ; C FIND THE MAXIMUM OF ALL THREE TRACES
232700     ; C
232800                LDA    JEND!!01+1
232900                SEC
233000                SBC    JBEG!!01+1
233100                STA    .T000005+1
233200                LDA    JEND!!01
233300                SBC    JBEG!!01
233400                STA    .T000005
233500                LDA    .T000005+1
233600                CLC
233700                ADC    #1
233800                STA    JDIF!!01+1
233900                LDA    .T000005
234000                ADC    #0
234100                STA    JDIF!!01
234200     ;          AXMAX=0.
234300     .FLTASG    SET    1
234400                JSR    .FLTASG
234500                .BYTE  0
234600                .WORD  .C000143
234700                .WORD  AXMAX!01
234800     ;          DO 320 J=JBEG,JEND
234900                LDA    JBEG!!01
235000                STA    J!!!!01
235100                LDA    JBEG!!01+1
```

```
255200            STA    J!!!!!01+1
255300            JMP    .L000146
255400  .L000144  EQU    *
255500            LDA    J!!!!!01+1
255600            CLC
255700            ADC    #1
255800            STA    J!!!!!01+1
255900            LDA    J!!!!!01
256000            ADC    #0
256100            STA    J!!!!!01
256200            LDA    JEND!!01+1
256300            CMP    J!!!!!01+1
256400            LDA    JEND!!01
256500            SBC    J!!!!!01
256600            BMI    .L000145
256700  .L000146  EQU    *
256800  ;         AXMAX=AMAX1(AXMAX,ABS(TRX(J)),ABS(TRY(J)),ABS(TRZ(J)))
256900            LDA    J!!!!!01+1
257000            SEC
257100            SBC    #1
257200            ASL    A
257300            ASL    A
257400            ADC    TRX!!!01
257500            STA    ABS.0001
237600            LDA    #0
237700            ADC    TRX!!!01+1
237800            STA    ABS.0001+1
237900            LDA    #.T000015 MOD .M
238000            STA    ABS.0000
238100            LDA    #.T000015/256
238200            STA    ABS.0000+1
238300            JSR    ABS
238400            LDA    J!!!!!01+1
238500            SEC
238600            SBC    #1
238700            ASL    A
238800            ASL    A
238900            ADC    TRY!!!01
239000            STA    ABS.0001
239100            LDA    #0
239200            ADC    TRY!!!01+1
239300            STA    ABS.0001+1
239400            LDA    #.T000017 MOD .M
239500            STA    ABS.0000
239600            LDA    #.T000017/256
239700            STA    ABS.0000+1
239800            JSR    ABS
239900            LDA    J!!!!!01+1
240000            SEC
240100            SBC    #1
240200            ASL    A
240300            ASL    A
240400            ADC    TRZ!!!01
240500            STA    ABS.0001
240600            LDA    #0
240700            ADC    TRZ!!!01+1
240800            STA    ABS.0001+1
240900            LDA    #.T000046 MOD .M
241000            STA    ABS.0000
241100            LDA    #.T000046/256
241200            STA    ABS.0000+1
241300            JSR    ABS
241400            LDA    #.T000046 MOD .M
241500            STA    AMAX1.04
241600            LDA    #.T000046/256
241700            STA    AMAX1.04+1
241800            LDA    #.T000017 MOD .M
241900            STA    AMAX1.03
242000            LDA    #.T000017/256
242100            STA    AMAX1.03+1
242200            LDA    #.T000015 MOD .M
242300            STA    AMAX1.02
```

```
242400              LDA     #.1000015/256
242500              STA     AMAX1.02+1
242600              LDA     #AXMAX!01 MOD .M
242700              STA     AMAX1.01
242800              LDA     #AXMAX!01/256
242900              STA     AMAX1.01+1
243000              LDA     #.1000015 MOD .M
243100              STA     AMAX1.00
243200              LDA     #.1000015/256
243300              STA     AMAX1.00+1
243400              JSR     AMAX1
243500     .FLTASG SET     1
243600              JSR     .FLTASGN
243700              .BYTE   0
243800              .WORD   .1000015
243900              .WORD   AXMAX!01
244000     ; 320   CONTINUE
244100     .L000148 EQU    *
244200              JMP     .L000144
244300     .L000145 EQU    *
244400     ; C
244500     ; C CALL HODO2 TO PLOT HODOGRAPHS THREE TIMES
244600     ; C
244700     ;       Y=YTOP+0.5
244800     .MFFADD SET     1
244900              JSR     .FFADD
245000              .BYTE   0
245100              .WORD   YTOP!!01,.C000149
245200              .WORD   Y!!!!!01
245300     ;       CALL HODO2(IRX(JBEG),IRZ(JBEG),JDIF,AXMAX,X,Y,CR,CV,HAXLEN,
245400     ;       +  IDEBUG,GATE1,GATE2)
245500              LDA     #GATE2!01 MOD .M
245600              STA     HODO2.12
245700              LDA     #GATE2!01/256
245800              STA     HODO2.12+1
245900              LDA     #GATE1!01 MOD .M
246000              STA     HODO2.11
246100              LDA     #GATE1!01/256
246200              STA     HODO2.11+1
246300              LDA     IDEBUG01
246400              STA     HODO2.10
246500              LDA     IDEBUG01+1
246600              STA     HODO2.10+1
246700              LDA     #HAXLEN01 MOD .M
246800              STA     HODO2.09
246900              LDA     #HAXLEN01/256
247000              STA     HODO2.09+1
247100              LDA     #CV!!!!01 MOD .M
247200              STA     HODO2.08
247300              LDA     #CV!!!!01/256
247400              STA     HODO2.08+1
247500              LDA     #CR!!!!01 MOD .M
247600              STA     HODO2.07
247700              LDA     #CR!!!!01/256
247800              STA     HODO2.07+1
247900              LDA     #Y!!!!!01 MOD .M
248000              STA     HODO2.06
248100              LDA     #Y!!!!!01/256
248200              STA     HODO2.06+1
248300              LDA     #X!!!!!01 MOD .M
248400              STA     HODO2.05
248500              LDA     #X!!!!!01/256
248600              STA     HODO2.05+1
248700              LDA     #AXMAX!01 MOD .M
248800              STA     HODO2.04
248900              LDA     #AXMAX!01/256
249000              STA     HODO2.04+1
249100              LDA     #JDIF!!01 MOD .M
249200              STA     HODO2.03
249300              LDA     #JDIF!!01/256
249400              STA     HODO2.03+1
249500              LDA     JBEG!!01+1
```

```
249600              SEC
249700              SBC     #1
249800              ASL     A
249900              ASL     A
250000              ADC     TRZ!!!01
250100              STA     HODO2.02
250200              LDA     #0
250300              ADC     TRZ!!!01+1
250400              STA     HODO2.02+1
250500              LDA     JBEG!!!01+1
250600              SEC
250700              SBC     #1
250800              ASL     A
250900              ASL     A
251000              ADC     TRX!!!01
251100              STA     HODO2.01
251200              LDA     #0
251300              ADC     TRX!!!01+1
251400              STA     HODO2.01+1
251500              JSR     HODO2
251600      ;       Y=Y-HAXLEN-1.0
251700      .FFSUB  SET     1
251800              JSR     .FFSUB
251900              .BYTE   0
252000              .WORD   Y!!!!!01,HAXLEN01
252100              .WORD   .1000015
252200      .FFSUB  SET     1
252300              JSR     .FFSUB
252400              .BYTE   0
252500              .WORD   .1000015,.C000150
252600              .WORD   Y!!!!!01
252700      ;       CALL HODO2(TRY(JBEG),TRZ(JBEG),JDIF,AXMAX,X,Y,CI,CV,HAXLEN,
252800      ;       + IDEBUG,GATE1,GATE2)
252900              LDA     #GATE2!01 MOD .M
253000              STA     HODO2.12
253100              LDA     #GATE2!01/256
253200              STA     HODO2.12+1
253300              LDA     #GATE1!01 MOD .M
253400              STA     HODO2.11
253500              LDA     #GATE1!01/256
253600              STA     HODO2.11+1
253700              LDA     IDEBUG01
253800              STA     HODO2.10
253900              LDA     IDEBUG01+1
254000              STA     HODO2.10+1
254100              LDA     #HAXLEN01 MOD .M
254200              STA     HODO2.09
254300              LDA     #HAXLEN01/256
254400              STA     HODO2.09+1
254500              LDA     #CV!!!!01 MOD .M
254600              STA     HODO2.08
254700              LDA     #CV!!!!01/256
254800              STA     HODO2.08+1
254900              LDA     #CI!!!!01 MOD .M
255000              STA     HODO2.07
255100              LDA     #CI!!!!01/256
255200              STA     HODO2.07+1
255300              LDA     #Y!!!!!01 MOD .M
255400              STA     HODO2.06
255500              LDA     #Y!!!!!01/256
255600              STA     HODO2.06+1
255700              LDA     #X!!!!!01 MOD .M
255800              STA     HODO2.05
255900              LDA     #X!!!!!01/256
256000              STA     HODO2.05+1
256100              LDA     #AXMAX!01 MOD .M
256200              STA     HODO2.04
256300              LDA     #AXMAX!01/256
256400              STA     HODO2.04+1
256500              LDA     #JDIF!!01 MOD .M
256600              STA     HODO2.03
256700              LDA     #JDIF!!01/256
256800              STA     HODO2.03+1
```

```
256900          LDA     JBEG!!!01+1
257000          SEC
257100          SBC     #1
257200          ASL     A
257300          ASL     A
257400          ADC     TRZ!!!01
257500          STA     HODO2.02
257600          LDA     #0
257700          ADC     TRZ!!!01+1
257800          STA     HODO2.02+1
257900          LDA     JBEG!!!01+1
258000          SEC
258100          SBC     #1
258200          ASL     A
258300          ASL     A
258400          ADC     TRY!!!01
258500          STA     HODO2.01
258600          LDA     #0
258700          ADC     TRY!!!01+1
258800          STA     HODO2.01+1
258900          JSR     HODO2
259000  ;       Y=Y-HAXLEN-1.0
259100  .MFFSUB SET     1
259200          JSR     .FFSUB
259300          .BYTE   0
259400          .WORD   Y!!!!!01,HAXLEN01
259500          .WORD   .I000015
259600  .MFFSUB SET     1
259700          JSR     .FFSUB
259800          .BYTE   0
259900          .WORD   .I000015,.C000151
260000          .WORD   Y!!!!!01
260100  ;       CALL HODO2(TRX(JBEG),TRY(JBEG),JDIF,AXMAX,X,Y,CR,CT,HAXLEN,
260200  ;       + IDEBUG,GATE1,GATE2)
260300          LDA     #GATE2!01 MOD .M
260400          STA     HODO2.12
260500          LDA     #GATE2!01/256
260600          STA     HODO2.12+1
260700          LDA     #GATE1!01 MOD .M
260800          STA     HODO2.11
260900          LDA     #GATE1!01/256
261000          STA     HODO2.11+1
261100          LDA     IDEBUG01
261200          STA     HODO2.10
261300          LDA     IDEBUG01+1
261400          STA     HODO2.10+1
261500          LDA     #HAXLEN01 MOD .M
261600          STA     HODO2.09
261700          LDA     #HAXLEN01/256
261800          STA     HODO2.09+1
261900          LDA     #CT!!!!!01 MOD .M
262000          STA     HODO2.08
262100          LDA     #CT!!!!!01/256
262200          STA     HODO2.08+1
262300          LDA     #CR!!!!!01 MOD .M
262400          STA     HODO2.07
262500          LDA     #CR!!!!!01/256
262600          STA     HODO2.07+1
262700          LDA     #Y!!!!!01 MOD .M
262800          STA     HODO2.06
262900          LDA     #Y!!!!!01/256
263000          STA     HODO2.06+1
263100          LDA     #X!!!!!01 MOD .M
263200          STA     HODO2.05
263300          LDA     #X!!!!!01/256
263400          STA     HODO2.05+1
263500          LDA     #AXMAX!01 MOD .M
263600          STA     HODO2.04
263700          LDA     #AXMAX!01/256
263800          STA     HODO2.04+1
263900          LDA     #JDIF!!01 MOD .M
264000          STA     HODO2.03
```

```
264100              LDA     #JBEG!!!01/256
264200              STA     MODU2.03+1
264300              LDA     JBEG!!!01+1
264400              SEC
264500              SBC     #1
264600              ASL     A
264700              ASL     A
264800              ADC     TRY!!!01
264900              STA     MODU2.02
265000              LDA     #0
265100              ADC     TRY!!!01+1
265200              STA     MODU2.02+1
265300              LDA     JBEG!!!01+1
265400              SEC
265500              SBC     #1
265600              ASL     A
265700              ASL     A
265800              ADC     TRX!!!01
265900              STA     MODU2.01
266000              LDA     #0
266100              ADC     TRX!!!01+1
266200              STA     MODU2.01+1
266300              JSR     MODU2
266400      ;       X=X+MAXLEN+1.0
266500      .MFFADD SET     1
266600              JSR     .FFADD
266700              .BYTE   0
266800              .WORD   X!!!!01,MAXLEN01
266900              .WORD   .T000015
267000      .MFFADD SET     1
267100              JSR     .FFADD
267200              .BYTE   0
267300              .WORD   .T000015,.C000152
267400              .WORD   X!!!!01
267500      ; 400   CONTINUE
267600      .L000138 EQU   *
267700              JMP     .L000134
267800      .L000135 EQU   *
267900      ; 420   XORG=X+5.0
268000      .L000130 EQU   *
268100      .MFFADD SET     1
268200              JSR     .FFADD
268300              .BYTE   0
268400              .WORD   X!!!!01,.C000153
268500              .WORD   XORG!!01
268600      ;       IF(ENDPLT.NE.1.)GO TO 100
268700      .MFFNE  SET     1
268800              JSR     .FFNE
268900              .BYTE   0
269000              .WORD   ENDPL!01,.C000154
269100              ASL     A
269200              BCS     *+5
269300              JMP     .L000155
269400              JMP     .L000009
269500      .L000155 EQU   *
269600      ;       CALL CLSEP
269700              JSR     CLSEP
269800      ;       RETURN
269900              JMP     .R000001
270000      ;       END
270100      .R000001 RTS
270200      ;       SUBROUTINE PNAME
270300      PNAME   EQU     *
270400      ;       .(NOUT,CHGNO,PLOTER,PAPER,XPORT,YDISPL,IBOLD,ISPEED,CPAPER,PEN1)
270500      NOUT!!02 EQU    PNAME.01
270600      CHGNO!02 EQU    PNAME.02
270700      PLOTER02 EQU    PNAME.03
270800      PAPER!02 EQU    PNAME.04
270900      XPORT!02 EQU    PNAME.05
271000      YDISPL02 EQU    PNAME.06
271100      IBOLD!02 EQU    PNAME.07
271200      ISPEED02 EQU    PNAME.08
271300      CPAPER02 EQU    PNAME.09
```

```
271400      PEN1!!02 EQU    PNAME.10
271500    ; C
271600    ; C    PNAME WRITES /PINT/ NAMELIST ON NOUT
271700    ; C
271800    ; C       REAL*8 PROD(2)/'FILM    ','PAPER   '/
271900    ;         REAL PROD(2)
272000    ; C       REAL*8 PLOTON(7)/'VAMP','C936','C750','XYNETICS','C770','C780',
272100    ; C      1   'C748'/
272200    ;         REAL PLOTON(7)
272300    ; C       REAL*4 YMAX(7)/30.,2*30.,57.,2*30.,48./
272400    ;         REAL*4 YMAX(7)
272500    ;         REAL*4 XPORT
272600    ;         INTEGER PLOTER,PAPER
272700    ;         LOGICAL CHGNU(7)
272800    ; C
272900    ;         PWIDTH=XPORT
273000    ; C
273100    ; C       WRITE(NOUT,1100)
273200    ; C      *(CHGNU(I),I=1,2),
273300    ; C      *(CHGNU(I),I=5,7),
273400    ; C      *CPAPER,
273500    ; C      *PEN1,
273600    ; C      *PLOTON(PLOTER),
273700    ; C      *PROD(PAPER+1),
273800    ; C      *PWIDTH
273900    ; C 1100 FORMAT(
274000    ; C      C*' XPLOTR ',/,
274100    ; C      C*' CLIENT=','''',2A1,'''',',',/,
274200    ; C      C*' CHARGE=','''',5A1,'''',',',/,
274300    ; C      C*' CPAPER=','''',A4,'''',',',/,
274400    ; C      C*' PEN1=','''',A4,'''',',',/,
274500    ; C      C*' PLOTON=','''',A8,'''',',',/,
274600    ; C      C*' PROD=','''',A8,'''',',',/,
274700    ; C      C*' PWIDTH=',E13.7,',',/,
274800    ; C,     C*' &END')
274900    ; CC
275000    ; CC      WRITE(NOUT,1200)
275100    ; C      C*IHOLD,
275200    ; C      C*ISPEED,
275300    ; C      C*YDISPL
275400    ; CC 1200 FORMAT(
275500    ; C      C*' &SELECT ',/,
275600    ; C      C*' NAMES=','''','ALL','''',',',/,
275700    ; C      C*' IHOLD=',I11,',',/,
275800    ; C      C*' ISPEED=',I11,',',/,
275900    ; C      C*' YDISPL=',E13.7,',')
276000    ; C       WRITE(NOUT,1220)YMAX(PLOTER)
276100    ; C 1220 FORMAT(' XMIN=0.,YMIN=0.,YMAX=',F5.1,',')
276200    ; C       WRITE(NOUT,1240)
276300    ; C 1240 FORMAT(' &END')
276400    ; C       WRITE(NOUT,1300)
276500    ; C 1300 FORMAT(
276600    ; C      *' &MERGE &END')
276700    ; C
276800    ; C       REWIND NOUT
276900    .MFIASG  SET     1
277000            JSR     .FLIASGN
277100            .BYTE   0
277200            .WORD   -XPORT!02
277300            .WORD   PWIDTH!02
277400    ;       RETURN
277500            JMP     .R000156
277600    ;       END
277700    .R000156 RTS
574000    ;       SUBROUTINE SCALE3(TRX,TRY,TRZ,NWIN,NSAMP,IDEBUG)
574100    SCALE3  EQU     *
574200    TRX!!!06 EQU    SCALE3.1
574300    TRY!!!06 EQU    SCALE3.2
574400    TRZ!!!06 EQU    SCALE3.3
574500    NWIN!!06 EQU    SCALE3.4
574600    NSAMP!06 EQU    SCALE3.5
574700    IDEBUG06 EQU    SCALE3.6
```

```
579800      ;         REAL*4 TRX(1),TRZ(1),TRY(1)
579900      ;         INTEGER WINDOW,HFWIN
580000      ; C       IF(IDEBUG.GT.0)WRITE(6,80)NWIN,NSAMP
580100      ; C80     FORMAT(' *** SUBROUTINE SCALE3 ***'/' NWIN=',I4,' NSAMP=',I4)
580200      ; C
580300      ; C FIND LARGEST AMPLITUDE AND NORMALIZE.
580400      ; C
580500      ;         WINDOW=NSAMP/NWIN
580600      .MIDIV    SEI     1.
580700               JSR     .IDIV
580800               .BYTE   7
580900               .WORD   -NSAMP!06,-NWIN!!06
581000               .WORD   WINDOW!06
581100      ;         TRMAX=0.
581200      .MFLTASG SEI     1
581300               JSR     .FLTASGN
581400               .BYTE   0
581500               .WORD   .C000404
581600               .WORD   TRMAX!06
581700      ;         DO 100 I=1,NSAMP
581800               LDA     #0
581900               STA     I!!!!!06
582000               LDA     #1
582100               STA     I!!!!!06+1
582200               JMP     .L000407
582300      .L000405 EQU     *
582400               LDA     I!!!!!06+1
582500               CLC
582600               ADC     #1
582700               STA     I!!!!!06+1
582800               LDA     I!!!!!06
582900               ADC     #0
583000               STA     I!!!!!06
583100               LDY     #1
583200               LDA     (NSAMP!06),Y
583300               CMP     I!!!!!06+1
583400               LDA     (NSAMP!06)
583500               SBC     I!!!!!06
583600               BMI     .L000406
583700      .L000407 EQU     *
583800      ;         TRMAX=AMAX1(ABS(TRX(I)),ABS(TRY(I)),ABS(TRZ(I)),TRMAX)
583900               LDA     I!!!!!06+1
584000               SEC
584100               SBC     #1
584200               ASL     A
584300               ASL     A
584400               ADC     TRX!!06
584500               STA     ABS.0001
584600               LDA     #0
584700               ADC     TRX!!06+1
584800               STA     ABS.0001+1
584900               LDA     #.T000410 MOD .M
585000               STA     ABS.0000
585100               LDA     #.T000410/256
585200               STA     ABS.0000+1
585300               JSR     ABS
585400               LDA     I!!!!!06+1
585500               SEC
585600               SBC     #1
585700               ASL     A
585800               ASL     A
585900               ADC     TRY!!06
586000               STA     ABS.0001
586100               LDA     #0
586200               ADC     TRY!!06+1
586300               STA     ABS.0001+1
586400               LDA     #.T000411 MOD .M
586500               STA     ABS.0000
586600               LDA     #.T000411/256
586700               STA     ABS.0000+1
586800               JSR     ABS
586900               LDA     I!!!!!06+1
587000               SEC
```

```
587100              SBC     #1
587200              ASL     A
587300              ASL     A
587400              ADC     TRZ!!!06
587500              STA     ABS.0001
587600              LDA     #0
587700              ADC     TRZ!!!06+1
587800              STA     ABS.0001+1
587900              LDA     #.1000412 MOD .M
588000              STA     ABS.0000
588100              LDA     #.1000412/256
588200              STA     ABS.0000+1
588300              JSR     ABS
588400              LDA     #TRMAX!06 MOD .M
588500              STA     AMAX1.04
588600              LDA     #TRMAX!06/256
588700              STA     AMAX1.04+1
588800              LDA     #.1000412 MOD .M
588900              STA     AMAX1.03
589000              LDA     #.1000412/256
589100              STA     AMAX1.03+1
589200              LDA     #.1000411 MOD .M
589300              STA     AMAX1.02
589400              LDA     #.1000411/256
589500              STA     AMAX1.02+1
589600              LDA     #.1000410 MOD .M
589700              STA     AMAX1.01
589800              LDA     #.1000410/256
589900              STA     AMAX1.01+1
590000              LDA     #.1000410 MOD .M
590100              STA     AMAX1.00
590200              LDA     #.1000410/256
590300              STA     AMAX1.00+1
590400              JSR     AMAX1
590500      .MFLTASG SET    1
590600              JSR     .FLTASGN
590700              .BYTE   0
590800              .WORD   .1000410
590900              .WORD   TRMAX!06
591000      ; 100   CONTINUE
591100      .L000409 EQU    *
591200              JMP     .L000405
591300      .L000406 EQU    *
591400      ;       TRMAX=TRMAX*10.
591500      .MFFMUL SET     1
591600              JSR     .FFMUL
591700              .BYTE   0
591800              .WORD   TRMAX!06,.C000413
591900              .WORD   TRMAX!06
592000      ;       DO 120 I=1,NSAMP
592100              LDA     #0
592200              STA     !!!!!!06
592300              LDA     #1
592400              STA     !!!!!!06+1
592500              JMP     .L000416
592600      .L000414 EQU    *
592700              LDA     !!!!!!06+1
592800              CLC
592900              ADC     #1
593000              STA     !!!!!!06+1
593100              LDA     !!!!!!06
593200              ADC     #0
593300              STA     !!!!!!06
593400              LDY     #1
593500              LDA     (NSAMP!06),Y
593600              CMP     !!!!!!06+1
593700              LDA     (NSAMP!06)
593800              SBC     !!!!!!06
593900              BMI     .L000415
594000      .L000416 EQU    *
594100      ;       TRX(I)=TRX(I)/TRMAX
594200              LDA     !!!!!!06+1
594300              SEC
```

```
594400              SBC     #1
594500              ASL     A
594600              ASL     A
594700              ADC     TRX!!!06
594800              STA     .1000402
594900              LDA     #0
595000              ADC     TRX!!!06+1
595100              STA     .1000402+1
595200              LDA     I!!!!!06+1
595300              SEC
595400              SBC     #1
595500              ASL     A
595600              ASL     A
595700              ADC     TRX!!!06
595800              STA     .1000403
595900              LDA     #0
596000              ADC     TRX!!!06+1
596100              STA     .1000403+1
596200   .MFFDIV    SET     1
596300              JSR     .FFDIV
596400              .BYTE   0
596500              .WORD   -.1000402,TRMAX!06
596600              .WORD   -.1000403
596700      ;       TRY(I)=TRY(I)/TRMAX
596800              LDA     I!!!!!06+1
596900              SEC
597000              SBC     #1
597100              ASL     A
597200              ASL     A
597300              ADC     TRY!!!06
597400              STA     .1000402
597500              LDA     #0
597600              ADC     TRY!!!06+1
597700              STA     .1000402+1
597800              LDA     I!!!!!06+1
597900              SEC
598000              SBC     #1
598100              ASL     A
598200              ASL     A
598300              ADC     TRY!!!06
598400              STA     .1000403
598500              LDA     #0
598600              ADC     TRY!!!06+1
598700              STA     .1000403+1
598800   .MFFDIV    SET     1
598900              JSR     .FFDIV
599000              .BYTE   0
599100              .WORD   -.1000402,TRMAX!06
599200              .WORD   -.1000403
599300      ;       TRZ(I)=TRZ(I)/TRMAX
599400              LDA     I!!!!!06+1
599500              SEC
599600              SBC     #1
599700              ASL     A
599800              ASL     A
599900              ADC     TRZ!!!06
600000              STA     .1000402
600100              LDA     #0
600200              ADC     TRZ!!!06+1
600300              STA     .1000402+1
600400              LDA     I!!!!!06+1
600500              SEC
600600              SBC     #1
600700              ASL     A
600800              ASL     A
600900              ADC     TRZ!!!06
601000              STA     .1000403
601100              LDA     #0
601200              ADC     TRZ!!!06+1
601300              STA     .1000403+1
601400   .MFFDIV    SET     1
601500              JSR     .FFDIV
601600              .BYTE   0
```

```
601700              .WORD -.T000402,TRMAX!06
601800              .WORD -.T000403
601900      ; 120   CONTINUE
602000   .L000418 EQU    *
602100              JMP     .L000414
602200   .L000415 EQU    *
602300      ; C
602400      ; C FIND THE LARGEST SUM OF THE SQUARE OF AMPLITUDE.
602500      ; C
602600      ;       AMP1=0.
602700   .MFLTASG SET    1
602800              JSR     .FLTASGN
602900              .BYTE   0
603000              .WORD   .C000419
603100              .WORD   AMP1!!06
603200      ;       AMP2=0.
603300   .MFLTASG SET    1
603400              JSR     .FLTASGN
603500              .BYTE   0
603600              .WORD   .C000420
603700              .WORD   AMP2!!06
603800      ;       AMP3=0.
603900   .MFLTASG SET    1
604000              JSR     .FLTASGN
604100              .BYTE   0
604200              .WORD   .C000421
604300              .WORD   AMP3!!06
604400      ;       DO 140 I=1,WINDOW
604500              LDA     #0
604600              STA     I!!!!!06
604700              LDA     #1
604800              STA     I!!!!!06+1
604900              JMP     .L000424
605000   .L000422 EQU    *
605100              LDA     I!!!!!06+1
605200              CLC
605300              ADC     #1
605400              STA     I!!!!!06+1
605500              LDA     I!!!!!06
605600              ADC     #0
605700              STA     I!!!!!06
605800              LDA     WINDOW!06+1
605900              CMP     I!!!!!06+1
606000              LDA     WINDOW!06
606100              SBC     I!!!!!06
606200              BMI     .L000423
606300   .L000424 EQU    *
606400      ;       AMP1=AMP1+TRX(I)**2.0
606500              LDA     I!!!!!06+1
606600              SEC
606700              SBC     #1
606800              ASL     A
606900              ASL     A
607000              ADC     TRX!!06
607100              STA     .T000402
607200              LDA     #0
607300              ADC     TRX!!06+1
607400              STA     .T000402+1
607500   .MFFADD  SET    1
607600              JSR     .FFADD
607700              .BYTE   0
607800              .WORD   -.T000402,.C000427
607900              .WORD   AMP1!!06
608000      ;       AMP2=AMP2+TRY(I)**2.0
608100              LDA     I!!!!!06+1
608200              SEC
608300              SBC     #1
608400              ASL     A
608500              ASL     A
608600              ADC     TRY!!06
608700              STA     .T000402
```

```
608800            LDA     #0
608900            ADC     TRY!!!06+1
609000            STA     .T000402+1
609100   .MFFADD  SET     1
609200            JSR     .FFADD
609300            .BYTE   0
609400            .WORD   -.T000402,.C000428
609500            .WORD   AMP2!!06
609600   ;        AMP3=AMP3+TPZ(1)**2.0
609700            LDA     T!!!!!06+1
609800            SEC
609900            SBC     #1
610000            ASL     A
610100            ASL     A
610200            ADC     TRZ!!!06
610300            STA     .T000402
610400            LDA     #0
610500            ADC     TRZ!!!06+1
610600            STA     .T000402+1
610700   .MFFADD  SET     1
610800            JSR     .FFADD
610900            .BYTE   0
611000            .WORD   -.T000402,.C000429
611100            .WORD   AMP3!!06
611200   ;  140   CONTINUE
611300   .L000426 EQU     *
611400            JMP     .L000422
611500   .L000423 EQU     *
611600   ;        AMP=SQRT(AMAX1(AMP1,AMP2,AMP3))
611700            LDA     #AMP3!!06 MOD .M
611800            STA     AMAX1.03
611900            LDA     #AMP3!!06/256
612000            STA     AMAX1.03+1
612100            LDA     #AMP2!!06 MOD .M
612200            STA     AMAX1.02
612300            LDA     #AMP2!!06/256
612400            STA     AMAX1.02+1
612500            LDA     #AMP1!!06 MOD .M
612600            STA     AMAX1.01
612700            LDA     #AMP1!!06/256
612800            STA     AMAX1.01+1
612900            LDA     #.T000410 MOD .M
613000            STA     AMAX1.00
613100            LDA     #.T000410/256
613200            STA     AMAX1.00+1
613300            JSR     AMAX1
613400            LDA     #.T000410 MOD .M
613500            STA     SQRT.001
613600            LDA     #.T000410/256
613700            STA     SQRT.001+1
613800            LDA     #.T000410 MOD .M
613900            STA     SQRT.000
614000            LDA     #.T000410/256
614100            STA     SQRT.000+1
614200            JSR     SQRT
614300   .MFLASG  SET     1
614400            JSR     .FLASGN
614500            .BYTE   0
614600            .WORD   .T000410
614700            .WORD   AMP!!06
614800   ;        HFWIN=WINDOW/2
614900   .MIDIV   SET     1
615000            JSR     .IDIV
615100            .BYTE   5
615200            .WORD   WINDOW06,.C000013
615300            .WORD   HFWIN06
615400   ;        IF(AMP.LE.1.E-4)GO TO 170
615500   .MFFLE   SET     1
615600            JSR     .FFLE
615700            .BYTE   0
615800            .WORD   AMP!!06,.C000430
615900            ASL     A
616000            BCS     *+5
```

```
616100              JMP     .L000431
616200              JMP     .L000432
616300    .L000431 EQU     *
616400       ;        DO 160 I=1,HFWIN
616500              LDA     #0
616600              STA     I!!!!!06
616700              LDA     #1
616800              STA     I!!!!!06+1
616900              JMP     .L000435
617000    .L000433 EQU     *
617100              LDA     I!!!!!06+1
617200              CLC
617300              ADC     #1
617400              STA     I!!!!!06+1
617500              LDA     I!!!!!06
617600              ADC     #0
617700              STA     I!!!!!06
617800              LDA     HFWIN!06+1
617900              CMP     I!!!!!06+1
618000              LDA     HFWIN!06
618100              SBC     I!!!!!06
618200              BMI     .L000434
618300    .L000435 EQU     *
618400       ;        TRX(I)=TRX(I)/AMP
618500              LDA     I!!!!!06+1
618600              SEC
618700              SBC     #1
618800              ASL     A
618900              ASL     A
619000              ADC     TRX!!!06
619100              STA     .T000402
619200              LDA     #0
619300              ADC     TRX!!!06+1
619400              STA     .T000402+1
619500              LDA     I!!!!!06+1
619600              SEC
619700              SBC     #1
619800              ASL     A
619900              ASL     A
620000              ADC     TRX!!!06
620100              STA     .T000403
620200              LDA     #0
620300              ADC     TRX!!!06+1
620400              STA     .T000403+1
620500    .MFFDIV  SET     1
620600              JSR     .FFDIV
620700              .BYTE   0
620800              .WORD   -.T000402,AMP!!!06
620900              .WORD   -.T000403
621000       ;        TRY(I)=TRY(I)/AMP
621100              LDA     I!!!!!06+1
621200              SEC
621300              SBC     #1
621400              ASL     A
621500              ASL     A
621600              ADC     TRY!!!06
621700              STA     .T000402
621800              LDA     #0
621900              ADC     TRY!!!06+1
622000              STA     .T000402+1
622100              LDA     I!!!!!06+1
622200              SEC
622300              SBC     #1
622400              ASL     A
622500              ASL     A
622600              ADC     TRY!!!06
622700              STA     .T000403
622800              LDA     #0
622900              ADC     TRY!!!06+1
623000              STA     .T000403+1
623100    .MFFDIV  SET     1
623200              JSR     .FFDIV
623300              .BYTE   0
```

```
623400              .WORD   -.1000402,AMP!!!06
623500              .WORD   -.1000403
623600      ;       TRZ(I)=TRZ(I)/AMP
623700              LDA     I!!!!!06+1
623800              SEC
623900              SBC     #1
624000              ASL     A
624100              ASL     A
624200              ADC     TRZ!!!06
624300              STA     .1000402
624400              LDA     #0
624500              ADC     TRZ!!!06+1
624600              STA     .1000402+1
624700              LDA     I!!!!!06+1
624800              SEC
624900              SBC     #1
625000              ASL     A
625100              ASL     A
625200              ADC     TRZ!!!06
625300              STA     .1000403
625400              LDA     #0
625500              ADC     TRZ!!!06+1
625600              STA     .1000403+1
625700      .MFFDIV SEI     1
625800              JSR     .FFDIV
625900              .BYTE   0
626000              .WORD   -.1000402,AMP!!!06
626100              .WORD   -.1000403
626200      ; 160   CONTINUE
626300      .L000437 EQU    *
626400              JMP     .L000433
626500      .L000434 EQU    *
626600      ; C
626700      ; C ENTER A LOOP TO SCALE C    DATA FOR ALL WINDOWS.
626800      ; C
626900      ; 170   NA=WINDOW+1
627000      .L000432 EQU    *
627100              LDA     WINDOW06+1
627200              CLC
627300              ADC     #1
627400              STA     NA!!!!06+1
627500              LDA     WINDOW06
627600              ADC     #0
627700              STA     NA!!!!06
627800      ;       NZ=2*WINDOW
627900      .MIMUL  SEI     1
628000              JSR     .IMUL
628100              .BYTE   0
628200              .WORD   .L000015,WINDOW06
628300              .WORD   NZ!!!!06
628400      ;       NS=HFWIN+1
628500              LDA     HFWIN!06+1
628600              CLC
628700              ADC     #1
628800              STA     NS!!!!06+1
628900              LDA     HFWIN!06
629000              ADC     #0
629100              STA     NS!!!!06
629200      ;       NI=HFWIN+WINDOW
629300              LDA     HFWIN!06+1
629400              CLC
629500              ADC     WINDOW06+1
629600              STA     NI!!!!06+1
629700              LDA     HFWIN!06
629800              ADC     WINDOW06
629900              STA     NI!!!!06
630000      ;       NWIN1=NWIN-1
630100              LDY     #1
630200              LDA     (NWIN!!06),Y
630300              SEC
630400              SBC     #1
630500              STA     NWIN!06+1
630600              LDA     (NWIN!!06)
```

```
630700            SBC     #0
630800 _____  SIA     _NI11106_____
630900    ;       UO 500  I=1,NPIN1
631000.           LDA     #0
631100 _____SIA____L!!!!!06_____
631200            LDA     #1
631300            SIA     L!!!!!06+1
631400 _____JMP     _L000440_____
631500    .L000438 EUU    *
631600            LDA     L!!!!!06+1
631700 _____CLL_____
631800            AUL     #1
631900            SIA   . L!!!!!06+1
```

It should thus be understood that the invention is not limited to any specific embodiments set forth herein, as variations are readily apparent, and thus the invention is to be given the broadest possible interpretation within the terms of the following claims.

The embodiments of the invention in which an exclusive property or privilege is claimed are defined as follows:

1. Method of accurately determining shape and elastic parameters of an earth formation to identify ore, marker rocks, economic minerals or the like, using a refraction exploration field system including a series of detectors, positioned along a line or survey at inline positions $X_1, X_2, \ldots X_n$ and at least one seismic source located adjacent to said detectors for producing a seismic wave for travel through said formation:
   (a) generating a seismic wave at a first sourcepoint location adjacent said series of detectors;
   (b) after said wave undergoes refraction, detecting arrival of a refracted wave at said series of detectors at said inline offset positions, to obtain a first set of traces associated with said offset positions $X_1, X_2, \ldots X_n$;
   (c) repeating steps (a) and (b) by generating a second wave at a second sourcepoint adjacent to inline position $X_n$ of said detector positions, and detecting said refracted wave to obtain a second set of traces;
   (d) advancing said series of detectors a selected number of inline positions or fractions thereof and repeating steps (a), (b) and (c) above to obtain additional sets of traces, but in which said additional sets of traces are associated with more than two inline positions overlapping common inline positions of said first and second sets of traces;
   (e) distinguishing arrival times of shear waves from compressional waves by means of two-dimensional hodographs generated by a computer-dominated process; and
   (f) analyzing arrival times of at least one segment of (i) shear waves and (ii) compressional waves as a function of inline position whereby shape of said earth formation as well as elastic parameters indicative of likelihood of said formation being an ore, marker rock, economic mineral, and the like, are provided.

2. The method of claim 1 in which step (e) includes the substeps of:
   (i) plotting V, T and R amplitude-vs.-time traces on a side-by-side basis to form a record where V is the vertical P-wave response at the series of detectors, T is the transverse SH-wave response at the detectors, and R is the radial SV-wave response at the detectors; and
   (ii) on said record also plotting three separate rows of V-R, V-T, and R-T hodographs as a function of a series of columnar time gates, so as to distinguish arrival times of compressional P-waves and transverse SH- and radial SV-shear waves associated with and appearing along said side-by-side V, T and R traces.

3. Method of claim 2 in which sub-step (ii) includes:
   (a) annotating both horizontal and vertical axes of said rows of V-R, V-T and R-T hodographs, as well as said columnar time gates; and
   (b) after converting all trace data points to correct plotter scale, plotting on said record straight lines between said scaled data points, to form said rows of V-R, V-T and R-T hodographs on said record.

4. Method of claim 3 in which sub-step (ii) includes the additional steps of
   (c) classifying particle motion associated with said rows of V-R, V-T and R-T hodographs as horizontal, vertical or circular motion; and
   (d) based on which of said hodographs being classified as horizontal, vertical or circular motion, determining arrival times of said traces as being associated with shear, compressional or Rayleigh waves.

5. In accurately determining shape and elastic parameters of an earth formation to identify ore, marker rocks, economic minerals or the like, using a refraction exploration field system including a series of detectors, positioned along a line of survey at inline positions $X_1, X_2, \ldots X_n$ and at least one seismic source located adjacent to said detectors for producing a seismic wave for travel through said formation, means for distinguishing arrival times of refracted shear waves from compressional waves by means of two-dimensional, generated hodographs, and means for plotting a series of said distinguished refracted travel time values versus horizontal offset coordinate annotated by sourcepoint-profile number and refraction arrival direction indicated by sourcepoint offset positions at one of a forward and trailing inline position $X_1$ and $X_n$ of said detectors, slope of said travel time values versus offset being indicative of apparent P-wave and/or S-wave velocities, said sourcepoint offset positions being alignable along an imaginary line of ascertainable slope.

6. Means of claim 5 in which said distinguishing means includes means for classifying particle motion of said hodographs as vertical, horizontal or circular.

7. Means of claim 5 in which said plotting means includes means for selecting refraction events from field data provided by said refraction field system, and means for plotting said events to indicate refraction travel time as a formation of horizontal offset.

8. Means of claim 5 in which said first- and second-mentioned means are a properly programmed digital computer.

* * * * *